United States Patent
Hernández Herrero et al.

(10) Patent No.: US 12,492,199 B2
(45) Date of Patent: Dec. 9, 2025

(54) PYRIDOPYRIMIDINES AS HISTAMINE H4-RECEPTOR INHIBITORS

(71) Applicant: FAES FARMA, S.A., Vizcaya (ES)

(72) Inventors: Gonzalo Hernández Herrero, Vizcaya (ES); Neftalí García Domínguez, Vizcaya (ES); Arturo Zazpe Arce, Vizcaya (ES); Roberto Olivera Tizne, Vizcaya (ES); Bárbara Noverges Pedro, Vizcaya (ES); Reyes Corcóstegui Vivar, Vizcaya (ES); Paloma Tato Cerdeiras, Vizcaya (ES)

(73) Assignee: FAES FARMA, S.A., Vizcaya (ES)

( * ) Notice: Subject to any disclaimer, the term of this patent is extended or adjusted under 35 U.S.C. 154(b) by 851 days.

(21) Appl. No.: 17/261,939

(22) PCT Filed: Jul. 24, 2019

(86) PCT No.: PCT/EP2019/069905
§ 371 (c)(1),
(2) Date: Jan. 21, 2021

(87) PCT Pub. No.: WO2020/020939
PCT Pub. Date: Jan. 30, 2020

(65) Prior Publication Data
US 2021/0300922 A1 Sep. 30, 2021

(30) Foreign Application Priority Data
Jul. 25, 2018 (EP) ..................................... 18382559

(51) Int. Cl.
*C07D 471/04* (2006.01)
*C07D 519/00* (2006.01)

(52) U.S. Cl.
CPC ......... *C07D 471/04* (2013.01); *C07D 519/00* (2013.01)

(58) Field of Classification Search
None
See application file for complete search history.

(56) References Cited

U.S. PATENT DOCUMENTS

2011/0201628 A1* 8/2011 Chuaqui ............. C07D 471/04
544/278
2011/0319409 A1* 12/2011 Cox ....................... A61P 25/18
514/264.11

FOREIGN PATENT DOCUMENTS

| WO | WO 2009/083608 A1 | 7/2009 |
|---|---|---|
| WO | 2010108059 A1 | 9/2010 |
| WO | WO 2010/146173 A1 | 12/2010 |
| WO | WO 2013/060881 A1 | 5/2013 |
| WO | WO 2014/052699 A1 | 4/2014 |
| WO | WO 2016/107848 A1 | 7/2016 |
| WO | WO 2018/190778 A2 | 11/2018 |

OTHER PUBLICATIONS

Zhang et al. Discovery of 2,4,6-trisubsittued pyrido[3,4-d]pyrimidine derivatives as new EGFR-TKIs. European Journal of Medicinal Chemistry. Published Feb. 16, 2018. (Year: 2018).*
González Campos, R.M. et al., "Estudio Oscilopolarografico de dos Derivados 5, 4d pirimidinicos", Ars. Pharmaceut., 1986, vol. 27, pp. 255-261.
Odingo, J. et al., "Synthesis and evaluation of the 2, 4-diaminoquinazoline series as anti-tubercular agents", Bioorganic & Medicinal Chemistry, 2014, vol. 22, pp. 6965-6979.
Smits, R.A. et al., "Discovery of Quinazolines as Histamine $H_4$ Receptor Inverse Agonists Using a Scaffold Hopping Approach", J. Med. Chem. , 2008, vol. 51, pp. 7855-7865.
Smits, R.A. et al., "Synthesis and QSAR of Quinazoline Sulfonamides As Highly Potent Human Histamine $H_4$ Receptor Inverse Agonists", Journal of Medicinal Chemistry, 2010, vol. 53, pp. 2390-2400.
CAS Registry No. 112059-16-2, accessed Dec. 25, 1987.
Search Report issued by the Intellectual Property Office of Singapore (IPOS) on Dec. 21, 2021 in connection with Singaporean Application No. 11202100575Q.
Chilian Patent Application No. CL 2019003049 A1, issued Feb. 7, 2019 (English Abstract only).

* cited by examiner

*Primary Examiner* — James H Alstrum-Acevedo
*Assistant Examiner* — Lauren Wells
(74) *Attorney, Agent, or Firm* — Gary J. Gershik

(57) ABSTRACT

The invention relates to compounds of formula (I):

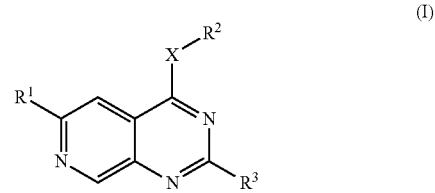

or pharmaceutically acceptable salts or solvates thereof, to pharmaceutical compositions comprising them and to their use in the treatment and/or prevention of diseases or disorders mediated by histamine H4 receptor.

6 Claims, No Drawings

PYRIDOPYRIMIDINES AS HISTAMINE H4-RECEPTOR INHIBITORS

RELATED APPLICATIONS

This application is a § 371 national stage of PCT International Application No. PCT/EP2019/069905, filed Jul. 24, 2019, claiming priority of European Patent Application No. 18382559.5, filed Jul. 25, 2018, the contents of each of which are hereby incorporated by reference into this application.

FIELD OF THE INVENTION

The present invention relates to new pyrido[3,4-d]pyrimidine derivatives, pharmaceutical compositions comprising them and their use in the prevention and/or treatment of histamine H4 receptor mediated diseases or disorders.

STATE OF THE ART

The histamine H4 receptor was identified in 2000 as a receptor for histamine. After its discovery, histamine H4 receptor has attracted much attention due to its role as a mediator of allergic and inflammatory processes, among others.

Attempts at obtaining efficient histamine H4 receptor inhibitors have multiplied in recent years and this research has resulted in several recent patent applications claiming pharmaceutical compositions for disorders and diseases mediated by this receptor.

Documents WO 2009/083608, WO 2010/146173 A and Smits et al., J. Med. Chem. 2008, 51, 7855-7865 disclose quinazoline compounds with activity as histamine H4 receptor inhibitors.

In particular, WO 2009/083608 describes the synthesis and H4 binding affinity of quinazoline compounds of the following formula

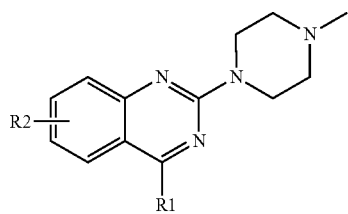

wherein R1 is a sulfonamide-substituted alkylamine.

Similarly, Smits at al. (J. Med. Chem. 2008, 51, 7855-7865) disclose histamine H4 receptor inverse agonist with this same quinazoline scaffold and wherein R1 can represent differently substituted amine groups.

Finally, WO 2010/146173 refers to the H4 receptor binding affinity of several compounds with a primary amine group at position 1 and a piperazine ring at position 4 of the quinazoline skeleton.

However, there still remains a need to find new and efficient compounds to treat histamine H4 receptor mediated diseases or disorders.

SUMMARY OF THE INVENTION

The authors of the present invention have found that compounds of formula (I) show activity as histamine H4-receptor antagonists and are therefore useful in the treatment of disorders and diseases mediated by this receptor.

These compounds present a new pyrido[3,4-d]pyrimidine scaffold, for which antihistaminic activity had never been disclosed. Additionally, as disclosed in the experimental section, the inventors have found that these compounds are not only efficient H4-receptor antagonists, but also present an improved affinity for said receptor compared to the corresponding quinazolines and to the isomeric pyrido[4,3-d]pyrimidine compounds.

Moreover, the inventors have surprisingly found that compounds of formula (I) can be also active as histamine H1-receptor antagonists, and therefore can inhibit both histamine receptors. This dual inhibition provides an improved effect in diseases and disorders in which both receptors are involved, such as type I allergic diseases.

Therefore, according to a first aspect, the present invention is directed to a compound of formula (I'):

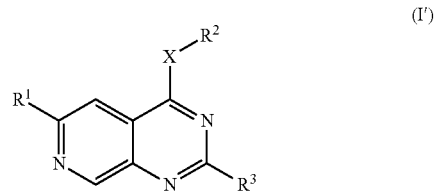

or a salt or solvate thereof,
wherein:
$R^1$ is selected from hydrogen, halogen, optionally substituted $C_{1-6}$ alkyl, optionally substituted $C_{3-7}$ cycloalkyl, optionally substituted $C_{6-10}$ aryl, optionally substituted 5- to 10-membered heterocyclyl, $OR^4$, $SR^4$, $NR^4R^5$, $COR^4$ and $CONR^4R^5$, wherein $R^4$ and $R^5$ are independently selected from H and optionally substituted $C_{1-6}$ alkyl;
X is selected from —O— and —$NR^6$—, wherein $R^e$ is selected from H and $C_{1-6}$ alkyl;
$R^1$ is selected from:
  $C_{1-6}$ alkyl optionally substituted by:
    $C_{1-6}$ alkyl,
    optionally substituted $C_{3-7}$ cycloalkyl,
    optionally substituted $C_{6-10}$ aryl,
    optionally substituted 5- to 10-membered heterocyclyl,
    optionally substituted 5- to 10-membered heteroaryl, and
    $OR^7$, wherein $R^7$ is selected from H and optionally substituted $C_{1-6}$ alkyl;
    $NR^8R^9$, wherein $R^8$ and $R^9$ are independently selected from H and optionally substituted $C_{1-6}$ alkyl;
    $COR^{10}$, wherein $R^{10}$ is selected from optionally substituted $C_{1-6}$ alkyl, optionally substituted $C_{6-10}$ aryl, optionally substituted $(C_{6-10})$aryl$(C_{1-6})$alkyl, optionally substituted 5- to 10-membered heterocyclyl and optionally substituted 5- to 10-membered heteroaryl;
    $CONR^{11}R^{12}$, wherein $R^{11}$ and $R^{12}$ are independently selected from H, optionally substituted $C_{1-6}$ alkyl, optionally substituted $C_{6-10}$ aryl, optionally substituted $(C_{6-10})$aryl$(C_{1-6})$alkyl, optionally substituted 5- to 10-membered heterocyclyl and optionally substituted 5- to 10-membered heteroaryl;

SOR$^{13}$, wherein R$^{13}$ is selected from optionally substituted C$_{1-6}$ alkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl;

SO$_2$R$^{14}$, wherein R$^{14}$ is selected from optionally substituted C$_{1-6}$ alkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl;

SO$_2$NR$^{15}$R$^{18}$, wherein R$^{15}$ and R$^{16}$ are independently selected from H, optionally substituted C$_{1-6}$ alkyl, optionally substituted C$_{3-7}$ cycloalkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl; and SO(=NH)NHR$^{17}$, wherein R$^{17}$ is selected from H, optionally substituted C$_{1-6}$ alkyl, optionally substituted C$_{3-7}$ cycloalkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl;

optionally substituted C$_{3-7}$ cycloalkyl;

optionally substituted C$_{6-10}$ aryl; and optionally substituted (C$_{6-10}$)aryl(C$_{1-6}$)alkyl;

R$^3$ is selected from:

optionally substituted 5- to 10-membered heterocyclyl and

NR$^{18}$R$^{19}$, wherein R$^{18}$ is selected from H and C$_{1-6}$ alkyl, and R$^{19}$ is selected from C$_{1-6}$ alkyl optionally substituted by optionally substituted 5- to 10-membered heterocyclyl or by optionally substituted 5- to 10-membered heteroaryl;

provided that the compound of formula (I) is not (4-fluoro-benzyl)-(2-piperidin-1-yl-pyrido[3,4-d]pyrimidin-4-yl)-amine; [2-(3,4-dihydro-1H-isoquinolin-2-yl)-pyrido[3,4-d]pyrimidin-4-yl]-pyridin-4-ylmethyl-amine; pyridin-4-ylmethyl-[2-(8-thiazol-2-yl-3,4-dihydro-1H-isoquinolin-2-yl)-pyrido[3,4-d]pyrimidin-4-yl]-amine; {2-[8-(morpholine-4-sulfonyl)-3,4-dihydro-1H-isoquinolin-2-yl]-pyrido[3,4-d]pyrimidin-4-yl}-pyridin-4-ylmethyl-amine; N$^1$-(2-morpholin-4-yl-pyrido[3,4-d]pyrimidin-4-yl)-3-phenyl-propane-1,2-diamine; and 2-[(2,6-di-morpholin-4-yl-pyrido[3,4-d]pyrimidin-4-yl)-methyl-amino]-ethanol.

According to a further aspect, the present invention is directed to a pharmaceutical composition comprising a compound of formula (I') as defined above, or a pharmaceutically acceptable salt or solvate thereof, and at least one pharmaceutically acceptable excipient.

A further aspect of the invention refers to a compound of formula (I') as defined above, or a pharmaceutically acceptable salt or solvate thereof, for use as a medicament.

A further aspect of the invention is directed to a compound of formula (I)

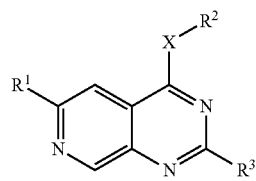

or a pharmaceutically acceptable salt or solvate thereof, wherein:

R$^1$ is selected from hydrogen, halogen, optionally substituted C$_{1-6}$ alkyl, optionally substituted C$_{3-7}$ cycloalkyl, optionally substituted C$_{6-10}$ aryl, optionally substituted 5-to 10-membered heterocyclyl, OR$^4$, SR$^4$, NR$^4$R$^5$, COR$^4$ and CONR$^4$R$^5$, wherein R$^4$ and R$^5$ are independently selected from H and optionally substituted C$_{1-6}$ alkyl;

X is selected from —O— and —NR$^6$—, wherein R$^6$ is selected from H and C$_{1-6}$ alkyl;

R$^2$ is selected from:

C$_{1-6}$ alkyl optionally substituted by:
C$_{1-6}$ alkyl,
optionally substituted C$_{3-7}$ cycloalkyl,
optionally substituted C$_{6-10}$ aryl,
optionally substituted 5- to 10-membered heterocyclyl,
optionally substituted 5- to 10-membered heteroaryl, and
OR$^7$, wherein R$^7$ is selected from H and optionally substituted C$_{1-6}$ alkyl;

NR$^8$R$^9$, wherein R$^8$ and R$^9$ are independently selected from H and optionally substituted C$_{1-6}$ alkyl;

COR$^{10}$, wherein R$^{10}$ is selected from optionally substituted C$_{1-6}$ alkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl;

CONR$^{11}$R$^{12}$, wherein R$^{11}$ and R$^{12}$ are independently selected from H, optionally substituted C$_{1-6}$ alkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl;

SOR$^{13}$, wherein R$^{13}$ is selected from optionally substituted C$_{1-6}$ alkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl;

SO$_2$R$^{14}$, wherein R$^{14}$ is selected from optionally substituted C$_{1-6}$ alkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl;

SO$_2$NR$^{15}$R$^{18}$, wherein R$^{15}$ and R$^{16}$ are independently selected from H, optionally substituted C$_{1-6}$ alkyl, optionally substituted C$_{3-7}$ cycloalkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl; and SO(=NH)NHR$^{17}$, wherein R$^{17}$ is selected from H, optionally substituted C$_{1-6}$ alkyl, optionally substituted C$_{3-7}$ cycloalkyl, optionally substituted C$_{6-10}$ aryl, optionally substituted (C$_{6-10}$)aryl(C$_{1-6}$)alkyl, optionally substituted 5- to 10-membered heterocyclyl and optionally substituted 5- to 10-membered heteroaryl;

optionally substituted C$_{3-7}$ cycloalkyl;
optionally substituted C$_{6-10}$ aryl; and
optionally substituted (C$_{6-10}$)aryl(C$_{1-6}$)alkyl;
R$^3$ is selected from:
optionally substituted 5- to 10-membered heterocyclyl and
NR$^{18}$R$^{19}$, wherein R$^{18}$ is selected from H and C$_{1-6}$ alkyl, and R$^{19}$ is selected from C$_{1-6}$ alkyl optionally substituted by optionally substituted 5- to 10-membered heterocyclyl or by optionally substituted 5- to 10-membered heteroaryl;

provided that the compound of formula (I) is not [2-(3,4-dihydro-1H-isoquinolin-2-yl-pyrido[3,4-d]pyrimidin-4-yl]-pyridin-4-ylmethyl-amine; pyridin-4-ylmethyl-[2-(8-thiazol-2-yl-3,4-dihydro-1H-isoquinolin-2-yl)-pyrido[3,4-d]pyrimidin-4-yl]-amine; {2-[8-(morpholine-4-sulfonyl)-3,4-dihydro-1H-isoquinolin-2-yl]-pyrido[3,4-d]pyrimidin-4-yl}-pyridin-4-ylmethyl-amine; and N$^1$-(2-morpholin-4-yl-pyrido[3,4-d]pyrimidin-4-yl)-3-phenyl-propane-1,2-diamine;
for use in the treatment and/or prevention of a disorder or disease mediated by histamine H4 receptor.

A further aspect of the invention are the compounds of formula (I) as defined above, or a pharmaceutically acceptable salt or solvate thereof, for use in the treatment and/or prevention of a disorder or disease susceptible to amelioration by antagonism of histamine H4 receptor.

According to a further aspect, the present invention is directed to the use of a compound of formula (I) as defined above, or a pharmaceutically acceptable salt or solvate thereof, in the preparation of a medicament for the treatment and/or prevention of a disorder or disease mediated by histamine H4 receptor.

In a further aspect, the invention is directed to a method of treating and/or preventing a disorder or disease mediated by histamine H4 receptor, said method comprising administering to a patient in need of such a treatment and/or prevention a therapeutically effective amount of at least one compound of formula (I) as described above, or a pharmaceutically acceptable salt or solvate thereof.

DETAILED DESCRIPTION OF THE INVENTION

In the context of the present invention, the following terms have the meaning detailed below:

The term "C$_{1-6}$ alkyl" refers to a linear or branched hydrocarbon chain radical consisting of carbon and hydrogen atoms, containing no insaturation, having between 1 and 6, preferably between 1 and 3 ("C$_3$ alkyl"), more preferably 1 or 2 ("C$_2$ alkyl"), carbon atoms and which is attached to the rest of the molecule by a single bond, including for example and in a non-limiting sense, methyl, ethyl, n-propyl, i-propyl, n-butyl, t-butyl, n-pentyl, etc. Preferably "alkyl" refers to methyl or ethyl.

The term "C$_{3-7}$ cycloalkyl" refers to a saturated or partially saturated mono- or bicyclic aliphatic group having between 3 and 7, preferably between 3 and 6 carbon atoms which is bound to the rest of the molecule by means of a single bond, including for example and in a non-limiting sense, cyclopropyl, cyclohexyl, cyclopentyl, etc.

The term "C$_{6-10}$ aryl" refers to an aromatic group having between 6 and 10, preferably 6 or 10 carbon atoms, comprising 1 or 2 aromatic nuclei, including for example and in a non-limiting sense, phenyl, naphthyl, etc. Preferably "aryl" refers to phenyl.

"5- to 10-membered heterocyclyl" refers to a stable 5- to 10-membered ring radical, preferably a 5- or 6-membered ring, which consists of carbon atoms and from one to five, preferably from 1 to 4, heteroatoms selected from the group consisting of nitrogen, oxygen, and sulphur and which can be partially or fully saturated. For the purposes of this invention, the heterocycle can be a monocyclyl or bicyclyl ring system. Examples of such heterocycles include, but are not limited to, pyrrolidine, piperidine, tetrahydropyridine, piperazine, morpholine, thiomorpholine, diazepane, tetrahydrofuran, tetrahydropyran, octahydro-pyrrolopyrazine.

"5- to 10-membered heteroaryl" refers to a stable 5- to 10-membered aromatic ring radical, preferably a 5- or 6-membered aromatic ring, which consists of carbon atoms and from one to five, preferably from 1 to 4, heteroatoms selected from the group consisting of nitrogen, oxygen, and sulphur. For the purposes of this invention, the heteroaryl can be a monocyclyl or bicyclyl ring system. Examples of such heteroaryl include, but are not limited to, thiophene, furan, pyrrole, thiazole, oxazole, isothiazole, isooxazole, imidazole, pyrazole, triazole, oxadiazole, thiadiazole, tetrazole, tetrazole oxide, oxadiazolone, pyridine, pyrimidine, dihydroindolone, benzimidazole, benzothiazole, benzofuran, indole, purine, quinoline.

The term "(C$_6$-C$_{10}$)aryl(C$_1$-C$_6$)alkyl" refers to an aryl group as defined above which is attached to the rest of the molecule through an alkyl group as defined above. Preferably, the (C$_6$-C$_{10}$)aryl(C$_1$-C$_6$)alkyl is a (C$_6$)aryl(C$_1$-C$_3$)alkyl, such as benzyl.

The term "C$_1$-C$_6$ haloalkyl" refers to an alkyl group as defined above wherein at least one of the hydrogen atoms has been replaced by a halogen atom such as, for example CF$_3$, CCl$_3$, CHF$_2$, CH$_2$F, CF$_2$CF$_3$.

The term "halogen" refers to bromo, chloro, iodo or fluoro.

As understood in this technical area, there can be a certain degree of substitution on the previously defined radicals. Thus, there can be substitution in any of the groups of the present invention. The references of the present document to substituted groups in the groups of the present invention indicate that the specified radical can be substituted in one or more available positions by one or more substituents. Said substituents include, for example and in a non-limiting sense, halogen, optionally substituted C$_{1-6}$ alkyl, C$_{1-6}$ haloalkyl, optionally substituted C$_{3-7}$ cycloalkyl, optionally substituted C$_{6-10}$ aryl, optionally substituted (C$_{6-10}$)aryl(C$_{1-6}$)alkyl, optionally substituted 5-to 10-membered heterocyclyl, optionally substituted 5- to 10-membered heteroaryl, CN, NO$_2$, —N(R$_a$)(R$_b$), —OR$_c$, —SR$_d$, —C(O)R$_e$, —C(O)OR$_f$, —C(O)N(R$_g$)(R$_h$), —OC(O)R$_i$, —C(NRj)NR$_k$R$_l$, —SOR$_m$, —SO$_2$R$_n$ and —SO$_2$NR$_o$R$_p$; wherein R$_a$, R$_b$, R$_c$, R$_d$, R$_e$, R$_f$, R$_g$, R$_h$, R$_i$, R$_j$, R$_k$, R$_l$, R$_m$, R$_n$, R$_o$ and R$_p$ are independently selected from hydrogen, optionally substituted C$_{1-6}$ alkyl, C$_{1-6}$ haloalkyl, optionally substituted C$_{6-10}$ aryl, optionally substituted (C$_{6-10}$)aryl(C$_{1-6}$)alkyl, optionally substituted 5- to 10-membered heterocyclyl, and optionally substituted 5- to 10-membered heteroaryl; and wherein said optionally substituted C$_{1-6}$ alkyl, C$_{6-10}$ aryl, (C$_{6-10}$)aryl(C$_{1-6}$)alkyl, 5- to 10-membered heterocyclyl, and 5- to 10-membered heteroaryl can in turn be substituted by one or more groups selected from halogen, $C_{1-6}$ alkyl, $C_{1-6}$ haloalkyl, $C_{3-7}$ cycloalkyl, $C_{6-10}$ aryl, $(C_{6-10})$aryl$(C_{1-6})$alkyl, 5- to 10-membered heterocycyl, 5- to 10-membered heteroaryl, CN, NO$_2$, —N(R$_a$)(R$_b$), —OR$_c$, —SR$_d$, —C(O)R$_e$, —C(O)OR$_f$, —C(O)N(R$_g$)(R$_h$), —OC(O)R$_i$, —C(NR$_j$)NR$_k$R$_l$, —SOR$_m$, —SO$_2$R$_n$ and —SO$_2$NR$_o$R$_p$; wherein R$_a$, R$_b$, R$_c$, R$_d$, R$_e$, R$_f$, R$_g$, R$_h$, R$_i$, R$_j$, R$_k$, R$_l$, R$_m$, R$_n$, R$_o$ and R$_p$ are independently selected from hydrogen, $C_{1-6}$ alkyl, $C_{1-6}$ haloalkyl, $C_{6-10}$ aryl, $(C_{6-10})$aryl$(C_{1-6})$alkyl, 5- to 10-membered heterocyclyl, and 5- to 10-membered heteroaryl.

The invention also provides "salts" of the compounds described herein. By way of illustration, said salts can be acid addition salts, base addition salts or metal salts, and can be synthesized from the parent compounds containing a basic or acid moiety by means of conventional chemical processes known by the person skilled in the art. See, generally, G. S. Paulekuhn, et al., "Trends in Active Pharmaceutical Ingredient Saft Selection based on Analysis of the Orange Book Database", J. Med. Chem., 2007, 50: 6665-72, S. M. Berge, et al., "Pharmaceutical Salts". J Pharm Sci., 1977, 66:1-19, and Handbook of Pharmaceutical Salts. Properties, Selection, and Use, Stahl and Wermuth, Eds., Wiley-VCH and VHCA, Zurich, 2002. Such salts are generally prepared, for example, by reacting the free acid or base forms of said compounds with a stoichiometric amount of the suitable base or acid in water or in an organic solvent or in a mixture of the two. Non-aqueous media such as ether, ethyl acetate, ethanol, acetone, isopropanol or acetonitrile are generally preferred. Illustrative examples of acid addition salts include inorganic acid addition salts such as, for example, hydrochloride, hydrobromide, hydroiodide, sulfate, pyrosulfate, bisulfate, sulfite, bisulfite, nitrate, phosphate, monohydrogen-phosphate, dihydrogenphosphate, meta-phosphate, pyrophosphate, etc., organic acid addition salts such as, for example, acetate, maleate, fumarate, citrate, oxalate, succinate, tartrate, malate, mandelate, methanesulfonate, p-toluenesulfonate, camphorsulfonate, propionates, decanoates, caprylates, acrylates, formates, isobutyrates, caproates, heptanoates, propiolates, malonates, succinates, suberates, sebacates, butyne-1,4-dioates, hexyne-1,6-dioates, benzoates, chlorobenzoates, methylbenzoates, dinitrobenzoates, hydroxybenzoates, methoxybenzoates, phthalates, sulfonates, xylenesulfonates, phenylacetates, phenylpropionates, phenylbutyrates, lactates, y-hydroxybutyrates, glycolates, propanesulfonates, naphthalene-1-sulfonates, naphthalene-2-sulfonates, etc.

Illustrative examples of base addition salts include inorganic base salts such as, for example, ammonium salts and organic base salts such as, for example, ethylenediamine, ethanolamine, N,N-dialkylenethanolamine, triethanolamine, glutamine, amino acid basic salts, etc. Illustrative examples of metal salts include, for example, sodium, potassium, calcium, magnesium, aluminum and lithium salts.

The compounds of the invention may be in the form of salts or solvates, preferably pharmaceutically acceptable salts or solvates.

The term "solvate" according to this invention is to be understood as meaning any form of the active compound according to the invention which has another molecule (most likely a polar solvent) attached to it via non-covalent bonding. Examples of solvates include hydrates and alcoholates. Solvation methods are generally known in the state of the art.

The term "pharmaceutically acceptable" relates to molecular entities and compositions being physiologically tolerable and normally not causing an allergic reaction or similar adverse reaction, such as gastric discomfort, dizziness and the like, when they are administered to a human being. Preferably, as used in this description, the term "pharmaceutically acceptable" means approved by a governmental regulatory agency or listed in the US pharmacopoeia or another generally recognized pharmacopoeia for use in animals, and more particularly in humans.

The compounds of the invention can be in the amorphous or in the crystalline form. The compounds of the invention may present different polymorphic forms, it is intended that the invention encompasses all such forms.

The compounds of the invention may have asymmetric centers and therefore exist in different enantiomeric or diastereomeric forms. Thus, any given compound referred to herein is intended to represent any one of a racemate, one or more enantiomeric forms, one or more diastereomerlc forms. Compounds referred to herein may also exist as atropisomers. All the stereoisomers including enantiomers, diastereoisomers and atropisomers of the compounds referred to herein, and mixtures thereof, are considered within the scope of the present invention.

The invention also encompasses pharmaceutically acceptable prodrugs of the compounds of Formula (I), and treatment methods employing such pharmaceutically acceptable prodrugs. The term "prodrug" means a precursor of a designated compound that, following administration to a subject, yields the compound in vivo via a chemical or physiological process such as solvolysis or enzymatic cleavage, or under physiological conditions (e.g., a prodrug on being brought to physiological pH is converted to the compound of Formula (I)). A "pharmaceutically acceptable prodrug" is a prodrug that is non-toxic, biologically tolerable, and otherwise biologically suitable for administration to the subject. Illustrative procedures for the selection and preparation of suitable prodrug derivatives are described, for example, in "Design of Prodrugs", ed. H. Bundgaard, Elsevier, 1985.

The present invention also encompasses pharmaceutically active metabolites of compounds of Formula (I), and uses of such metabolites in the methods of the invention. A "pharmaceutically active metabolite" means a pharmacologically active product of metabolism in the body of a compound of Formula (I) or salt thereof. Prodrugs and active metabolites of a compound may be determined using routine techniques known or available in the art. See, e.g., Bertolini at al., J. Med. Chem. 1997, 40, 2011-2016; Shan et al., J. Pharm. Sci. 1997, 86 (7), 765-767; Bagshawe, Drug Dev. Res. 1995, 34, 220-230; Bodor, Adv. Drug Res. 1984, 13, 55-331; Bundgaard, Design of Prodrugs (Elsevier Press, 1985); and Larsen, Design and Application of Prodrugs, Drug Design and Development (Krogsgaard-Larsen et al., eds., Harwood Academic Publishers, 1991).

The compounds of Formula (I) and their pharmaceutically acceptable salts, pharmaceutically acceptable solvates, pharmaceutically acceptable prodrugs, and pharmaceutically active metabolites, whether alone or in combination, (collectively, "active agents") of the present invention are useful as histamine H4 receptor modulators in the methods of the invention. Such methods for modulating histamine H4 receptor activity comprise exposing histamine H4 receptor to an effective amount of at least one chemical entity selected from compounds of Formula (I), pharmaceutically acceptable salts of compounds of Formula (I), pharmaceutically acceptable prodrugs of compounds of Formula (I), and pharmaceutically active metabolites of compounds of Formula (I). Embodiments of this invention inhibit histamine H4 receptor activity.

The compounds of the invention are also meant to include compounds which differ only in the presence of one or more isotopically enriched atoms. For example, compounds having the present structures except for the replacement of a hydrogen by a deuterium or tritium, or the replacement of a carbon by a $^{13}$C- or $^{14}$C-enriched carbon or a nitrogen by $^{15}$N-enriched nitrogen are within the scope of this invention.

Compounds of Formula (I)

In a first aspect, the invention is directed to a compound of formula (I), or a salt or a salt or solvate thereof, wherein said compound of formula (I) is not (4-fluoro-benzyl)-(2-piperidin-1-yl-pyrido[3,4-d]pyrimidin-4-yl)-amine; [2-(3,4-dihydro-1H-isoquinolin-2-yl)-pyrido[3,4-d]pyrimidin-4-yl]-pyridin-4-ylmethyl-amine; pyridin-4-ylmethyl-[2-(8-thiazol-2-yl-3,4-dihydro-1H-isoquinolin-2-yl)-pyrido[3,4-d]pyrimidin-4-yl]-amine; {2-[8-(morpholine-4-sulfonyl)-3,4-dihydro-1H-isoquinolin-2-yl]-pyrido[3,4-d]pyrimidin-4-yl}-pyridin-4-ylmethyl-amine; Ni-(2-morpholin-4-yl-pyrido[3,4-d]pyrimidin-4-yl)-3-phenyl-propane-1,2-diamine; and 2-[(2,6-di-morpholin-4-yl-pyrido[3,4-d]pyrimidin-4-yl)-methyl-amino]-ethanol. Such a compound is denoted herein as a compound of formula (I').

Particular and preferred embodiments for the compounds of formula (I) and (I') are described below.

In a particular embodiment, X is selected from —O— and —NR$^6$—, wherein R$^6$ is selected from H and C$_{1-3}$ alkyl.

In another embodiment, X is —NR$^6$—, wherein R$^6$ is selected from H and C$_{1-6}$ alkyl, preferably from H and C$_{1-3}$ alkyl.

In another embodiment, X is selected from —O— and —NH—.

Preferably, X is —NH—.

In an embodiment of the invention, R$^1$ is selected from hydrogen, halogen, optionally substituted C$_{1-6}$ alkyl, OR$^4$, SR$^4$, NR$^4$R$^5$, COR$^4$ and CONR$^4$R$^5$, wherein R$^4$ and R$^5$ are independently selected from H and optionally substituted C$_{1-6}$ alkyl.

In an embodiment of the invention, R$^1$ is selected from:
hydrogen, halogen.

C$_{1-6}$ alkyl optionally substituted by halogen, C$_{1-6}$ alkyl, C$_{1-6}$ haloalkyl, —N(R$_a$)(R$_b$), —OR$_c$, —SR$_d$, —C(O)R$_e$, —C(O)OR$_f$, —C(O)N(R$_g$)(R$_h$) or —OC(O)R$_i$; wherein R$_a$, R$_b$, R$_c$, R$_d$, R$_e$, R$_f$, R$_g$, R$_h$ and R$_i$ are independently selected from hydrogen, C$_{1-6}$ alkyl, C$_{1-6}$ haloalkyl, C$_{6-10}$ aryl and (C$_{6-10}$)aryl(C$_{1-6}$)alkyl, OR$^4$, SR$^4$, NR$^4$R$^5$, COR$^4$ and CONR$^4$R$^5$, wherein R$^4$ and R$^5$ are independently selected from H and C$_{1-6}$ alkyl optionally substituted by halogen, C$_{1-6}$ alkyl, C$_{1-6}$ haloalkyl, —N(R$_a$)(R$_b$), —OR$_c$, —SR$_d$, —C(O)R$_e$, —C(O)OR$_f$, —C(O)N(R$_g$)(R$_h$) or —OC(O)R$_i$; wherein R$_a$, R$_b$, R$_c$, R$_d$, R$_e$, R$_f$, R$_g$, R$_h$ and R$_i$ are independently selected from hydrogen, C$_{1-6}$ alkyl, C$_{1-6}$ haloalkyl, C$_{6-10}$ aryl and (C$_{6-10}$)aryl(C$_{1-6}$)alkyl.

In another embodiment, R$^1$ is selected from:
hydrogen, halogen,

C$_{1-6}$ alkyl optionally substituted by halogen, C$_{1-6}$ alkyl, —N(R$_a$)(R$_b$), —OR$_c$, —SR$_d$, —C(O)R$_e$ or —C(O)N(R$_g$)(R$_h$); wherein R$_a$, R$_b$, R$_c$, R$_d$, R$_e$, R$_g$ and R$_h$ are independently selected from hydrogen and C$_{1-6}$ alkyl, OR$^4$, SR$^4$, NR$^4$R$^5$, COR$^4$ and CONR$^4$R$^5$, wherein R$^4$ and R$^5$ are independently selected from H and C$_{1-6}$ alkyl optionally substituted by halogen, C$_{1-6}$ alkyl, —N(R$_a$)(R$_b$), —OR$_0$, —SR$_d$, —C(O)R$_e$ or —C(O)N(R$_g$)(R$_h$); wherein R$_a$, R$_b$, R$_c$, R$_d$, R$_e$, R$_g$ and R$_h$ are independently selected from hydrogen and C$_{1-6}$ alkyl.

In a further embodiment, R$^1$ is selected from:
hydrogen, halogen,

C$_{1-6}$ alkyl optionally substituted by halogen, C$_{1-6}$ alkyl, —NH$_2$, —OH, —C(O)—C$_{1-6}$ alkyl or —C(O)NH$_2$, and S—C$_{1-6}$ alkyl, NHR$^5$, CO—C$_{1-6}$ alkyl and CONH$_2$, wherein R$^5$ is C,$ alkyl optionally substituted by OH.

Preferably, R$^1$ is selected from halogen and C$_{1-6}$ alkyl. More preferably, R$^1$ is halogen, even more preferably Cl.

In a particular embodiment of the invention, when R$^2$ is an optionally substituted C$_{3-7}$ cycloalkyl, an optionally substituted C$_{6-10}$ aryl or an optionally substituted (C$_{6-10}$)aryl(C$_{1-6}$)alkyl, said C$_{3-7}$ cycloalkyl, C$_{6-10}$ aryl and (C$_{6-10}$)aryl(C$_{1-6}$)alkyl are optionally substituted by halogen, C$_{1-6}$ alkyl, C$_{1-6}$ haloalkyl, C$_{3-7}$ cycloalkyl, C$_{6-10}$ aryl, (C$_{6-10}$)aryl(C$_{1-6}$)alkyl, 5- to 10-membered heterocyclyl, 5- to 10-membered heteroaryl, CN, NO$_2$, —N(R$_a$)(R$_b$), —OR$_c$, —SR$_d$, —C(O)R$_e$, —C(O)OR$_f$, —C(O)N(R$_g$)(R$_h$), —OC(O)R$_i$, —C(NRj)NR$_k$R$_l$, —SOR$_m$, —SO$_2$R$_n$ or —SO$_2$NR$_o$R$_p$; wherein R$_a$, R$_b$, R$_c$, R$_d$, R$_e$, R$_f$, R$_g$, R$_h$, R$_i$, R$_j$, R$_k$, R$_l$, R$_m$, R$_n$, R$_o$ and R$_p$ are independently selected from hydrogen, C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl, and 5- to 10-membered heteroaryl.

In a particular embodiment of the invention, R$^2$ is an optionally substituted C$_{1-6}$ alkyl, preferably an optionally substituted C$_{1-3}$ alkyl, even more preferably it is an optionally substituted C$_{1-2}$ alkyl.

In an embodiment, R$^2$ is a C$_{1-6}$ alkyl, preferably a C$_{1-3}$ alkyl, optionally substituted by:

C$_{3-7}$ cycloalkyl optionally substituted by halogen, C$_{1-6}$ alkyl, C$_{6-10}$ aryl or (C$_{6-10}$)aryl(C$_{1-6}$)alkyl, C$_{6-10}$ aryl optionally substituted by halogen, C$_{1-6}$ alkyl, C$_{6-10}$ aryl or (C$_{6-10}$)aryl(C$_{1-6}$)alkyl, 5- to 10-membered heterocyclyl optionally substituted by halogen, C$_{1-6}$ alkyl, C$_{6-10}$ aryl or (C$_{6-10}$)aryl(C$_{1-6}$)alkyl, 5- to 10-membered heteroaryl optionally substituted by halogen, optionally substituted C$_{1-6}$ alkyl, optionally substituted C$_{3-7}$ cycloalkyl, optionally substituted C$_{6-10}$ aryl, optionally substituted (C$_{6-10}$)aryl(C$_{1-6}$)alkyl, optionally substituted 5- to 10-membered heterocyclyl, optionally substituted 5- to 10-membered heteroaryl, CN, NO$_2$, —N(R$_a$)(R$_b$), —OR$_c$, —SR$_d$, —C(O)R$_e$, —C(O)OR$_f$, —C(O)N(R$_g$)(R$_h$), —OC(O)R$_i$, —C(NRj)NR$_k$R$_l$, —SOR$_m$, —SO$_2$R$_n$ or —SO$_2$NR$_o$R$_p$; wherein R$_a$, R$_b$, R$_c$, R$_d$, R$_e$, R$_f$, R$_g$, R$_h$, R$_i$, R$_j$, R$_k$, R$_l$, R$_m$, R$_n$, R$_o$ and R$_p$ are independently selected from hydrogen, optionally substituted C$_{1-6}$ alkyl, C$_{1-6}$ haloalkyl, C$_{6-10}$ aryl, (C$_{6-10}$)aryl(C$_{1-6}$)alkyl, 5-to 10-membered heterocyclyl, and 5- to 10-membered heteroaryl; and wherein said optionally substituted C$_{1-6}$ alkyl, C$_{6-10}$ aryl, (C$_{6-10}$)aryl(C$_{1-6}$)alkyl, 5- to 10-membered heterocyclyl, and 5- to 10-membered heteroaryl can in turn be substituted by one or more groups selected from halogen, C$_{1-6}$ alkyl, C$_{1-6}$ haloalkyl, C$_{3-7}$ cycloalkyl, C$_{6-10}$ aryl, (C$_{6-10}$)aryl(C$_{1-6}$)alkyl, 5- to 10-membered heterocyclyl, 5- to 10-membered heteroaryl, CN, NO$_2$, —N(R$_a$)(R$_b$), —OR$_c$, —SR$_d$, —C(O)R$_e$, —C(O)OR$_f$, —C(O)N(R$_g$)(R$_h$), —OC(O)R$_i$-C(NRj)NR$_k$R$_l$, —SOR$_m$, —SO$_2$R$_n$ and —SO$_2$NR$_o$R$_p$; wherein R$_a$, R$_b$, R$_c$, R$_d$, R$_e$, R$_f$, R$_g$, R$_h$, R$_i$, R$_j$, R$_k$, R$_l$, R$_m$, R$_n$, R$_o$ and R$_p$ are independently selected from hydrogen, C$_{1-6}$-alkyl, C$_{1-6}$ haloalkyl, C$_{6-10}$ aryl, (C$_{6-10}$)aryl(C$_{1-6}$)alkyl, 5- to 10-membered heterocyclyl, and 5- to 10-membered heteroaryl;

COR$^{10}$, wherein R$^{10}$ is selected from C$_{1-6}$ alkyl, C$_{6-10}$ aryl and (C$_{6-10}$)aryl(C$_{1-8}$)alkyl optionally substituted by C$_{1-6}$ alkyl or C$_{6-10}$ aryl:

CONR$^{11}$R$^{12}$, wherein R$^{11}$ and R$^{12}$ are independently selected from H and C$_{1-6}$ alkyl, C$_{6-10}$ aryl and (C$_{6-10}$)aryl(C$_{1-6}$)alkyl optionally substituted by C$_{1-6}$ alkyl or C$_{6-10}$ aryl;

SOR$^{13}$, wherein R$^{13}$ is selected from C$_{1-6}$ alkyl, C$_{6-10}$ aryl, (C$_{6-10}$)aryl(C$_{1-6}$)alkyl, 5- to 10-membered heterocyclyl and 5- to 10-membered heteroaryl optionally substituted by C$_{1-6}$ alkyl, C$_{6-10}$ aryl, (C$_{6-10}$)aryl(C$_{1-6}$)alkyl, halogen, —N(R$_a$)(R$_b$), —OR$_c$, —SR$_d$, —C(O)R$_e$, —C(O)OR$_f$, —C(O)N(R$_g$)(R$_h$) or —OC(O)R$_i$, wherein R$_a$, R$_b$, R$_c$, R$_d$, R$_e$, R$_f$, R$_g$, R$_h$ and R$_i$, R$_j$, are independently selected from hydrogen, C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl and 5- to 10-membered heteroaryl;

SO$_2$R$^{14}$, wherein R$^{14}$ is selected from C$_{1-6}$ alkyl, C$_{6-10}$ aryl, (C$_{6-10}$)aryl(C$_{1-6}$)alkyl, 5-to 10-membered heterocyclyl and 5- to 10-membered heteroaryl optionally substituted by C$_{1-6}$ alkyl, C$_{6-10}$ aryl, (C$_{6-10}$)aryl(C$_{1-6}$)alkyl, halogen, —N(R$_a$)(R$_b$), —OR$_c$, —SR$_d$, —C(O)R$_e$, —C(O)OR$_f$, —C(O)N(R$_g$)(R$_h$) or —OC(O)R$_i$, wherein R$_a$, R$_b$, R$_c$, R$_d$, R$_e$, R$_f$, R$_g$, R$_h$ and R$_i$, R$_j$, are independently selected from hydrogen, C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl and 5- to 10-membered heteroaryl;

SO$_2$NR$^{15}$R$^{16}$, wherein R$^{15}$ and R$^{16}$ are Independently selected from H and C$_{1-6}$ alkyl, C$_{6-10}$ aryl, (C$_{6-10}$)aryl(C$_{1-4}$)alkyl, 5- to 10-membered heterocyclyl and 5- to 10-membered heteroaryl optionally substituted by C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl, 5- to 10-membered heteroaryl halogen, —N(R$_a$)(R$_b$), —OR$_c$, —SR$_d$, —C(O)R$_e$, —C(O)OR$_f$, —C(O)N(R$_g$)(R$_h$) or —OC(O)R$_i$, wherein R$_a$, R$_b$, R$_c$, R$_d$, R$_e$, R$_f$, R$_g$, R$_h$ and R$_i$ R$_j$, are independently selected from hydrogen, C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl and 5- to 10-membered heteroaryl; and SO(=NH)NHR$^{17}$, wherein R$^{17}$ is selected from H and C$_{1-6}$ alkyl, C$_{6-10}$ aryl, (C$_{6-10}$)aryl(C$_{1-6}$)alkyl, 5- to 10-membered heterocyclyl and 5- to 10-membered heteroaryl optionally substituted by C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl, 5- to 10-membered heteroaryl halogen, —N(R$_a$)(R$_b$), —OR$_c$, —SR$_d$, —C(O)R$_e$, —C(O)OR$_f$, —C(O)N(R$_g$)(R$_h$) or —OC(O)R$_i$, wherein R$_a$, R$_b$, R$_c$, R$_d$, R$_e$, R$_f$, R$_g$, R$_h$ and R$_i$ R$_j$, are independently selected from hydrogen, C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl and 5- to 10-membered heteroaryl.

In a further embodiment, R$^2$ is a C$_{1-3}$ alkyl optionally substituted by:

5- or 6-membered heteroaryl optionally substituted by halogen, optionally substituted C$_{1-6}$ alkyl, optionally substituted C$_{3-7}$ cycloalkyl, optionally substituted C$_{6-10}$ aryl, optionally substituted (C$_{6-10}$)aryl(C$_{1-6}$)alkyl, optionally substituted 5- to 10-membered heterocyclyl, optionally substituted 5- to 10-membered heteroaryl, CN, NO$_2$, —N(R$_a$)(R$_b$), —OR$_c$, —SR$_d$, —C(O)R$_b$, —C(O)OR$^f$, —C(O)N(R$_g$)(R$_h$), —OC(O)R$_i$, —C(NRj)NR$_k$R$_l$, —SOR$_m$, —SO$_2$R$_n$ or —SO$_2$NR$_o$R$_p$; wherein R$_a$, R$_b$, R$_c$, R$_d$, R$_e$, R$_f$, R$_g$, R$_h$, R$_i$, R$_j$, R$_k$, R$_l$, R$_m$, R$_n$, R$_o$ and R$_p$ are independently selected from hydrogen, optionally substituted C$_{1-6}$ alkyl, C$_{1-6}$ haloalkyl, C$_{6-10}$ aryl, (C$_{6-10}$)aryl(C$_{1-6}$)alkyl, 5-to 10-membered heterocyclyl, and 5- to 10-membered heteroaryl; and wherein said optionally substituted C$_{1-6}$ alkyl, C$_{6-10}$ aryl, (C$_{6-10}$)aryl(C$_{1-6}$)alkyl, 5- to 10-membered heterocyclyl, and 5- to 10-membered heteroaryl can in turn be substituted by one or more groups selected from halogen, C$_{1-6}$ alkyl, C$_{1-6}$ haloalkyl, C$_{3-7}$ cycloalkyl, C$_{6-10}$ aryl, (C$_{6-10}$)aryl(C$_{1-6}$)alkyl, 5- to 10-membered heterocyclyl, 5- to 10-membered heteroaryl, CN, NO$_2$, —N(R$_a$)(R$_b$), —OR$_c$, —SR$_d$, —C(O)R$_a$, —C(O)OR$^f$, —C(O)N(R$_g$)(R$_h$), —OC(O)R$_i$, —C(NR$_j$)NR$_k$R$_l$, —SOR$_m$, —SO$_2$R$_n$ and —SO$_2$NR$_o$R$_p$; wherein R$_a$, R$_b$, R$_c$, R$_d$, R$_e$, R$_f$, R$_g$, R$_h$, R$_i$, R$_j$, R$_k$, R$_l$, R$_m$, R$_n$, R$_o$ and R$_p$ are independently selected from hydrogen, C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl, and 5- to 10-membered heteroaryl;

SOR$^{13}$, wherein R$^{13}$ is selected from C$_{1-6}$ alkyl, C$_{6-10}$ aryl, (C$_{6-10}$)aryl(C$_{1-6}$)alkyl, 5-to 10-membered heterocyclyl and 5- to 10-membered heteroaryl optionally substituted by C$_{1-6}$ alkyl, C$_{6-10}$ aryl, (C$_{6-10}$)aryl(C$_{1-6}$)alkyl, halogen, —N(R$_a$)(R$_b$), —OR$_c$, —SR$_d$, —C(O)R$_e$, —C(O)OR$^f$, —C(O)N(R$_g$)(R$_h$) or —OC(O)R$_i$, wherein R$_a$, R$_b$, R$_c$, R$_d$, R$_e$, R$_f$, R$_g$, R$_h$ and R$_i$, R$_j$, are independently selected from hydrogen, C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl and 5- to 10-membered heteroaryl;

SO$_2$R$^{14}$, wherein R$^{14}$ is selected from C$_{1-6}$ alkyl, C$_{6-10}$ aryl, (C$_{6-10}$)aryl(C$_{1-6}$)alkyl, 5-to 10-membered heterocyclyl and 5- to 10-membered heteroaryl optionally substituted by C$_{1-6}$ alkyl, C$_{6-10}$ aryl, (C$_{6-10}$)aryl(C$_{1-6}$)alkyl, halogen, —N(R$_a$)(R$_b$), —OR$_c$, —SR$_d$, —C(O)R$_e$, —C(O)OR$_f$, —C(O)N(R$_g$)(R$_h$) or —OC(O)R$_i$, wherein R$_a$, R$_b$, R$_c$, R$_d$, R$_e$, R$_f$, R$_g$, R$_h$ and R$_i$ R$_j$, are independently selected from hydrogen, C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl and 5- to 10-membered heteroaryl; and SO$_2$NR$^{15}$R$^{16}$, wherein R$^{15}$ and R$^{16}$ are independently selected from H and C$_{1-6}$ alkyl, C$_{6-10}$ aryl, (C$_{6-10}$)aryl(C$_{1-6}$)alkyl, 5- to 10-membered heterocyclyl and 5- to 10-membered heteroaryl optionally substituted by C$_{1-4}$ alkyl, C$_{1-4}$ haloalkyl, C$_{6-10}$ aryl, (C$_{6-10}$)aryl(C$_{1-6}$)alkyl, 5- to 10-membered heterocyclyl, 5- to 10-membered heteroaryl halogen, —N(R$_a$)(R$_b$), —OR$_c$, —SR$_d$, —C(O)R$_e$, —C(O)OR$_f$, —C(O)N(R$_g$)(R$_h$) or —OC(O)R$_i$, wherein R$_a$, R$_b$, R$_c$, R$_d$, R$_e$, R$_f$, R$_g$, R$_h$ and R$_i$ R$_j$, are independently selected from hydrogen, C$_{1-6}$ alkyl, C$_{1-6}$ haloalkyl, C$_{6-10}$ aryl, (C$_{6-10}$)aryl(C$_{1-6}$)alkyl, 5- to 10-membered heterocyclyl and 5- to 10-membered heteroaryl.

In a particular embodiment of the invention, X—R$^2$ is a group of formula (II), (III), (IV) or (V):

—NH—(CH$_2$)$n$—Z     (II)

—NH—(CH$_2$)$n$—SOR$^{13}$     (III)

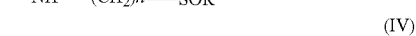

—NH—(CH$_2$)$n$—SO$_2$R$^{14}$     (IV)

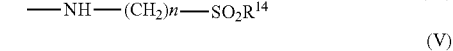

—NH—(CH$_2$)$n$—SO$_2$NR$^{15}$R$^{16}$     (V)

wherein:

n is selected from 1, 2 and 3;

Z is selected from a 5- or 6-membered heterocyclyl and 5- or 6-membered heteroaryl optionally substituted by halogen, optionally substituted C$_{1-6}$ alkyl, optionally substituted $(C_{6-10})$aryl$(C_{1-6})$alkyl, optionally substituted 5- to 10-membered heteroaryl, CN, —N($R_a$)($R_b$), —$OR_c$, —$SR_d$, —C(O)$R_e$, —C(O)$OR^f$, —C(O)N($R_g$)($R_h$), —OC(O)$R_i$, —C(NR)$NR_kR_l$, —$SOR_m$, —$SO_2R_n$ or —$SO_2NR_oR_p$; wherein $R_a$, $R_b$, $R_c$, $R_d$, $R_e$, $R_f$ $R_g$, $R_h$, $R_i$, $R_j$, $R_k$, $R_l$, $R_m$, $R_n$, $R_o$ and $R_p$ are independently selected from hydrogen, optionally substituted $C_{1-6}$ alkyl, $C_{1-6}$ haloalkyl, $C_{6-10}$ aryl, $(C_{6-10})$aryl$(C_{1-6})$alkyl, 5- to 10-membered heterocyclyl, and 5- to 10-membered heteroaryl; and wherein said optionally substituted $C_{1-6}$ alkyl, optionally substituted $(C_{6-10})$aryl$(C_{1-6})$alkyl, optionally substituted 5- to 10-membered heteroaryl can in turn be substituted by one or more groups selected from $C_{1-6}$ alkyl, $C_{1-6}$ haloalkyl, $C_{6-10}$ aryl, 5- to 10-membered heteroaryl, halogen, —N($R_a$)($R_b$) and —$OR_c$, wherein $R_a$, $R_b$ and $R_c$ are independently selected from hydrogen, $C_{1-6}$ alkyl and $C_{1-6}$ haloalkyl;

$R^{13}$ is selected from $C_{1-6}$ alkyl, $C_{6-10}$ aryl, $(C_{6-10})$aryl$(C_{1-6})$alkyl, 5- to 10-membered heterocyclyl and 5- to 10-membered heteroaryl optionally substituted by $C_{1-6}$ alkyl, $C_{6-10}$ aryl, $(C_{6-10})$aryl$(C_{1-6})$alkyl, halogen, —N($R_a$)($R_b$), —$OR^f$, —$SR_d$, —C(O)$R_e$, —C(O)$OR_f$, —C(O)N($R_g$)($R_h$) or —OC(O)$R_i$, wherein $R_a$, $R_b$, $R_c$, $R_d$, $R_e$, $R_f$, $R_g$, $R_h$ and $R_i$ $R_j$, are independently selected from hydrogen, $C_{1-6}$ alkyl, $C_{1-6}$ haloalkyl, $C_{1-6}$ aryl, $(C_{6-10})$aryl$(C_{1-6})$alkyl, 5- to 10-membered heterocyclyl and 5- to 10-membered heteroaryl;

$R^{14}$ is selected from $C_{1-6}$ alkyl, $C_{1-6}$ aryl, $(C_{6-10})$aryl$(C_{1-6})$alkyl, 5- to 10-membered heterocyclyl and 5- to 10-membered heteroaryl optionally substituted by $C_{1-6}$ alkyl, $C_{6-10}$ aryl, $(C_{6-10})$aryl$(C_{1-6})$alkyl, halogen, —N($R^a$)($R_b$), —$OR_c$, —$SR_d$, —C(O)$R_e$, —C(O)$OR_f$, —C(O)N($R_g$)($R_h$) or —OC(O)$R_i$, wherein $R_a$, $R_b$, $R_c$, $R_d$, $R_e$, $R_f$ $R_g$, $R_h$ and $R_i$ $R_j$, are independently selected from hydrogen, $C_{1-6}$ alkyl, $C_{1-6}$ haloalkyl, $C_{6-10}$ aryl, $(C_{6-10})$aryl$(C_{1-6})$alkyl, 5- to 10-membered heterocyclyl and 5- to 10-membered heteroaryl; and $R^{15}$ and $R^{16}$ are independently selected from H and $C_{1-6}$ alkyl, $C_{6-10}$ aryl, $(C_{6-10})$aryl$(C_{1-6})$alkyl, 5- to 10-membered heterocyclyl and 5- to 10-membered heteroaryl optionally substituted by $C_{1-6}$ alkyl, $C_{1-6}$ haloalkyl, $C_{6-10}$ aryl, $(C_{6-10})$aryl$(C_{1-6})$alkyl, 5- to 10-membered heteroaryl, halogen, —N($R_a$)($R_b$), —$OR_c$, —$SR_d$, —C(O)$R_e$, —C(O)$OR^f$, —C(O)N($R_g$)($R_h$) or —OC(O)$R_i$, wherein $R_a$, $R_b$, $R_c$, $R_d$, $R_e$, $R_f$ $R_g$, $R_h$ and $R_i$ $R_j$, are independently selected from hydrogen, $C_{1-6}$ alkyl, $C_{1-6}$ haloalkyl, $C_{6-10}$ aryl, $(C_{6-10})$aryl$(C_{1-6})$alkyl, 5- to 10-membered heterocyclyl and 5- to 10-membered heteroaryl.

In a preferred embodiment, n is 1 or 2.

In another embodiment, Z is a 5- or 6-membered heteroaryl, preferably a 5-membered heteroaryl, optionally substituted by halogen, optionally substituted $C_{1-6}$ alkyl, optionally substituted $(C_{6-10})$aryl$(C_{1-6})$alkyl, optionally substituted 5- to 10-membered heteroaryl, CN, —N($R_a$)($R_b$), —$OR_c$, —$SR_d$, —C(O)$R_e$, —C(O)$OR^f$, —C(O)N($R_g$)($R_h$), —OC(O)$R_i$, —C(NR$_j$)NR$_k$R$_l$, —$SOR_m$, —$SO_2R_n$ or —$SO_2NR_oR_p$; wherein $R_a$, $R_b$, $R_c$, $R_d$, $R_e$, $R_f$ $R_g$, $R_h$, $R_i$, $R_j$, $R_k$, $R_l$, $R_m$, $R_n$, $R_o$, and $R_p$ are independently selected from hydrogen, optionally substituted $C_{1-6}$ alkyl, $C_{1-6}$ haloalkyl, $C_{6-10}$ aryl, $(C_{6-10})$aryl$(C_{1-6})$alkyl, 5- to 10-membered heterocyclyl, and 5- to 10-membered heteroaryl; and wherein said optionally substituted $C_{1-6}$ alkyl, optionally substituted $(C_{6-10})$aryl$(C_{1-6})$alkyl and optionally substituted 5- to 10-membered heteroaryl can in turn be substituted by one or more groups selected from $C_{1-6}$ alkyl, $C_{1-6}$ haloalkyl, $C_{6-10}$ aryl, 5- to 10-membered heteroaryl, halogen, —N($R_a$)($R_b$) and —$OR_b$, wherein $R_a$, $R_b$ and $R_b$ are independently selected from hydrogen, $C_{1-6}$ alkyl and $C_{1-6}$ haloalkyl.

In a preferred embodiment, Z is selected from thiophene, furan, oxazole and thiazole, preferably thiophene, optionally substituted by halogen, optionally substituted $C_{1-6}$ alkyl, optionally substituted $(C_{6-10})$aryl$(C_{1-6})$alkyl, optionally substituted 5- to 10-membered heteroaryl, CN, —N($R_a$)($R_b$), —$OR_c$, —$SR_d$, —C(O)$R_e$, —C(O)$OR_f$, —C(O)N($R_g$)($R_h$), —OC(O)$R_i$, —C(NR$_j$)NR$_k$R$_l$, —$SOR_m$, —$SO_2R_n$ or —$SO_2NR_oR_p$; wherein $R_a$, $R_b$, $R_c$, $R_d$, $R_e$, $R_f$ $R_g$, $R_h$, $R_i$, $R_j$, $R_k$, $R_l$, $R_m$, $R_n$, $R_o$ and $R_p$ are independently selected from hydrogen, optionally substituted $C_{1-6}$ alkyl, $C_{1-6}$ haloalkyl, $C_{6-10}$ aryl, $(C_{6-10})$aryl$(C_{1-6})$alkyl, 5- to 10-membered heterocyclyl, and 5- to 10-membered heteroaryl; and wherein said optionally substituted $C_{1-6}$ alkyl, optionally substituted $(C_{6-10})$aryl$(C_{1-6})$alkyl and optionally substituted 5- to 10-membered heteroaryl can in turn be substituted by one or more groups selected from $C_{1-6}$ alkyl, $C_{1-6}$ haloalkyl, $C_{6-10}$ aryl, 5- to 10-membered heteroaryl, halogen, —N($R_a$)$R_b$) and —$OR_c$, wherein $R_a$, $R_b$ and $R_c$ are independently selected from hydrogen, $C_{1-6}$ alkyl and $C_{1-6}$ haloalkyl.

In another embodiment, $R^{13}$ is selected from $C_{1-6}$ alkyl. $C_{6-10}$ aryl and $(C_{6-10})$aryl$(C_{1-6})$alkyl optionally substituted by $C_{1-6}$ alkyl, $C_{6-10}$ aryl, halogen, —N($R_a$)($R_b$), or —$OR_b$, wherein $R_a$, $R_b$ and $R_c$ are independently selected from hydrogen and $C_{1-6}$ alkyl. Preferably, it is selected from $C_{1-3}$ alkyl, phenyl and phenyl$(C_{1-3})$alkyl optionally substituted by $C_3$ alkyl, phenyl, —N($R_a$)($R_b$), or —$OR_c$, wherein $R_a$, $R_b$ and $R_c$ are independently selected from hydrogen and $C_{1-3}$ alkyl.

In a further embodiment, $R^{14}$ is selected from $C_{1-6}$ alkyl, $C_{6-10}$ aryl and $(C_{6-10})$aryl$(C_{1-6})$alkyl optionally substituted by $C_{1-6}$ alkyl, $C_{6-10}$ aryl, halogen, —N($R_a$)($R_b$), or —$OR_c$, wherein $R_a$, $R_b$ and $R_c$ are independently selected from hydrogen and $C_{1-6}$ alkyl. Preferably, it is selected from $C_{1-3}$ alkyl, phenyl and phenyl$(C_{1-3})$alkyl optionally substituted by $C_{1-3}$ alkyl, phenyl, —N($R_a$)($R_b$), or —$OR_c$, wherein $R_a$, $R_b$ and $R_c$ are independently selected from hydrogen and $C_{1-3}$ alkyl.

In a preferred embodiment, $R^{15}$ is selected from H and $C_{1-6}$ alkyl optionally substituted by halogen, —N($R_a$)($R_b$), —$OR_c$, —$SR_d$, —C(O)$R_e$, —C(O)$OR_f$, —C(O)N($R_g$)($R_h$) or —OC(O)$R_i$, wherein $R_a$, $R_b$, $R_c$, $R_d$, $R_e$, $R_f$ $R_g$, $R_h$ and $R_i$ $R_j$, are independently selected from hydrogen, $C_{1-6}$ alkyl, $C_{1-6}$ haloalkyl, $C_{6-10}$ aryl and $(C_{6-10})$aryl$(C_{1-6})$alkyl.

More preferably, $R^{15}$ is selected from H and $C_{1-3}$ alkyl optionally substituted by —N($R_a$)($R_b$) or —$OR_c$, wherein $R_a$, $R_b$ and $R_c$ are independently selected from hydrogen and $C_{1-6}$ alkyl.

In another preferred embodiment, $R^{16}$ is selected from $C_{1-6}$ alkyl, $C_{6-10}$ aryl, $(C_{6-10})$aryl$(C_{1-6})$alkyl and 5- to 10-membered heteroaryl optionally substituted by $C_{1-6}$ alkyl, $C_{1-6}$ haloalkyl, $C_{6-10}$ aryl, $(C_{6-10})$aryl$(C_{1-6})$alkyl, 5- to 10-membered heteroaryl, halogen, —N($R_a$)($R_b$), —$OR_c$ or —$SR_d$, wherein $R_a$, $R_b$, $R_c$ and $R_d$ are independently selected from hydrogen, $C_{1-6}$ alkyl and $C_{1-6}$ haloalkyl.

In a further embodiment, $R^{16}$ is selected from $C_{1-3}$ alkyl, phenyl, phenyl$(C_{1-3})$alkyl and 5- or 6-membered heteroaryl optionally substituted by $C_{1-3}$ alkyl, $C_{1-3}$ haloalkyl, phenyl, phenyl$(C_{1-3})$alkyl, 5- or 6-membered heteroaryl, halogen, —N($R_a$)($R_b$), —$OR_c$ or —$SR_d$, wherein $R_a$, $R_b$, $R_c$ and $R_d$ are independently selected from hydrogen, $C_{1-3}$ alkyl and $C_{1-3}$ haloalkyl.

In an embodiment, $R^2$ is selected from:
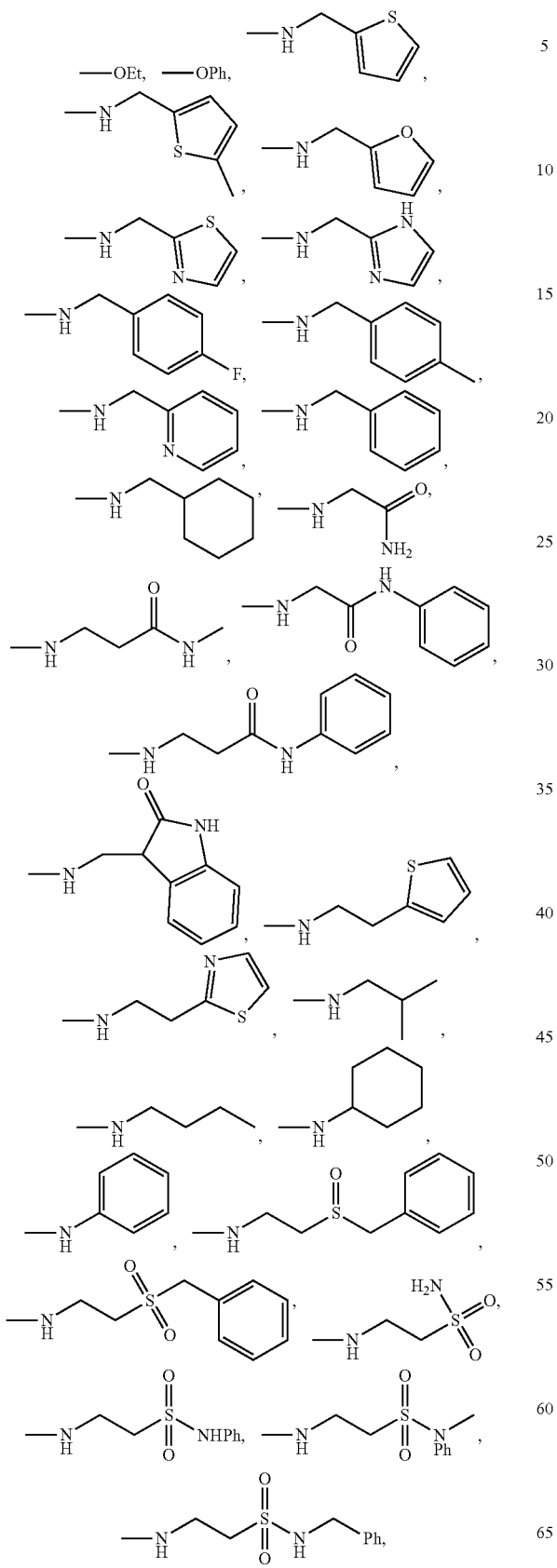
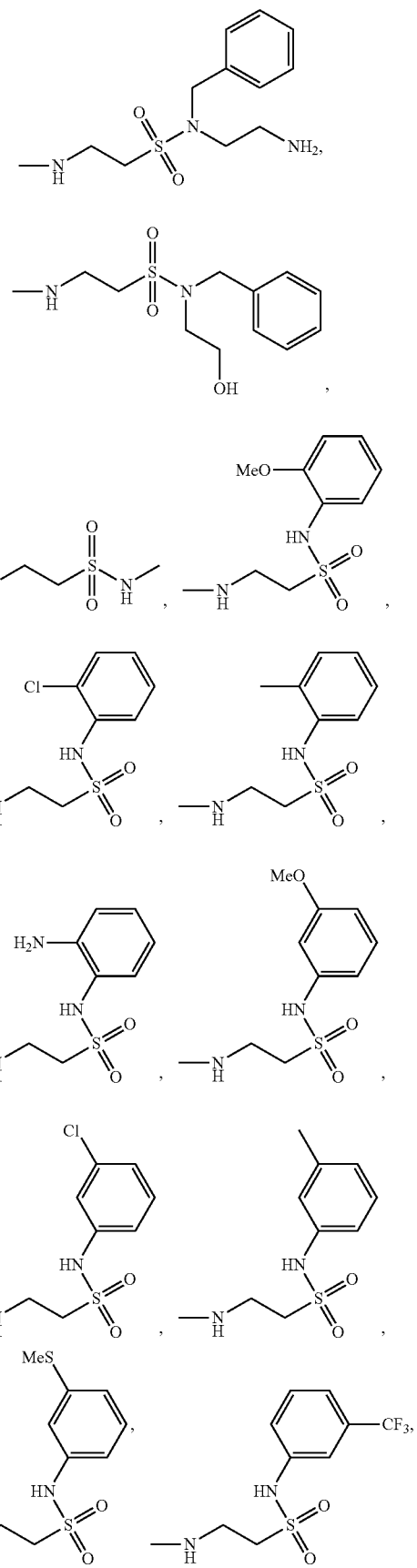

-continued

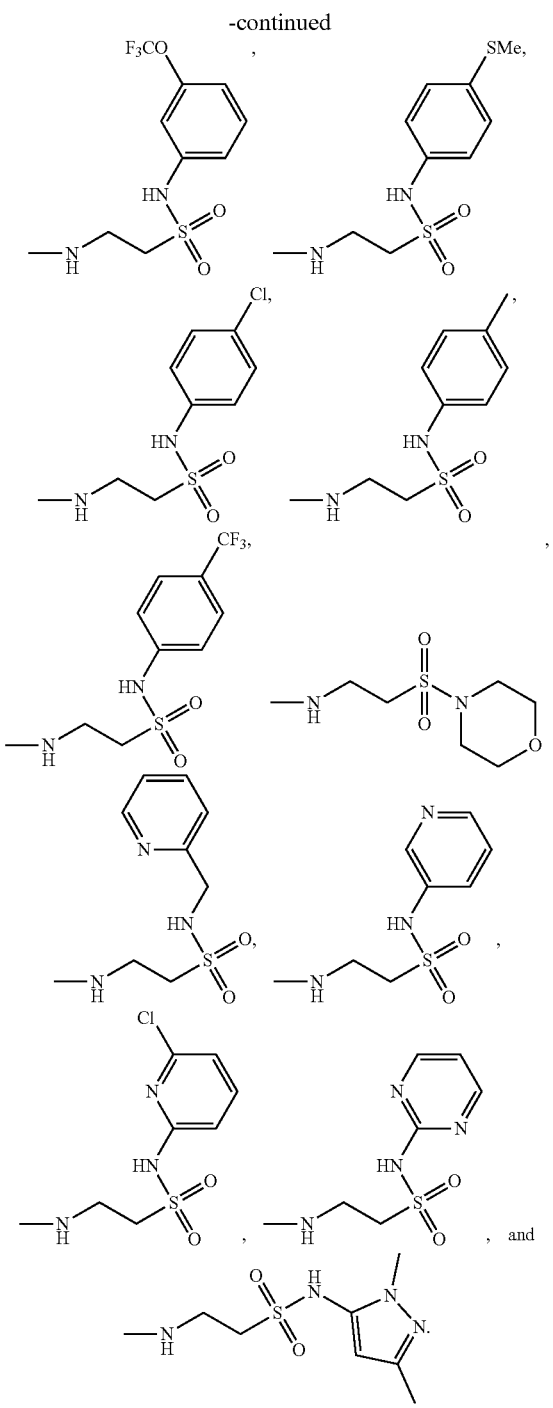

In an embodiment of the invention, $R^3$ is selected from:
optionally substituted 5- to 10-membered heterocyclyl, wherein the 5- to 10-membered heterocyclyl is not morpholine or tetrahydroisoquinoline; and
$NR^7R^8$, wherein $R^7$ is selected from H and $C_{1-6}$ alkyl, and $R^8$ is selected from $C_{1-6}$ alkyl optionally substituted by optionally substituted 5- to 10-membered heterocyclyl or by optionally substituted 5- to 10-membered heteroaryl.

In a particular embodiment, $R^3$ is selected from:
5- to 10-membered heterocyclyl optionally substituted by halogen, $C_{1-6}$ alkyl, $C_{1-6}$ haloalkyl, $-N(R_a)(R_b)$, $-OR_c$, $-SR_d$, $-C(O)R_e$, $-C(O)OR_f$, $-C(O)N(R_g)$ $(R_h)$ and $-OC(O)R_i$; wherein $R_a$, $R_b$, $R_c$, $R_d$, $R_e$, $R_f$, $R_g$, $R_h$ and $R_i$ are independently selected from hydrogen, $C_{1-6}$ alkyl, $C_{1-6}$ haloalkyl, $C_{6-10}$ aryl and $(C_{6-10})$ aryl$(C_{1-6})$alkyl. Preferably, 5- to 10-membered heterocyclyl optionally substituted by $C_{1-6}$ alkyl or $-N(R_a)$ $(R_b)$; wherein $R_a$ and $R_b$ are independently selected from hydrogen and $C_{1-6}$ alkyl; and
$NR^7R^8$, wherein $R^7$ is selected from H and $C_{1-6}$ alkyl, and $R^8$ is selected from $C_{1-6}$ alkyl optionally substituted by 5- to 10-membered heterocyclyl or by 5- to 10-membered heteroaryl optionally substituted by halogen, $C_{1-6}$ alkyl, $C_{1-6}$ haloalkyl, $-N(R_a)(R_b)$, $-OR_c$, $-SR_d$, $-C(O)R_e$, $-C(O)OR_f$, $-C(O)N(R_g)(R_h)$ and $-OC(O)R_i$; wherein $R_a$, $R_b$, $R_c$, $R_d$, $R_e$, $R_f$, $R_g$, $R_h$ and $R_i$ are independently selected from hydrogen, $C_{1-6}$ alkyl, $C_{1-6}$ haloalkyl, $C_{6-10}$ aryl and $(C_{6-10})$aryl$(C_{1-6})$alkyl. Preferably, $R^8$ is selected from $C_{1-6}$ alkyl optionally substituted by 5- to 10-membered heterocyclyl or by 5- to 10-membered heteroaryl optionally substituted by $C_{1-6}$ alkyl.

In an embodiment of the invention, $R^3$ is selected from:
optionally substituted N-containing 5- to 10-membered heterocyclyl, and
$NR^7R^8$, wherein $R^7$ is selected from H and $C_{1-6}$ alkyl, and $R^8$ is selected from $C_{1-6}$ alkyl optionally substituted by optionally substituted 5- to 10-membered heterocyclyl or by optionally substituted 5- to 10-membered heteroaryl.

In another embodiment of the invention, $R^3$ is selected from:
optionally substituted N-containing 5- to 10-membered heterocyclyl, and
$NR^7R^8$, wherein $R^7$ is selected from H and $C_{1-6}$ alkyl, and $R^8$ is selected from $C_{1-3}$ alkyl optionally substituted by optionally substituted 5- to 10-membered heteroaryl.

In a particular embodiment, $R^3$ is selected from:
N-containing 5- to 10-membered heterocyclyl optionally substituted by halogen, $C_{1-6}$ alkyl, $C_{1-6}$ haloalkyl, $-N(R_a)(R_b)$, $-OR_c$, $-SR_d$, $-C(O)R_e$, $-C(O)OR_f$, $-C(O)N(R_g)(R_h)$ and $-OC(O)R_i$; wherein $R_a$, $R_b$, $R_c$, $R_d$, $R_e$, $R_f$, $R_g$, $R_h$ and $R_i$ are independently selected from hydrogen, $C_{1-6}$ alkyl, $C_{1-6}$ haloalkyl, $C_{6-10}$ aryl and $(C_{6-10})$aryl$(C_{1-6})$alkyl. Preferably, N-containing 5- to 10-membered heterocycyl optionally substituted by $C_{1-6}$ alkyl or $-N(R_a)(R_b)$; wherein $R_a$ and $R_b$ are independently selected from hydrogen and $C_{1-6}$ alkyl; and
$NR^7R^8$, wherein $R^7$ is selected from H and $C_{1-6}$ alkyl, and $R^8$ is selected from $C_{1-3}$ alkyl optionally substituted by 5- to 10-membered heteroaryl optionally substituted by halogen, $C_{1-6}$ alkyl, $C_{1-6}$ haloalkyl, $-N(R_a)(R_b)$, $-OR_c$, $-SR_d$, $-C(O)R_a$, $-C(O)OR_f$, $-C(O)N(R_g)$ $(R_h)$ and $-OC(O)R_i$; wherein $R_a$, $R_b$, $R_c$, $R_d$, $R_e$, $R_f$, $R_g$, $R_h$ and $R_i$ are independently selected from hydrogen, $C_{1-6}$ alkyl, $C_{1-6}$ haloalkyl, $C_{6-10}$ aryl and $(C_{6-10})$ aryl$(C_{1-6})$alkyl. Preferably, $R^8$ is selected from $C_{1-3}$ alkyl optionally substituted by 5- to 10-membered heteroaryl optionally substituted by $C_{1-6}$ alkyl.

In a particular embodiment of the invention, when $R^3$ is an optionally substituted 5- to 10-membered heterocyclyl, preferably it is an optionally substituted N-containing 5-to 10-membered heterocyclyl. More preferably, it is an optionally substituted 5- to 10-membered heterocyclyl comprising one or two nitrogen atoms. More preferably, an optionally substituted 5- to 10-membered heterocyclyl wherein the heterocyclyl ring consists of carbon atoms and one or two nitrogen atoms, such as pyrrolidine, piperidine, tetrahydropyridine, piperazine, diazepane, octahydro-pyrrolopyrazine, azetidine, octahydro-pyridopyrazine, octahydro-pyrrolopyrrole, diaza-spirononane, diaza-spiroundecane.

In a further embodiment, when $R^3$ is an optionally substituted N-containing 5- to 10-membered heterocyclyl, said heterocyclyl is selected from:

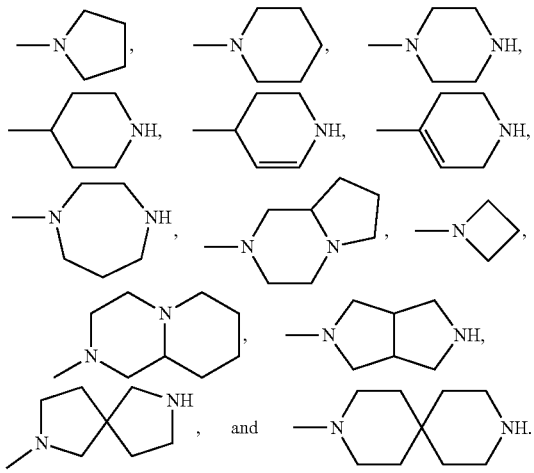

In an embodiment, the N-containing 5- to 10-membered heterocyclyl is optionally substituted by halogen, $C_{1-6}$ alkyl, $C_{1-6}$ haloalkyl, $-N(R_a)(R_b)$, $-OR_c$, $-SR_d$, $-C(O)R_e$, $-C(O)OR_f$, $-C(O)N(R_g)(R_h)$ and $-OC(O)R_i$; wherein $R_a$, $R_b$, $R_c$, $R_d$, $R_e$, $R_f$, $R_g$, $R_h$ and $R_i$ are independently selected from hydrogen, $C_{1-6}$ alkyl, $C_{1-6}$ haloalkyl, $C_{8-10}$ aryl and $(C_{6-10})$aryl$(C_{1-6})$alkyl. Preferably, it is optionally substituted by $C_{1-6}$ alkyl or $-N(R_a)(R_b)$; wherein $R_a$ and $R_b$ are independently selected from hydrogen and $C_{1-6}$ alkyl.

In an embodiment, when $R^3$ is an optionally substituted N-containing 5- to 10-membered heterocyclyl, it is selected from:

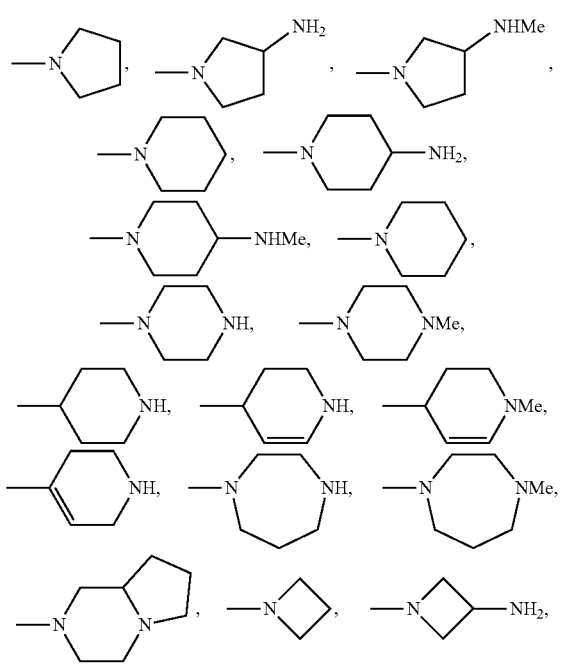

In a preferred embodiment, $R^3$ is an optionally substituted 6-membered heterocyclyl, preferably an optionally substituted N-containing 6-membered heterocyclyl, more preferably an optionally substituted N-containing 6-membered heterocyclyl comprising one or two nitrogen atoms.

In another embodiment, $R^3$ is selected from optionally substituted piperazine and optionally substituted ocathydro-pyrrolo[1,2-a]pyrazine.

In an embodiment, $R^3$ is optionally substituted piperazine. In a further embodiment, it is piperazine optionally substituted by $C_{1-6}$ alkyl, preferably Me. Even more preferably, $R^3$ is 4-methyl-piperazinyl.

In a further embodiment, $R^3$ is selected from:

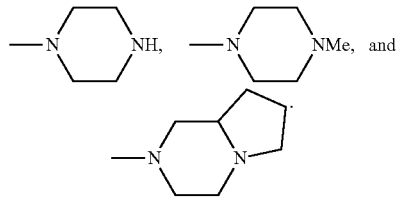

Preferably, it is

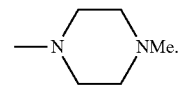

In a preferred embodiment, X—$R^2$ is a group of formula (II), (III), (IV) or (V) as defined above, more preferably a group of formula (II) or (V), and $R^3$ is an optionally substituted N-containing 5- to 10-membered heterocyclyl as defined above.

In another preferred embodiment, $R^1$ is selected from halogen, optionally substituted $C_{1-6}$ alkyl, $OR^4$, $SR^4$, $NR^4R^5$, $COR^4$ and $CONR^4R^5$, wherein $R^4$ and $R^5$ are independently selected from H and optionally substituted $C_{1-6}$ alkyl; and $R^3$ is an optionally substituted N-containing 5- to 10-membered heterocyclyl as defined above.

In a further preferred embodiment,
$R^1$ is selected from halogen, optionally substituted $C_{1-6}$ alkyl, $OR^4$, $SR^4$, $NR^4R^5$, $COR^4$ and $CONR^4R^5$, wherein $R^4$ and $R^5$ are independently selected from H and optionally substituted $C_{1-6}$ alkyl; preferably, $R^1$ is chloride;
X—$R^2$ is a group of formula (II), (III), (IV) or (V) as defined above, preferably a group of formula (II) or (V); and $R^3$ is an optionally substituted N-containing 5- to 10-membered heterocyclyl as defined above; preferably optionally substituted piperazine.
According to another embodiment, the compound of the invention is selected from the group consisting of:
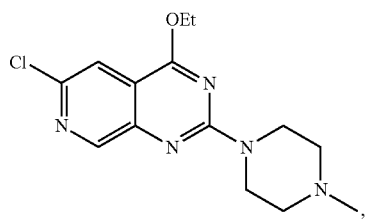
,
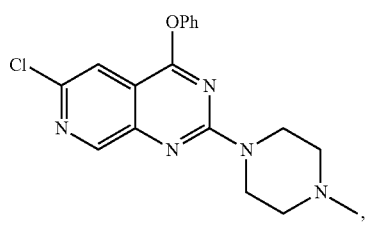
,
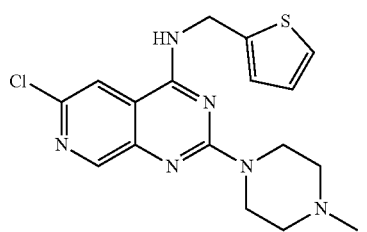
,
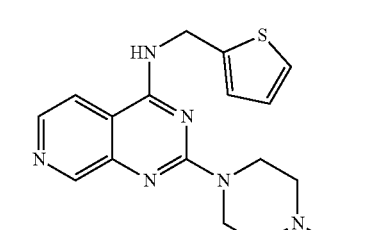
,
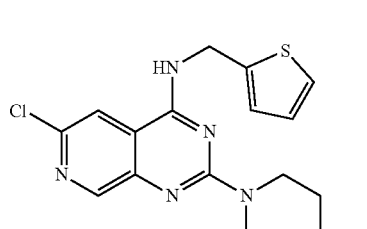
,
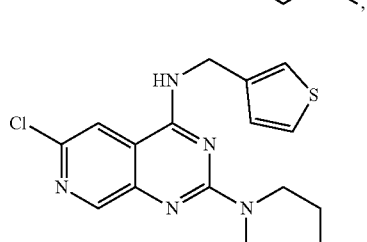
,
-continued
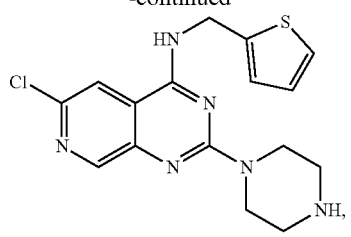
,
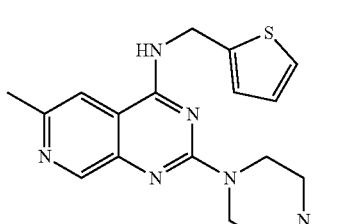
,
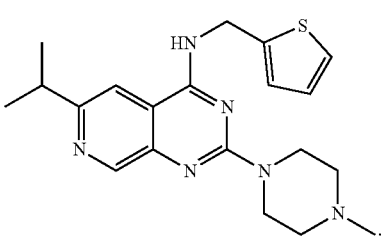
,
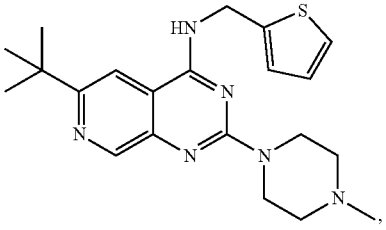
,
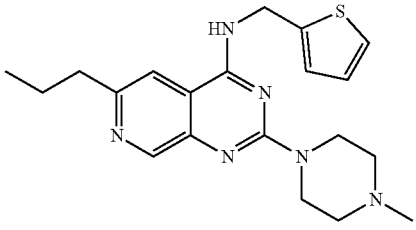
,
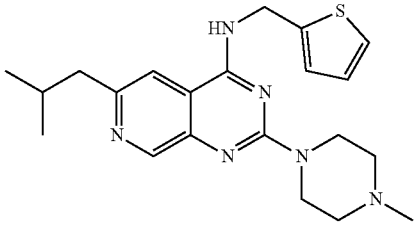
,
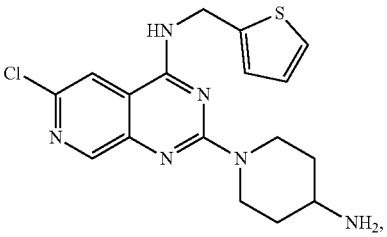
, -continued
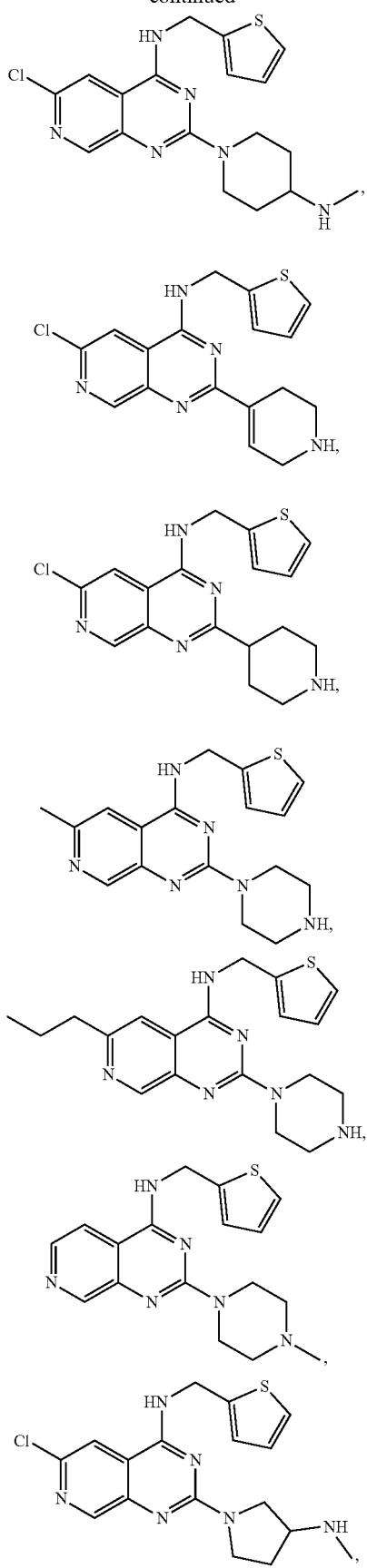
-continued
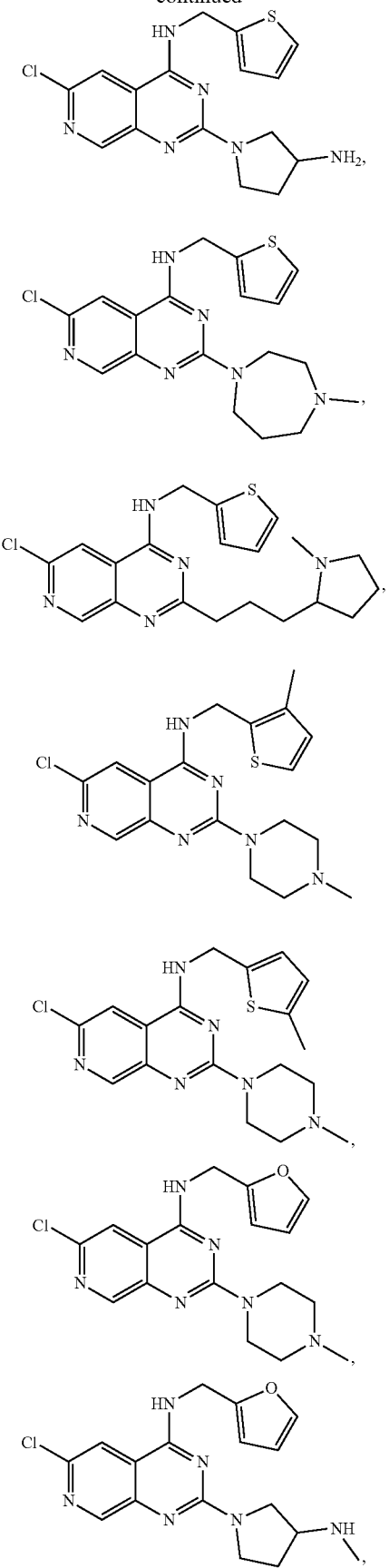

-continued
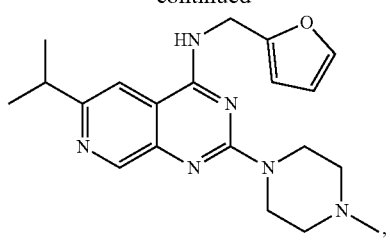
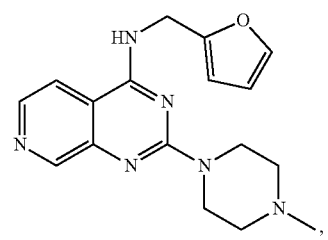
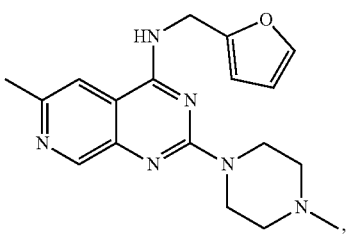
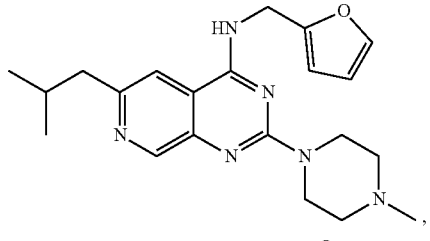
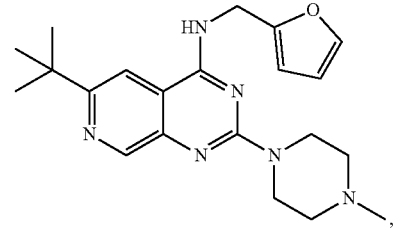
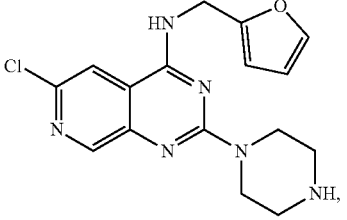
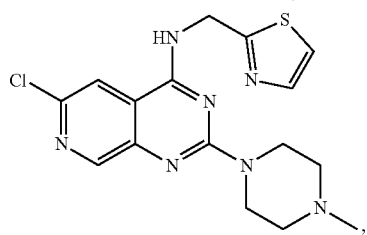
-continued
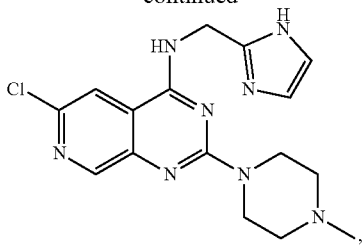
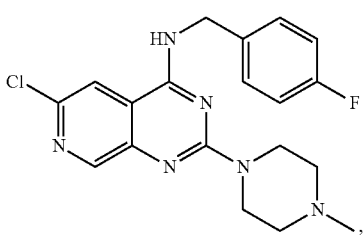
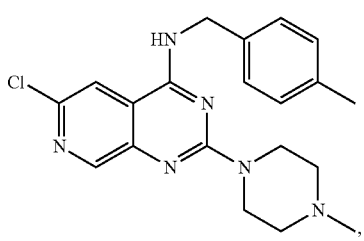
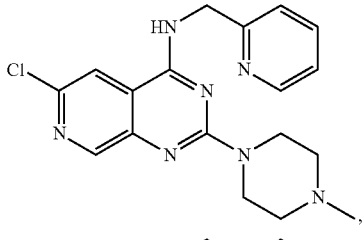
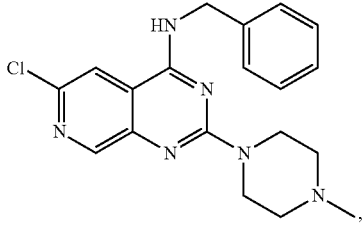
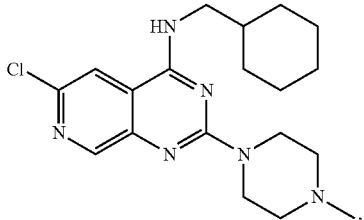
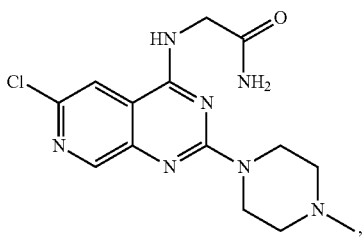

-continued
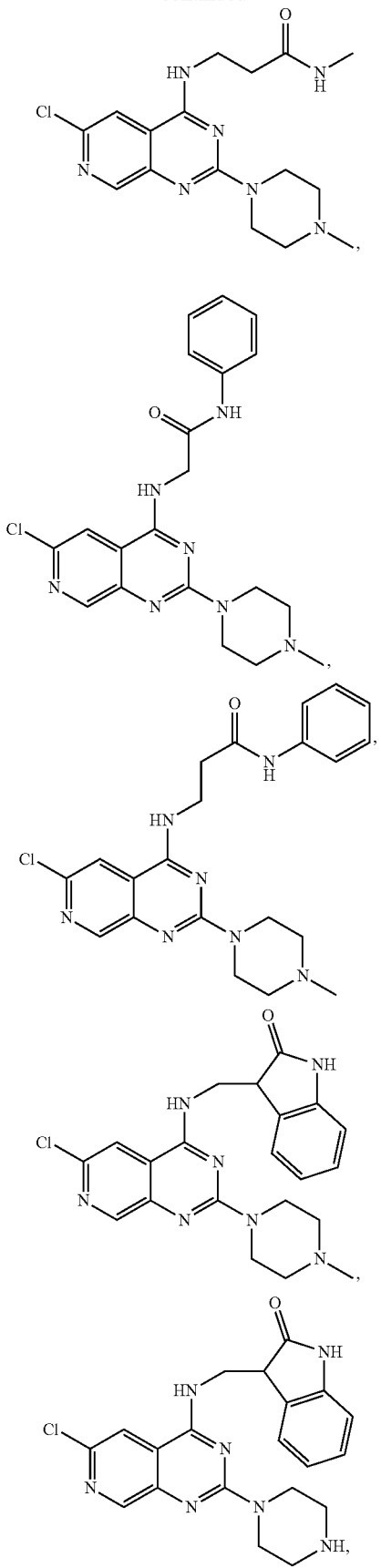
-continued
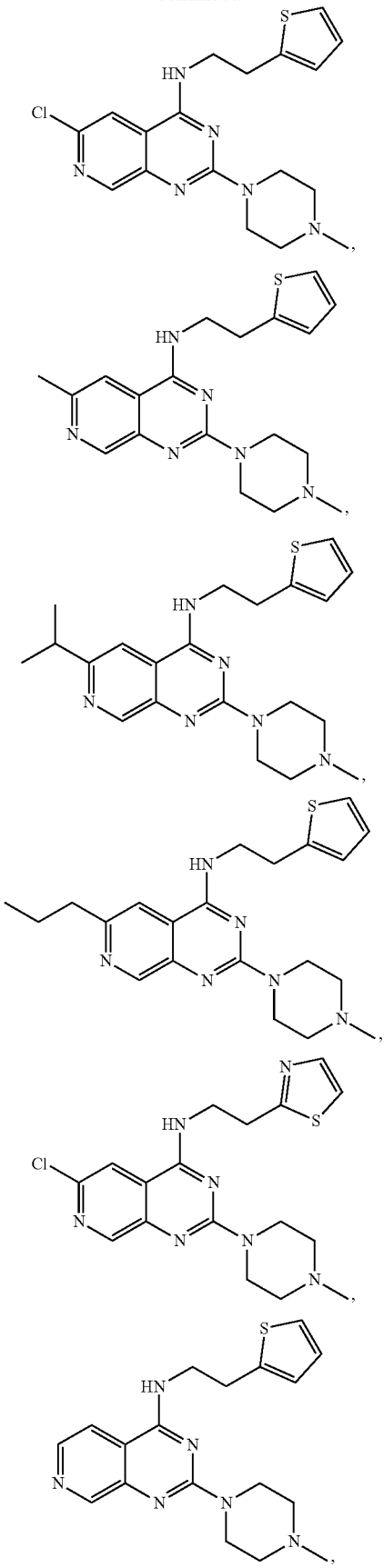

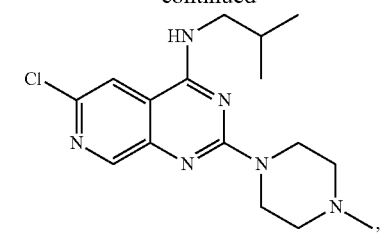
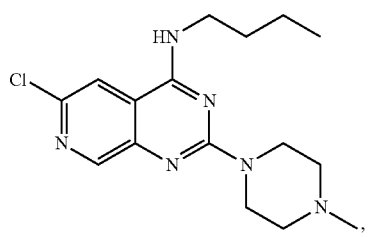
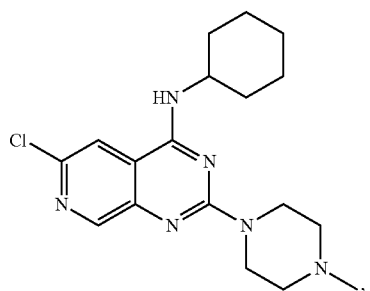
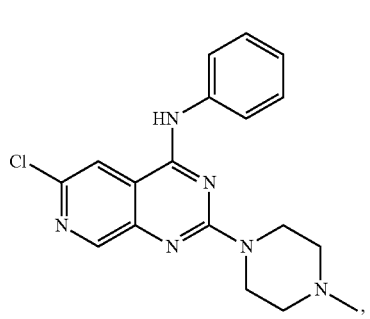
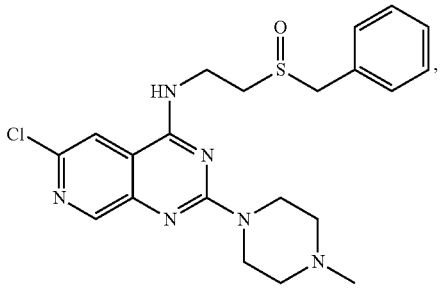
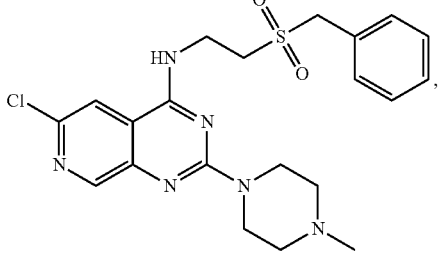
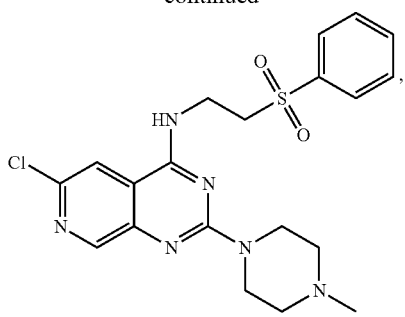
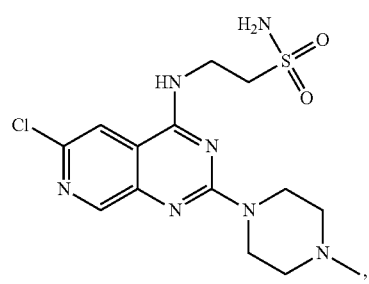
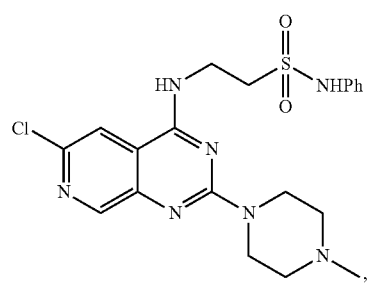
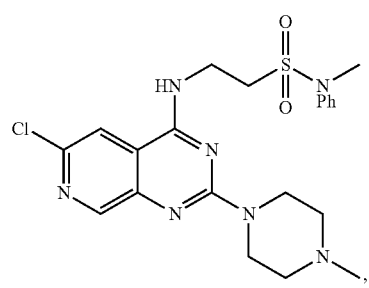
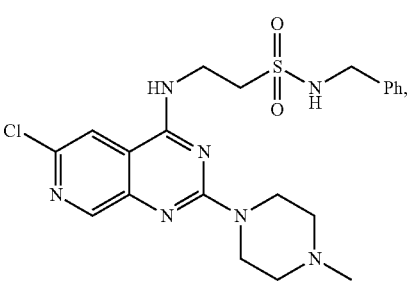

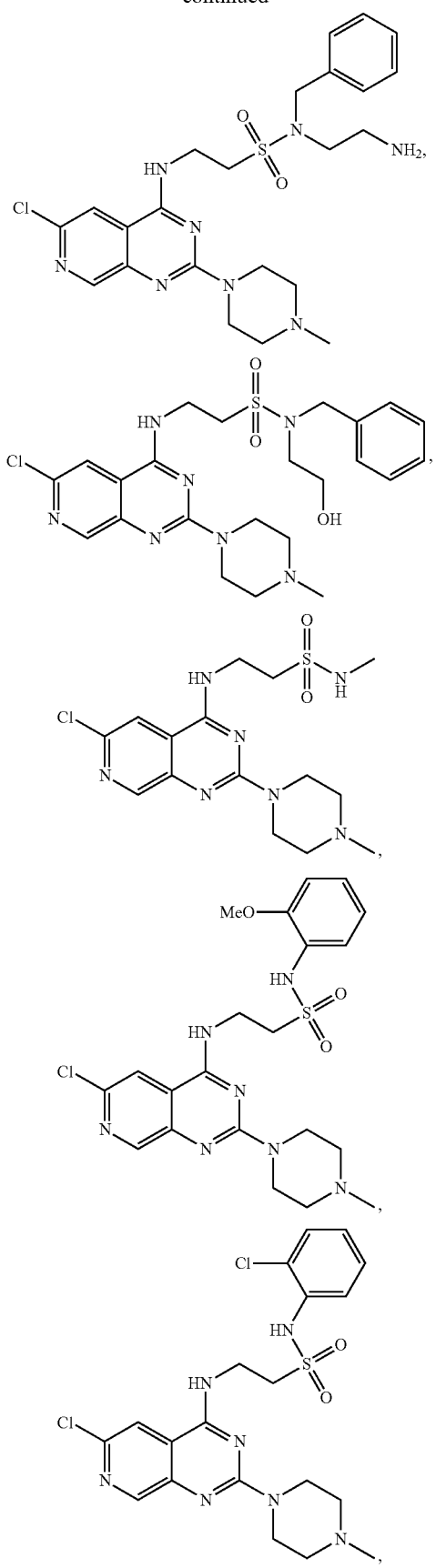
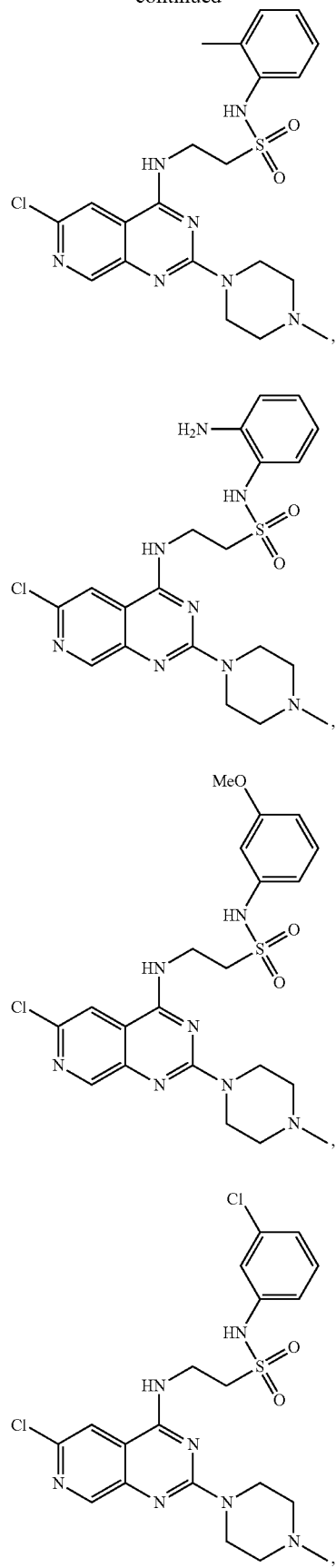

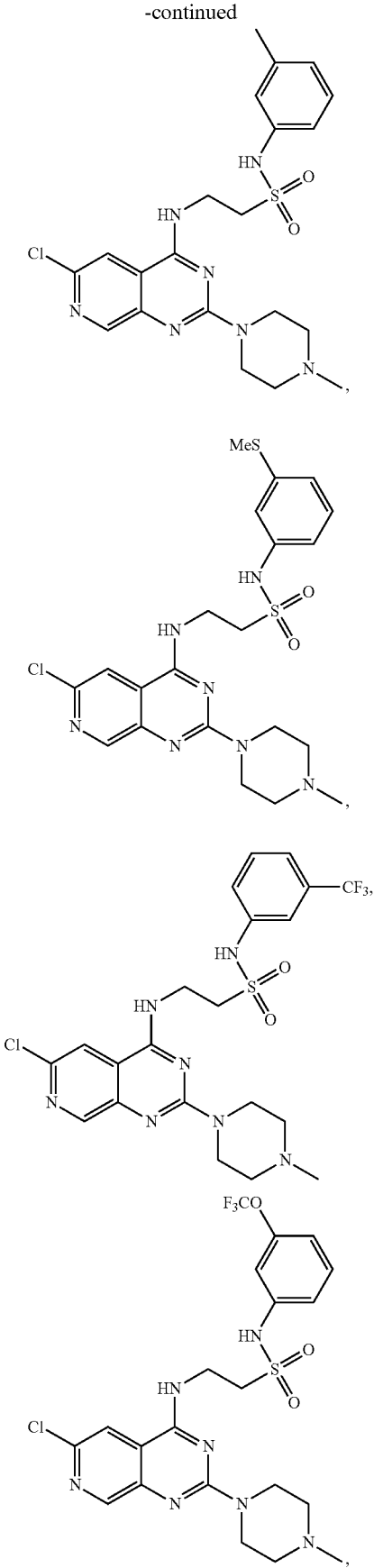
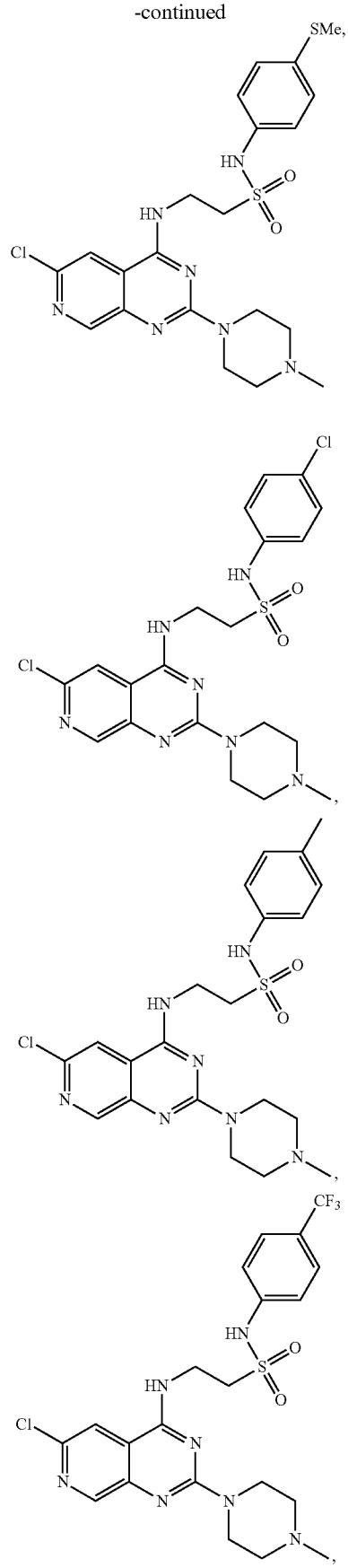

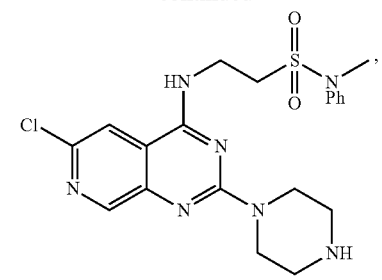
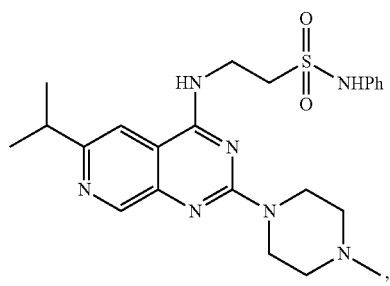
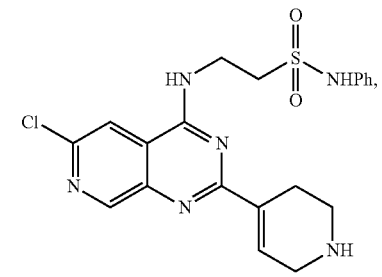
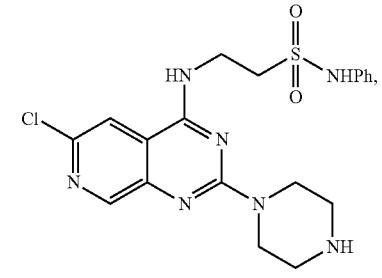
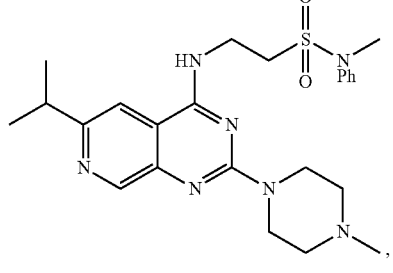
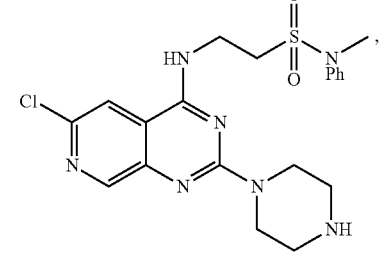
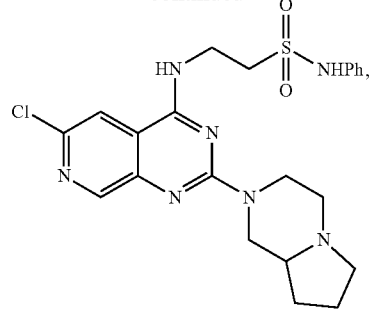
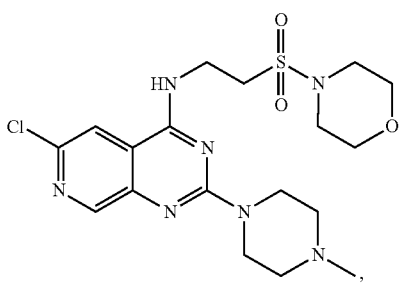
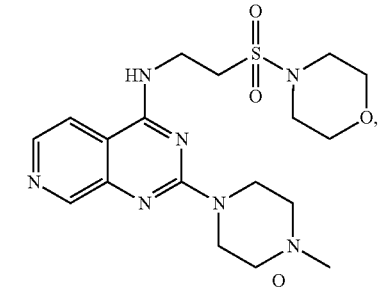
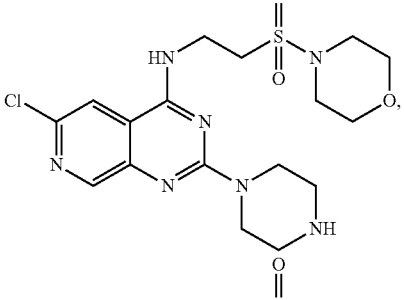
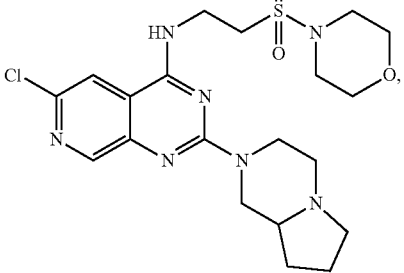
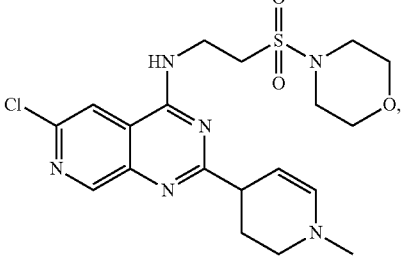

37

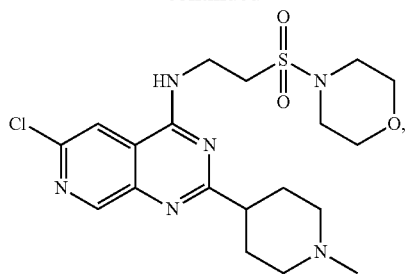

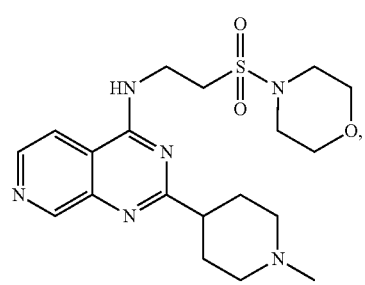

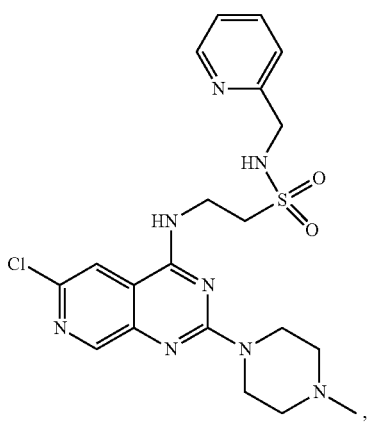

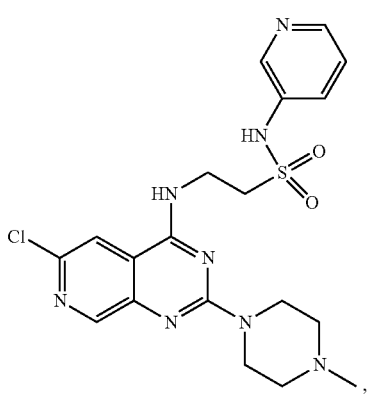

38

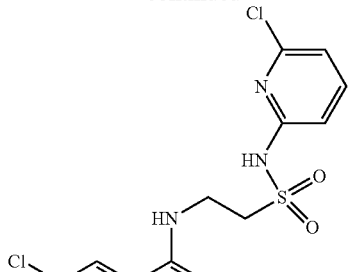

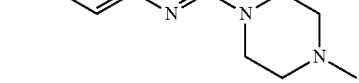

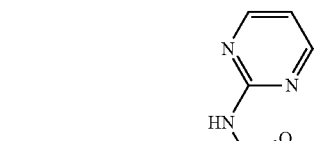

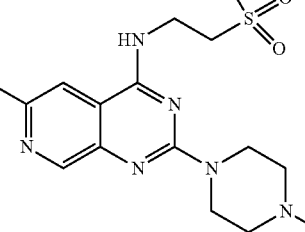

and

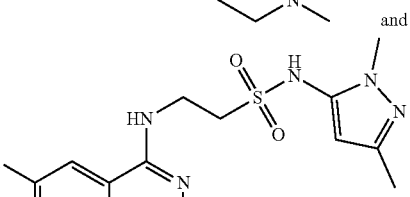

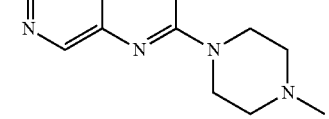

or a salt or solvate thereof.

Uses of Compounds of Formula (I)

Compounds of formula (I) have been found to be antagonists of histamine H4 receptor and would thus be useful in the treatment and/or prevention of diseases or disorders mediated by this receptor; in particular, diseases or disorders susceptible to improvement by antagonism of histamine H4 receptor.

Therefore, an aspect of the invention refers to a compound of formula (I'), or a pharmaceutically acceptable salt or solvate thereof, for use as a medicament.

In another aspect, the invention is directed to a compound of formula (I) as defined above, or a pharmaceutically acceptable salt or solvate thereof, for use in the treatment and/or prevention of a disorder or disease mediated by histamine H4 receptor, preferably a disease or disorder susceptible to amelioration by antagonism of H4 histamine receptor.

In an aspect, the invention is directed to a compound of formula (I) as defined above, or a pharmaceutically acceptable salt or solvate thereof, for use in the treatment and/or prevention of inflammatory disorders, including inflammatory skin diseases, inflammatory diseases of the gastrointestinal tract and inflammatory eye diseases; allergic disorders; dermatological disorders; autoimmune diseases; pruritic diseases, lymphatic disorders, immunodeficiency disorders, respiratory diseases, cardiac diseases, kidney diseases, pain disorders, overactive bladder conditions, vestibular disorders, joint diseases and macular degenerative disorders.

In a particular embodiment, the invention is directed to a compound of formula (I) as defined above, or a pharmaceutically acceptable salt or solvate thereof, for use in the treatment and/or prevention of allergy, asthma, dry eye, conjunctivitis, uveitis, allergic rhinitis, rhinoconjuntivitis, chronic obstructive airway disease (COPD), atopic dermatitis, psoriasis, itchy skin, uraemic pruritus, urticaria, rheumatoid arthritis, psoriatic arthritis, colitis, Crohn's disease and ulcerative colitis, myocardial ischaemia, diabetic nephropathy, inflammatory pain, neuropathic pain, vertigo, tinnitus, atherosclerosis, multiple sclerosis, mastocytosis and inflammatory or systemic lupus erythematosus. Illustrative types of inflammation treatable with a histamine H4 receptor-modulating agent according to the invention include inflammation due to any one of a plurality of conditions such as allergy, asthma, dry eye, chronic obstructed pulmonary disease (COPD), atherosclerosis, rheumatoid arthritis, multiple sclerosis, inflammatory bowel diseases (including colitis, Crohn's disease, and ulcerative colitis), psoriasis, pruritis, itchy skin, atopic dermatitis, urticaria (hives), ocular inflammation (e.g., post-surgical ocular inflammation), conjunctivitis (e.g. allergic conjunctivitis or vernal keratoconjunctivitis), nasal polyps, allergic rhinitis, nasal itch, scleroderma, autoimmune thyroid diseases, immune-mediated (also known as type 1) diabetes mellitus and lupus, which are characterized by excessive or prolonged inflammation at some stage of the disease. Other autoimmune diseases that lead to inflammation include Myasthenia gravis, autoimmune neuropathies, such as Guillain-Barre, autoimmune uveitis, autoimmune hemolytic anemia, pernicious anemia, autoimmune thrombocytopenia, temporal arteritis, antiphospholipid syndrome, vasculitides, such as Wegener's granulomatosis, Behcet's disease, dermatitis herpetiformis, pemphigus vulgaris, vitiligo, primary biliary cirrhosis, autoimmune hepatitis, autoimmune oophoritis and orchitis, autoimmune disease of the adrenal gland, polymyositis, dermatomyositis, spondyloarthropathies, such as ankylosing spondylitis, and Sjogren's syndrome.

In an advantageous embodiment, compounds of formula (I) are antagonist of both histamine H1 and H4 receptors. Combined H1 and H4 antagonists have been disclosed to be more effective than monotherapy in the treatment of diseases or disorders where both receptors are involved. Therefore, such compounds with affinity for the histamine H1 receptor in addition to H4 receptor may be able to modulate inflammatory diseases (dermatitis, itching and inflammation) with both H4R and H1R component more efficiently than only with selective H1R or selective H4R ligands.

The term "treatment" or "to treat" in the context of this specification means administration of a compound or formulation according to the invention to ameliorate or eliminate the disease or one or more symptoms associated with said disease, through modulation of histamine H4 receptor activity. "Treatment" also encompasses ameliorating or eliminating the physiological sequelae of the disease.

The term "ameliorate" in the context of this invention is understood as meaning any improvement on the situation of the patient treated.

The term "prevention" or "to prevent" in the context of this specification means administration of a compound or formulation according to the invention to reduce the risk of acquiring or developing the disease or one or more symptoms associated with said disease.

Pharmaceutical Compositions

According to a further aspect, the present invention is directed to a pharmaceutical composition comprising a compound of formula (I') as defined above, or a pharmaceutically acceptable salt or solvate thereof, and at least one pharmaceutically acceptable excipient.

In an embodiment, the composition is administered simultaneously, separately or sequentially in combination with one or more additional therapeutic agents selected from the group consisting of calcineurin inhibitors, anti-interleukin 17 (anti-IL-17) agents, anti-interleukin 4 receptor (anti-IL-4R), anti-interleukin-31 (anti-IL-31) agents, and combinations thereof to a patient in need thereof.

The term "pharmaceutically acceptable excipient" refers to a vehicle, diluent, or adjuvant that is administered with the active ingredient. Such pharmaceutical excipients can be sterile liquids, such as water and oils, including those of petroleum, animal, vegetable, or synthetic origin, such as peanut oil, soybean oil, mineral oil, sesame oil, and similar. Water or saline aqueous solutions and aqueous dextrose and glycerol solutions, particularly for injectable solutions, are preferably used as vehicles. Suitable pharmaceutical vehicles are described in "Remington's Pharmaceutical Sciences" by E. W. Martin, 21st Edition, 2005.

The excipients and auxiliary substances necessary to manufacture the desired pharmaceutical form of administration of the pharmaceutical composition of the invention will depend, among other factors, on the elected administration pharmaceutical form. Said pharmaceutical forms of administration of the pharmaceutical composition will be manufactured according to conventional methods known by the skilled person in the art. A review of different active ingredient administration methods, excipients to be used and processes for producing them can be found in "Tratado de Farmacia Galénica", C. Fauli i Trillo, Luzán 5, S.A. de Ediciones, 1993.

Examples of pharmaceutical compositions include any solid (tablets, pills, capsules, granules etc.) or liquid (solutions, suspensions or emulsions) compositions for oral, topical or parenteral administration.

In a preferred embodiment the pharmaceutical compositions are in oral form. Suitable dose forms for oral administration may be tablets and capsules and may contain conventional excipients known in the art such as binding agents, for example syrup, acacia, gelatin, sorbitol, tragacanth, or polyvinylpyrrolidone; fillers, for example lactose, sugar, maize starch, calcium phosphate, sorbitol or glycine; tabletting lubricants, for example magnesium stearate; disintegrants, for example starch, polyvinylpyrrolidone, sodium starch glycolate or microcrystalline cellulose; or pharmaceutically acceptable wetting agents such as sodium lauryl sulfate.

The solid oral compositions may be prepared by conventional methods of blending, filling or tabletting. Such operations are conventional in the art. The tablets may for example be prepared by wet or dry granulation and optionally coated according to methods well known in normal pharmaceutical practice, in particular with an enteric coating.

The pharmaceutical compositions may also be adapted for parenteral administration, such as sterile solutions, suspensions or lyophilized products in the appropriate unit dosage form. Adequate excipients can be used, such as bulking agents, buffering agents or surfactants.

The mentioned formulations will be prepared using standard methods such as those described or referred to in the Spanish and US Pharmacopoeias and similar reference texts.

The compounds or compositions of the present invention may be administered by any suitable method, such as oral, sublingual, intranasal, intraocular, parenteral, subcutaneous, intramuscular, intravenous, or transdermal administration. Oral administration is preferred.

Generally an effective administered amount of a compound of the invention will depend on the relative efficacy of the compound chosen, the severity of the disorder being treated and/or prevented and the weight of the sufferer. However, active compounds will typically be administered once or more times a day, for example 1, 2, 3 or 4 times daily, with typical total daily doses in the range of from 0.01 to 1000 mg/kg/day.

The present invention is additionally explained below by means of examples. This explanation must by no means be interpreted as a limitation of the scope of the invention as it is defined in the claims.

EXAMPLES

Compounds of formula (I) according to the present invention were prepared following the general preparation strategy detailed below. The detailed preparation of some of the compounds is described hereinafter.

Reagents and solvents were used as received from the commercial supplier without further purification unless mentioned otherwise. Reactions were carried out in Schlenk tubes or microwave sealed reactors typically under Ar atmosphere.

Microwave reactions were performed using Anton Paar Monowave 450 equipment.

The reaction temperature indicated in the experimental procedures corresponds to the external temperature of the reaction system measured with calibrated temperature sensors (conventional heating) or to the internal reactor temperature measured with a fiber-optic temperature sensor (microwave assisted reactions).

Low temperature reactions were carried out using an Immersion Cooler Huber mod. TC100E equipped with Pt100 sensor (temperature stability of ±0.5 K). In this type of processes, the reaction temperature indicated corresponds to the internal reaction temperature measured with calibrated temperature sensors.

Reactions were monitored by analytical thin layer chromatography using commercial aluminium sheets pre-coated (0.2 mm layer thickness) with silica gel 60 F254 (E. Merck) or by UPLC-MS chromatography. Analytical UPLC/PDA/MS analyses were conducted using a Waters Acquity H-Class chromatograph with a UPLC-PDA optical detector and a QDa™ or a TQD™ MS detector in scan mode. The chromatographic analyses were performed using the following conditions:

Method A: Column Kinetex C18 100×3.0 mm 2.6 μm column. Mobile phase: ammonium bicarbonate 10 mM (solvent A) and methanol (solvent B). Gradient at 0.6 mL/min from 95% to 5% solvent A in 9.0 minutes, then 0.5 minutes in 5% solvent A and back to 95% solvent A in another 0.5 minutes. Total run time 10 minutes. Oven temperature 30° C. Sample temperature 18° C.

Method B: Column Kinetex C18 100×3.0 mm 2.6 μm column. Mobile phase: formic acid 0.1% (solvent A) and methanol (solvent B). Gradient at 0.6 mL/min from 95% to 5% solvent A in 9.0 minutes, then 0.5 minutes in 5% solvent A and back to 95% solvent A in another 0.5 minutes. Total run time 10 minutes. Oven temperature 40° C. Sample temperature 18° C.

The chromatographic method applied for each compound is shown between parentheses after the purity value throughout the text noted as "UPLC-(name of the method)".

Product purification by flash chromatography was performed using E. Merck Silica Gel (230-400 mesh). Visualization was carried out under UV light. Product purification by automated preparative flash chromatography was carried out on Combiflash® Rf+ flash chromatography system from Teledyne Isco, or alternatively on Reveleris® PREP system from Buchi instruments using SiliaSep™ or SiliaSep™ C18) (17%) 4 g, 12 g or 24 g flash cartridges purchased from Silicycle (UV detection operating at three different wavelength $\lambda 1=254$ nm, $\Delta 2=280$ nm and $\Delta 3=220$-230 nm. Yields given are isolated yields unless otherwise stated.

Proton, magnetic nuclear resonance spectra were recorded at 300 MHz with a BRUKER Avance 300 MHz devices in deuterated solvents: chloroform, methanol or dimethylsulfoxide. Chemical shifts are reported in ppm relative to TMS peak at 0.00 ppm or relative to the corresponding signal of the residual solvent. The letters m, s, d, t, q, quint and sept stand for multiplet, singlet, doublet, triplet, quartet, quintuplet and septuplet, respectively. The letters b indicate broad signal. All melting points are corrected and were recorded on a Büchi B-540 apparatus using melting point tubes BUCHI™ reference 017808.

Synthesis of Compounds of Formula (I)

The compounds of formula (I) of the present invention can be synthesized in a multi-step sequence by available synthetic procedures. For example, they can be prepared by the process summarized in the general Schemes 1-4 shown below.

Synthesis of the key Intermediate F: The preparation of the Intermediate F, common in all of the examples described in the present invention, is shown in the Scheme 1.

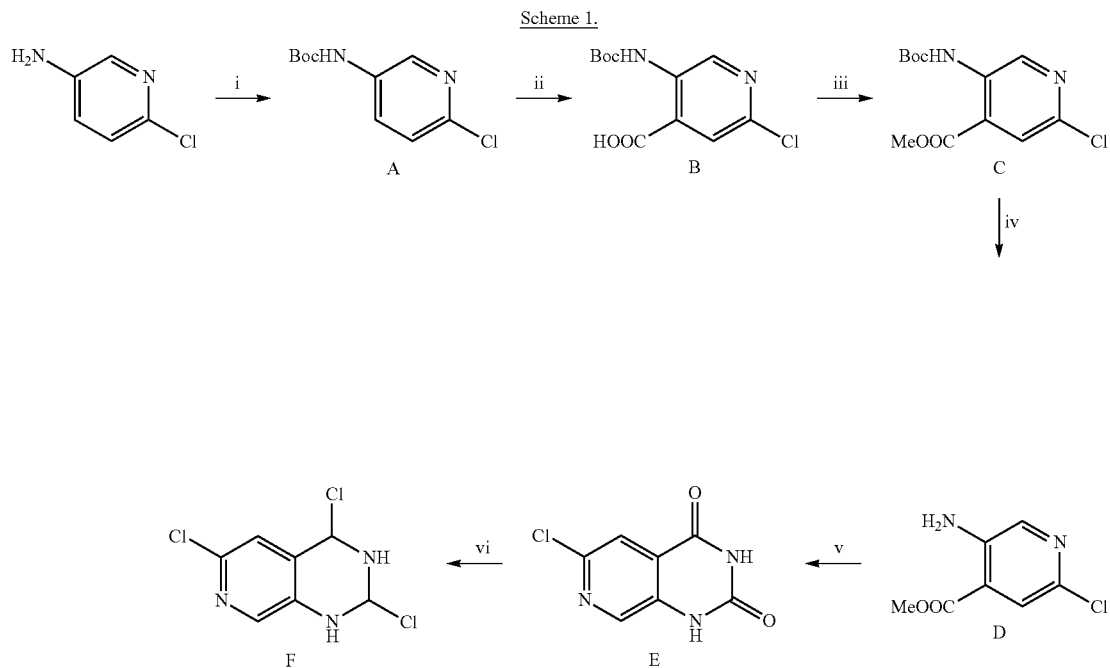

Synthetic route for the preparation of Intermediate F. Reagents and conditions: (i) Boc$_2$O, t-BuOH, 50° C.; (ii) BuLi, TMEDA, Et$_2$O, −78° C., CO$_2$ (g). H$_2$O; (iii) 4-DMAP, EDCl, CH$_2$Cl$_2$, 22° C., MeOH; (iv) concd HCl, MeOH, 65° C.; (v) urea, 150° C., 12 h; (vi) POCl$_3$, DIPEA, 110° C., 12 h.

Synthesis of Examples 1-8 and 68-9: Preparation of the compounds of formula (I) where R$^2$ is N-methylpiperazine, piperazine, N-methylpyrrolidin-3-amine, 2-(1-methylpyrrolidin-2-yl)ethan-1-amine, 1-methyl-1,4-diazepane, N-methylpiperidin-4-amine, piperidin-4-amine, pyrrolidin-3-amine or octahydropyrrolo[1,2-a]pyrazine is depicted in Scheme 2 starting from common intermediate F shown in Scheme 1.

Scheme 2.

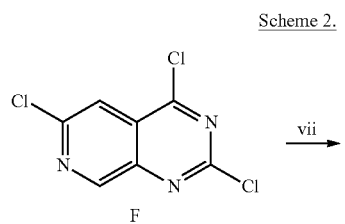

-continued

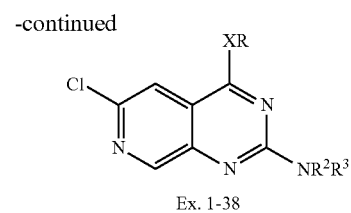

Ex. 1-38

Synthetic route for the preparation of Examples 1-38 and 68-99. Reagents and conditions: (vii) RXH, DIPEA, EtOAc (0.14M), 22° C., t (h); R$^3$R$^2$NH, μW, 120° C., t (min).

Synthesis of Examples 39-45: Preparation of the compounds of formula (I) where R$^2$ is piperidine, 1-methylpiperidine, 1-methyl-1,2,3,4-tetrahydropyridine or 1,2,3,6-tetrahydropyridine is depicted in Scheme 3 starting from common intermediate F shown in Scheme 1.

Scheme 3.

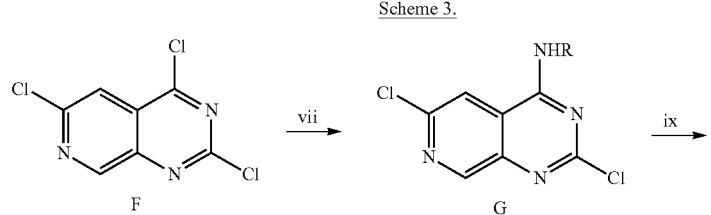

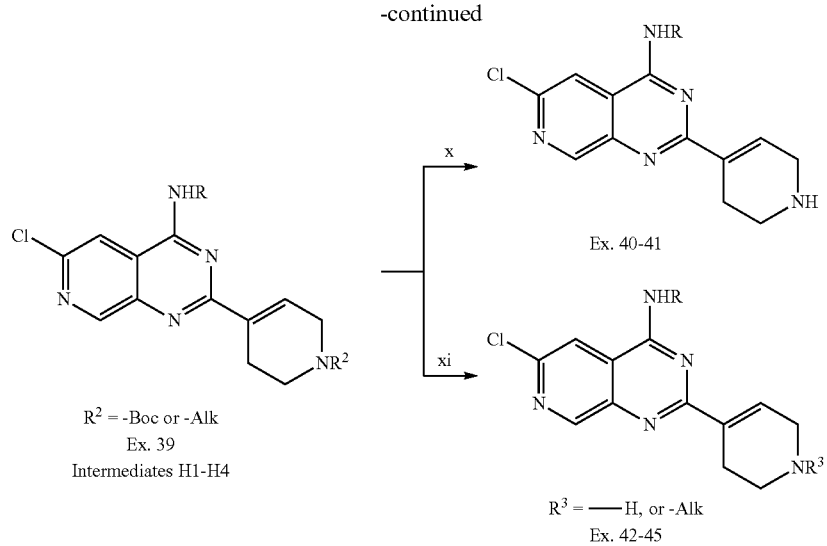

R² = -Boc or -Alk
Ex. 39
Intermediates H1-H4

Ex. 40-41

R³ = —H, or -Alk
Ex. 42-45

Synthetic route for the preparation of Examples 39-45. Reagents and conditions: (viii) RNH₂, DIPEA, EtOAc: DCM 1:1% v/v (0.14M), 22° C., t (h); (ix) RBpin, Na₂CO₃ (2M), THF (0.27M), μW, 100° C., t (h); (x) Pd(OH)₂ 20% w/w on carbon, H₂ (1 atm), EtOAc:MeOH 2:1% v/v (7 mM); (xi) concd HCl, MeOH (0.1M).

Synthesis examples 46-67: Preparation of the compounds of formula (I) where R³ substitution is -alkyl or —H is depicted in Scheme 4 starting from the Examples (3, 4, 6, 16, 17, 18, 24, 42 and 43) shown in Schemes 2 and 3.

Scheme 4.

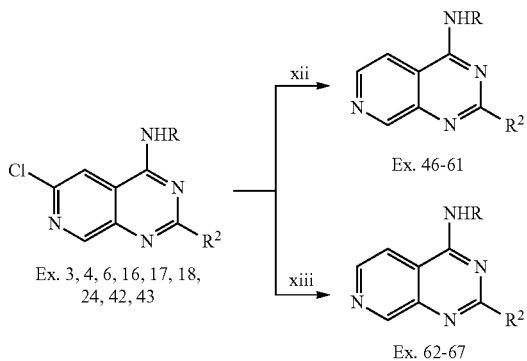

Ex. 3, 4, 6, 16, 17, 18, 24, 42, 43

Ex. 46-61

Ex. 62-67

Synthetic route for the preparation of the Examples 46-67. Reagents and conditions: (xii) R³MX, PEPPSI™—IPr, LiCl, DME (4-6 mM), 70° C., 16 h; (xiii) Pd/C, H₂ (1 atm), EtOAc:MeOH 2:1% v/v (7 mM).

Step 1: Synthesis of Intermediate A CAS: 171178-45-3]

Tert-butyl (6-chloropyridin-3-yl)carbamate was prepared by an adapted procedure derived from WO 2008/130021, WO 2006/024834 and Ohta et al., *Bioorg. Med. Chem.* 2008, 16, 7021-7032.

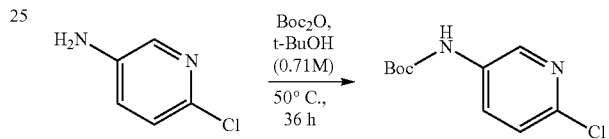

In a 500 ml oven-dried round bottom flask 5-amino-2-chloropyridine (20 g, 154 mmol, 1 equiv.) was dissolved in tert-butanol (217 mL, 0.71M), di-tert-butyl dicarbonate (38.4 g, 172 mmol, 1.12 equiv.) was added and the solution was stirred at 50° C. The reaction progress was monitored by TLC (Heptane:EtOAc 30:60% v/v) until complete conversion of 5-amino-2-chloropyridine into the Intermediate A was achieved (36 h). The solvent was evaporated on a rotary evaporator and the residue was dissolved in ethyl acetate (500 mL). The organic phase was washed with water (3×150 mL), brine (1×150 mL), dried over anhyd. Na₂SO₄ and volatiles were removed under reduced pressure to give a pink solid, which was purified by automated flash chromatography (Elution with Heptane:EtOAc:DCM 50:25:25% v/v) giving tert-butyl (6-chloropyridin-3-yl)carbamate as a white solid (35.29 g, 99.3% yield). Purity: 99.0% (UPLC-A); mp: 127-129.1° C.; ¹H-NMR (CDCl₃), δ (ppm): 8.245 (dd, 1H), 7.965 (d, 1H), 7.25 (dd, 1H), 6.66 (bs, NH), 1.52 (s, 9H); LR-MS (ESI+): m/z=229.1 Da [M+H]⁺, calcd. for C₁₀H₁₃ClN₂O₂: 228.7.

Step 2: Synthesis of Intermediate B [CAS: 171178-46-4]

5-((tert-butoxycarbonyl)amino)-2-chloroisonicotinate was prepared by an adapted procedure derived from WO 2008/130021 and WO 2006/024834.

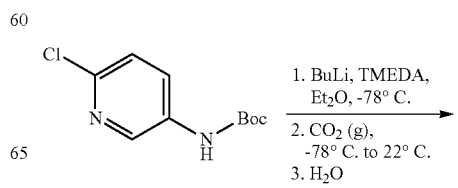

-continued

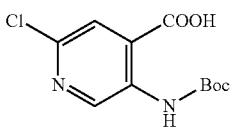

To a 500 mL oven dried 3 necked round bottom flask, tert-butyl (6-chloropyridin-3-yl)carbamate (Intermediate A) (5 g, 21.82 mmol, 1 equiv.) was dissolved in anhydrous diethyl ether (200 mL) giving a yellow solution. TMEDA 0.1M (11.7 mL, 76 mmol, 3.5 equiv.) were added and the mixture was cooled to −78° C. A solution of n-butyl lithium 2.5 M in hexanes (30.5 mL, 76 mmol, 3.5 equiv) was dropwise added (the reaction mixture turned brown-red colour). When the addition of the reagent was completed, the reaction mixture was permitted to reach to −10° C. and stirred at this temperature for 3 h. The reaction mixture was then re-cooled to −78° C. and a carbon dioxide gas bag (1 gal) was fitted under Ar atmosphere. The system was evacuated and flushed with carbon dioxide for three times. The reaction mixture was stirred at −78° C. under carbon dioxide atmosphere at atmospheric pressure for 4 h. The reaction was permitted to warm up to 22° C. and stirred for 18 h. Water was added to the reaction mixture until complete solution of solid materials (300 mL). The phases were separated and the aqueous phase was washed with diethyl ether (2×100 mL). After that, the pH-value of the aqueous phase was adjusted to 6.32 with HCl 2.7M and extracted with diethyl ether (4×200 mL) and EtOAc (5×200 mL). The combined organic phases were dried over anhyd. $Na_2SO_4$ and concentrated under reduced pressure giving 5-((tert-butoxycarbonyl)amino)-2-chloroisonicotinic acid as a pale yellow solid, (5.13 g, 87% yield). Purity: 99.1% (UPLC-A); $^1$H-NMR (DMSO-$d_6$), δ (ppm): 10.01 (s, 1H), 9.12 (s, 1H), 7.75 (s, 1H), 1.48 (s, 9H); LR-MS (ESI+): m/z=273.0 Da $[M+H]^+$, calcd. for $C_{11}H_{13}ClN_2O_4$: 272.7.

Step 3: Synthesis of Intermediate C [CAS: 305371-42-0]

Methyl 5-((tert-butoxycarbonyl)amino)-2-chloroisonicotinate was prepared by an adapted procedure derived from Haddleton et al., *J. Am. Chem. Soc.* 2012, 134, 7406-7413.

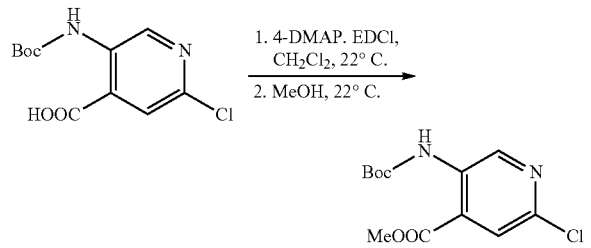

5-((tert-butoxycarbonyl)amino)-2-chloroisonicotinic acid (Intermediate B) (4.27 g, 15 mmol, 1 equiv.) was added to a 500 mL two necked oven-dried round bottom flask equipped with a stirring bar and suspended in dichloromethane (187 mL, 0.08M) was added. 4-Dimethylamino pyridine (7.40 g, 60 mmol, 4 equiv.) was added at 22° C. resulting in an homogeneous solution. N-(3-dimethylaminopropyl)-$N^1$-ethylcarbodiimide (4.65 g, mmol, 2 equiv.) was added at that temperature and the crude mixture was stirred for 3 h. Anhydrous MeOH (HPLC quality), (5.5 mL, 135 mmol, 9 equiv.) was added to the solution and the mixture was stirred for 1 h at 22° C. The resulting mixture was heated to reflux using an aluminium heating block for 72 h. TLC (EtOAc: MeOH 90:10% v/v) showed complete conversion of Intermediate B into Intermediate C. The reaction was permitted to reach to 22° C. and volatiles were removed under reduced pressure. Dichloromethane (150 mL) was added to the residue until complete solution was achieved and the mixture was transferred to a separating funnel, washed with $H_2O$ (1×70 mL). HCl 1M (2×50 mL) and saturated NaCl solution (1×50 mL). The organic phase was dried with $Na_2SO_4$ and filtered through a pad of $Na_2SO_4$ on a filter plate. The solvent was removed under reduced pressure giving a brown solid, which was purified by automated flash chromatography (Heptane:EtOAc, product elution with EtOAc 100% v/v) giving methyl 5-((tert-butoxycarbonyl)amino)-2-chloroisonicotinate as a pale yellow solid (4.04 g, 79% yield). Purity: 99.4% (UPLC-A); mp: 90.0-95.8° C.; $^1$H-NMR (CDCl$_3$), δ (ppm): 9.68 (bs, NH), 9.49 (s, 1H), 7.73 (s, 1H), 7.20 (s, 1H), 3.91 (s, 3H), 1.47 (s, 9H); LR-MS (ESI+): m/z=287.1 Da $[M+H]^+$, calcd. for $C_{12}H_1ClN_2O_4$: 286.2.

Step 4: Synthesis of Intermediate D [CAS: 1073182-9-8]

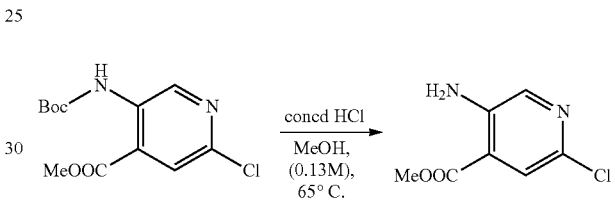

Methyl 5-((tert-butoxycarbonyl)amino)-2-chloroisonicotinate (Intermediate C) (6.22 g, 21.68 mmol, 1 equiv.) was dissolved in methanol (165 mL) and concd hydrochloric acid. (8.71 mL, 105 mmol, 4.85 equiv.) was added to the solution. The resulting yellow solution was stirred and heated to reflux using an aluminium heating block until complete conversion was achieved (22 h). The reaction was monitored by TLC analysis (Heptane:EtOAc 30:60% v/v). MeOH was evaporated under reduced pressure. DCM was added until complete solution of the residue was achieved (160 mL), water (90 ml) was added. The pH of the aqueous phase (initial pH 0.3) was adjusted to 13.02 by addition of 1.25M sodium hydroxide solution and extracted with DCM (4×200 mL). The combined organic phases were dried over anhyd. $Na_2SO_4$, filtered off and concentrated under reduced pressure yielding methyl 5-amino-2-chloroisonicotinate as a brown-yellow solid; (3.90 g, 95% yield). Purity: 98.4% (UPLC-A); $^1$H-NMR (CDCl$_3$), δ (ppm): 8.0 (s, 1H), 7.6 (s, 1H), 3.91 (s, 3H); LR-MS (ESI+): m/z=187.0 Da $[M+H]^+$, calcd. for $C_7H_7ClN_2O_2$: 186.2.

Step 5: Synthesis of Intermediate E CAS: 219051263-91

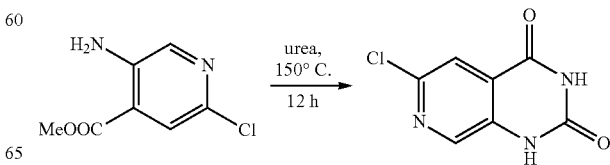

Urea (4.75 g, 79 mmol, 10 equiv.) was melted in a 50 mL round-bottom flask by heating at 150° C. using an aluminium heating block. Intermediate D (1.48 g, 7.9 mmol, 1 equiv.) was added and the mixture was heated at 150° C. overnight. The formation of a brown oil was observed. The temperature was lowered down to 100° C. and water (30 mL) was added. The mixture was stirred at this temperature for 1 h allowing unreacted urea to dissolve. The pH of the aqueous phase (initial pH 7.63) was adjusted to 4.0 by addition of HCl 1M. The aqueous phase was extracted (3×70 mL) with $CHCl_3$/iPrOH 4:1% v/v. The combined organic phases were dried over anhyd. $Na_2SO_4$, filtered off and evaporated under reduced pressure giving a yellow solid, mixture of intermediate D and E. The yellow solid was suspended in 100 mL of DCM and stirred during 15 min. The suspension was filtrated through a filter plate and washed with DCM (3×10 mL). The DCM-containing phases were combined and the solvent was removed under reduced pressure giving the unreacted intermediate D. The filtered yellow solid was dried to give 6-chloropyrido[3,4-d]pyrimidine-2,4(1H,3H)-dione as a pale yellow solid (1.20 g, 72% yield). Purity: 93.9% (UPLC-B); mp: 315.4-318.2° C.; $^1$H-NMR (DMSO-d6), δ (ppm): 11.60 (bs, 2H, NH), 8.36 (s, 1H), 7.77 (s, 1H); LR-MS (ESI+): m/z=198.1 Da [M+H]$^+$, calcd. for $C_7H_4ClN_3O_2$: 197.6.

Step 6: Synthesis of Intermediate F [CAS: 2143878-49-1]

2,4,6-Trichloropyrdo[3,4-d]pyrimidine was prepared by an adapted procedure derived from Kool et al., *J. Org. Chem.* 2005, 70, 132-140; Rose et al., *J. Chem. Soc.*, 1947, 775-783; Ohta et al., *Bioorg. Med. Chem.* 2008, 16, 7021-7032.

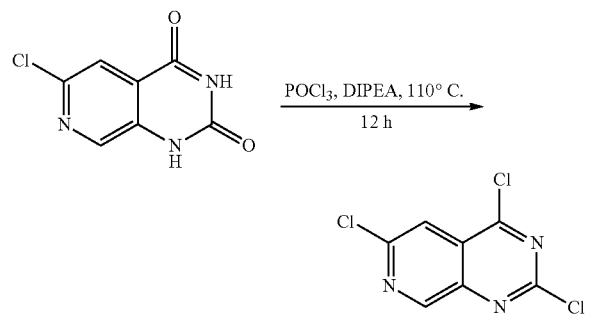

To a 6-chloropyrido[3,4-d]pyrimidine-2,4(1H,3H)-dione (Intermediate E) (1.19 g, 6 mmol, 1 equiv.) contained in a 100 mL 2-necked oven-dried round-bottom flask fitted with a Dimroth condenser, previously distilled $POCl_3$ (27 mL, 288 mmol, 48 equiv.) and DIPEA (2.72 mL, 15.6 mmol, 2.6 equiv.) were added. The mixture was stirred under reflux conditions (110° C.) for 18 h. Volatiles were distilled off under laboratory vacuum (200-300 mmHg). The residue was dissolved in DCM (80 mL) and washed with water (2×30 mL) and saturated NaCl solution (1×30 mL). The organic phase was dried over anhyd. $Na_2SO_4$ and filtered. The solvent was removed under reduced pressure giving 2, 4, 6-trichloropyrido[3,4-d]pyrimidine as a light brown solid (1.22 g, 89% yield). Purity: 96.6% (UPLC-B); mp: 107.7-110.3° C.; $^1$H-NMR (CDCl$_3$), δ (ppm): 9.30 (s, 1H), 8.07 (s, 1H); LR-MS (ESI+): m/z=233.8 Da [M+H]$^+$, calcd. for $C_7H_2ClN_3$: 232.9.

Seto 7: Synthesis of Examples 1-38 and 68-99

General Synthetic Procedure A:

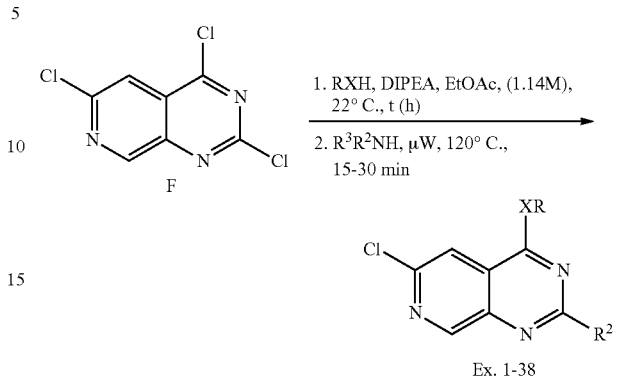

An oven dried μW reactor was charged with 2,4,6-Trichloropyrido[3,4-d]pyrimidine (Intermediate F) (234 mg, 1 mmol, 1 equiv.) sealed with a septum and purged with Ar atmosphere (3 cycles Ar/vacuum). Then, EtOAc (7 mL, 0.14 M) and N,N-diisopropylethylamine (0.51 mL, 2.9 mmol, 2.9 equiv.) were added and the mixture was homogenized by stirring for 5 min. The corresponding amine or alcohol (RXH) (1.05 mmol, 1.05 equiv.) was added. The resulting mixture was stirred at 22° C. until complete conversion of the Intermediate F was achieved (2-20 h). The corresponding amine ($R^3R^2NH$) (1.5-10.3 mmol, 1.5-10.3 equiv.) was added. The mixture was homogenized by stirring and submitted to reaction under microwave irradiation at 120° C. for 15-30 min (Energy Power: 60 W). The progress of the reaction was confirmed by TLC (EtOAc:MeOH). The crude mixture was transferred to a round bottom flask by addition of EtOAc and volatiles were removed under reduced pressure. The residue was dissolved in EtOAc (70 mL) and transferred to a separating funnel. The organic phase was washed with water (3×30 mL) and saturated NaCl solution (1×30 mL). The organic phase was dried over anhyd. $Na_2SO_4$ and filtered through a pad of $Na_2SO_4$ with a filter plate. The solvent was removed under reduced pressure giving the crude mixture, which was purified by automated flash chromatography (EtOAc:MeOH) yielding the corresponding products (Examples 1-38 and 68-99).

All of the reacting amines are commercially available except in the case of aminealkyisulfonamides used in the Examples 14-18, 26-28, 37-39, 41, 43, 45 and 71-90. The required aminealkylsulfonamides were prepared by an adapted procedure of the protocol described in the literature: Smits et al., *J. Med. Chem.* 2010, 53, 2390-2400. The structural elucidation of all of the compounds used in this procedure are reported therein except for: 2-amino-N-benzylethane-1-sulfonamide hydrochloride; white solid; Weight: 3.102 g; Yield: 35%; Purity: 84.0% (UPLC-A); mp: 175.5-187.9° C.; $^1$H-NMR (CDCl$_3$:MeOD 4:1% v/v), δ (ppm): 7.41-7.29 (m, 5H), 4.31 (s, 2H), 3.43-3.31 (m, 4H); LR-MS (ESI+): m/z=215.0 Da [M+H]$^+$, calcd. for $C_9H_{14}N_2O_2S$ (parent free base): 214.1.

2-amino-N-(2-chlorophenyl)ethane-1-sulfonamide hydrochloride; pale orange crystals; Weight: 2.0 g; Yield: 83.0%; Purity: 98.2% (UPLC-A); mp: 179.8-185.5° C.; $^1$H-NMR (D$_2$O), δ (ppm): 7.48-7.40 (m, 2H), 7.36-7.14 (m, 2H), 3.59 (t, 2H), 3.46 (t, 2H); LR-MS (ESI+): m/z=235.0 Da [M+H]$^+$, calcd. for $C_8H_{11}ClN_2O_2S$ (parent free base): 234.0.

2-amino-N-(o-tolyl)ethane-1-sulfonamide hydrochloride; yellow solid; Weight: 1.8 g; Yield: 77.4%; Purity: 85.2% (UPLC-A); mp: 156.0-164.7° C.; $^1$H-NMR (D$_2$O), δ (ppm): 7.38-7.10 (m, 4H), 3.62 (t, 2H), 3.47 (t, 2H), 2.27 (s, 3H); LR-MS (ESI+): m/z=215.2 Da [M+H]$^+$, calcd. for C$_9$H$_{14}$N$_2$O$_2$S (parent free base): 214.1.

2-amino-N-(2-methoxyphenyl)ethane-1-sulfonamide hydrochloride; pale brown solid; Weight: 2.0 g; Yield: 77.6%; Purity: 90.7% (UPLC-A); mp: 152.7-160.0° C.; $^1$H-NMR (D$_2$O), δ (ppm): 7.37-7.22 (m, 2H), 7.05 (m, 1H), 6.95 (m, 1H), 3.82 (s, 3H), 3.60-3.40 (m, 4H); LR-MS (ESI+): m/z=231.0 Da [M+H]$^+$, calcd. for C$_8$H$_{14}$N$_2$O$_3$S (parent free base): 230.1.

2-amino-N-(2-aminophenyl)ethane-1-sulfonamide dihydrochloride; pale pink solid; Weight: 1.9 g; Yield: 63.0%; Purity: 94.1% (UPLC-A); mp: 229.6-237.0° C.; $^1$H-NMR (D$_2$O), δ (ppm): 7.67-7.29 (m, 4H), 3.64 (t, 2H), 3.49 (t, 2H); LR-MS (ESI+): m/z=216.1 Da [M+H]$^+$, calcd. for CH$_{13}$N$_3$O$_2$S (parent free base): 215.1.

2-amino-N-(3-chlorophenyl)ethane-1-sulfonamide hydrochloride; pale brown solid; Weight: 1.8 g; Yield: 75.7%; Purity: 98.2% (UPLC-A); mp: 122.7-137.8° C.; $^1$H-NMR (D$_2$O), δ (ppm): 7.41-7.20 (m, 3H), 7.20-6.93 (m, 1H), 3.57 (t, 2H), 3.39 (t, 2H); LR-MS (ESI+): m/z=234.9 Da [M+H]$^+$, calcd. for C$_9$H$_{11}$ClN$_2$O$_2$S (parent free base): 234.0.

2-amino-N-(3-(trifluoromethoxy)phenyl)ethane-1-sulfonamide hydrochloride; pale brown solid; Weight: 2.8 g; Yield: 87.4%; Purity: 93.6% (UPLC-A); mp: 151.6-162.5° C.; $^1$H-NMR (D$_2$O), δ (ppm): 7.42 (t, 1H), 7.23-7.11 (m, 3H), 3.59 (t, 2H), 3.39 (t, 2H); LR-MS (ESI+): m/z=284.9 Da [M+H]$^+$, calcd. for C$_9$H$_{11}$F$_3$N$_2$O$_3$S (parent free base): 284.0.

2-amino-N-(3-(trifluoromethyl)phenyl)ethane-1-sulfonamide hydrochloride; yellow solid; Weight: 0.439 g; Yield: 43.0%; Purity: 94.8% (UPLC-A); mp: 201.5-203.5° C.; $^1$H-NMR (D$_2$O), δ (ppm): 7.56-7.36 (m, 4H), 3.55 (t, 2H), 3.37 (t, 2H); LR-MS (ESI+): m/z=268.9 Da [M+H]$^+$, calcd. for C$_9$H$_{11}$F$_3$N$_2$O$_2$S (parent free base): 268.1.

2-amino-N-(m-tolyl)ethane-1-sulfonamide hydrochloride; pale yellow solid; Weight: 1.6 g: Yield: 72.0%; Purity: 90.0% (UPLC-A); mp: 141.6-148.0° C.; $^1$H-NMR (D$_2$O), δ (ppm): 7.24 (t, 1H), 7.03 (m, 3H), 3.53 (t, 2H), 3.37 (t, 2H), 2.24 (s, 3H); LR-MS (ESI+): m/z=215.0 Da [M+H]$^+$, calcd. for C$_9$H$_{14}$N$_2$O$_2$S (parent free base): 214.1.

2-amino-N-(3-methoxyphenyl)ethane-1-sulfonamide hydrochloride: pale brown solid; Weight: 2.0 g; Yield: 84.5%; Purity: 94.4% (UPLC-A); mp: 108.7-116.7° C.; $^1$H-NMR (D$_2$O), δ (ppm): 7.28 (t, 1H), 6.93-6.73 (m, 3H), 3.74 (s, 3H), 3.55 (t, 2H), 3.38 (t, 2H); LR-MS (ESI+): m/z=231.0 Da [M+H]$^+$, calcd. for C$_9$H$_{14}$N$_2$O$_3$S (parent free base): 230.1.

2-amino-N-(3-(methylthio)phenyl)ethane-1-sulfonamide hydrochloride; pale yellow solid; Weight: 2.2 g; Yield: 53.8%; Purity: 95.6% (UPLC-A): mp: 137.3-142.7° C.; $^1$H-NMR (D$_2$O), δ (ppm): 7.25 (m, 1H), 7.07 (m, 2H), 6.96 (m, 1H), 3.54 (t, 2H), 3.38 (t, 2H), 2.39 (s, 3H); LR-MS (ESI+): m/z=246.9 Da [M+H]$^+$, calcd. for C$_9$H$_{14}$N$_2$O$_2$S$_2$ (parent free base): 246.1.

2-amino-N-(4-chlorophenyl)ethane-1-sulfonamide hydrochloride; yellow solid; Weight: 2.1 g; Yield: 95.0%; Purity: 91.6% (UPLC-A); mp: 198.2-212.2° C.; $^1$H-NMR (D$_2$O), δ (ppm): 7.42-7.17 (m, 2H), 7.16-6.93 (m, 2H), 3.52 (t, 2H), 3.36 (t, 2H); LR-MS (ESI+): m/z=234.9 Da [M+H]$^+$, calcd. for C$_9$H$_{11}$ClN$_2$O$_2$S (parent free base): 234.0.

2-amino-N-(4-(trifluoromethyl)phenyl)ethane-1-sulfonamide hydrochloride; orange-brown solid; Weight: 0.400 g; Yield: 47.1%; Purity: 97.0% (UPLC-A); mp: 118.7-207.6° C.; $^1$H-NMR (D$_2$O), δ (ppm): 7.63 (d, 2H), 7.31 (d, 2H), 3.61 (t, 2H), 3.39 (t, 2H); LR-MS (ESI+): m/z=268.9 Da [M+H]$^+$, calcd. for C$_9$H$_{11}$F$_3$N$_2$O$_2$S (parent free base): 268.1.

2-amino-N-(p-tolyl)ethane-1-sulfonamide hydrochloride; yellow-brown solid; Weight: 1.2 g; Yield: 89.3%; Purity: 89.0% (UPLC-A); mp: 162.0-173.9° C.; $^1$H-NMR (D$_2$O), δ (ppm): 7.18 (d, 2H), 7.10 (d, 2H), 3.51 (t, 2H), 3.37 (t, 2H), 2.23 (s, 3H); LR-MS (ESI+): m/z=215.0 Da [M+H]$^+$, calcd. for C$_9$H$_{14}$N$_2$O$_2$S (parent free base): 214.1.

2-amino-N-(4-(methylthio)phenyl)ethane-1-sulfonamide hydrochloride; grey solid; Weight: 1.9 g; Yield: 67.7%: Purity: 95.8% (UPLC-A); mp: 160.7-169.3° C.; $^1$H-NMR (D$_2$O), δ (ppm): 7.21 (d, 2H), 7.12 (d, 2H), 3.50 (t, 2H), 3.35 (t, 2H), 2.36 (s, 3H); LR-MS (ESI+): m/z=246.9 Da [M+H] J, calcd. for C$_9$H$_{14}$N$_2$O$_2$S$_2$ (parent free base): 246.1.

2-amino-N-(pyridin-3-yl)ethane-1-sulfonamide hydrochloride; pale orange solid: Weight: 1.6 g; Yield: 66.3%; Purity: 89.8% (UPLC-A); mp: 165.3-179.3° C.; $^1$H-NMR (D$_2$O), δ (ppm): 8.72-8.62 (m, 1H), 8.51 (t, 1H), 8.39-8.24 (m, 1H), 7.97 (q, 1H), 3.92-3.65 (m, 2H), 3.62-3.31 (m, 2H); LR-MS (ESI+): m/z=202.0 Da [M+H]$^+$, calcd. for C$_7$H$_{11}$N$_3$O$_2$S (parent free base): 201.1.

2-amino-N-(6-chloropyridin-2-yl)ethane-1-sulfonamide hydrochloride; beige solid; Weight: 0.400 g; Yield: 20.3%; Purity: 94.3% (UPLC-A); mp: 176.7-185.3° C.; $^1$H-NMR (D$_2$O), δ (ppm): 7.62 (t, 1H), 7.05 (dd, 1H), 6.81 (dd, 1H), 3.84 (t, 2H), 3.40 (t, 2H); LR-MS (ESI+): m/z=235.9 Da [M+H]$^+$, calcd. for C$_7$H$_{10}$ClN$_3$O$_2$S (parent free base): 235.0.

2-amino-N-(pyridin-2-ylmethyl)ethane-1-sulfonamide hydrochloride; beige solid; Weight: 0.600 g; Yield: 24.0%; Purity: 97.0% (UPLC-A); mp: 166.0-176.0° C.; $^1$H-NMR (D$_2$O), δ (ppm): 8.63 (dd, 1H), 8.51 (td, 1H), 8.00 (d, 1H), 7.91 (t, 1H), 4.73 (s, 2H), 3.65 (t, 2H), 3.45 (t, 2H); LR-MS (ESI+): m/z=216.0 Da [M+H]$^+$, calcd. for C$_8$H$_{13}$NaO$_2$S (parent free base): 215.1.

2-amino-N-(pyrimidin-2-yl)ethane-1-sulfonamide hydrochloride; orange solid; Weight: 1.2 g; Yield: 52.0%; Purity: 91.5% (UPLC-A); mp: 138.7-146.0° C.; $^1$H-NMR (D$_2$O), δ (ppm): 8.53 (d, 2H), 7.07 (t, 1H), 3.73 (t, 2H), 3.46 (t, 2H); LR-MS (ESI+): m/z=203.0 Da [M+H]$^+$, calcd. for C$_6$H$_{10}$N$_4$O$_2$S (parent free base): 202.1.

2-amino-N-(1,3-dimethyl-1H-pyrazol-5-yl)ethane-1-sulfonamide hydrochloride; pale yellow solid; Weight: 0.400 g; Yield: 14.5%; Purity: 90.6% (UPLC-A); mp: 182.0-195.6° C.; $^1$H-NMR (D$_2$O), δ (ppm): 6.37-6.12 (m, 1H), 3.72 (s, 3H), 3.64 (t, 2H), 3.41 (t, 2H), 2.23 (s, 3H); LR-MS (ESI+): m/z=219.0 Da [M+H]$^+$, calcd. for C$_7$H$_{14}$N$_4$O$_2$S (parent free base): 218.1.

Alternatively, the required aminealkylsulfonamides used in the Examples 91 and 92 were prepared as the corresponding protected derivatives (O-tert-butyldimethylsilyl) protected derivative for the example 91 and N-tert-butyloxycarbonyl-protected derivative for the example 92) by an adapted procedure of the protocol described in the literature: Smits et al., J. Med. Chem. 2010, 53, 2390-2400. In these examples, an additional deprotection reaction step was necessary to obtain the target compound (see examples 91 and 92). 2-amino-N-benzyl-N-(2-((tert-butyldimethylsilyl)oxy)ethyl)ethane-1-sulfonamide reacted in the example 91 was obtained as a white solid; Weight: 2.28 g; Yield: 75%; Purity: 98.0% (UPLC-A); $^1$H-NMR (DMSO-de), δ (ppm): 7.41-7.27 (m, 5H), 4.41 (s, 2H), 3.49 (t, 2H), 3.29-3.10 (m, 4H), 2.93 (t, 2H), 0.81 (s, 9H), −0.04 (s, 6H); LR-MS (ESI+): m/z=373.1 Da [M+H]$^+$, calcd. for C$_{17}$H$_2$N$_2$O$_3$SSi: 372.2.

tert-butyl(2-((2-amino-N-benzylethyl)sulfonamido)ethyl) carbamate reacted in the example 92 was obtained as a pale yellow solid; Weight: 1.40 g; Yield: 67.0%; Purity: 93.8% (UPLC-A); $^1$H-NMR (CDCl$_3$), δ (ppm): 7.41-7.27 (m, 5H), 4.45 (s, 2H), 3.32 (t, 2H), 3.20 (t, 4H), 3.08 (t, 2H), 1.49 (bs, NH$_2$), 1.43 (s, 9H); LR-MS (ESI+): m/z=358.1 Da [M+H]$^+$, calcd. for C$_{15}$H$_{27}$N$_3$O$_4$S: 357.2.

Additionally, in examples 30 and 31 of this invention the reacting amine was used as the corresponding-protected derivative (Boc-protected). In these examples, an additional Boc-deprotection reaction step was necessary to obtain the target compound.

Boc-Deprotection Procedure: The corresponding Boc-derivative (1 equiv.) was dissolved in MeOH (0.1M, HPLC quality). Conc. hydrochloric acid (3 equiv.) was added and the resulting yellow solution was stirred under reflux conditions until total conversion was achieved (3-20 h). The progress of the reaction was monitored by TLC (EtOAc:MeOH). The mixture was permitted to cool down to 22° C. and MeOH was removed under reduced pressure. The residue was dissolved in DCM, poured onto water and transferred to a separatory funnel. The pH of the aqueous phase was adjusted to pH-14 by addition of 1.25M sodium hydroxide solution and extracted with DCM (3×40 mL). The combined organic phases were dried over anhyd. Na$_2$SO$_4$, filtered off and concentrated under reduced pressure yielding the corresponding deprotected compound.

The following compounds were obtained following the General Synthetic Procedure A described above for Examples 1-38 and 68-99:

Example 1: 6-chloro-4-ethoxy-2-(4-methylpiperazin-1-yl)pyrido[3,4-d]pyrimidine

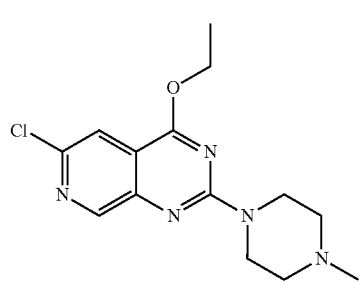 [SMILES: CCOc1nc(N2CCN(C)CC2)nc2cnc(Cl)cc12]

RXH: ethanol, 59 μL; t: 2 h; R$^3$R$^2$NH: 1-methylpiperazine, 0.54 mL, 5 mmol, 5 equiv.; t: 20 min. Automated flash chromatography (EtOAc:MeOH, product elution with 90:10% v/v) provided the title compound as a yellow solid; weight: 0.143 g; Yield: 40%; Purity: 85.5% (UPLC-B); $^1$H-NMR (CDCl$_3$), δ (ppm): 8.70 (d, 1H), 7.70 (d, 1H), 4.55 (q, 2H), 3.96 (t, 4H), 2.52 (t, 4H), 2.37 (s, 3H), 1.50 (t, 3H); LR-MS (ESI+): m/z=308.1 Da [M+H]$^+$, calcd. for C$_{14}$H$_{16}$ClN$_5$O: 307.1.

Example 2: 6-chloro-2-(4-methylpiperazin-1-yl)-4-phenoxypyrido[3,4-d]pyrimidine

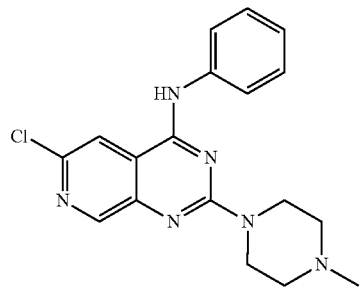 [SMILES: CN1CCN(c2nc(Nc3ccccc3)c3cc(Cl)ncc3n2)CC1]

RXH: phenol, 89 μL; t: 12 h; R$^3$R$^2$NH: 1-methylpiperazine, 0.54 mL, 5 mmol, 5 equiv.; t: 20 min. Automated flash chromatography (EtOAc:MeOH, product elution with EtOAc 100% v/v) provided the title compound as a yellow solid; weight: 0.249 g; Yield: 67%; Purity: 95.6% (UPLC-A); mp: 137.8-144.2° C.; $^1$H-NMR (CDCl$_3$), δ (ppm): 8.75 (d, 1H), 7.89 (d, 1H), 7.49-7.43 (m, 2H), 7.32 (t, 1H), 7.30-7.22 (m, 2H), 3.78 (bt, 4H), 2.39 (t, 4H), 2.30 (s, 3H); LR-MS (ESI+): m/z=356.1 Da [M+H]$^+$, calcd. for C$_{18}$H$_{18}$ClN$_5$O: 355.1.

Example 3: 6-chloro-2-(4-methylpiperazin-1-yl)-N-(thiophen-2-ylmethyl)pyrido[3,4-d]pyrimidin-4-amine

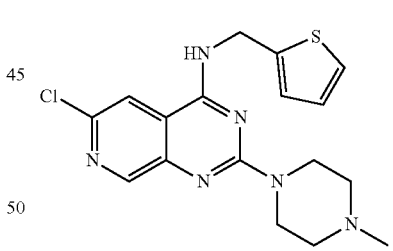

RXH: 2-thiophenemethylamine, 0.11 mL; t: 5 h; R$^3$R$^2$NH: 1-methylpiperazine, 0.27 mL, 2.5 mmol, 2.5 equiv.; t: 20 min. Automated flash chromatography (EtOAc:MeOH, product elution with 96:4% v/v) provided the title compound as a yellow solid; weight: 0.279 g; Yield: 79%; Purity: 94.3% (UPLC-A); mp: 150° C. (decomposition); $^1$H-NMR (CDCl$_3$), δ (ppm): 8.63 (s, 1H), 7.31 (s, 1H), 7.25 (dd, 1H), 7.05 (d, 1H), 6.98 (dd, 1H), 6.01 (t, NH), 4.94 (d, 2H), 3.98 (t, 4H), 2.49 (t, 4H), 2.35 (s, 3H); LR-MS (ESI+): m/z=375.0 Da [M+H]$^4$, calcd. for C$_{17}$H$_{19}$ClN$_6$S: 374.1.

Example 4: 6-chloro-N-(furan-2-ylmethyl)-2-(4-methylpiperazin-1-yl)pyrido[3,4-d]pyrimidin-4-amine

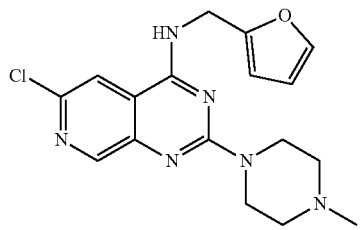 [SMILES: CN1CCN(c2nc(NCc3ccco3)c3cc(Cl)ncc3n2)CC1]

RXH: furan-2-ylmethanamine, 97.2 mL; t: 5 h; R³R²NH: 1-methylpiperazine, 0.27 mL, 2.5 mmol, 2.5 equiv.; t: 30 min. Automated flash chromatography (EtOAc:MeOH, product elution with 92:8% v/v) provided the title compound as a yellow solid; weight: 307 mg; Yield: 85%; Purity: 99.0% (UPLC-B), mp: 158.1-170.2° C.; ¹H-NMR (CDCl₃), (ppm): 8.63 (s, 1H), 7.41 (d, 1H), 7.32 (s, 1H), 6.37 (t, 1H), 6.33 (d, 1H), 5.87 (t, 1H), 4.77 (d, 2H), 3.96 (t, 4H), 2.49 (t, 4H), 2.36 (s, 3H); LR-MS (ESI+): m/z=359.0 Da [M+H], calcd. for $C_{17}H_{19}ClN_6O$: 358.1.

Example 5: 6-chloro-2-(4-methylpiperazin-1-yl)-N-(thiophen-3-ylmethyl)pyrido[3,4-d]pyrimidin-4-amine

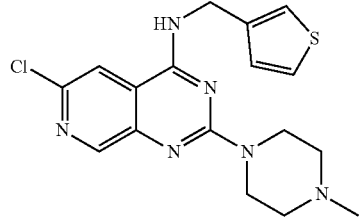 [SMILES: CN1CCN(c2nc(NCc3ccsc3)c3cc(Cl)ncc3n2)CC1]

RXH: 3-thiophenemethylamine, 0.11 mL; t: 3 h; R³R²NH: 1-methylpiperazine, 0.54 mL, mmol, 5 equiv.; t: 30 min. Automated flash chromatography (EtOAc:MeOH, product elution with 89:11% v/v) provided the title compound as a yellow solid; weight: 0.335 g; Yield: 87%; Purity: 95.8% (UPLC-A); ¹H-NMR (CDCl₃), δ (ppm): 8.62 (s, 1H), 7.34 (s, 1H), 7.33 (d, 1H), 7.26 (d, 1H), 7.11 (d, 1H), 5.95 (t, NH), 4.78 (d, 2H), 3.96 (t, 4H), 2.51 (t, 4H), 2.37 (s, 3H); LR-MS (ESI+): m/z=375.0 Da [M+H]⁺, calcd. for $C_{17}H_{19}ClN_6S$: 374.1.

Example 6: 6-chloro-2-(4-methylpiperazin-1-yl)-N-(2-(thiophen-2-yl)ethyl)pyrido[3,4-d]pyrimidin-4-amine

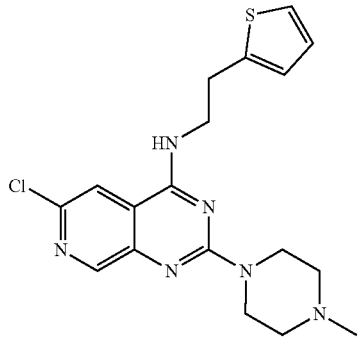 [SMILES: CN1CCN(c2nc(NCCc3cccs3)c3cc(Cl)ncc3n2)CC1]

RXH: 2-(thiophen-2-yl)ethan-1-amine, 0.14 mL; t: 3 h; R¹R²NH: 1-methylpiperazine, 0.17 mL, 1.5 mmol, 1.5 equiv.; t: 30 min. Automated flash chromatography (EtOAc:MeOH, product elution with 96:04% v/v) provided the title compound as a yellow solid; weight: 0.356 g; Yield: 89%; Purity: 97.2% (UPLC-B); mp: 160.4-175.1° C.; ¹H-NMR (CDCl₃), δ (ppm): 8.62 (s, 1H), 7.27 (s, 1H), 7.20 (d, 1H), 6.98 (dd, 1H), 6.87 (d, 1H), 5.83 (t, NH), 3.96 (t, 4H), 3.86 (dd, 2H), 3.23 (t, 2H), 2.51 (t, 4H), 2.36 (s, 3H); LR-MS (ESI+): m/z=389.0 Da [M+H]⁺, calcd. for $C_{18}H_{21}ClN_6S$: 388.1.

Example 7: 6-chloro-2-(4-methylpiperazin-1-yl)-N-(thiazol-2-ylmethyl)pyrido[3,4-d]pyrimidin-4-amine

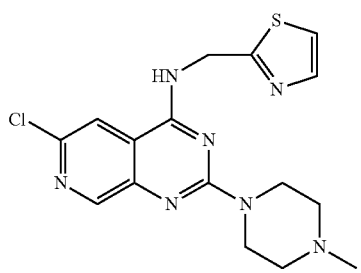 [SMILES: CN1CCN(c2nc(NCc3nccs3)c3cc(Cl)ncc3n2)CC1]

RXH: 3-chloro-2-((chloro-5-azanyl)methyl)-2,3-dihydrothiazol-3-ium-2-ide, 192.9 mg; t: 1 h; R¹R²NH: 1-methylpiperazine, 1.16 mL, 10.3 mmol, 10.3 equiv.; t: 30 min. Automated flash chromatography (EtOAc:MeOH, product elution with 91:9% v/v) provided the title compound as a yellow solid; weight: 0.334 g; Yield: 88%; Purity: 99.0% (UPLC-A); ¹H-NMR (CD₂Cl₂:MeOD 2:1% v/v), δ (ppm): 8.53 (d, 1H), 7.78 (d, 1H), 7.71 (d, 1H), 7.38 (d, 1H), 4.23 (s, 2H), 3.90 (t, 4H), 2.48 (t, 4H), 2.33 (s, 3H); LR-MS (ESI+): m/z=376.1 Da [M+H]⁺, calcd. for $C_{16}H_{16}ClN_7S$: 375.1.

Example 8: N-((1H-imidazol-2-yl)methyl)-6-chloro-2-(4-methylpiperazin-1-yl)pyrido[3,4-d]pyrimidin-4-amine

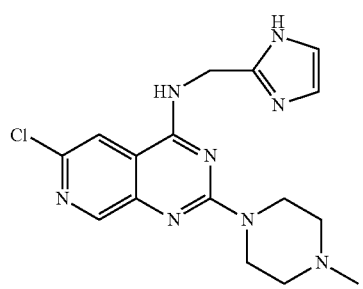 [SMILES: CN1CCN(c2nc(NCc3ncc[nH]3)c3cc(Cl)ncc3n2)CC1]

RXH: 2-(aminomethyl)imidazol dyhydrochloride, 176.80 mg; t: 5 h; $R^3R^2NH$: 1-methylpiperazine, 1.16 mL, 10.3 mmol, 10.3 equiv.; t: 30 min. Automated flash chromatography (EtOAc:MeOH, product elution with 78:22% v/v) provided the title compound as a yellow solid; weight: 0.278 g; Yield: 62%; Purity: 97.8% (UPLC-A); $^1$H-NMR (CD$_2$Cl$_2$: MeOD 2:1% v/v), δ (ppm): 8.49 (d, 1H), 7.87 (d, 1H), 6.94 (s, 2H), 4.77 (s, 2H), 3.84 (t, 4H), 2.45 (t, 4H), 2.31 (s, 3H): LR-MS (ESI+): m/z=359.1 Da [M+H]$^+$, calcd. for $C_{16}H_{19}ClN_8$: 358.1.

Example 9: 6-chloro-2-(4-methylpiperazin-1-yl)-N-phenylpyrido[3,4-d]pyrimidin-4-amine

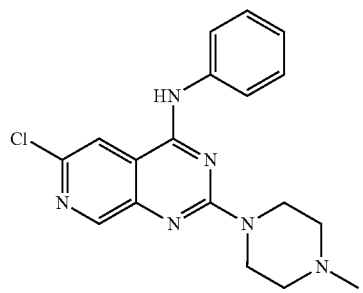 [SMILES: CN1CCN(c2nc(Nc3ccccc3)c3cc(Cl)ncc3n2)CC1]

RXH: Aniline, 97 μL; t: 12 h; $R^3R^2NH$: 1-methylpiperazine, 0.54 mL, 5 mmol, 5 equiv.; t: 20 min. Automated flash chromatography (EtOAc:MeOH, product elution with 97:3% v/v) provided the title compound as a yellow solid; weight: 0.310 g; Yield: 85%; Purity: 97.2% (UPLC-A): mp: 210.8-218.1° C.; $^1$H-NMR (CDCl$_3$), δ (ppm): 8.68 (s, 1H), 7.66 (d, 2H), 7.49 (s, 1H), 7.42 (t, 2H), 7.30 (bs, NH), 7.19 (t, 1H), 3.92 (t, 4H), 2.48 (t, 4H), 2.34 (s, 3H); LR-MS (ESI+): m/z=355.1 Da [M+H]$^+$, calcd. for $C_{18}H_{19}ClN$: 354.1.

Example 10: N-benzyl-6-chloro-2-(4-methylpiperazin-1-yl)pyrido[3,4-d]pyrimidin-4-amine

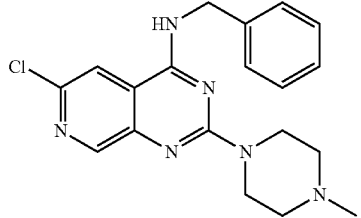 [SMILES: CN1CCN(c2nc(NCc3ccccc3)c3cc(Cl)ncc3n2)CC1]

RXH: Benzylamine, 0.11 mL; t: 3 h; $R^3R^2NH$: 1-methylpiperazine, 1.16 mL, 10.3 mmol, 10.3 equiv.; t: 20 min. Automated flash chromatography (EtOAc:MeOH, product elution with 96:4% v/v) provided the title compound as a yellow solid; weight: 0.285 g; Yield: 75%; Purity: 97.1% (UPLC-A); $^1$H-NMR (CDCl$_3$), δ (ppm): 8.62 (s, 1H), 7.38-7.30 (m, 5H), 7.36 (s, 1H), 5.95 (t, NH), 4.77 (d, 2H), 3.93 (t, 4H), 2.46 (t, 4H), 2.34 (s, 3H); LR-MS (ESI+): m/z=369.1 Da [M+H]$^+$, calcd. for $C_{19}H_{21}ClN_6$: 368.2.

Example 11: 6-chloro-2-(4-methylpiperazin-1-yl)-N-(pyridin-2-ylmethyl)pyrido[3,4-d]pyrimidin-4-amine

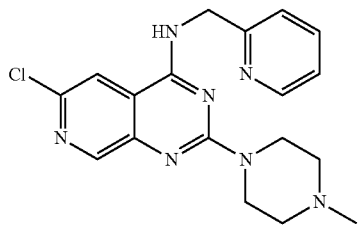 [SMILES: CN1CCN(c2nc(NCc3ccccn3)c3cc(Cl)ncc3n2)CC1]

RXH: pyridin-2-ylmethanamine, 0.11 mL; t: 2 h; $R^3R^2NH$: 1-methylpiperazine, 1.16 mL, 10.3 mmol, 10.3 equiv.; t: 30 min. Automated flash chromatography (EtOAc:MeOH, product elution with 80:20% v/v) provided the title compound as a yellow solid; weight: 0.229.52 g; Yield: 61%; Purity: 98.3% (UPLC-B); mp: 182.3-193.5° C.; $^1$H-NMR (CDCl$_3$), δ (ppm): 8.62 (dm, 1H), 8.60 (s, 1H), 7.73 (td, 1H), 7.59 (t, NH), 7.47 (s, 1H), 7.36 (d, 1H), 7.27 (t, 1H), 4.82 (d, 2H), 3.94 (t, 4H), 2.48 (t, 4H), 2.35 (s, 3H); LR-MS (ESI+): m/z=313.0 Da [M+H]$^+$, calcd. for $C_{18}H_{20}ClN_7$: 369.2.

Example 12: 6-chloro-N-(4-fluorobenzyl)-2-(4-methylpiperazin-1-yl)pyrido[3,4-d]pyrimidin-4-amine

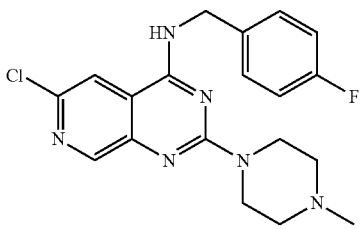 [SMILES: CN1CCN(c2nc(NCc3ccc(F)cc3)c3cc(Cl)ncc3n2)CC1]

RXH: 4-fluorophenyl)methanamine, 0.12 mL; t: 3 h; $R^3R^2NH$: 1-methylpiperazine, 1.16 mL, 10.3 mmol, 10.3 equiv.; t: 30 min. Automated flash chromatography (EtOAc:MeOH, product elution with 98:2% v/v) provided the title compound as a yellow solid; weight: 0.275 g; Yield: 70%; Purity: 98.4% (UPLC-B); mp: 164° C. (decomposition); $^1$H-NMR (CDCl$_3$), δ (ppm): 8.63 (s, 1H), 7.33 (t, 1H), 7.32 (s, 1H), 7.04 (t, 1H), 5.90 (t, NH), 4.74 (d, 2H), 3.92 (t, 4H), 2.48 (t, 4H), 2.34 (s, 3H); LR-MS (ESI+): m/z=387.0 Da [M+H]$^+$, calcd. for $C_{19}H_{20}ClFN_6$: 386.1.

Example 13: 6-chloro-N-(4-methylbenzyl)-2-(4-methylpiperazin-1-yl)pyrido[3,4-d]pyrimidin-4-amine

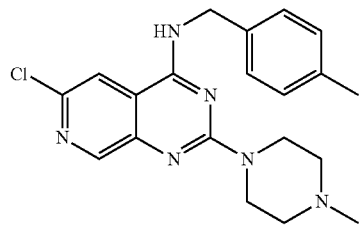 [SMILES: Cc1ccc(CNc2nc(N3CCN(C)CC3)nc3cnc(Cl)cc23)cc1]

RXH: p-tolylmethanamine, 0.13 mL; t: 2 h; $R^3R^2NH$: 1-methylpiperazine, 1.16 mL, 10.3 mmol, 10.3 equiv.; t: 30 min. Automated flash chromatography (EtOAc:MeOH, product elution with 95:5% v/v) provided the title compound as a yellow solid; weight: 0.355 g; Yield: 90%; Purity: 97.2% (UPLC-B); mp: 181.2-198.0° C.; $^1$H-NMR (CDCl$_3$), δ (ppm): 8.62 (s, 1H), 7.29 (s, 1H), 7.26 (d, 1H), 7.18 (d, 1H), 5.81 (t, NH), 4.72 (d, 2H), 3.94 (t, 4H), 2.48 (t, 4H), 2.36 (s, 3H), 2.35 (s, 3H); LR-MS (ESI+): m/z=383.1 Da [M+H]$^+$, calcd. for $C_{20}H_{23}ClN_6$: 382.2.

Example 14: 2-((6-chloro-2-(4-methylpiperazin-1-yl)pyrido[34-d]pyrimidin-4-yl)amino)-N-methyl-ethane-1-sulfonamide

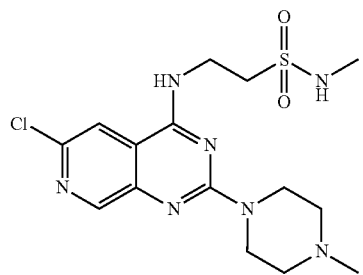 [SMILES: CNS(=O)(=O)CCNc1nc(N2CCN(C)CC2)nc2cnc(Cl)cc12]

RXH: 2-amino-N-methylethane-1-sulfonamide hydrochloride, 185 mg; t: 12 h; $R^3R^2NH$: 1-methylpiperazine, 0.54 mL, 5 mmol, 5 equiv.; t: 20 min. Automated flash chromatography (EtOAc:MeOH, product elution with 90:10% v/v) provided the title compound as a yellow solid; weight: 0.357 g; Yield: 87%; Purity: 97.4% (UPLC-A); $^1$H-NMR (CDCl$_3$), δ (ppm): 8.50 (s, 1H), 7.34 (s, 1H), 6.88 (t, NH), 4.01 (dt, 2H), 3.91 (t, 4H), 3.45 (t, 2H), 2.83 (s, 3H), 2.52 (t, 4H), 2.37 (s, 3H); LR-MS (ESI+): m/z=400.2 Da [M+H]$^+$, calcd. for $C_{15}H_{22}ClN_7O_2S$: 399.1.

Compound from Example 14 (0.357 mg, 0.87 mmol, 1 equiv.) was suspended in MSOH (9.7 mL, 0.09M. HPLC quality) and HCl 1.25M in MeOH (2.1 mL, 2.6 mmol, 3 equiv.) was added. The mixture was stirred at 22° C. over 18 h. Volatiles were removed under reduced pressure yielding quantitatively 2-((6-chloro-2-(4-methylpiperazin-1-yl)pyrido[3,4-d]pyrimidin-4-yl)amino)-N-methylethane-1-sulfonamide hydrochloride as a yellow solid; Purity: 97.4% (UPLC-A); mp: 232.9° C. (degradation); $^1$H-NMR (D$_2$O), δ (ppm): 8.73 (s, 1H), 7.97 (s, 1H), 4.14 (t, 2H), 3.73 (bt, 4H), 3.60 (t, 4H), 3.31 (bt, 2H), 3.01 (s, 3H), 2.73 (s, 3H); LR-MS (ESI+): m/z=400.2 Da [M+H]$^+$, calcd. for $C_{15}H_{22}ClN_7O_2S$ (parent free base): 399.1.

Example 15: N-benzyl-2-((6-chloro-2-(4-methylpiperazin-1-yl)pyrido[3,4-d]pyrimidin-4-yl)amino)ethane-1-sulfonamide

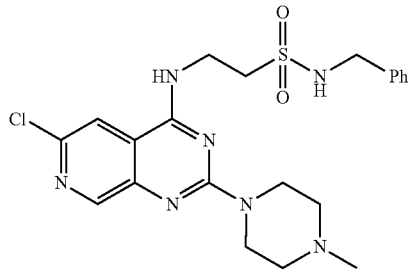 [SMILES: CN1CCN(c2nc(NCCS(=O)(=O)NCc3ccccc3)c3cc(Cl)ncc3n2)CC1]

RXH: 2-amino-N-benzylethane-1-sulfonamide hydrochloride, 234 mg; t: 12 h; $R^3R^2NH$: 1-methylpiperazine, 0.54 mL, 5 mmol, 5 equiv.; t: 20 min. Automated flash chromatography (EtOAc:MeOH, product elution with 97:3% v/v) provided the title compound as a yellow solid; weight: 0.389 g; Yield: 80%; Purity: 97.7% (UPLC-A); mp: 222.5-230.2° C.; $^1$H-NMR (MeOD), δ (ppm): 8.36 (s, 1H), 7.66 (s, 1H), 7.22-7.09 (m, 5H), 4.12 (s, 2H), 3.86-3.79 (m, 6H), 3.22-3.20 (m, 2H), 2.39 (t, 4H), 2.23 (s, 3H); LR-MS (ESI+): m/z=476.3 Da [M+H]$^+$, calcd. for $C_{21}H_{26}ClN_7O_2S$: 475.2.

Compound from Example 15 (0.389 mg, 0.8 mmol, 1 equiv.) was suspended in MeOH (8.9 mL, 0.09M, HPLC quality) and HCl 1.25M in MeOH (1.9 mL, 2.4 mmol, 3 equiv.) was added. The mixture was stirred at 22° C. over 17 h. Volatiles were removed under reduced pressure to afford N-benzyl-2-((6-chloro-2-(4-methylpiperazin-1-yl)pyrido[3,4-d]pyrimidin-4-yl)amino)ethane-1-sulfonamide hydrochloride in quantitative yield as a yellow solid; Purity: 96.7% (UPLC-A); mp: 194.8-204.6° C.; $^1$H-NMR (D$_2$O), δ (ppm): 8.38 (s, 1H), 7.47 (s, 1H), 7.16-7.10 (m, 5H), 4.19 (s, 2H), 3.90 (t, 2H), 3.68-3.62 (m, 4H), 3.41-3.37 (m, 4H), 3.20-3.15 (m, 2H), 2.97 (s, 3H); LR-MS (ESI+): m/z=476.1 Da [M+H], calcd. for $C_{21}H_{26}ClN_7O_2S$ (parent free base): 475.2.

Example 16: 2-((6-chloro-2-(4-methylpiperazin-1-yl)pyrido[3,4-d]pyrimidin-4-yl)amino)-N-phenylethane-1-sulfonamide

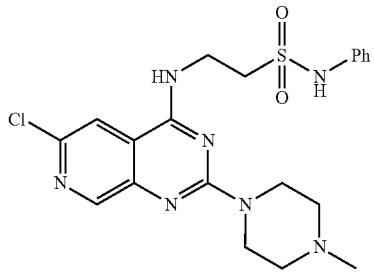 [SMILES: CN1CCN(c2nc(NCCS(=O)(=O)Nc3ccccc3)c3cc(Cl)ncc3n2)CC1]

RXH: 2-amino-N-phenylethane-1-sulfonamide hydrochloride, 225.7 mg; t: 12 h; $R^3R^2NH$: 1-methylpiperazine, 0.54 mL, 5 mmol, 5 equiv.; t: 20 min. Automated flash chromatography (EtOAc:MeOH, product elution with 94:06% v/v) provided the title compound as a yellow solid; weight: 0.417 g; Yield: 90%; Purity: 99.5% (UPLC-A); mp: 223.1-229.5° C.; $^1$H-NMR (MeOD), δ (ppm): 8.47 (s, 1H), 7.73 (s, 1H), 7.29-7.06 (m, 5H), 3.96 (t, 2H), 3.83 (t, 4H), 3.57 (t, 2H), 2.45 (t, 4H), 2.35 (s, 3H); LR-MS (ESI+): m/z=462.1 Da [M+H]$^+$, calcd. for $C_{20}H_{24}ClN_7O_2S$: 461.1.

Compound from Example 16 (0.417 mg, 0.9 mmol, 1 equiv.) was suspended in MeOH (10 mL, 0.09M, HPLC quality) and HCl 1.25M in MeOH (2.2 mL, 2.7 mmol, 3 equiv.) was added. The mixture was stirred at 22 C for 15 h. Volatiles were removed under reduced pressure to afford 6-chloro-2-(piperazin-1-yl)-N-(thiophen-2-ylmethyl)pyrido[3,4-d]pyrimidin-4-amine hydrochloride in quantitative yield as a yellow solid; Purity: 99.5% (UPLC-A); mp: 277.1° C. (decomposition); $^1$H-NMR (MeOD:D$_2$O 80:20% v/v), δ (ppm): 8.59 (s, 1H), 7.82 (s, 1H), 7.26-7.21 (m, 2H), 7.11-7.06 (m, 3H), 4.05 (t, 4H), 3.70 (t, 4H), 3.69-3.11 (bs, 4H), 3.01 (s, 3H); LR-MS (ESI+): m/z=462.1 Da [M+H]$^+$, calcd. for $C_{20}H_{24}ClN_7O_2S$ (parent free base): 461.1.

Example 17: 2-((6-chloro-2-(4-methylpiperazin-1-yl)pyrido[3,4-d]pyrimidin-4-yl)amino)-N-methyl-N-phenylethane-1-sulfonamide

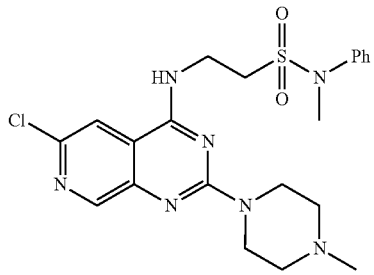 [SMILES: CN1CCN(c2nc(NCCS(=O)(=O)N(C)c3ccccc3)c3cc(Cl)ncc3n2)CC1]

RXH: 2-amino-N-methyl-N-phenylethane-1-sulfonamide hydrochloride, 293 mg; t: 12 h; $R^3R^2NH$: 1-methylpiperazine, 0.54 mL, 5 mmol, 5 equiv.; t: 20 min. Automated flash chromatography (EtOAc:MeOH, product elution with 95:5% v/v) provided the title compound as a yellow solid; weight: 0.330 g; Yield: 69%; Purity: 99.2% (UPLC-A); mp: 175.4-183.9° C.; $^1$H-NMR (CDCl$_3$), δ (ppm): 8.59 (s, 1H), 7.37-7.26 (m, 5H), 7.36 (s, 1H), 6.48 (t, NH), 4.06 (dd, 2H), 3.89 (t, 4H), 3.40 (t, 2H), 3.37 (s, 3H), 2.46 (t, 4H), 2.35 (s, 3H); LR-MS (ESI+): m/z=476.3 Da [M+H]$^+$, calcd. for $C_{21}H_{26}ClN_7O_2S$: 475.2.

Example 18: 6-chloro-2-(4-methylpiperazin-1-yl)-N-(2-(morpholinosulfonyl)ethyl)pyrido[3,4-d]pyrimidin-4-amine

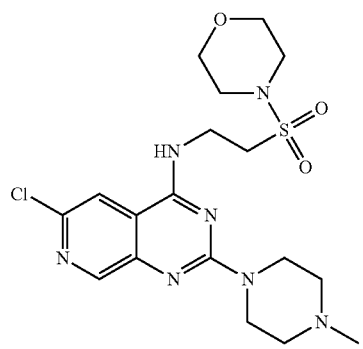 [SMILES: CN1CCN(c2nc(NCCS(=O)(=O)N3CCOCC3)c3cc(Cl)ncc3n2)CC1]

RXH: 2-(morpholinosulfonyl)ethan-1-amine hydrochloride, 293 mg; t: 12 h; $R^3R^2NH$: 1-methylpiperazine, 0.54 mL, 5 mmol, 5 equiv.; t: 20 min. Automated flash chromatography (EtOAc:MeOH, product elution with 92:8% v/v) provided the title compound as a pale yellow solid; weight: 0.417 g; Yield: 90%; Purity: 98.2% (UPLC-A); mp: 126.4-136.8° C.; $^1$H-NMR (CD$_2$Cl$_2$), δ (ppm): 8.41 (s, 1H), 7.31/s, 1H), 6.61 (t, NH), 4.00 (dd, 2H), 3.81 (t, 4H), 3.65 (t, 4H), 3.23 (t, 2H), 3.19 (t, 4H), 2.37 (t, 4H), 2.22 (s, 3H); LR-MS (ESI+): m/z=456.2 Da [M+H]$^+$, calcd. for $C_{16}H_{26}ClN_7O_3S$: 455.2.

Example 19: 3-(((6-chloro-2-(4-methylpiperazin-1-yl)pyrido[3,4-d]pyrimidin-4-yl)amino)methyl)indolin-2-one

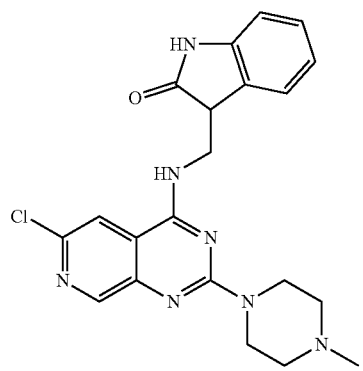 [SMILES: CN1CCN(c2nc(NCC3C(=O)Nc4ccccc43)c3cc(Cl)ncc3n2)CC1]

RXH: 3-(aminomethyl)indolin-2-one hydrochloride, 210 mg; t: 12 h; $R^3R^2NH$: 1-methylpiperazine, 0.32 mL, 3 mmol, 3 equiv.; t: 20 min. Automated flash chromatography (EtOAc:MeOH, product elution with 70:30% v/v) provided the title compound as a yellow solid; weight 0.149 g; Yield: 30%; Purity: 84.8% (UPLC-A); $^1$H-NMR (MeOD), δ (ppm): 8.50 (s, 1H), 7.88 (s, 1H), 7.26-7.23 (m, 2H), 7.02-6.91 (m, 2H), 4.14-3.88 (m, 3H), 3.97 (m, 4H), 2.60 (t, 4H), 2.41 (s, 3H); LR-MS (ESI+): m/z=424.2 Da [M+H]$^+$, calcd. for $C_{21}H_{22}ClN_7O$: 423.2.

Example 20: 6-chloro-N-isobutyl-2-(4-methylpiperazin-1-yl)pyrido[3,4-d]pyrimidin-4-amine

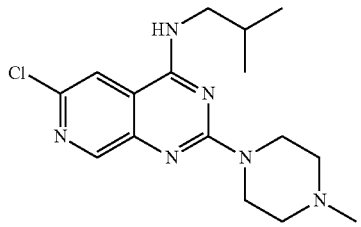 [SMILES: CC(C)CNc1nc(N2CCN(C)CC2)nc2cnc(Cl)cc12]

RXH: isobutylamine, 0.1 mL; t: 3 h; R²R²NH: 1-methylpiperazine, 0.54 mL, 5 mmol, 5 equiv.; t: 20 min. Automated flash chromatography (EtOAc:MeOH, product elution with EtOAc 100% v/v) provided the title compound as a yellow solid; weight: 0.248 g; Yield: 73%; Purity: 98.4% (UPLC-A); mp: 160.4-163.1° C.; $^1$H-NMR (CDCl$_3$), δ (ppm): 8.61 (s, 1H), 7.37 (s, 1H), 5.89 (t, NH), 3.93 (t, 4H), 3.41 (t, 2H), 2.49 (t, 4H), 2.35 (s, 3H), 2.03 (sept, 1H), 1.01 (d, 6H); LR-MS (ESI+): m/z=335.2 Da [M+H]$^+$, calcd. for $C_{16}H_{23}ClN_6$: 334.2.

Example 21: 6-chloro-N-cyclohexyl-2-(4-methylpiperazin-1-yl)pyrido[3,4-d]pyrimidin-4-amine

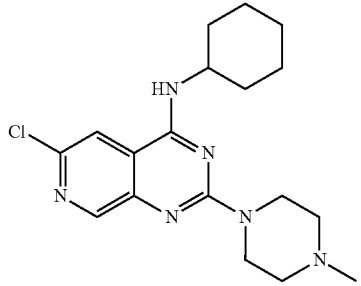 [SMILES: CN1CCN(c2nc(NC3CCCCC3)c3cc(Cl)ncc3n2)CC1]

RXH: cyclohexylamine, 0.12 mL; t: 2 h; R²H: 1-methylpiperazine, 0.54 mL, 5 mmol, 5 equiv.; t: 20 min. Automated flash chromatography (EtOAc:MeOH, product elution with EtOAc 100% v/v) provided the title compound as a yellow solid; weight: 0.260 g; Yield: 72%; Purity: 99.7% (UPLC-A); mp: 155.8-165.6° C.; $^1$H-NMR (CDCl$_3$), δ (ppm): 8.60 (s, 1H), 7.34 (s, 1H), 5.55 (d, NH), 4.14-4.03 (m, 1H), 3.92 (t, 4H), 2.49 (t, 4H), 2.35 (s, 3H), 2.17-2.07 (m, 2H), 1.87-1.76 (m, 2H), 1.74-1.65 (m, 1H), 1.52-1.23 (m, 5H); LR-MS (ESI+): m/z=361.3 Da [M+H]$^+$, calcd. for $C_{15}H_{25}ClN_6$: 360.2.

Example 22: N-butyl-6-chloro-2-(4-methylpiperazin-1-yl)pyrido[3,4-d]pyrimidin-4-amine

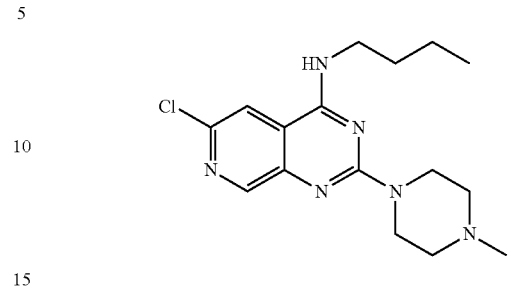

RXH: butylamine, 0.10 mL; t: 1 h; R³R²NH: 1-methylpiperazine, 0.54 mL, 5 mmol, 5 equiv.; t: 20 min. Automated flash chromatography (EtOAc:MeOH, product elution with EtOAc 100% v/v) provided the title compound as a yellow solid; weight: 0.154 g; Yield: 45%; Purity: 97.9% (UPLC-A); mp: 134.7-140.5° C.; $^1$H-NMR (CDCl$_3$), δ (ppm): 8.62 (s, 1H), 7.30 (s, 1H), 5.58 (t, NH), 3.94 (t, 4H), 3.59 (dd, 2H), 2.49 (t, 4H), 2.35 (s, 3H), 1.74-1.64 (m, 2H), 1.51-1.39 (m, 2H), 0.99 (t, 3H); LR-MS (ESI+): m/z=335.2 Da [M+H]$^+$, calcd. for $C_{16}H_{23}ClN_6$: 334.2.

Example 23: 6-chloro-N-(cyclohexylmethyl)-2-(4-methylpiperazin-1-yl)pyrido[3,4-d]pyrimidin-4-amine

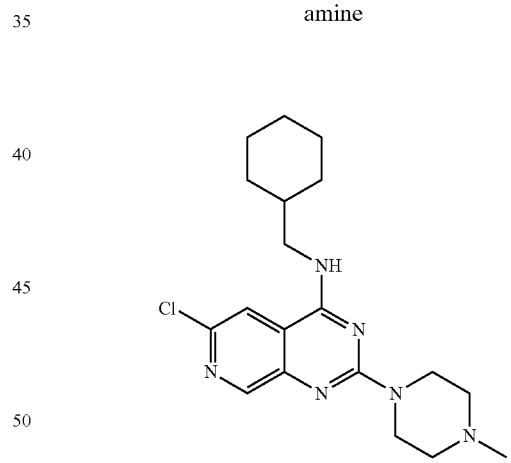

RXH: cyclohexanemethylamine, 0.13 mL; t: 2.5 h; R³R²NH: 1-methylpiperazine, 0.54 mL, mmol, 5 equiv.; t: 20 min. Automated flash chromatography (EtOAc:MeOH, product elution with 91:9% v/v) provided the title compound as a yellow solid; weight: 0.240 g; Yield: 64%; Purity: 99.9% (UPLC-A); mp: 92.8-103.5° C.; $^1$H-NMR (CDCl$_3$), δ (ppm): 8.60 (s, 1H), 7.37 (s, 1H), 5.89 (t, NH), 3.93 (t, 4H), 3.43 (t, 2H), 2.49 (t, 4H), 2.35 (s, 3H) 1.82-1.62 (m, 6H), 1.1-0.96 (m, 5H); LR-MS (ESI+): m/z=375.4 Da [M+H]$^+$, calcd. for $C_{19}H_{27}ClN_6$: 374.2.

Example 24: 6-chloro-2-(piperazin-1-yl)-N-(thiophen-2-ylmethyl)pyrido[3,4-d]pyrimidin-4-amine

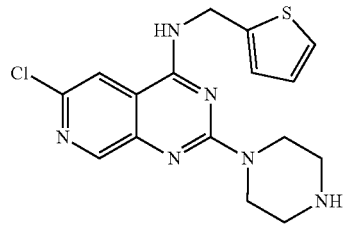

RXH: 2-thiophenemethylamine, 0.11 mL; t: 5 h; R³R²NH: methylpiperazine hexahydrate, 980 mg, 5 mmol, 5 equiv.; t: 20 min. Automated flash chromatography (EtOAc:MeOH, product elution with 89:11% v/v) provided the title compound as a yellow solid; weight: 0.307 g; Yield: 82%; Purity: 96.3% (UPLC-A); mp: 88.5-98.7° C.; $^1$H-NMR (MeOD), δ (ppm): 8.43 (s, 1H), 7.78 (s, 1H), 7.24 (dd, 1H), 7.05 (d, 1H), 6.94 (dd, 1H), 4.89 (d, 2H), 3.95 (t, 4H), 2.94 (t, 4H); LR-MS (ESI+): m/z=361.0 Da [M+H]⁺, calcd. for $C_{15}H_{17}ClN_6S$: 360.1.

Compound from Example 24 (0.307 mg, 0.82 mmol, 1 equiv.) was suspended in MeOH (9.1 mL, 0.09M, HPLC quality) and HCl 1.25M in MeOH (2.0 mL, 2.5 mmol, 3 equiv.) was added. The mixture was stirred at 22° C. for 16 h. Volatiles were removed under reduced pressure to afford 6-chloro-2-(piperazin-1-yl)-N-(thiophen-2-ylmethyl)pyrido[3,4-d]pyrimidin-4-amine hydrochloride in quantitative yield as a yellow solid; Purity: 97.8% (UPLC-A); mp: 211.47° C. (decomposition); $^1$H-NMR (MeOD: D₂O 80:20% v/v), δ (ppm): 8.82 (s, 1H), 8.15 (s, 1H), 7.38 (dd, 1H), 7.19 (d, 1H), 7.04 (dd, 1H), 5.06 (d, 2H), 4.29 (t, 4H), 3.47 (t, 4H); LR-MS (ESI+): m/z=361.0 Da [M+H]⁺, calcd. for $C_{16}H_{17}ClN_6S$ (parent free base): 360.1.

Example 25: 6-chloro-N-(furan-2-ylmethyl)-2-(piperazin-1-yl)pyrido[3,4-d]pyrimidin-4-amine

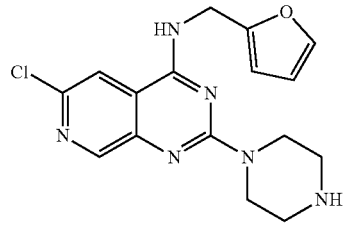

RXH: furan-2-ylmethanamine, 97.2 μL; t: 5 h; R³R²NH: methylpiperazine hexahydrate, 980 mg, 5 mmol, 5 equiv.; t: 20 min. Automated flash chromatography (EtOAc:MeOH, product elution with 60:40% v/v) provided the title compound as a yellow solid; weight: 158 mg; Yield: 45%; Purity: 98.2% (UPLC-A); $^1$H-NMR (MeOD), δ (ppm): 8.54 (d, 1H), 7.77 (d, 1H), 7.37 (dd, 1H), 6.34 (dd, 1H), 6.28 (dd, 1H), 4.72 (s, 2H), 3.96 (t, 4H), 2.98 (t, 4H): LR-MS (ESI+): m/z=345.0 Da [M+H]⁺, calcd. for $C_{16}H_{17}ClN_6O$: 344.1.

Example 26: 2-((6-chloro-2-(piperazin-1-yl)pyrido[3,4-d]pyrimidin-4-yl)amino)-N-phenylethane-1-sulfonamide

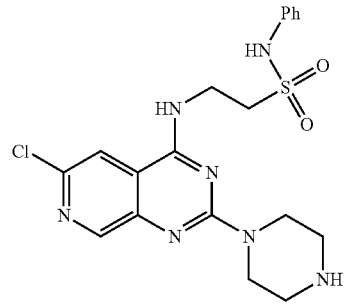 [SMILES: O=S(=O)(CCNc1nc(N2CCNCC2)nc2cnc(Cl)cc12)Nc1ccccc1]

RXH: 2-amino-N-phenylethane-1-sulfonamide hydrochloride, 225.7 mg; t: 12 h; R³R²NH: methylpiperazine hexahydrate, 980 mg, 5 mmol, 5 equiv.; t: 20 min. Automated flash chromatography (EtOAc:MeOH, product elution with 60:40% v/v) provided the title compound as a yellow solid; weight: 0.3498 g; Yield: 71%; Purity: 90.9% (UPLC-A); mp: 170.1-172.9° C.; $^1$H-NMR (MeOD), δ (ppm): 8.44 (s, 1H), 7.72 (s, 1H), 7.30-7.06 (m, 5H), 3.99-3.92 (m, 6H), 3.56 (t, 2H), 3.07 (t, 4H); LR-MS (ESI+): m/z=448.1 Da [M+H]⁺, calcd. for $C_{19}H_{22}ClN_7O_2S$: 447.1.

Compound from Example 26 (0.350 mg, 0.7 mmol, 1 equiv.) was suspended in MeOH (7.8 mL, 0.09M, HPLC quality) and HCl 1.25M in MeOH (1.7 mL, 2.1 mmol, 3 equiv.) was added. The mixture was stirred at 22° C. overnight. Volatiles were removed under reduced pressure to afford 2-((6-chloro-2-(piperazin-1-yl)pyrido[34-d]pyrimidin-4-yl)amino)-N-phenylethane-1-sulfonamide hydrochloride in quantitative yield as a yellow solid; Purity: 97.1% (UPLC-B); mp: 142.2-153.5° C.; $^1$H-NMR (MeOD), δ (ppm): 8.47 (s, 1H), 7.73 (s, 1H), 7.29-7.05 (m, 5H), 3.96 (t, 2H), 3.82 (t, 4H), 3.57 (t, 2H), 2.87 (t, 4H); LR-MS (ESI+): m/z=448.1 Da [M+H]⁺, calcd. for $C_{19}H_{22}ClN_7O_2S$ (parent free base): 447.1.

Example 27: 2-((6-chloro-2-(piperazin-1-yl)pyrido[3,4-d]pyrimidin-4-yl)amino)-N-methyl-N-phenylethane-1-sulfonamide

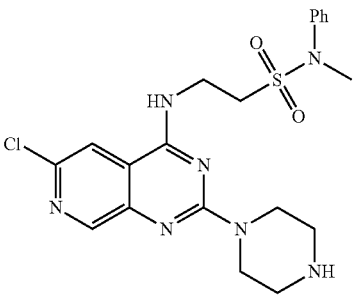 [SMILES: CN(c1ccccc1)S(=O)(=O)CCNc1nc(N2CCNCC2)nc2cnc(Cl)cc12]

RXH: 2-amino-N-methyl-N-phenylethane-1-sulfonamide hydrochloride, 293 mg; t: 12 h; R³R²NH: methylpiperazine hexahydrate, 980 mg, 5 mmol, 5 equiv.; t: 20 min. Automated flash chromatography (EtOAc:MeOH, product elution with 60:40% v/v) provided the title compound as a yellow solid; weight: 0.399 g; Yield: 83%; Purity: 96.0% (UPLC-A); mp: 86.5-92.0° C.; $^1$H-NMR (CDCl$_3$), δ (ppm): 8.57 (s, 1H), 7.37-7.25 (m, 5H), 7.36 (s, 1H), 6.59 (t, NH), 4.06 (dd, 2H), 3.84 (t, 4H), 3.42 (t, 2H), 3.37 (s, 3H), 2.92 (t, 4H), 2.59 (s, 3H); LR-MS (ESI+): m/z=462.2 Da [M+H]$^+$, calcd. for C$_{20}$H24ClN$_7$O$_2$S: 461.1.

Example 28: 6-chloro-N-(2-(morpholinosulfonyl)ethyl)-2-(piperazin-1-yl)pyrido[3,4-d]pyrimidin-4-amine

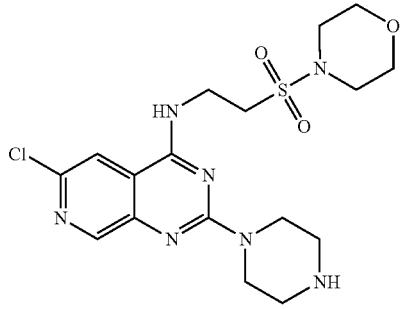 [SMILES: O=S(=O)(CCNc1nc(N2CCNCC2)nc2cnc(Cl)cc12)N1CCOCC1]

RXH: 2-(morpholinosulfonyl)ethan-1-amine hydrochloride, 293 mg; t: 12 h; R$^1$R$^2$NH: methylpiperazine hexahydrate, 980 mg, 5 mmol, 5 equiv.; t: 20 min. Automated flash chromatography (EtOAc:MeOH, product elution with 60:40% v/v) provided the title compound as a yellow solid; weight: 0.409 g; Yield: 87%; Purity: 94.1% (UPLC-A); mp: 114.3-123.5° C.; $^1$H-NMR (CD$_2$Cl$_2$), δ (ppm): 8.43 (s, 1H), 7.55 (s, 1H), 3.93 (t, 2H), 3.79 (t, 4H), 3.65 (t, 4H), 3.24 (t, 2H), 3.16 (t, 4H), 2.82 (t, 4H; LR-MS (ESI+): m/z=442.1 Da [M+H]$^+$, calcd. for C$_{17}$H$_{24}$ClN$_7$OS: 441.1.

Example 29: 3-(((6-chloro-2-(piperazin-1-yl)pyrido[3,4-d]pyrimidin-4-yl)amino)methyl)indolin-2-one

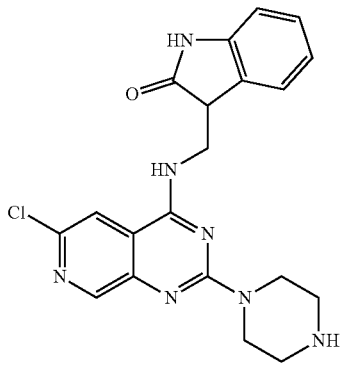 [SMILES: O=C1Nc2ccccc2C1CNc1nc(N2CCNCC2)nc2cnc(Cl)cc12]

RXH: 3-(aminomethyl)indolin-2-one hydrochloride, 210 mg; t: 12 h; R$^3$R$^2$NH: methylpiperazine hexahydrate, 980 mg, 5 mmol, 5 equiv.; t: 20 min. Automated flash chromatography (EtOAc:MeOH, product elution with 50:50% v/v) provided the title compound as a yellow solid; weight: 0.112 g; Yield: 20%; Purity: 73% (UPLC-A); $^1$H-NMR (MeOD), δ (ppm): 8.50 (s, 1H), 7.88 (s, 1H), 7.25-7.19 (m, 2H), 7.01-6.90 (m, 2H), 4.16-3.84 (m, 3H), 3.94 (t, 4H), 2.94 (t, 2H), 2.76 (t, 2H); LR-MS (ESI+): m/z=410.1 Da [M+H]$^+$, calcd. for C$_{20}$H$_2$ClN$_7$O: 409.1.

Example 30: 6-chloro-2-(3-(methylamino)pyrrolidin-1-yl)-N-(thiophen-2-ylmethyl)pyrido[3,4-d]pyrimidin-4-amine

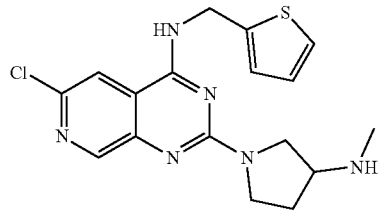 [SMILES: CNC1CCN(c2nc(NCc3cccs3)c3cc(Cl)ncc3n2)C1]

The compound was obtained by reaction of tert-butyl (1-(6-chloro-4-((thiophen-2-ylmethyl)amino)pyrido[3,4-d]pyrimidin-2-yl)pyrrolidin-3-yl)(methyl)carbamate (obtained by the General Synthetic Procedure A) under the Boc-deprotection conditions above-described; RXH: Thiophen-2-ylmethanamine, 0.11 mL; t: 5 h: R$^3$R$^2$NH: 3-(N-tert-butoxycarbonyl-N-methylamino)pyrrolidine/3-(N-Boc-N-methylamino)pyrrolidine, 1.02 mL, 5 mmol, 5 equiv.; t: 15 min. Automated flash chromatography (Heptane:EtOAc, product elution with 50:50% v/v) provided tert-butyl (1-(6-chloro-4-((thiophen-2-ylmethyl)amino)pyrido[3,4-d]pyrimidin-2-yl)pyrrolidin-3-yl)(methyl)carbamate as a yellow solid; weight: 404 mg; Yield: 80%; Purity: 94.1% (UPLC-A); $^1$H-NMR (CDCl$_3$), δ (ppm): 8.65 (s, 1H), 7.36 (s, 1H), 7.23 (dd, 1H), 7.06 (d, 1H), 6.96 (dd, 1H), 4.21 (t, NH), 4.95 (d, 2H), 3.94-3.87 (m, 2H), 3.65-3.53 (m, 2H), 2.83 (s, 3H), 2.20-2.05 (m, 3H), 1.49 (s, 9H); LR-MS (ESI+): m/z=476.0 Da [M+H]$^+$, calcd. for CH$_{27}$ClN$_6$O$_2$S: 475.0.

Boc-Deprotection Procedure; tert-butyl (1-(6-chloro-4-((thiophen-2-ylmethyl)amino)pyrido[3,4-d]pyrimidin-2-yl)pyrrolidin-3-yl)(methyl)carbamate (253 mg, 0.5 mmol, 1 equiv.); methanol (5 mL, 0.1M): concd HCl (0.15 mL, 1.5 mmol, 3 equiv.), t: 12 h. Work-up of the reaction yielded the title compound as a yellow solid; weight: 142 mg; Yield: 75%; Purity: 99.2% (UPLC-B); $^1$H-NMR (CDCl$_3$), δ (ppm): 8.63 (s, 1H), 7.34 (s, 1H), 7.22 (dd, 1H), 7.05 (d, 1H), 6.95 (dd, 1H), 6.25 (t, NH), 4.91 (d, 2H), 3.89-3.65 (m, 3H), 3.53 (dd, 1H), 3.37 (quint, 1H), 2.49 (s, 3H), 2.25-2.14 (m, 1H), 1.92-1.83 (m, 1H); LR-MS (ESI+): m/z=375.0 Da [M+H]$^+$, calcd. for C7H$_{19}$ClN$_6$S: 374.1.

Example 31: 6-chloro-N-(furan-2-ylmethyl)-2-(3-(methylamino)pyrrolidin-1-yl)pyrido[3,4-d]pyrimidin-4-amine

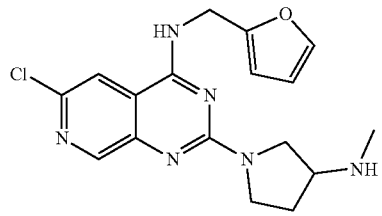

The compound was obtained by reaction of tert-butyl (1-(6-chloro-4-((furan-2-ylmethyl)amino)pyrido[3,4-d]pyrimidin-2-yl)pyrrolidin-3-yl)methyl)carbamate (obtained by the General Synthetic Procedure A) under the Boc-Deprotection conditions above-described: RXH: furan-2-ylmethanamine, 97.2 µL; t: 5 h; R³R²NH: 3-(N-tert-butoxycarbonyl-N-methylamino)pyrrolidine/3-(N-Boc-N-methylamino)pyrrolidine, 1.02 mL, 5 mmol, 5 equiv.; t: 15 min. Automated flash chromatography (Heptane:EtOAc, product elution with 50:50% v/v) provided tert-butyl (1-(6-chloro-4-((furan-2-ylmethyl)amino)pyrido[3,4-d]pyrimidin-2-yl)pyrrolidin-3-yl)(methyl)carbamate as a yellow solid; weight: 386 mg; Yield: 83%; Purity: 98.7% (UPLC-A); ¹H-NMR (CDCl₃), δ (ppm): 8.63 (s, 1H), 7.42 (s, 1H), 7.37 (dd, 1H), 6.34 (dd, 1H), 6.30 (dd, 1H), 4.86 (bs, NH), 4.76 (d, 2H), 3.93-3.84 (m, 2H), 3.62-3.50 (m, 2H), 2.83 (s, 3H), 2.19-2.05 (m, 3H), 1.49 (s, 9H); LR-MS (ESI+): m/z=459.1 Da [M+H]⁺, calcd. for $C_{21}H_{27}ClN_{7}O_{3}$: 458.2.

Boc-Deprotection Procedure; tert-butyl (1-(6-chloro-4-((furan-2-ylmethyl)amino)pyrido[3,4-d]pyrimidin-2-yl)pyrrolidin-3-yl)(methyl)carbamate (230 mg, 0.5 mmol, 1 equiv.); methanol (5 mL, 0.1M); concd HCl (0.15 mL, 1.5 mmol, 3 equiv.), t: 5 h. Work-up of the reaction yielded the title compound as a yellow solid; weight: 134 mg; Yield: 90%; Purity: 98.4% (UPLC-A); ¹H-NMR (CDCl₃). (ppm): 8.61 (d, 1H), 7.37 (dd, 1H), 7.35 (s, 1H), 6.34 (dd, 1H), 6.31 (dd, 1H), 6.2 (t, NH), 4.72 (d, 2H), 3.87-3.74 (m, 2H), 3.70-3.61 (m, 1H), 3.51 (dd, 1H), 3.38 (quint, 1H), 2.50 (s, 3H), 2.25-2.15 (m, 1H), 1.93-1.83 (m, 1H); LR-MS (ESI+): m/z=359.1 Da [M+H]⁺, calcd. for $C_{17}H_{19}ClN_{6}O$: 358.1.

Example 32: 6-chloro-2-(4-methyl-1,4-diazepan-1-yl)-N-(thiophen-2-ylmethyl)pyrido[3,4-d]pyrimidin-4-amine

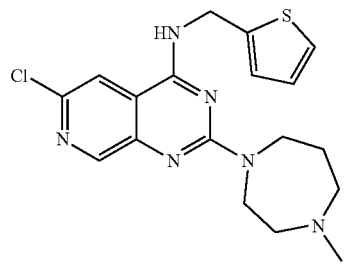 [SMILES: CN1CCCN(c2nc(NCc3cccs3)c3cc(Cl)ncc3n2)CC1]

RXH: 2-thiophenemethylamine, 0.11 mL; t: 5 h; R³R²NH: 1-methylhomopiperazine, 0.26 mL, 2 mmol, 2 equiv; t: 20 min. Automated flash chromatography (EtOAc:MeOH, product elution with 95:5% v/v) provided the title compound as a yellow solid; weight: 0.367 g; Yield: 89%; Purity: 98.5% (UPLC-A); ¹H-NMR (MeOD), δ (ppm): 8.52 (s, 1H), 7.81 (d, 1H), 7.21 (dd, 1H), 7.04 (d, 1H), 6.94 (dd, 1H), 4.90 (s, 2H), 4.01 (bs, 2H), 3.92 (bs, 2H), 2.78 (bs, 2H), 2.70-2.67 (m, 2H), 2.42 (s, 3H), 2.06 (bs, 2H); LR-MS (ESI+): m/z=389.1 Da [M+H]⁺, calcd. for $C_{18}H_{21}ClN_{6}S$: 388.1.

Example 33: 6-chloro-N₂-(2-(1-methylpyrrolidin-2-yl)ethyl)-N₄-(thiophen-2-ylmethyl)pyrido[3,4-d]pyrimidine-2,4-diamine

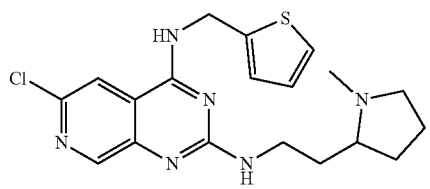 [SMILES: CN1CCCC1CCNc1nc(NCc2cccs2)c2cc(Cl)ncc2n1]

RXH: 2-thiophenemethylamine, 0.11 mL; t: 5 h; R³R²NH: 2-(2-aminoethyl)-1-methylpyrrolidine, 0.30 mL, 2 mmol, 2 equiv.: t: 20 min. Automated flash chromatography (EtOAc:MeOH, product elution with 85:15% v/v) provided the title compound as a yellow solid; weight: 0.352 g; Yield: 87%; Purity: 99.2% (UPLC-A); ¹H-NMR (CDCl₃/MeOD 2:1), δ (ppm): 8.51 (bs, 1H), 7.75 (bs, 1H), 7.21 (dd, 1H), 7.06 (d, 1H), 6.95 (dd, 1H), 4.92 (bs, 2H), 3.55 (t, 2H), 3.23-3.16 (m, 1H), 2.43 (s, 3H), 2.39-2.31 (m, 2H), 2.14-2.06 (m, 2H), 1.86-1.81 (m, 2H), 1.69-1.62 (m, 2H); LR-MS (ESI+): m/z=403.1 Da [M+H]⁺, calcd. for $C_{19}H_{23}ClN_{6}S$: 402.1.

Example 34: 2-(3-aminopyrrolidin-1-yl)-6-chloro-N-(thiophen-2-ylmethyl)pyrido[3,4-d]pyrimidin-4-amine

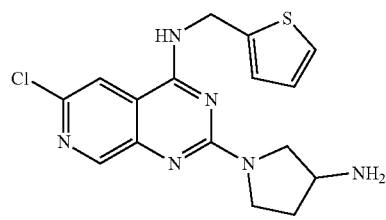 [SMILES: NC1CCN(c2nc(NCc3cccs3)c3cc(Cl)ncc3n2)C1]

RXH: 2-thiophenemethylamine, 0.11 mL; t: 5 h; R³R²NH: 3-aminopyrrolidine, 0.18 mL, 2 mmol, 2 equiv.; t: 20 min. Automated flash chromatography (EtOAc:MeOH, product elution with 87:13% v/v) provided the title compound as a yellow solid; weight: 0.330 g; Yield: 90%; Purity: 98.2% (UPLC-A); ¹H-NMR (CDCl₃/MeOD 2:1), δ (ppm): 8.55 (s, 1H), 7.76 (s, 1H), 7.20 (dd, 1H), 7.07 (d, 1H), 6.94 (dd, 1H), 4.90 (bs, 2H), 3.97-3.83 (m, 2H), 3.79-3.69 (m, 2H), 3.50 (d, 1H), 2.33-2.22 (m, 1H), 1.92-1.86 (m, 1H); LR-MS (ESI+): m/z=361.0 Da [M+H]⁺, calcd. for $C_{16}H_{17}ClN_{6}S$: 360.1.

Example 35: 2-(4-aminopiperidin-1-yl)-6-chloro-N-(thiophen-2-ylmethyl)pyrido[3,4-d]pyrimidin-4-amine

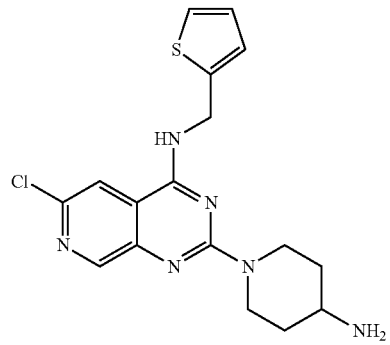 [SMILES: NC1CCN(c2nc(NCc3cccs3)c3cc(Cl)ncc3n2)CC1]

RXH: 2-thiophenemethylamine, 0.11 mL; t: 5 h; R³R²NH: 4-Aminopiperidine, 0.23 mL, 2 mmol, 2 equiv.; t: 20 min. Automated flash chromatography (EtOAc:MeOH, product elution with 70:30% v/v) provided the title compound as a yellow solid; weight: 0.167 g; Yield: 40%; Purity: 89.8% (UPLC-A); ¹H-NMR (CDCl₃), δ (ppm): 8.63 (s, 1H), 7.27 (s, 1H), 7.25 (d, 1H), 7.07 (dd, 1H), 6.98 (dd, 1H), 5.81 (t, NH), 4.95 (d, 2H), 4.87 (dt, 2H), 3.04 (td, 2H), 2.97 (t, 1H), 1.93 (dm, 1H), 1.34 (ddd, 2H); LR-MS (ESI+): m/z=375.0 Da [M+H]$^+$, calcd. for $C_{17}H_{19}ClN_6S$: 374.1.

Example 36: 6-chloro-2-(4-(methylamino)piperidin-1-yl)-N-(thiophen-2-ylmethyl)pyrido[3,4-d]pyrimidin-4-amine

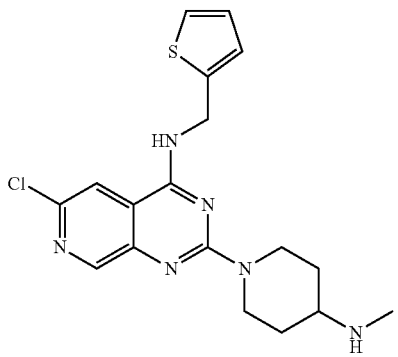 [SMILES: CNC1CCN(c2nc(NCc3cccs3)c3cc(Cl)ncc3n2)CC1]

RXH: 2-thiophenemethylamine, 0.11 mL; t: 5 h; R$^3$R$^2$NH: 4-methylaminopiperidine, 240 mg, 2 mmol, 2 equiv.; t: 15 min. Automated flash chromatography (EtOAc:MeOH, product elution with 95:5% v/v) provided the title compound as a yellow solid; weight: 0.166 g; Yield: 35%; Purity: 81.7% (UPLC-A); $^1$H-NMR (CDCl$_3$), δ (ppm): 8.60 (s, 1H), 7.34 (s, 1H), 7.24 (dd, 1H), 7.05 (d, 1H), 6.97 (dd, 1H), 6.18 (t, NH), 4.96 (dt, 2H), 4.91 (d, 2H), 2.98 (td, 2H), 2.89 (tt, 1H), 2.55 (s, 3H), 2.08 (dm, 1H), 1.53 (ddd, 2H); LR-MS (ESI+): m/z=389.1 Da [M+H]$^+$, calcd. for $C_{15}H_{21}ClN_6S$: 388.1.

Example 37: 2-((6-chloro-2-(hexahydropyrrolo[1,2-a]pyrazin-2(1H)-yl)pyrido[3,4-d]pyrimidin-4-yl)amino)-N-phenylethane-1-sulfonamide

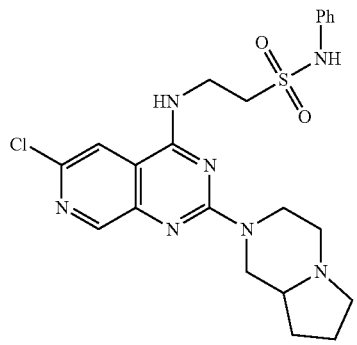 [SMILES: O=S(=O)(CCNc1nc(N2CCN3CCCC3C2)nc2cnc(Cl)cc12)Nc1ccccc1]

RXH: 2-amino-N-phenylethane-1-sulfonamide hydrochloride, 225.7 mg; t: 12 h; R$^3$R$^2$NH: 1,4-Diazabicyclo[4.3.0]nonane, 0.27 mL, 2.1 mmol, 2.1 equiv.; t: 30 min. Automated flash chromatography (EtOAc:MeOH, product elution with 50:50% v/v) provided the title compound as a yellow solid; weight: 0.220 g; Yield: 40%; Purity: 88.7% (UPLC-A); $^1$H-NMR (CDCl$_3$), δ (ppm): 8.40 (s, 1H), 7.49 (bs, 2H), 7.25-7.11 (m, 2H), 7.19 (s, 1H), 7.06-6.98 (m, 1H), 4.73 (d, 1H), 4.55 (d, 1H), 3.94 (bs, 2H), 3.53 (bs, 3H), 3.41-3.11 (m, 3H), 3.02 (t, 1H), 2.60 (t, 2H), 2.04-1.79 (m, 3H), 1.73-1.54 (m, 1H); LR-MS (ESI+): m/z=488.1 Da [M+H]$^+$, calcd. for $C_{22}H_{26}ClN_7O_2S$: 487.2.

Example 38: 6-chloro-2-(hexahydropyrrolo[1,2-a]pyrazin-2(1H)-yl)-N-(2-(morpholinosulfonyl)ethyl)pyrido[3,4-d]pyrimidin-4-amine

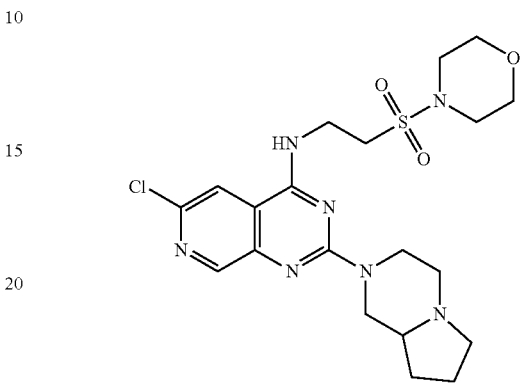

RXH: 3-(aminomethyl)indolin-2-one hydrochloride, 210 mg; t: 12 h; R$^3$R$^2$NH: 1,4-Diazabicyclo[4.3.0]nonane, 0.27 mL, 2.1 mmol, 2.1 equiv.; t: 30 min. Automated flash chromatography (EtOAc:MeOH, product elution with 50:50% v/v) provided the title compound as a yellow solid; weight: 0.313 g; Yield: 54%; Purity: 83.2% (UPLC-A); mp: degradation of the compound was observed up to 67.3° C.; $^1$H-NMR (CDCl$_3$), δ (ppm): 8.54 (s, 1H), 7.44 (s, 1H), 7.01 (t, NH), 4.93 (d, 1H), 4.78 (d, 1H), 4.10 (d, 2H), 3.78 (t, 4H), 3.42-3.27 (m, 6H), 3.26-3.14 (m, 3H), 2.86 (t, 1H), 2.47-2.17 (m, 3H), 2.00-1.75 (m, 3H), 1.68-1.51 (m, 1H); LR-MS (ESI+): m/z=482.1 Da [M+H]$^+$, calcd. for $C_{20}H_{25}ClN_7O_3S$: 481.2.

Example 68: 6-chloro-2-(4-methylpiperazin-1-yl)-N-((3-methylthiophen-2-yl)methyl)pyrido[3,4-d]pyrimidin-4-amine

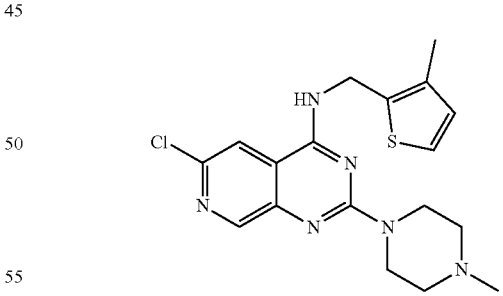

RXH: (3-methylthiophen-2-yl)methanamine, 0.14 mL; t: 14 h; R$^3$R$^2$NH: 1-methylpiperazine, 0.88 mL, 7.8 mmol, 7.8 equiv.; t: 30 min. Automated flash chromatography (EtOAc:MeOH, product elution with 95:05% v/v) provided the title compound as a brown solid; weight: 0.217 g; Yield: 51%; Purity: 91.3% (UPLC-B); mp: 196.2-200.8° C.; $^1$H-NMR (CDCl$_3$), δ (ppm): 8.62 (s, 1H), 7.28 (s, 1H), 7.17 (d, 1H), 6.85 (d, 1H), 5.75 (t, NH), 4.86 (d, 2H), 3.98 (t, 4H), 2.50 (t, 4H), 2.36 (s, 3H), 2.28 (s, 3H); LR-MS (ESI+): m/z=389.0 Da [M+H]$^+$, calcd. for $C_{19}H_{21}ClN_6S$: 388.1.

Example 69: 6-chloro-2-(4-methylpiperazin-1-yl)-N-((5-methylthiophen-2-yl)methyl)pyrido[3,4-d]pyrimidin-4-amine

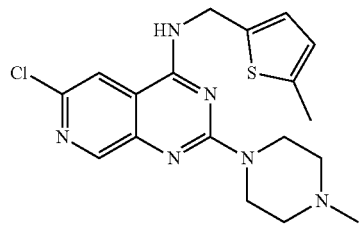 [SMILES: Cc1ccc(CNc2nc(N3CCN(C)CC3)nc3cnc(Cl)cc23)s1]

RXH: (5-methylthiophen-2-yl)methanamine, 0.13 mL; t: 2 h; R³R²NH: 1-methylpiperazine, 0.88 mL, 7.8 mmol, 7.8 equiv.; t: 30 min. Automated flash chromatography (EtOAc:MeOH, product elution with 98:02% v/v) provided the title compound as a yellow solid; weight: 0.292 g; Yield: 75%; Purity: 99.9% (UPLC-A); mp: 208.0-212.1° C.; ¹H-NMR (CDCl₃), δ (ppm): 8.63 (s, 1H), 7.26 (s, 1H), 6.85 (d, 1H), 6.62 (dq, 1H), 5.76 (t, NH), 4.86 (d, 2H), 3.98 (t, 4H), 2.50 (t, 4H), 2.45 (d, 3H), 2.36 (s, 3H); LR-MS (ESI+): m/z=389.1 Da [M+H]⁺, calcd. for $C_{16}H_{21}ClN_6S$: 388.1.

Example 70: 6-chloro-2-(4-methylpiperazin-1-yl)-N-(2-(thiazol-2-yl)ethyl)pyrido[3,4-d]pyrimidin-4-amine

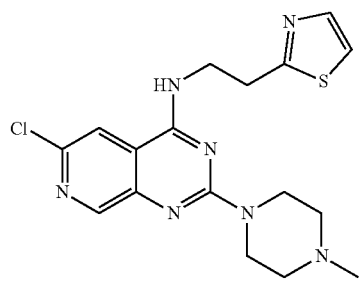 [SMILES: CN1CCN(c2nc(NCCc3nccs3)c3cc(Cl)ncc3n2)CC1]

RXH: 2-(thiazol-2-yl)ethan-1-amine, 0.12 mL; t: 15.5 h; R³R²NH: 1-methylpiperazine, 0.88 mL, 7.8 mmol, 7.8 equiv.; t: 30 min. Automated flash chromatography (EtOAc:MeOH, product elution with 96:04% v/v) provided the title compound as a yellow solid; weight 0.265 g; Yield: 67.3%; Purity: 99.0% (UPLC-B); mp: 184.7-188.7° C.; ¹H-NMR (CDCl₃), δ (ppm): 8.53 (s, 1H), 7.71 (d, 1H), 7.28 (s, 1H), 7.20 (d, 1H), 6.96 (t, NH), 3.95 (dd, 2H), 3.87 (t, 4H), 3.32 (t, 2H), 2.41 (t, 4H), 2.28 (s,3H); LR-MS (ESI+): m/z=390.0 Da [M+H]⁺, calcd. for $C_{17}H_{20}ClN_7S$: 389.1.

Example 71: 2-((6-chloro-2-(4-methylpiperazin-1-yl)pyrido[3,4-d]pyrimidin-4-yl)amino)ethane-1-sulfonamide

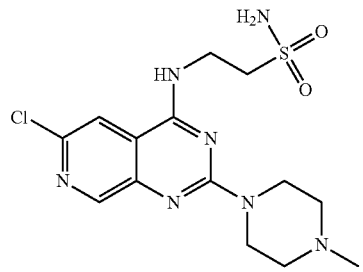 [SMILES: CN1CCN(c2nc(NCCS(N)(=O)=O)c3cc(Cl)ncc3n2)CC1]

RXH: 2-aminoethane-1-sulfonamide hydrochloride 168.0 mg; t: 2 h; R³R²NH: 1-methylpiperazine, 0.88 mL, 7.8 mmol, 7.8 equiv.: t: 20 min. Automated flash chromatography (EtOAc:MeOH, product elution with 90:10% v/v) provided the title compound as a brown solid; weight: 0.262 g; Yield: 65%; Purity: 95.5% (UPLC-B); ¹H-NMR (CDCl₃: MeOD 70:30% v/v), δ (ppm): 8.48 (s, 1H), 7.56 (s, 1H), 3.94 (t, 2H), 3.88 (t, 4H), 3.38 (t, 2H), 2.52 (t, 4H), 2.33 (s, 3H); LR-MS (ESI+): m/z=386.1 Da [M+H]⁺, calcd. for $C_{14}H_{20}ClN_7O_2S$: 385.1.

Example 72: 2-((6-chloro-2-(4-methylpiperazin-1-yl)pyrido[3,4-d]pyrimidin-4-yl)amino)-N-(2-chlorophenyl)ethane-1-sulfonamide

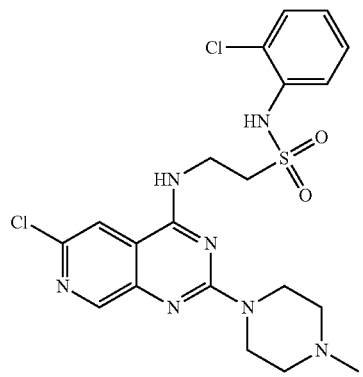 [SMILES: CN1CCN(c2nc(NCCS(=O)(=O)Nc3ccccc3Cl)c3cc(Cl)ncc3n2)CC1]

RXH: 2-amino-N-(2-chlorophenyl)ethane-1-sulfonamide hydrochloride, 290.0 mg; t: 2 h; R³R²NH: 1-methylpiperazine, 0.88 mL, 7.8 mmol, 7.8 equiv.; t: 20 min. Automated flash chromatography (EtOAc:MeOH, product elution with 88:12% v/v) provided the title compound as a brown solid; weight: 0.303 g; Yield: 60.4%; Purity: 99.0% (UPLC-B); mp: 210.5-225.5° C.: ¹H-NMR (MeOD), δ (ppm): 8.47 (s, 1H), 7.73 (s, 1H), 7.56 (dd, 1H), 7.34 (dd, 1H), 7.27 (td, 1H), 7.12 (td, 1H), 3.99 (t, 2H), 3.88 (t, 4H), 3.61 (t, 2H), 2.54 (t, 4H), 2.39 (s, 3H); LR-MS (ESI+): m/z=496.1 Da [M+H]⁺, calcd. for $C_{20}H_{23}Cl_2N_7O_2S$: 495.1.

Example 73: 2-((6-chloro-2-(4-methylpiperazin-1-yl)pyrido[3,4-d]pyrimidin-4-yl)amino)-N-(o-tolyl)ethane-1-sulfonamide

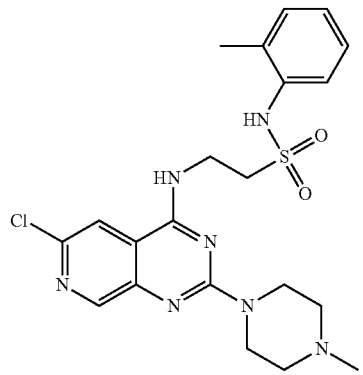 [SMILES: Cc1ccccc1NS(=O)(=O)CCNc1nc(N2CCN(C)CC2)nc2cnc(Cl)cc12]

RXH: 2-amino-N-(o-tolyl)ethane-1-sulfonamide hydrochloride, 309.0 mg; t: 2 h; R³R²NH: 1-methylpiperazine, 0.88 mL, 7.8 mmol, 7.8 equiv.; t: 20 min. Automated flash chromatography (EtOAc:MeOH, product elution with 80:20% v/v) provided the title compound as a yellow solid; weight: 0.297 g; Yield: 61.8%; Purity: 98.9% (UPLC-B); mp: 226.0-229.0° C.; ¹H-NMR (CDCl₃:MeOD 70:30% v/v), δ (ppm): 8.50 (s, 1H), 7.40 (s, 1H), 7.27 (d, 1H), 7.10-6.99 (m, 3H), 3.94 (t, 2H), 3.79 (t, 4H), 3.43 (t, 2H), 2.39 (t, 4H), 2.26 (s, 3H), 2.21 (s, 3H); LR-MS (ESI+): m/z=476.1 Da [M+H]⁺, calcd. for $C_{21}H_2ClN_7O_2S$: 475.2.

Example 74: 2-((6-chloro-2-(4-methylpiperazin-1-yl)pyrido[3,4-d]pyrimidin-4-yl)amino)-N-(2-methoxyphenyl)ethane-1-sulfonamide

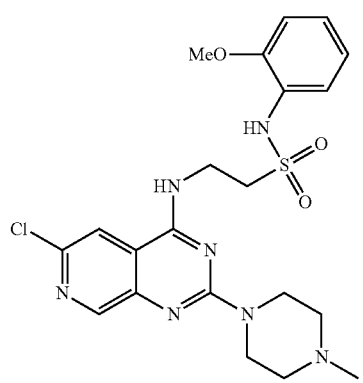 [SMILES: COc1ccccc1NS(=O)(=O)CCNc1nc(N2CCN(C)CC2)nc2cnc(Cl)cc12]

RXH: 2-amino-N-(2-methoxyphenyl)ethane-1-sulfonamide hydrochloride, 308.8 mg; t: 16 h; R³R²NH: 1-methylpiperazine, 0.88 mL, 7.8 mmol, 7.8 equiv.; t: 20 min. Automated flash chromatography (EtOAc:MeOH, product elution with 80:20% v/v) provided the title compound as an orange solid; weight: 0.306 g; Yield: 56.0%; Purity: 90.0% (UPLC-A); mp: 208.5-213.6° C.; ¹H-NMR (MeOD), δ (ppm): 8.46 (s, 1H), 7.71 (s, 1H), 7.39 (d, 1H), 7.04 (t, 1H), 6.89 (d, 1H), 6.84 (d, 1H), 3.95 (t, 2H), 3.83 (t, 4H), 3.70 (s, 3H), 3.57 (t, 2H), 2.47 (t, 4H), 2.35 (s, 3H); LR-MS (ESI+): m/z=492.0 Da [M+H]⁺, calcd. for $C_{21}H_2ClN_7O_3S$: 491.2.

Example 75: N-(2-aminophenyl)-2-((6-chloro-2-(4-methylpiperazin-1-yl)pyrido[3,4-d]pyrimidin-4-yl)amino)ethane-1-sulfonamide

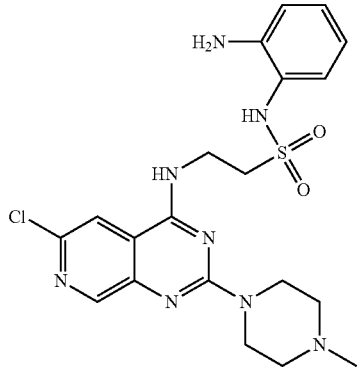 [SMILES: CN1CCN(c2nc(NCCS(=O)(=O)Nc3ccccc3N)c3cc(Cl)ncc3n2)CC1]

RXH: 2-amino-N-(2-aminophenyl)ethane-1-sulfonamide dihydrochloride, 281.0 mg; t: 2 h; R³R²NH: 1-methylpiperazine, 0.88 mL, 7.8 mmol, 7.8 equiv.; t: 20 min. Automated flash chromatography (CHCl₃:EtOH, product elution with 85:15% v/v) provided the title compound as a yellow solid; weight: 0.279 g; Yield: 57.7%; Purity: 98.2% (UPLC-B); mp: 223.8-232.2° C.; ¹H-NMR (CDCl₃:MeOD 70:30% v/v), δ (ppm): 8.26 (s, 1H), 7.42 (s, 1H), 6.87 (dd, 1H), 6.78 (dd, 1H), 6.53 (dd, 1H), 6.42 (dd, 1H), 3.75 (t, 2H), 3.61 (t, 4H), 3.25 (t, 2H), 2.20 (t, 4H), 2.10 (s, 3H); LR-MS (ESI+): m/z=477.2 Da [M+H]⁺, calcd. for $C_{20}H_{25}ClN_8O_2S$: 476.2.

Example 76: 2-((6-chloro-2-(4-methylpiperazin-1-yl)pyrido[3,4-d]pyrimidin-4-yl)amino)-N-(3-chlorophenyl)ethane-1-sulfonamide

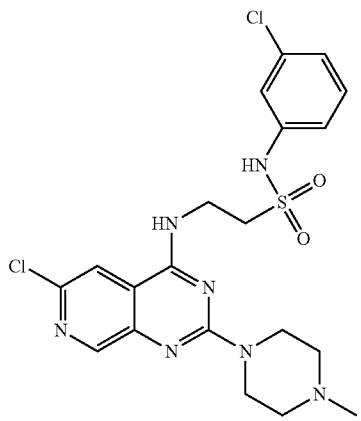 [SMILES: CN1CCN(c2nc(NCCS(=O)(=O)Nc3cccc(Cl)c3)c3cc(Cl)ncc3n2)CC1]

RXH: 2-amino-N-(3-chlorophenyl)ethane-1-sulfonamide hydrochloride, 289.9 mg; t: 2 h; R³R²NH: 1-methylpiperazine, 0.88 mL, 7.8 mmol, 7.8 equiv.; t: 20 min. Automated flash chromatography (EtOAc:MeOH, product elution with 90:10% v/v) provided the title compound as a yellow solid; weight: 0.287 g; Yield: 56.0%; Purity: 96.8% (UPLC-B); mp: 203.0-205.0° C.; ¹H-NMR (CDCl₃:MeOD 70:30% v/v), δ (ppm): 8.46 (s, 1H), 7.46 (s, 1H), 7.06-6.90 (m, 4H), 3.87 (t, 2H), 3.74 (t, 4H), 3.46 (t, 2H), 2.38 (t, 4H), 2.26 (s, 3H); LR-MS (ESI+): m/z=496.0 Da [M+H]⁺, calcd. for $C_{20}H_{23}Cl_2N_7O_2S$: 495.1.

Example 77: 2-((6-chloro-2-(4-methylpiperazin-1-yl)pyrido[3,4-d]pyrimidin-4-yl)amino)-N-(3-(trifluoromethoxy)phenyl)ethane-1-sulfonamide

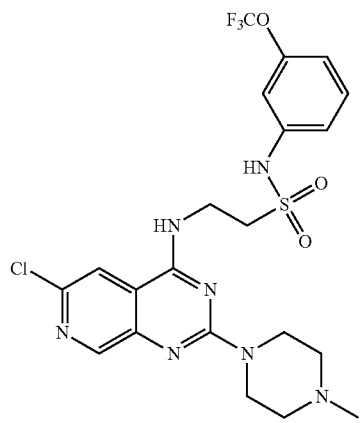 [SMILES: CN1CCN(c2nc(NCCS(=O)(=O)Nc3cccc(OC(F)(F)F)c3)c3cc(Cl)ncc3n2)CC1]

RXH: 2-amino-N-(3-(trifluoromethoxy)phenyl)ethane-1-sulfonamide hydrochloride, 359.8 mg; t: 17 h; $R^3R^2NH$: 1-methylpiperazine, 0.88 mL, 7.8 mmol, 7.8 equiv.; t: 20 min. Automated flash chromatography (EtOAc:MeOH, product elution with 95:05% v/v) provided the title compound as a yellow solid; weight: 0.278 g; Yield: 47.2%; Purity: 92.5% (UPLC-A); mp: 185.7-189.5° C.; $^1$H-NMR (CDCl$_3$:MeOD 70:30% v/v), δ (ppm): 8.45 (s, 1H), 7.49 (s, 1H), 7.15 (q, 1H), 7.03-6.95 (m, 2H), 6.83 (dt, 1H), 3.89 (t, 2H), 3.78 (t, 4H), 3.46 (t, 2H), 2.42 (t, 4H), 2.29 (s, 3H); LR-MS (ESI+): m/z=546.0 Da [M+H]$^+$, calcd. for $C_{21}H_{23}ClF_3N_7O_3S$: 545.1.

Example 78: 2-((6-chloro-2-(4-methylpiperazin-1-yl)pyrido[3,4-d]pyrimidin-4-yl)amino)-N-(3-(trifluoromethyl)phenyl)ethane-1-sulfonamide

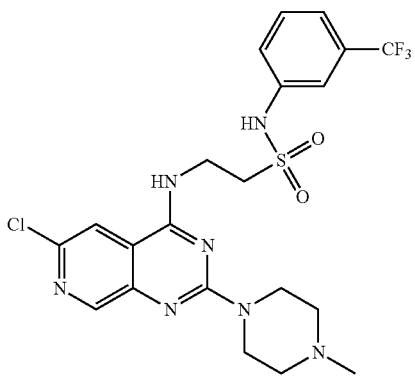 [SMILES: CN1CCN(c2nc(NCCS(=O)(=O)Nc3cccc(C(F)(F)F)c3)c3cc(Cl)ncc3n2)CC1]

RXH: 2-amino-N-(3-(trifluoromethyl)phenyl)ethane-1-sulfonamide hydrochloride, 337.5 mg; t: 2 h; $R^3R^2NH$: 1-methylpiperazine, 0.88 mL, 7.8 mmol, 7.8 equiv.; t: 20 min. Automated flash chromatography (EtOAc:MeOH, product elution with 95:05% v/v) provided the title compound as a brown solid; weight: 0.495 g; Yield: 86.0%; Purity: 92.1% (UPLC-A); mp: 211.0-213.0° C.; $^1$H-NMR (CDCl$_3$), δ (ppm): 8.62 (s, 1H), 7.45-7.38 (m, 4H), 7.17 (s, 1H), 6.26 (t, NH), 4.10 (q, 2H), 3.87 (t, 4H), 3.56 (t, 2H), 2.44 (t, 4H), 2.34 (s, 3H); LR-MS (ESI+): m/z=530.0 Da [M+H]$^+$, calcd. for $C_{21}H_{23}ClF_3N_7O_2S$: 529.1.

Example 79: 2-((6-chloro-2-(4-methylpiperazin-1-yl)pyrido[3,4-d]pyrimidin-4-yl)amino)-N-(m-tolyl)ethane-1-sulfonamide

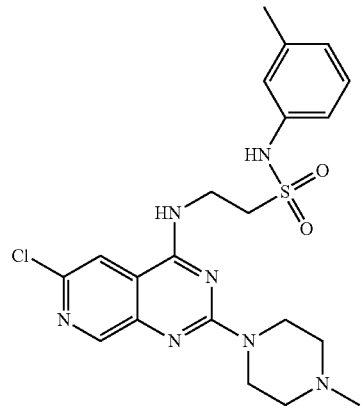 [SMILES: Cc1cccc(NS(=O)(=O)CCNc2nc(N3CCN(C)CC3)nc3cnc(Cl)cc23)c1]

RXH: 2-amino-N-(m-tolyl)ethane-1-sulfonamide hydrochloride, 292.5 mg; t: 13.5 h; $R^3R^2NH$: 1-methylpiperazine, 0.88 mL, 7.8 mmol, 7.8 equiv.; t: 20 min. Automated flash chromatography (EtOAc:MeOH, product elution with 80:20% v/v) provided the title compound as a yellow solid; weight: 0.338 g; Yield: 69.2%; Purity: 97.4% (UPLC-A); mp: 210.7-214.2° C.; $^1$H-NMR (MeOD), δ (ppm): 8.47 (s, 1H), 7.73 (s, 1H), 7.10 (t, 1H), 6.97-6.84 (m, 3H), 3.94 (t, 2H), 3.81 (t, 4H), 3.58 (t, 2H), 2.42 (t, 4H), 2.33 (s, 3H), 2.19 (s, 3H); LR-MS (ESI+): m/z=476.1 Da [M+H]$^+$, calcd. for $C_{21}H2ClN_7O_2S$: 475.2.

Example 80: 2-((6-chloro-2-(4-methylpiperazin-1-yl)pyrido[3,4-d]pyrimidin-4-yl)amino)-N-(3-methoxyphenyl)ethane-1-sulfonamide

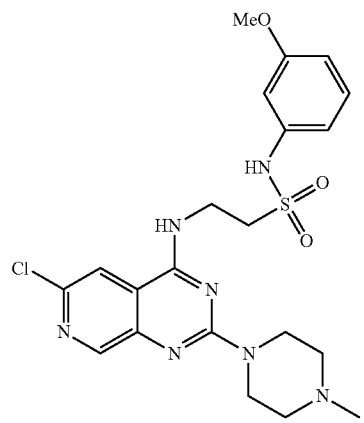 [SMILES: COc1cccc(NS(=O)(=O)CCNc2nc(N3CCN(C)CC3)nc3cnc(Cl)cc23)c1]

RXH: 2-amino-N-(3-methoxyphenyl)ethane-1-sulfonamide hydrochloride, 296.7 mg; t: 4.5 h; $R^3R^2NH$: 1-methylpiperazine, 0.88 mL, 7.8 mmol, 7.8 equiv.; t: 20 min. Automated flash chromatography (EtOAc:MeOH, product elution with 80:20% v/v) provided the title compound as a yellow solid; weight: 0.254 g; Yield: 49.7%; Purity: 96.4%

(UPLC-A); mp: 215.7-217.0° C.; $^1$H-NMR (CDCl$_3$:MeOD 70:30% v/v), δ (ppm): 8.36 (s, 1H), 7.42 (s, 1H), 6.95 (t, 1H), 6.56-6.40 (m, 3H), 3.80 (t, 2H), 3.66 (t, 4H), 3.56 (s, 3H), 3.38 (t, 2H), 2.30 (t, 4H), 2.18 (s, 3H); LR-MS (ESI+): m/z=492.1 Da [M+H]$^+$, calcd. for C$_{21}$H$_{25}$ClN$_7$O$_3$S: 491.2.

Example 81: 2-((6-chloro-2-(4-methylpiperazin-1-yl)pyrido[3,4-d]pyrimidin-4-yl)amino)-N-(3-(methylthio)phenyl)ethane-1-sulfonamide

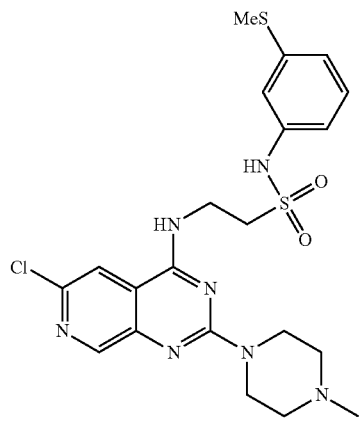

RXH: 2-amino-N-(3-(methylthio)phenyl)ethane-1-sulfonamide hydrochloride, 310.6 mg; t: 16.5 h; R$^3$R$^2$NH: 1-methylpiperazine, 0.88 mL, 7.8 mmol, 7.8 equiv.; t: 30 min. Automated flash chromatography (EtOAc:MeOH, product elution with 80:20% v/v) provided the title compound as a pale brown solid; weight: 0.453 g; Yield: 82.0%; Purity: 91.9% (UPLC-A); mp: 122.1-137.4° C.; $^1$H-NMR (CDCl$_3$:MeOD 70:30% v/v), δ (ppm): 8.62 (s, 1H), 7.23-7.17 (m, 2H), 7.02-6.90 (m, 3H), 6.28 (t, NH), 4.07 (dd, 2H), 3.87 (t, 4H), 3.55 (dd, 2H), 2.45 (t, 4H), 2.43 (s, 3H), 2.34 (s, 3H); LR-MS (ESI+): m/z=508.0 Da [M+H]$^+$, calcd. for C$_{21}$H$_{25}$ClN$_7$O$_2$S$_2$: 507.1.

Example 82: 2-((6-chloro-2-(4-methylpiperazin-1-yl)pyrido[3,4-d]pyrimidin-4-yl)amino)-N-(4-chlorophenyl)ethane-1-sulfonamide

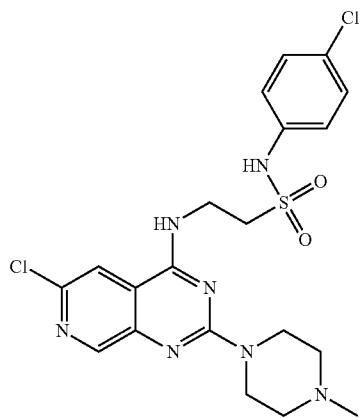 [SMILES: CN1CCN(c2nc(NCCS(=O)(=O)Nc3ccc(Cl)cc3)c3cc(Cl)ncc3n2)CC1]

RXH: 2-amino-N-(4-chlorophenyl)ethane-1-sulfonamide hydrochloride, 309.7 mg; t: 3 h; R$^3$R$^2$NH: 1-methylpiperazine, 0.88 mL, 7.8 mmol, 7.8 equiv.; t: 30 min. Automated flash chromatography (EtOAc:MeOH, product elution with 96:04% v/v) provided the title compound as a yellow solid; weight: 0.180 g; Yield: 35.9%; Purity: 98.8% (UPLC-A); mp: 232.1-241.2° C.; $^1$H-NMR (MeOD), δ (ppm): 8.46 (s, 1H), 7.71 (s, 1H), 7.22 (d, 2H), 7.11 (d, 2H), 3.93 (t, 2H), 3.81 (t, 4H), 3.56 (t, 2H), 2.44 (t, 4H), 2.35 (s, 3H): LR-MS (ESI+): m/z=496.0 Da [M+H]$^+$, calcd. for C$_{20}$H$_{23}$Cl$_2$N$_7$O$_2$S: 495.1.

Example 83: 2-((6-chloro-2-(4-methylpiperazin-1-yl)pyrido[3,4-d]pyrimidin-4-yl)amino)-N-(4-(trifluoromethyl)phenyl)ethane-1-sulfonamide

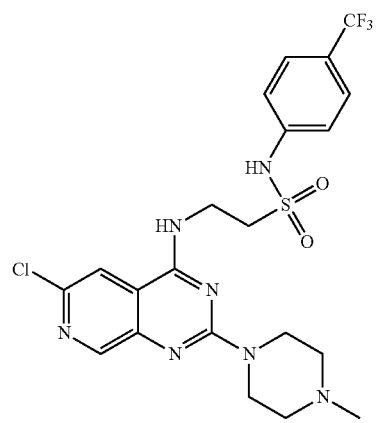 [SMILES: CN1CCN(c2nc(NCCS(=O)(=O)Nc3ccc(C(F)(F)F)cc3)c3cc(Cl)ncc3n2)CC1]

RXH: 2-amino-N-(4-(trifluoromethyl)phenyl)ethane-1-sulfonamide hydrochloride, 329.8 mg; t: 2 h; R$^3$R$^2$NH: 1-methylpiperazine, 0.88 mL, 7.8 mmol, 7.8 equiv.; t: 30 min. Automated flash chromatography (EtOAc:MeOH, product elution with 95:05% v/v) provided the title compound as a yellow solid; weight: 0.246 g; Yield: 43.7%; Purity: 94.0% (UPLC-A); mp: 214.5-221.5° C.; $^1$H-NMR (MeOD), δ (ppm): 8.44 (s, 1H), 7.70 (s, 1H), 7.46 (d, 2H), 7.22 (d, 2H), 3.96 (t, 2H), 3.81 (t, 4H), 3.61 (t, 2H), 2.41 (t, 4H), 2.31 (s, 3H); LR-MS (ESI+): m/z=530.0 Da [M+H]$^+$, calcd. for C$_{21}$H$_{23}$ClF$_3$N$_7$O$_2$S: 529.1.

Example 84: 2-((6-chloro-2-(4-methylpiperazin-1-yl)pyrido[3,4-d]pyrimidin-4-yl)amino)-N-(p-tolyl)ethane-1-sulfonamide

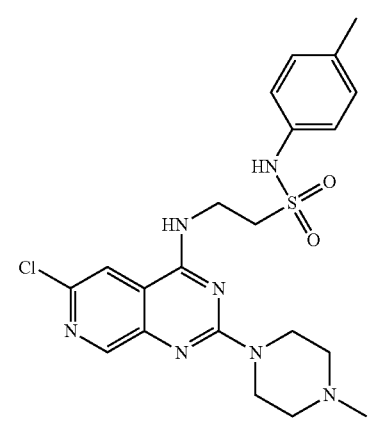 [SMILES: Cc1ccc(NS(=O)(=O)CCNc2nc(N3CCN(C)CC3)nc3cnc(Cl)cc23)cc1]

RXH: 2-amino-N-(p-tolyl)ethane-1-sulfonamide hydrochloride, 294.8 mg; t: 3 h; R³R²NH: 1-methylpiperazine, 0.88 mL, 7.8 mmol, 7.8 equiv.; t: 30 min. Automated flash chromatography (EtOAc:MeOH, product elution with 85:15% v/v) provided the title compound as a pale yellow solid; weight: 0.463 g; Yield: 92.0%; Purity: 94.6% (UPLC-A); mp: 201.5-206.1° C.; ¹H-NMR (CDCl₃), δ (ppm): 8.63 (s, 1H), 7.21 (s, 1H), 7.15-7.03 (m, 4H), 4.08 (dd, 2H), 3.87 (t, 4H), 3.49 (dd, 2H), 2.45 (t, 4H), 2.34 (s, 3H), 2.31 (s, 3H); LR-MS (ESI+): m/z=476.1 Da [M+H]⁺, calcd. for $C_{21}H_{26}ClN_7O_2S$: 475.2.

Example 85: 2-((6-chloro-2-(4-methylpiperazin-1-yl)pyrido[3,4-d]pyrimidin-4-yl)amino)-N-(4-(methylthio)phenyl)ethane-1-sulfonamide

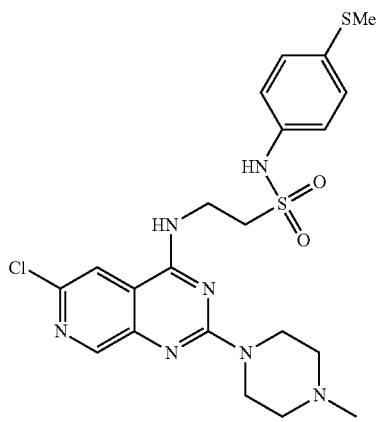 [SMILES: CSc1ccc(NS(=O)(=O)CCNc2nc(N3CCN(C)CC3)nc3cnc(Cl)cc23)cc1]

RXH: 2-amino-N-(4-(methylthio)phenyl)ethane-1-sulfonamide hydrochloride, 270.5 mg; t: 17 h; R³R²NH: 1-methylpiperazine, 0.88 mL, 7.8 mmol, 7.8 equiv.; t: 30 min. Automated flash chromatography (EtOAc:MeOH, product elution with 80:20% v/v) provided the title compound as a pale yellow solid; weight: 0.248 g; Yield: 46.4%; Purity: 95.0% (UPLC-A); mp: 228.5-233.0° C.; ¹H-NMR (MeOD), δ (ppm): 8.47 (s, 1H), 7.73 (s, 1H), 7.14-7.06 (m, 4H), 3.94 (t, 2H), 3.81 (t, 4H), 3.57 (t, 2H), 2.45 (t, 4H), 2.43 (s, 3H), 2.34 (s, 3H); LR-MS (ESI+): m/z=508.0 Da [M+H]⁺, calcd. for $C_{21}H_{25}ClN_7O_2S_2$: 507.1.

Example 86: 2-((6-chloro-2-(4-methylpiperazin-1-yl)pyrido[3,4-d]pyrimidin-4-yl)amino)-N-(pyridin-3-yl)ethane-1-sulfonamide

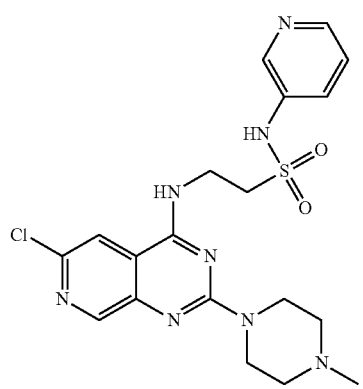 [SMILES: CN1CCN(c2nc(NCCS(=O)(=O)Nc3cccnc3)c3cc(Cl)ncc3n2)CC1]

RXH: 2-amino-N-(pyridin-3-yl)ethane-1-sulfonamide hydrochloride, 277.9 mg; t: 2 h; R³R²NH: 1-methylpiperazine, 0.88 mL, 7.8 mmol, 7.8 equiv.; t: 30 min. Automated flash chromatography (EtOAc:MeOH, product elution with 75:25% v/v) provided the title compound as a yellow solid; weight: 0.178 g; Yield: 36.3%; Purity: 94.7% (UPLC-B); mp: 196.0-199.1° C.; ¹H-NMR (CDCl₃:MeOD 70:30% v/v), δ (ppm): 8.43 (s, 1H), 8.31 (d, 1H), 8.21 (dd, 1H), 7.58 (ddd, 1H), 7.40 (s, 1H), 7.15 (dd, 1H), 3.92 (t, 2H), 3.78 (t, 4H), 3.46 (s, 2H), 3.37 (t, NH), 2.44 (t, 4H), 2.30 (s, 3H); LR-MS (ESI+): m/z=463.2 Da [M+H]⁺, calcd. for $C_{19}H_{23}ClN_8O_2S$: 462.1.

Example 87: 2-((6-chloro-2-(4-methylpiperazin-1-yl)pyrido[3,4-d]pyrimidin-4-yl)amino)-N-(6-chloropyridin-2-yl)ethane-1-sulfonamide

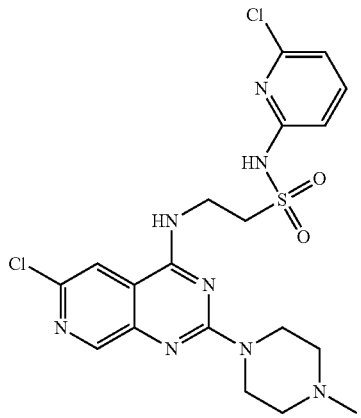 [SMILES: CN1CCN(c2nc(NCCS(=O)(=O)Nc3cccc(Cl)n3)c3cc(Cl)ncc3n2)CC1]

RXH: 2-amino-N-(6-chloropyridin-2-yl)ethane-1-sulfonamide hydrochloride, 303.0 mg; t: 2 h; R³R²NH: 1-methylpiperazine, 0.88 mL, 7.8 mmol, 7.8 equiv.; t: 30 min. Automated flash chromatography (EtOAc:MeOH, product elution with 90:10% v/v) provided the title compound as a pale yellow solid; weight: 0.440 g; Yield: 85%; Purity: 96.0% (UPLC-B); mp: 252.6-254.0° C.; ¹H-NMR (CDCl₃:MeOD 70:30% v/v), δ (ppm): 8.41 (s, 1H), 7.52 (s, 1H), 7.47 (s, NH), 7.40 (t, 1H), 6.67 (dd, 2H), 3.95 (t, 2H), 3.84 (t, 2H), 3.82 (t, 4H), 3.29 (s, NH), 2.47 (t, 4H), 2.30 (s, 3H); LR-MS (ESI+): m/z=497.1 Da [M+H]⁺, calcd. for $C_{19}H_{22}Cl_2N_8O_2S$: 496.1.

Example 88: 2-((6-chloro-2-(4-methylpiperazin-1-yl)pyrido[3,4-d]pyrimidin-4-yl)amino)-N-(pyridin-2-ylmethyl)ethane-1-sulfonamide

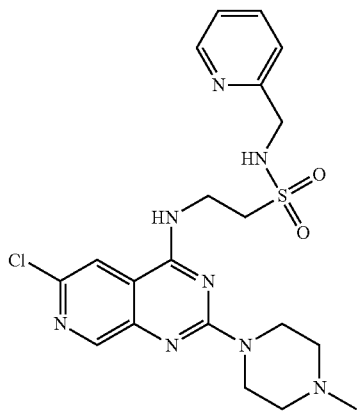 [SMILES: CN1CCN(c2nc(NCCS(=O)(=O)NCc3ccccn3)c3cc(Cl)ncc3n2)CC1]

RXH: 2-amino-N-(pyridin-2-ylmethyl)ethane-1-sulfonamide hydrochloride, 272.5 mg; t: 3.5 h; R³R²NH: 1-methylpiperazine, 0.88 mL, 7.8 mmol, 7.8 equiv.; t: 30 min. Automated flash chromatography (EtOAc:MeOH, product elution with 91:09% v/v) provided the title compound as a yellow solid; weight: 0.326 g; Yield: 67.7%; Purity: 99.1% (UPLC-A); mp: 196.5-197.2° C.; ¹H-NMR (CDCl₃:MeOD 70:30% v/v), δ (ppm): 8.56 (s, 1H), 8.51 (d, 1H), 7.69 (t, 1H), 7.27 (s, 1H), 7.25-7.20 (m, 2H), 7.10 (t, NH), 4.49 (s, 2H), 4.06 (t, 2H), 3.90 (t, 4H), 3.41 (t, 2H), 2.47 (t, 4H), 2.34 (s, 3H); LR-MS (ESI+): m/z=477.1 Da [M+H]⁺, calcd. for $C_{20}H_{25}ClN_8O_2S$: 476.2.

Example 89: 2-((6-chloro-2-(4-methylpiperazin-1-yl)pyrido[3,4-d]pyrimidin-4-yl)amino)-N-(pyrimidin-2-yl)ethane-1-sulfonamide

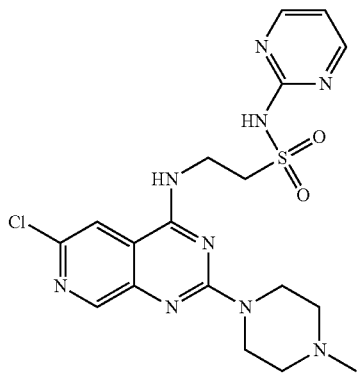 [SMILES: CN1CCN(c2nc(NCCS(=O)(=O)Nc3ncccn3)c3cc(Cl)ncc3n2)CC1]

RXH: 2-amino-N-(pyrimidin-2-yl)ethane-1-sulfonamide hydrochloride, 311.5 mg; t: 2 h; R³R²NH: 1-methylpiperazine, 0.88 mL, 7.8 mmol, 7.8 equiv.; t: 20 min. Automated flash chromatography (DCM:MeOH, product elution with 90:20% v/v) provided the title compound as a pale yellow solid; weight: 0.109 g; Yield: 23.5%; Purity: 99.6% (UPLC-B); mp: 256.6-263.8° C.; ¹H-NMR (MeOD), δ (ppm): 8.44 (s, 1H), 8.32 (d, 2H), 7.84 (s, NH), 7.66 (s, 1H), 6.81 (t, 1H), 4.06-3.93 (m, 4H), 3.90 (t, 3H), 2.56 (t, 4H), 2.39 (s, 3H); LR-MS (ESI+): m/z=464.1 Da [M+H]⁺, calcd. for $C_{18}H_{22}ClN_9O_2S$: 463.1.

Example 90: 2-((6-chloro-2-(4-methylpiperazin-1-yl)pyrido[3,4-d]pyrimidin-4-yl)amino)-N-(1,3-dimethyl-1H-pyrazol-5-yl)ethane-1-sulfonamide

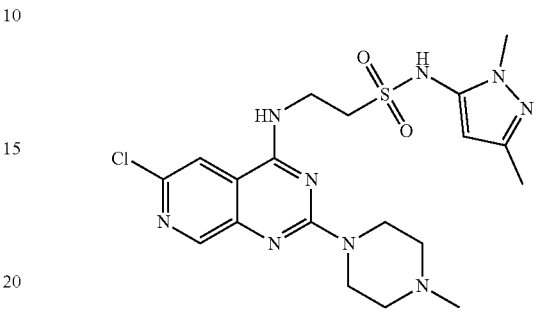

RXH: 2-amino-N-(1,3-dimethyl-1H-pyrazol-5-yl)ethane-1-sulfonamide hydrochloride, 295.2 mg; t: 2 h; R³R²NH: 1-methylpiperazine, 0.88 mL, 7.8 mmol, 7.8 equiv.; t: 30 min. Automated flash chromatography (EtOAc:MeOH, product elution with 75:25% v/v) provided the title compound as a pale red solid; weight: 0.128 g; Yield: 25.0%; Purity: 93.6% (UPLC-B); ¹H-NMR (MeOD), δ (ppm): 8.61 (s, 1H), 7.31 (s, 1H), 6.47 (t, NH), 5.88 (s, 1H), 4.12 (dd, 2H), 3.92 (t, 4H), 3.80 (s, 3H), 3.54 (dd, 2H), 2.54 (t, 4H), 2.40 (s, 3H), 2.20 (s, 3H); LR-MS (ESI+): m/z=480.2 Da [M+H]⁺, calcd. for $C_{19}H_{26}ClN_9O_2S$: 479.2.

Example 91: N-benzyl-2-((6-chloro-2-(4-methylpiperazin-1-yl)pyrido[3,4-d]pyrimidin-4-yl)amino)-N-(2-hydroxyethyl)ethane-1-sulfonamide

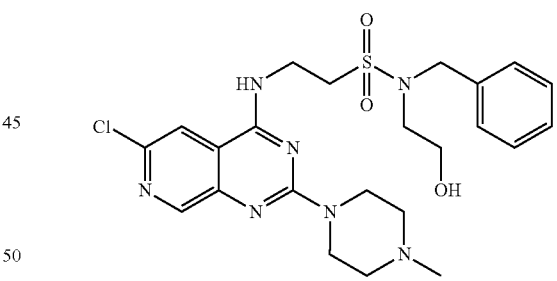

The compound was obtained by reaction of N-benzyl-N-(2-((tert-butyldimethylsilyl)oxy)ethyl)-2-((6-chloro-2-(4-methylpiperazin-1-yl)pyrido[3,4-d]pyrimidin-4-yl)amino)ethane-1-sulfonamide (obtained by the General Synthetic Procedure A) under the Silyl-Deprotection conditions below-described; RXH: 2-amino-N-benzyl-N-(2-((tert-butyldimethylsilyl)oxy)ethyl)ethane-1-sulfonamide, 391.2 mg; t: 2 h; R³R²NH: 1-methylpiperazine, 0.88 mL, 7.8 mmol, 7.8 equiv.; t: 30 min. Automated flash chromatography (DCM:MeOH, product elution with 95:05% v/v) provided N-benzyl-N-(2-((tert-butyldimethylsilyl)oxy)ethyl)-2-((6-chloro-2-(4-methylpiperazin-1-yl)pyrido[3,4-d]pyrimidin-4-yl)amino)ethane-1-sulfonamide as a yellow solid; weight: 0.544 g; Yield: 83.0%; Purity: 96.8% (UPLC-B); mp: 89.9-94.6° C.; ¹H-NMR (CDCl₃), δ (ppm): 8.64 (s, 1H), 7.33 (s, 1H), 7.32 (m, 5H), 6.60 (t, NH), 4.50 (s, 2H), 4.07 (dd, 2H), 3.92 (t, 4H), 3.73 (t, 2H), 3.37 (dd, 4H), 2.47 (t, 4H), 2.35 (s, 3H), 0.89 (s, 9H), 0.07 (s, 6H); LR-MS (ESI+): m/z=634.2 Da [M+H]$^+$, calcd. for $C_2H_{44}ClN_7O_3SSi$: 633.3.

Silyl-Deprotection Procedure; A round bottom flask was charged with N-benzyl-N-(2-((tert-butyldimethylsilyl)oxy)ethyl)-2-((6-chloro-2-(4-methylpiperazin-1-yl)pyrido[3,4-d]pyrimidin-4-yl)amino)ethane-1-sulfonamide (217 mg, 0.342 mmol, 1 equiv.), THF (20 mL, 0.017M) and TBAF (411 µL, 0.411 mmol, 1.2 equiv.), The mixture was stirred at 23° C. for 85 min. The progress of the reaction was confirmed by TLC (DCM:MeOH, 85:15% v/v). Work-up of the reaction yielded the title compound as a white solid; weight: 24 mg; Yield: 13.2%; Purity: 97.9% (UPLC-B); mp: 157.5-161.3° C.; $^1$H-NMR (CDCl$_3$), δ (ppm): 8.56 (s, 1H), 7.31 (s, 1H), 7.28-7.21 (m, 5H), 6.71 (t, NH), 4.39 (s, 2H), 4.18 (dd, 2H), 3.85 (t, 4H), 3.68 (t, 2H), 3.38 (dd, 4H), 2.41 (t, 4H), 2.28 (s, 3H); LR-MS (ESI+): m/z=520.1 Da [M+H]$^+$, calcd. for $C_{23}H_{30}ClN_7O_3S$: 519.2.

Example 92: N-(2-aminoethyl)-N-benzyl-2-((6-chloro-2-(4-methylpiperazin-1-yl)pyrido[3,4-d]pyrimidin-4-yl)amino)ethane-1-sulfonamide

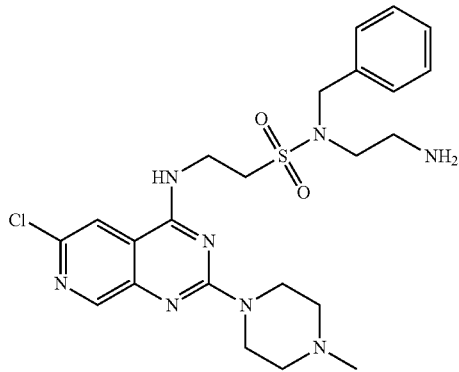 [SMILES: CN1CCN(c2nc(NCCS(=O)(=O)N(CCN)Cc3ccccc3)c3cc(Cl)ncc3n2)CC1]

The compound was obtained by reaction of tert-butyl (2-((N-benzyl-2-((6-chloro-2-(4-methylpiperazin-1-yl)pyrido[3,4-d]pyrimidin-4-yl)amino)ethyl)sulfonamido)ethyl)carbamate (obtained by the General Synthetic Procedure A) under the Boc-Deprotection conditions below-described; RXH: tert-butyl (2-((2-amino-N-benzylethyl)sulfonamido)ethyl)carbamate, 278.8 mg; t: 3 h; R$^3$R$^2$NH: 1-methylpiperazine, 0.66 mL, 5.8 mmol, 7.8 equiv.; t: 30 min. Automated flash chromatography (DCM:MeOH, product elution with 92:08% v/v) provided tert-butyl (2-((N-benzyl-2-((6-chloro-2-(4-methylpiperazin-1-yl)pyrido[3,4-d]pyrimidin-4-yl)amino)ethyl)sulfonamido)ethyl)carbamate as a yellow solid; weight: 405 mg; Yield: 88.0%; Purity: 99.3% (UPLC-B); mp: 86.7-92.3° C.; $^1$H-NMR (CDCl$_3$), δ (ppm): 8.51 (s, 1H), 7.33 (s, 1H), 7.25 (m, 5H), 6.76 (bs, NH), 4.86 (s, 1H), 4.40 (s, 2H), 3.97 (dd, 2H), 3.83 (t, 4H), 3.30-3.22 (m, 4H), 3.16 (dd, 2H), 2.40 (t, 4H), 2.27 (s, 3H), 1.35 (s, 9H); LR-MS (ESI+): m/z=619.2 Da [M+H]$^+$, calcd. for $C_{25}HClN_8O_4S$: 618.3.

Boc-Deprotection Procedure; A µW reactor was charged with tert-butyl (2-((N-benzyl-2-((6-chloro-2-(4-methylpiperazin-1-yl)pyrido[3,4-d]pyrimidin-4-yl)amino)ethyl)sulfonamido)ethyl)carbamate (101 mg, 0.162 mmol, 1 equiv.), methanol (2.5 mL, 0.07M) and TFA ((102 µL, 1.312 mmol, 8.1 equiv.), The mixture was homogenized by stirring and submitted to reaction under microwave irradiation at 120° C. for 45 min (Energy Power: 50 W). The progress of the reaction was confirmed by TLC (EtOAc:MeOH, 85:15% v/v). Work-up of the reaction yielded the title compound as a yellow solid; weight: 69 mg; Yield: 80%; Purity: 97.6% (UPLC-B); mp: 158.0-162.0° C.; $^1$H-NMR (CDCl$_3$), δ (ppm): 8.62 (s, 1H), 7.40 (s, 1H), 7.34 (t, NH), 7.31-7.26 (m, 5H), 4.38 (s, 2H), 4.06 (dd, 2H), 3.92 (t, 4H), 3.41 (dd, 2H), 3.37 (t, 2H), 2.82 (t, 2H), 2.48 (t, 4H), 2.35 (s, 3H); LR-MS (ESI+): m/z=519.1 Da [M+H]$^+$, calcd. for $C_{21}H_{31}ClNO_2S$: 518.2.

Example 93: 6-chloro-2-(4-methylpiperazin-1-yl)-N-(2-(phenylsulfonyl)ethyl)pyrido[3,4-d]pyrimidin-4-amine

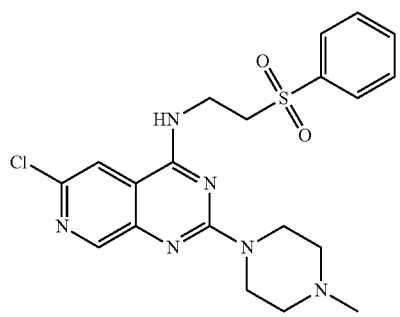 [SMILES: CN1CCN(c2nc(NCCS(=O)(=O)c3ccccc3)c3cc(Cl)ncc3n2)CC1]

RXH: 2-(phenylsulfonyl)ethan-1-amine hydrochloride, 258.7 mg; t: 18 h; R$^3$R$^2$NH: 1-methylpiperazine, 0.88 mL, 7.8 mmol, 7.8 equiv.; t: 30 min. Automated flash chromatography (EtOAc:MeOH, product elution with 85:15% v/v) provided the title compound as a brown solid; weight: 0.279 g; Yield: 62.0%; Purity: 99.4% (UPLC-B); mp: 141.5-151.1° C.; $^1$H-NMR (CDCl$_3$). δ (ppm): 8.61 (s, 1H), 7.95 (d, 2H), 7.78-7.50 (m, 4H), 6.40 (t, NH), 4.07 (dd, 2H), 3.87 (t, 4H), 3.51 (dd, 2H), 2.46 (t, 4H), 2.35 (s, 3H); LR-MS (ESI+): m/z=447.0 Da [M+H]$^+$, calcd. for $C_{20}H_{23}ClN_8O_2S$: 446.1.

Example 94: N-(2-(benzylsulfonyl)ethyl)-6-chloro-2-(4-methylpiperazin-1-yl)pyrido[3,4-d]pyrimidin-4-amine

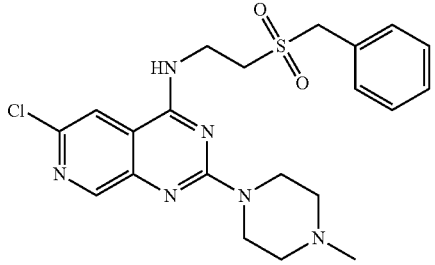 [SMILES: CN1CCN(c2nc(NCCS(=O)(=O)Cc3ccccc3)c3cc(Cl)ncc3n2)CC1]

RXH: 2-(benzylsulfonyl)ethan-1-amine, 220.0 mg; t: 23 h; R$^3$R$^2$NH: 1-methylpiperazine, 0.88 mL, 7.8 mmol, 7.8 equiv.; t: 30 min. Automated flash chromatography (EtOAc:MeOH, product elution with 80:20% v/v) provided the title compound as a white solid; weight 0.315 g; Yield: 67.7%;

Purity: 99.2% (UPLC-B); mp: 217.9-221.1° C.; $^1$H-NMR (CDCl$_3$), δ (ppm): 8.63 (s, 1H), 7.38-7.35 (m, 5H), 7.25 (s, 1H), 6.30 (t, NH), 4.33 (s, 2H), 4.06 (dd, 2H), 3.88 (t, 4H), 3.26 (dd, 2H), 2.46 (t, 4H), 2.35 (s, 3H); LR-MS (ESI+): m/z=461.0 Da [M+H]$^+$, calcd. for C$_{21}$H$_2$ClN$_8$O$_2$S: 460.1.

Example 95: N-(2-(benzylsulfinyl)ethyl)-6-chloro-2-(4-methylpiperazin-1-yl)pyrido[3,4-d]pyrimidin-4-amine

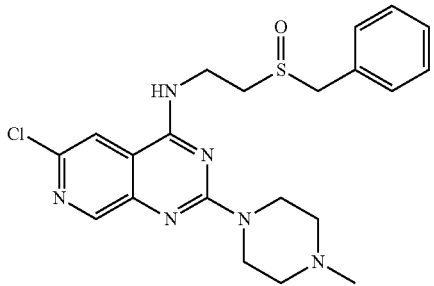 [SMILES: CN1CCN(c2nc(NCCS(=O)Cc3ccccc3)c3cc(Cl)ncc3n2)CC1]

RXH: 2-(benzylsulfinyl)ethan-1-amine, 202.6 mg; t: 6 h; R$^3$R$^2$NH: 1-methylpiperazine, 0.88 mL, 7.8 mmol, 7.8 equiv.; t: 30 min. Automated flash chromatography (EtOAc:MeOH, product elution with 80:20% v/v) provided the title compound as a yellow solid; weight 0.188 g; Yield: 40.8%; Purity: 97.6% (UPLC-B); mp: 200.7-203.2° C.; $^1$H-NMR (CDCl$_3$), δ (ppm): 8.62 (s, 1H), 7.41-7.27 (m, 6H), 7.13 (t, NH), 4.26-4.01 (m, 4H), 3.89 (t, 4H), 3.13-3.02 (m, 1H), 2.93-2.81 (m, 1H), 2.46 (t, 4H), 2.35 (s, 3H); LR-MS (ESI+): m/z=445.1 Da [M+H]$^+$, calcd. for C$_{21}$H$_{25}$ClN$_7$OS: 444.2.

Example 96: 3-((6-chloro-2-(4-methylpiperazin-1-yl)pyrido[3,4-d]pyrimidin-4-yl)amino)-N-phenylpropanamide

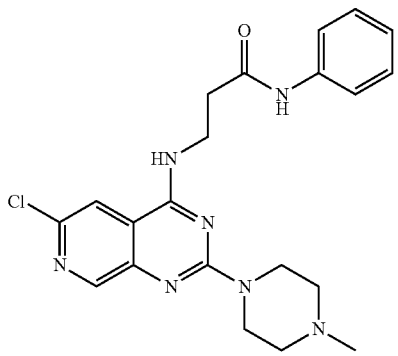 [SMILES: CN1CCN(c2nc(NCCC(=O)Nc3ccccc3)c3cc(Cl)ncc3n2)CC1]

RXH: 3-amino-N-phenylpropanamide, 189.5 mg; t: 2 h; R$^3$R$^2$NH: 1-methylpiperazine, 0.88 mL, 7.8 mmol, 7.8 equiv.; t: 20 min. Automated flash chromatography (EtOAc:MeOH, product elution with 80:20% v/v) provided the title compound as a brown solid; weight: 0.315 g; Yield: 72.7%; Purity: 98.3% (UPLC-B); mp: 206.6-210.6° C.; $^1$H-NMR (CDCl$_3$:MeOD 90:10% v/v), δ (ppm): 8.53 (s, 1H), 7.68 (s, 1H), 7.51 (d, 2H), 7.31 (t, 2H), 7.10 (t, 1H), 4.02-3.88 (m, 6H), 2.79 (t, 2H), 2.56 (t, 4H), 2.39 (s, 3H); LR-MS (ESI+): m/z=426.1 Da [M+H]$^+$, calcd. for C$_{21}$H$_{24}$ClN$_7$O: 425.2.

Example 97: 2-((6-chloro-2-(4-methylpiperazin-1-yl)pyrido[3,4-d]pyrimidin-4-yl)amino)-N-phenylacetamide

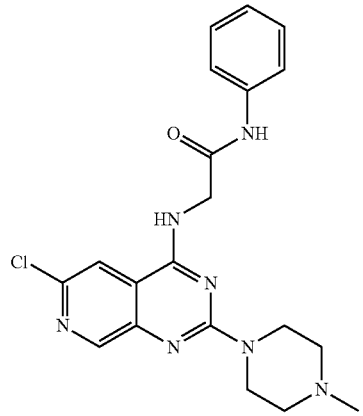 [SMILES: CN1CCN(c2nc(NCC(=O)Nc3ccccc3)c3cc(Cl)ncc3n2)CC1]

RXH: 2-amino-N-phenylacetamide hydrochloride, 166.0 mg; t: 20 h; R$^3$R$^2$NH: 1-methylpiperazine, 0.88 mL, 7.8 mmol, 7.8 equiv.; t: 20 min. Automated flash chromatography (EtOAc:MeOH, product elution with 80:20% v/v) provided the title compound as a brown solid; weight: 0.251 g; Yield: 56.3%; Purity: 92.5% (UPLC-B); mp: 257.4-268.7° C.; $^1$H-NMR (CDCl$_3$:MeOD 90:10% v/v), δ (ppm): 8.52 (s, 1H), 7.78 (s, 1H), 7.56 (d, 2H), 7.32 (t, 2H), 7.12 (t, 1H), 4.25 (s, 2H), 3.88 (t, 4H), 2.39 (t, 4H), 2.27 (s, 3H); LR-MS (ESI+): m/z=412.1 Da [M+H]$^+$, calcd. for C$_{20}$H$_2$ClN$_7$O: 411.2.

Example 98: 3-((6-chloro-2-(4-methylpiperazin-1-yl)pyrido[3,4-d]pyrimidin-4-yl)amino)-N-methylpropanamide

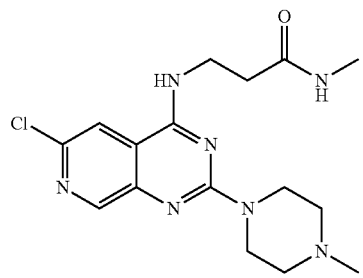 [SMILES: CNC(=O)CCNc1nc(N2CCN(C)CC2)nc2cnc(Cl)cc12]

RXH: 3-amino-N-methylpropanamide, 107.3 mg; t: 16.5 h; R$^3$R$^2$NH: 1-methylpiperazine, 0.88 mL, 7.8 mmol, 7.8 equiv.; t: 30 min. Automated flash chromatography (EtOAc:MeOH, product elution with 80:20% v/v) provided the title compound as a pale brown solid; weight: 0.295 g; Yield: 79.0%; Purity: 97.4% (UPLC-A); mp: 227.6-235.3° C.; $^1$H-NMR (MeOD), δ (ppm): 8.43 (s, 1H), 7.75 (s, 1H), 3.90 (t, 4H), 3.81 (t, 2H), 2.71 (s, 3H), 2.56 (t, 2H), 2.50 (t, 4H), 2.33 (s, 3H); LR-MS (ESI+): m/z=364.1 Da [M+H]$^+$, calcd. for C$_{16}$H$_2$ClNO: 363.2.

Example 99: 2-((6-chloro-2-(4-methylpiperazin-1-yl)pyrido[3,4-d]pyrimidin-4-yl)amino)acetamide

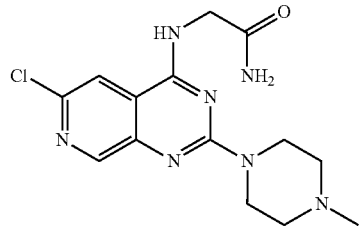 [SMILES: CN1CCN(c2nc(NCC(N)=O)c3cc(Cl)ncc3n2)CC1]

RXH: 2-aminoacetamide, 79.4 mg; t: 16.5 h; R³R²NH: 1-methylpiperazine, 0.88 mL, 7.8 mmol, 7.8 equiv.; t: 30 min. Automated flash chromatography (EtOAc:MeOH, product elution with 70:30% v/v) provided the title compound as a yellow solid; weight: 0.069 g; Yield: 20.3%; Purity: 98.6% (UPLC-A); mp: 237.1-241.8° C.; ¹H-NMR (MeOD), δ (ppm): 8.52 (s, 1H), 7.76 (s, 1H), 7.47 (s, 2H(NH₂)), 4.11 (s, 2H), 3.88 (t, 4H), 3.35 (s, NH), 2.47 (t, 4H), 2.31 (s, 3H); LR-MS (ESI+): m/z=336.0 Da [M+H]⁺, calcd. for $C_{14}H_{18}ClN_7O$: 335.1.

Steed 8: Synthesis of Intermediates G

General Synthetic Procedure B:

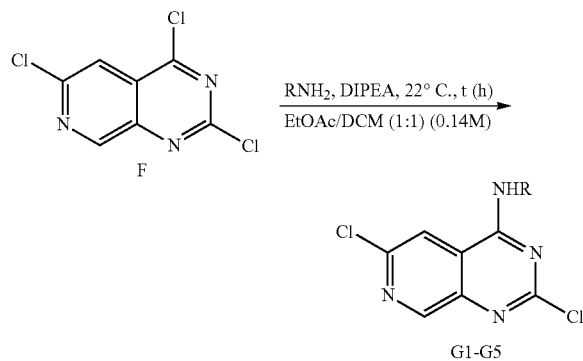

2,4,6-Trichloropyrido[3,4-d]pyrimidine (Intermediate F) (936 mg, 4 mmol, 1 equiv.) was suspended in the mixture of solvents [EtOAc:DCM (1:1), 28 mL, 0.14 M] in a round bottom flask provide with a stirring bar under Ar atmosphere. Then, N, N-diisopropylethylamine (2.04 mL, 2.9 mmol, 2.9 equiv.) was added the mixture was homogenized by stirring for 5 min. The corresponding amine (RNH₂) (4.1 mmol, 1.025 equiv.) was added and the resulting mixture was stirred at 22° C. until complete conversion of the Intermediate F was achieved (5-20 h). The reaction was monitored by TLC (Heptane: EtOAc). Volatiles were removed under reduced pressure and the residue was dissolved in EtOAc (150 mL), washed with water (3×50 mL), dried over anhyd. Na₂SO₄ and filtered. The solvent was removed under reduced pressure giving the yellow-brown oil, which was purified by automated flash chromatography (Heptane:EtOAc:DCM) giving the corresponding Intermediate (G1-G5).

The following compounds were obtained following the General Synthetic Procedure B described above for Intermediates G:

Intermediate G1: 2,6-dichloro-N-(thiophen-2-ylmethyl)pyrido[3,4-d]pyrimidin-4-amine

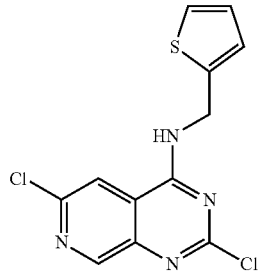 [SMILES: Clc1cc2c(NCc3cccs3)nc(Cl)nc2cn1]

RNH₂: Thiophen-2-ylmethanamine, 0.43 mL; t: 15 h; Automated flash chromatography (Heptane:EtOAc:DCM, product elution with 80:10:10% v/v) provided the Intermediate G1 as a pale yellow solid; weight: 1.06 g; Yield: 85%; Purity: 99.6% (UPLC-B); mp: 168.7-172.3° C.; ¹H-NMR (CDCl₃), δ (ppm): 8.98 (s, 1H), 7.56 (s, 1H), 7.30 (dd, 1H), 7.14 (d, 1H), 7.00 (dd, 1H), 6.36 (t, NH), 5.04 (d, 2H): LR-MS (ESI+): m/z=311.0 Da [M+H]⁺, calcd. for $C_{12}H_6Cl_2N_4S$: 310.0.

Intermediate G2: 2,6-dichloro-N-(2-(morpholinosulfonyl)ethyl)pyrido[3,4-d]pyrimidin-4-amine

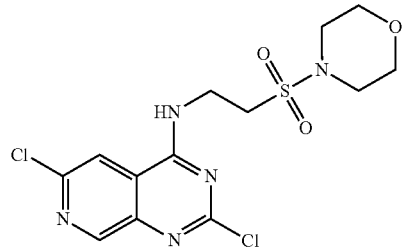 [SMILES: O=S(=O)(CCNc1nc(Cl)nc2cnc(Cl)cc12)N1CCOCC1]

RNH₂: 2-amino-N-phenylethane-1-sulfonamide hydrochloride, 881.3 mg; t: 12 h; Automated flash chromatography (Heptane:EtOAc:DCM, product elution with 40:30:30% v/v) provided the Intermediate G2 as a yellow solid; weight: 1.22 g; Yield: 77%; Purity: 99.2% (UPLC-B); mp: 236.7-240.4° C.; ¹H-NMR (MeOH), δ (ppm): 8.74 (s, 1H), 7.96 (s. 1H), 4.04 (t, 2H), 3.76 (t, 4H), 3.43 (t, 2H), 3.32 (t, 4H); LR-MS (ESI+): m/z=392.0 Da [M+H]⁺, calcd. for $C_{13}H_{15}Cl_2N_5O_3S$: 391.0.

Intermediate G3: 2-((2,6-dichloropyrido[3,4-d]pyrimidin-4-yl)amino)-N-phenylethane-1-sulfonamide

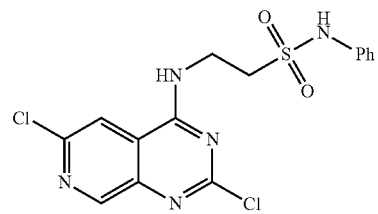 [SMILES: O=S(=O)(CCNc1nc(Cl)nc2cnc(Cl)cc12)Nc1ccccc1]

RNH$_2$: 2-amino-N-phenylethane-1-sulfonamide hydrochloride, 881.30 mg; t: 12 h; Automated flash chromatography (Heptane:EtOAc:DCM, product elution with 70:15:15% v/v) provided the Intermediate G3 as a pale yellow solid; weight: 1.67 g; Yield: 93%; Purity: 88.6% (UPLC-B); $^1$H-NMR (CDCl$_3$), δ (ppm): 8.80 (s, 1H), 7.99 (s, 1H), 7.21-7.18 (m, 5H), 7.04 (t, NH), 4.04 (t, 2H), 3.57 (t, 2H); LR-MS (ESI+): m/z=311.0 Da [M+H]$^+$, calcd. for C$_{15}$H$_{13}$Cl$_2$N$_5$O$_2$S: 397.0.

Intermediate G4: 2-((2,6-dichloropyrido[3,4-d]pyrimidin-4-yl)amino)-N-methyl-N-phenylethane-1-sulfonamide

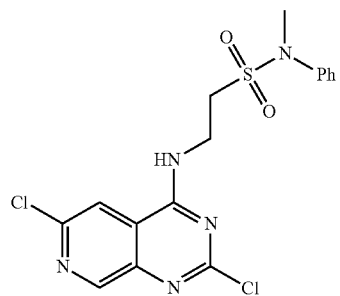 [SMILES: CN(c1ccccc1)S(=O)(=O)CCNc1nc(Cl)nc2cnc(Cl)cc12]

RNH$_2$: 2-amino-N-methyl-N-phenylethane-1-sulfonamide hydrochloride, 1.144 g; t: 10 h; Automated flash chromatography (Heptane:EtOAc:DCM, product elution with 70:15:15% v/v) provided the Intermediate G4 as a pale yellow solid; weight: 1.53 g; Yield: 90%; Purity: 97.3% (UPLC-B); mp: 184.3-203.4° C.; $^1$H-NMR (CDCl$_3$), δ (ppm): 8.91 (s, 1H), 7.84 (s, 1H), 7.46-7.36 (m, 5H), 7.29 (t, NH), 4.03 (t, 2H), 3.46 (t, 2H), 3.39 (s, 3H); LR-MS (ESI+): m/z=412.1 Da [M+H]$^+$, calcd. for C$_{16}$H$_{15}$Cl$_2$N$_5$O$_2$S: 411.0.

Intermediate G5: 3-(((2,6-dichloropyrido[3,4-d]pyrimidin-4-yl)amino)methyl)indolin-2-one

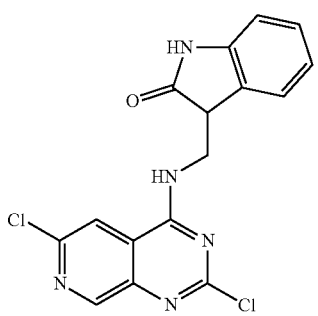 [SMILES: O=C1Nc2ccccc2C1CNc1nc(Cl)nc2cnc(Cl)cc12]

RNH$_2$: 3-(aminomethyl)indolin-2-one hydrochloride, 800 mg; t: 20 h. Automated flash chromatography (Heptane:EtOAc:DCM, product elution with 60:20:20% v/v) provided the Intermediate G5 as a yellow solid; weight: 0.553 g; Yield: 37%; Purity: 96.4% (UPLC-B); mp: 202.2-206.8° C.; $^1$H-NMR (MeOD), δ (ppm): 8.82 (s, 1H), 8.12 (s, 1H), 7.34 (d, 1H), 7.22 (t, 1H), 7.01 (t, 1H), 6.91 (t, 1H), 4.11 (dd, 2H), 3.97 (t, 1H); LR-MS (ESI+): m/z=360.0 Da [M+H]$^+$, calcd. for C$_{16}$H$_{11}$Cl$_2$N$_5$O: 359.0.

Step 9: Synthesis of Example 39 and Intermediates H1-H4

General Synthetic Procedure C:

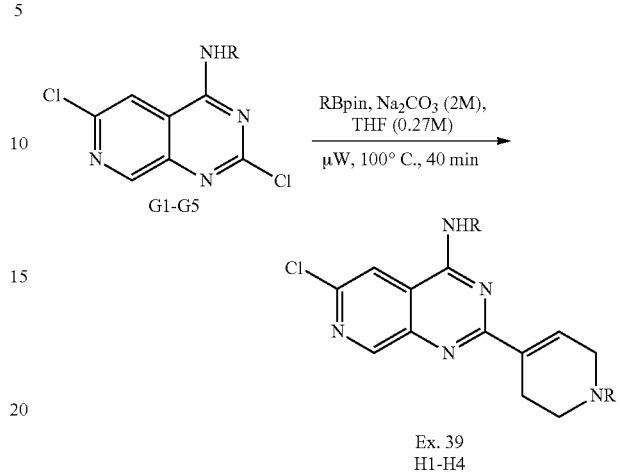

The corresponding Intermediate G (1 mmol, 1 equiv.), Pd(PPh$_3$)$_4$ (29.2 mg, 0.025 mmol, 0.05 equiv.) and the appropriate boronic acid pinacol ester (RBpin, 1.1 mmol, 1.1 equiv.) were charged in an oven dried µW reactor. The µW reactor was sealed with a septum and purged with Ar atmosphere (3 cycles Ar/Vacuum). Anhyd. THF (1.9 mL, 0.27M) was added and the mixture was stirred until complete solution was achieved. The solution of Na$_2$CO$_3$ (2M, 0.75 mL, 3 equiv.) was added and the reaction mixture was submitted to reaction under microwave irradiation at 100° C. for 40 min (energy power: 150 W). Full conversion of the Intermediate G was confirmed by TLC monitoring (Heptane:EtOAc). The crude mixture was transferred to a separating funnel by addition of EtOAc (70 mL). The organic phase was washed with water (3×30 mL) and with saturated NaCl solution (1×30 mL), dried over anhyd. Na$_2$SO$_4$ and filtered through a pad of Celite® with a filter plate. The solvent was removed under reduced pressure giving the crude mixture, which was purified by automated flash chromatography yielding the corresponding Intermediate H1-H4 or the compound from Example 39.

The following compounds were obtained following the General Synthetic Procedure C described above for the Example 39 and Intermediates H1-H4:

Example 39: 6-chloro-2-(1-methyl-1,2,3,4-tetrahydropyridin-4-yl)-N-(2-(morpholinosulfonyl)ethyl)pyrido[3,4-d]pyrimidin-4-amine

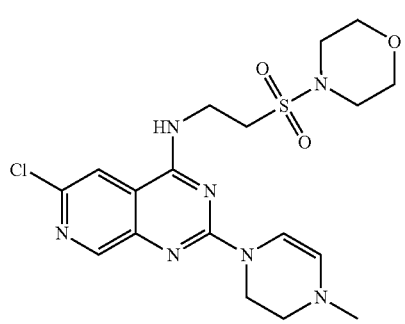 [SMILES: CN1C=CN(c2nc(NCCS(=O)(=O)N3CCOCC3)c3cc(Cl)ncc3n2)CC1]

Intermediate G2: 394 mg; RBpin: 1-methyl-4-(4,4,5,5-tetramethyl-1,3,2-dioxaborolan-2-yl)-1,2,3,6-tetrahydropyridine, 250.4 mg. Work-up of the crude mixture yielded a mixture of two compounds: the expected cross-coupling product (6-chloro-2-(1-methyl-1,2,3,6-tetrahydropyridin-4-yl)-N-(2-(morpholinosulfonyl)ethyl)pyrido[34-d]pyrimidin-4-amine) and the title compound, stemming from the isomerization of the former compound. Automated flash chromatography (EtOAc/DCM/MeOH, the title compound eluted with 40:40:20% v/v) led to the isolation of the title compound as the major product, contaminated with the cross-coupling byproduct (7.7%); weight: 0.417 g; Yield: 50%; Purity: 90.1% (UPLC-B); yellow solid; $^1$H-NMR (CDCl$_3$), δ (ppm): 8.84 (s, 1H), 6.16 (t, 1H), 6.03-5.93 (m, 1H), 5.41 (d, 1H), 4.94 (d, 1H), 4.88 (t, 2H), 4.16 (t, 4H), 4.15 (t, 2H), 3.62-3.56 (m, 2H), 3.44 (s, 3H), 3.34 (dd, 4H), 2.86-2.71 (m, 1H), 2.31 (dt, 1H); LR-MS (ESI+): m/z=454.0 Da [M+H]$^+$, calcd. for C$_{19}$H$_{25}$ClN$_6$O$_3$S: 453.0.

Intermediate H1: 6-chloro-2-(1-methyl-1,2,3,6-tetrahydropyridin-4-yl)-N-(thiophen-2-ylmethyl)pyrido[3,4-d]pyrimidin-4-amine

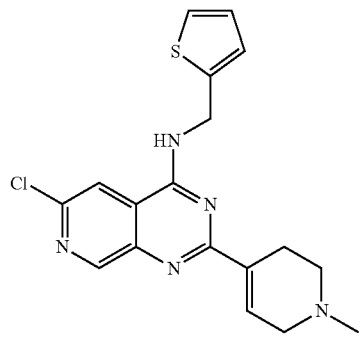 [SMILES: CN1CC=C(c2nc(NCc3cccs3)c3cc(Cl)ncc3n2)CC1]

Intermediate G1: 311 mg; RBpin: 1-methyl-4-(4,4,5,5-tetramethyl-1,3,2-dioxaborolan-2-yl)-1,2,3,6-tetrahydropyridine, 250.4 mg. Automated flash chromatography (EtOAc:MeOH, product elution with 97:3% v/v) provided the Intermediate H1 as a yellow solid; weight 0.126 g; Yield: 30%; Purity: 89.1% (UPLC-B); $^1$H-NMR (MeOD), δ (ppm): 8.90 (s, 1H), 8.08 (s, 1H), 7.04-7.36 (m, 1H), 7.27 (dd, 1H), 7.13 (dd, 1H), 6.97 (dd, 1H), 5.04 (d, 2H), 3.35-3.28 (m, 2H), 2.92-2.84 (m, 2H), 2.82-2.75 (m, 2H), 2.47 (s, 3H); LR-MS (ESI+): m/z=372.1 Da [M+H]$^+$, calcd. for C$_{18}$H$_{18}$ClN$_6$S: 371.1.

Intermediate H2: tert-butyl 4-(6-chloro-4-((thiophen-2-ylmethyl)amino)pyrido[3,4-d]pyrimidin-2-yl)-3,6-dihydropyridine-1(2H)-carboxylate

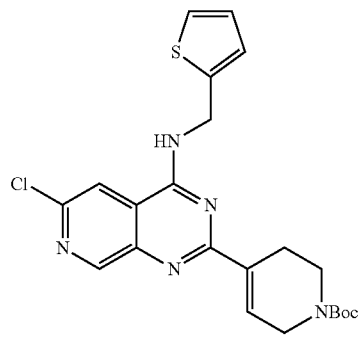 [SMILES: CC(C)(C)OC(=O)N1CC=C(c2nc(NCc3cccs3)c3cc(Cl)ncc3n2)CC1]

Intermediate G1: 311 mg; RBpin: N-Boc-1,2,3,6-tetrahydropyridine-4-boronic acid pinacol ester, 174 mg. Automated flash chromatography (Heptane:EtOAc, product elution with 78:22% v/v) provided the Intermediate H2 as a yellow solid; weight: 0.185 g; Yield: 79%; Purity: 97.8% (UPLC-B); $^1$H-NMR (CDCl$_3$), δ (ppm): 9.00 (s, 1H), 7.55 (s, 1H), 7.35 (bs, 1H), 7.25 (dd, 1H), 7.09 (dd, 1H), 6.98 (dd, 1H), 6.21 (t, NH), 5.03 (d, 2H), 4.21 (dd, 2H), 3.66 (t, 2H), 2.82 (bt, 2H), 1.50 (s, 9H); LR-MS (ESI+): m/z=458.1 Da [M+H]$^+$, calcd. for C$_{22}$H$_{24}$ClN$_5$O$_2$S: 457.1.

Intermediate H3: tert-butyl 4-(6-chloro-4-((2-(N-phenylsulfamoyl)ethyl)amino)pyrido[3,4-d]pyrimidin-2-yl)-3,6-dihydropyridine-1(2H)-carboxylate

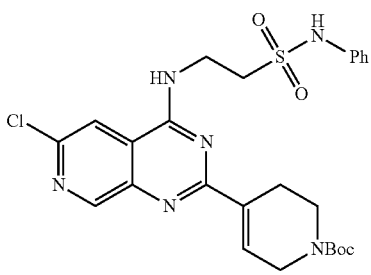

Intermediate G3: 448 mg; RBpin: N-Boc-1,2,3,6-tetrahydropyridine-4-boronic acid pinacol ester, 174 mg. Automated flash chromatography (Heptane:EtOAc, product elution with 65:35% v/v) provided the Intermediate H3 as a yellow solid; weight 0.465 g; Yield: 83%; Purity: 97.3% (UPLC-B); $^1$H-NMR (CDCl$_3$), δ (ppm): 8.87 (s, 1H), 7.56 (bs, 1H), 7.44 (bs, 1H), 7.33-7.12 (m, 5H), 6.82 (t, NH), 4.14 (bt, 4H), 3.61 (bt, 4H), 2.70 (bt, 2H), 1.50 (s, 9H); LR-MS (ESI+): m/z=545.2 Da [M+H]$^+$, calcd. for C$_{22}$H$_{29}$ClN$_6$O$_4$S: 544.2.

Intermediate H4: tert-butyl 4-(6-chloro-4-((2-(N-methyl-N-phenylsulfamoyl)ethyl)amino)pyrido[3,4-d]pyrimidin-2-yl)-3,6-dihydropyridine-1(2H)-carboxylate

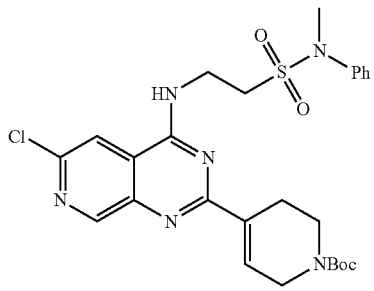 [SMILES: CN(c1ccccc1)S(=O)(=O)CCNc1nc(C2=CCN(C(=O)OC(C)(C)C)CC2)nc2cnc(Cl)cc12]

Intermediate G4: 422 mg; RBpin: N-Boc-1,2,3,6-tetrahydropyridine-4-boronic acid pinacol ester, 174 mg. Automated flash chromatography (Heptane:EtOAc, product elution with 70:30% v/v) provided the Intermediate H4 as a yellow solid; weight: 0.442 g; Yield: 79%; Purity: 99.9% (UPLC-A); $^1$H-NMR (CDCl$_3$), δ (ppm): 8.93 (s, 1H), 7.65 7.64-7.09 (m, 6H), 4.17-4.09 (m, 4H), 3.63 (t, 2H), 3.47 (t, 2H), 3.36 (s, 3H), 2.81-2.67 (m, 2H), 1.51 (s, 9H); LR-MS (ESI+): m/z=559.2 Da [M+H]$^+$, calcd. for C$_{25}$H$_{31}$ClN$_6$O$_4$S: 558.2.

Step 10: Synthesis of Examples 40-41

The following compounds were obtained following the Boc-deprotection Procedure above described for Examples 1-38:

Example 40: 6-chloro-2-(1,2,3,6-tetrahydropyridin-4-yl)-N-(thiophen-2-ylmethyl)pyrido[3,4-d]pyrimidin-4-amine

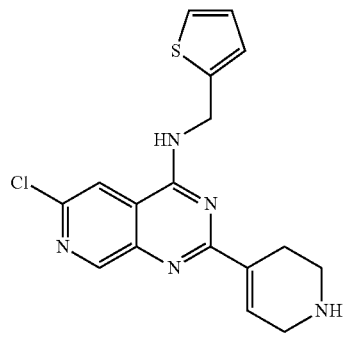 [SMILES: Clc1cc2c(NCc3cccs3)nc(C3=CCNCC3)nc2cn1]

Intermediate H2: (233 mg, 0.5 mmol, 1 equiv.); MeOH (5 mL, 0.1M); concd HCl (0.15 mL, 1.5 mmol, 3 equiv.), t: 17 h. Work-up of the reaction yielded the title compound as a yellow solid; weight: 186 mg; Yield: 99%; Purity: 94.9% (UPLC-B); mp: 248° C. (decomposition); $^1$H-NMR (MeOD), δ (ppm): 8.90 (s, 1H), 7.94 (s, 1H), 7.43 (bs, 1H), 7.18 (dd, 1H), 7.07 (dd, 1H), 6.94 (dd, 1H), 4.99 (d, 2H), 3.61 (dd, 2H), 3.09 (t, 2H), 2.76-2.68 (m, 2H); LR-MS (ESI+): m/z=359.1 Da [M+H]$^+$, calcd. for C$_{17}$H$_{16}$ClN$_5$S: 358.0.

Example 41: 2-((6-chloro-2-(1,2,3,6-tetrahydropyridin-4-yl)pyrido[3,4-d]pyrimidin-4-yl)amino)-N-phenylethane-1-sulfonamide

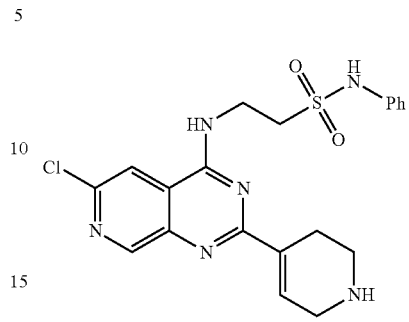

Intermediate H3: (279.7 mg, 0.5 mmol, 1 equiv.); MeOH (5 mL, 0.1M); concd HCl (0.15 mL, 1.5 mmol, 3 equiv.), t: 17 h. Work-up of the reaction yielded the title compound as a yellow solid; weight: 239 mg; Yield: 98%; Purity: 91.0% (UPLC-A), mp: 243.0-247.3° C.; $^1$H-NMR (MeOD), δ (ppm): 9.21 (s, 1H), 8.33 (s, 1H), 7.43-7.39 (m, 1H), 7.33-7.20 (m, 5H), 7.13-7.06 (m, 1H), 4.26 (t, 2H), 4.11 (dd, 2H), 3.68 (t, 2H), 3.54 (t, 2H), 3.04-2.96 (m, 2H); LR-MS (ESI+): m/z=445.1 Da [M+H]$^+$, calcd. for C$_{20}$H$_{21}$ClN$_6$O$_2$S: 444.1.

Step 11: Synthesis of Examples 42-45

General Reduction Procedure:

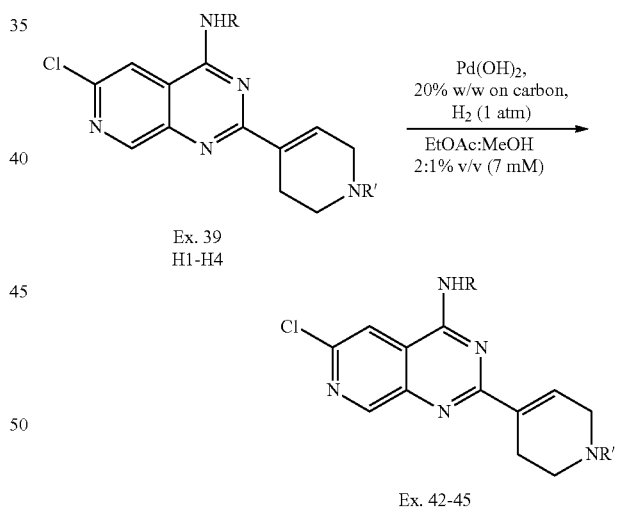

In a 250 ml oven dried round bottom flask, the appropriate compound (Example 39 or Intermediate H1-H4) (0.5 mmol, 1 equiv.) was dissolved in a mixture of solvents [EtOAc (46 mL) and MeOH (23 mL, HPLC quality)] under Ar atmosphere. Pd(OH)$_2$ 20% w/w on carbon (70.8 mg, 0.1 mmol, 0.1 equiv.) was added and three cycles of H$_2$/vacuum were done in order to purge residual gases from the solvents. The reaction mixture was stirred at 22° C. under H$_2$ atmosphere. The reaction was monitored by TLC (EtOAc:MeOH) until full conversion was achieved. The crude mixture reaction was filtered through a pad of Celite® in a filter plate and solvents were removed under reduced pressure. The residue was purified by automated flash chromatography giving the corresponding compounds (Examples 42-45).

The following compounds were obtained following the General Reduction Procedure described above for the Example 42-45:

Example 42: 6-chloro-2-(1-methylpiperidin-4-yl)-N-(thiophen-2-ylmethyl)pyrido[3,4-d]pyrimidin-4-amine

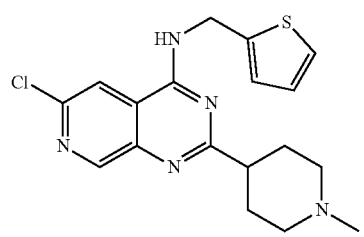 [SMILES: CN1CCC(c2nc(NCc3cccs3)c3cc(Cl)ncc3n2)CC1]

Intermediate H1: 208 mg. Automated flash reversed-phase chromatography (Water:MeOH, product elution with 20:80% v/v) provided the title compound as a yellow solid; weight: 0.132 g; Yield: 65%; Purity: 91.5% (UPLC-A); $^{1}$H-NMR (CDCl$_{3}$), δ (ppm): 9.00 (s, 1H), 7.50 (s, 1H), 7.26 (dd, 1H), 7.09 (dd, 1H), 6.98 (dd, 1H), 6.02 (t, NH), 5.04 (d, 2H), 3.05-2.94 (m, 2H), 2.87-2.74 (m, 1H), 2.34 (s, 3H), 2.17-1.98 (m, 6H); LR-MS (ESI+): m/z=374.1 Da [M+H]$^{+}$, calcd. for C$_{18}$H$_{20}$ClN$_{5}$S: 373.1.

Example 43: 6-chloro-2-(1-methylpiperidin-4-yl)-N-(2-(morpholinosulfonyl)ethyl)pyrido[3,4-d]pyrimidin-4-amine

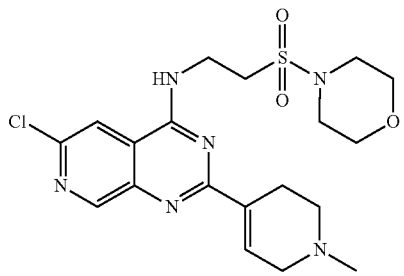 [SMILES: CN1CC=C(c2nc(NCCS(=O)(=O)N3CCOCC3)c3cc(Cl)ncc3n2)CC1]

Example 39: 252 mg. Automated flash reversed-phase chromatography (Water-MeOH, product elution with 60:40% v/v) provided the title compound as a yellow solid; weight: 0.414 g; Yield: 55%; Purity: 60.4% (UPLC-A); $^{1}$H-NMR (CDCl$_{3}$), δ (ppm): 8.91 (s, 1H), 8.12 (s, 1H), 4.65 (t, 2H), 4.13 (t, 4H), 3.77 (t, 2H), 3.32 (dd, 4H), 3.06-2.93 (m, 2H), 2.86-2.73 (m, 1H), 2.18-1.96 (m, 6H), 2.43 (s, 3H); LR-MS (ESI+): m/z=455.0 Da [M+H]$^{+}$, calcd. for C$_{19}$H$_{27}$ClN$_{6}$O$_{3}$S: 454.1.

Example 44: 6-chloro-2-(piperidin-4-yl)-N-(thiophen-2-ylmethyl)pyrido[3,4-d]pyrimidin-4-amine

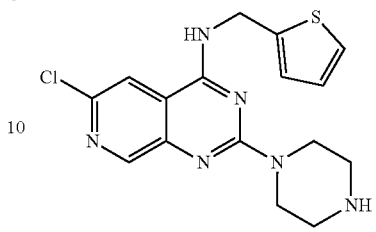

Intermediate H2: 189 mg. Automated flash chromatography (Heptane:EtOAc, elution with 89:11% v/v) provided tert-butyl 4-(6-chloro-4-((thiophen-2-ylmethyl)amino)pyrido[3,4-d]pyrimidin-2-yl)piperidine-1-carboxylate as a yellow solid; weight: 205 mg; Yield: 74%; Purity: 82.9% (UPLC-A); $^{1}$H-NMR (CDCl$_{3}$), δ (ppm): 9.00 (s, 1H), 7.54 (s, 1H), 7.26 (dd, 1H), 7.09 (dd, 1H), 6.99 (dd, 1H), 6.19 (t, 1H), 5.04 (d, 2H), 4.22 (dd, 2H), 3.66 (t, 1H), 3.05-2.76 (m, 3H), 2.10-1.84 (m, 3H), 1.48 (s, 9H); LR-MS (ESI+): m/z=460.2 Da [M+H]$^{+}$, calcd. for C$_{22}$H$_{26}$ClN$_{5}$O$_{2}$S: 459.1. This compound (205 mg, 0.37 mmol) was submitted to reaction under Boc-Deprotection Procedure above described for Examples 1-38 obtaining the title compound as a yellow solid; weight: 92 mg; Yield: 69%; Purity: 100% (UPLC-A); $^{1}$H-NMR (MeOD), δ (ppm): 8.92 (s, 1H), 8.23 (s, 1H), 7.28 (dd, 1H), 7.13 (dd, 1H), 6.92 (dd, 1H), 5.12 (d, 2H), 3.59-3.40 (m, 4H), 3.31-3.09 (m, 1H), 2.30-2.17 (m, 1H); LR-MS (ESI+): m/z=360.1 Da [M+H]$^{+}$, calcd. for C$_{17}$H$_{16}$ClN$_{5}$S: 359.1.

Example 45: 2-((6-chloro-2-(piperidin-4-yl)pyrido[3,4-d]pyrimidin-4-yl)amino)-N-methyl-N-phenylethane-1-sulfonamide

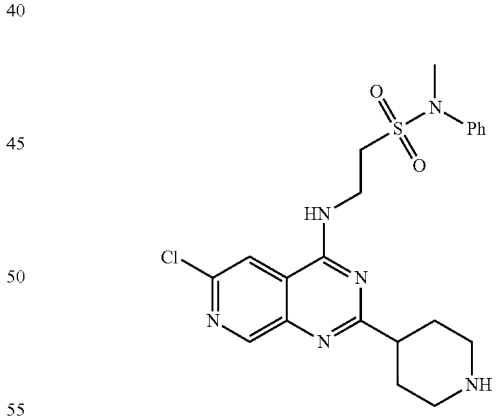

Intermediate H4: 280 mg. Automated flash chromatography (Heptane:EtOAc, product elution with 10:90% v/v) provided tert-butyl 4-(6-chloro-4-((2-(N-methyl-N-phenylsulfamoyl)ethyl)amino)pyrido[3,4-d]pyrimidin-2-yl)piperidine-1-carboxylate as a yellow solid; weight: 238 mg; Yield: 85%; Purity: 99.0% (UPLC-A); $^{1}$H-NMR (CDCl$_{3}$), δ (ppm): 8.96 (s, 1H), 7.54 (s, 1H), 7.38-7.24 (m, 5H), 4.27-4.04 (m, 4H), 3.41-3.34 (m, 1H), 3.36 (s, 3H), 2.96-2.65 (m, 4H), 2.00-1.63 (m, 4H), 1.47 (s, 9H); This compound (238 mg, 0.43 mmol) was submitted to reaction under Boc-deprotection Procedure described above for Examples 1-38 obtaining the title compound as a yellow solid; weight: 152 mg; Yield: 75%; Purity: 97.7% (UPLC-A); $^1$H-NMR (MeOD), δ (ppm): 9.14 (s, 1H), 8.37 (s, 1H), 7.57-7.17 (m, 5H), 4.37-4.16 (m, 2H), 3.76-3.58 (m, 1H), 3.62 (t, 2H), 3.51 (t, 2H), 3.39 (s, 3H), 3.30-3.10 (m, 2H), 2.54-2.10 (m, 4H); LR-MS (ESI+): m/z=461.2 Da [M+H]$^+$, calcd. for $C_{21}H_{25}ClN_6O_2S$: 460.1.

Step 12: Synthesis of Examples 46-61

General Synthetic Procedure D

The General Dehalogenation Procedure described in the present invention was an adapted procedure from those extracted from the protocols described in the following websites—PEPPSI™ CATALYST: Website: www.sigmaaldrich.com/content/dam/sigma-aldrich/docs/Aldrich/Bulletin/al_eppsi_activation_guide.pdf (downloaded on 2018/07/20)—PEPPSIM activation guide: Website: https://www.sigmaaldrich.com/content/dam/sigma-aldrich/docs/Aldrich/Bulletin/al_peppsi_activation_guide.pdf

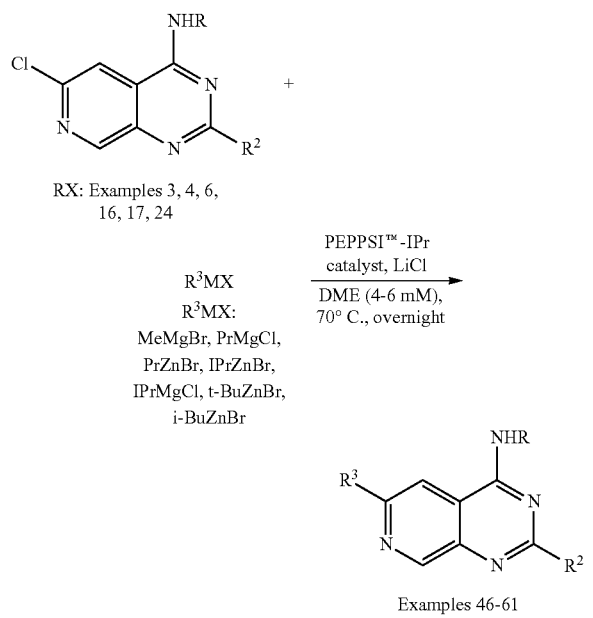

RX: Examples 3, 4, 6, 16, 17, 24

$R^3MX$
$R^3MX$:
MeMgBr, PrMgCl, PrZnBr, IPrZnBr, IPrMgCl, t-BuZnBr, i-BuZnBr

PEPPSI™-IPr catalyst, LiCl
DME (4-6 mM), 70° C., overnight

Examples 46-61

An oven dried Schlenk was charged with a stirbar, PEPPSI™—IPr (7 mg, 2 mol %) and LiCl (69 mg, 1.6 mmol, 3.2 equiv.) under Ar atmosphere and sealed with a septum. DME (0.8 mL, freshly dried over 4 Å molecular sieves activated in an oven dried Schienk heating at 650° C. under vacuum (<1 mmHg) just prior to use) was added and the suspension was stirred until PEPPSI-IPr was dissolved. After this time, the organohalide compound (RX, 0.5 mmol, 1 equiv.) was added and the mixture was stirred until complete solution of RX. In some cases, the addition of an extra DME 0.2-0.4 mL was necessary to dissolve RX. When an homogeneous solution was achieved, the organometallic compound (R$^3$MX, 0.8 mmol, 1.6 equiv.) was added dropwise via syringe under Ar atmosphere. The reaction turned into an orange-brown colour indicating an efficient activation of the catalyst. The septum was replaced with a screw capped glass stopcock under Ar atmosphere and was stirred at 70° C. over 18 h. The reaction was permitted to cool down to 22° C. and 10 mL of saturated NH$_4$Cl solution was added. The reaction was stirred at this temperature for 5 min to quench the unreacted organometallic (R$^3$MX) species. The mixture was transferred to a separatory funnel with 80 mL of EtOAc and 20 mL of saturated NH$_4$Cl solution. The phases were separated and the organic phase was washed with water (2×20 mL) and saturated NaCl solution (1×20 mL). The organic phase was dried over anhyd. Na$_2$SO$_4$ and filtered off a pad of Celite®. Volatiles were removed under reduced pressure giving a yellow oil, which was purified by automated flash column (EtOAc:MeOH) providing the corresponding product (Examples 46-61). The following compounds were obtained following the General Synthetic Procedure D above described for Examples 46-61:

Example 46: 6-methyl-2-(4-methylpiperazin-1-yl)-N-(thiophen-2-ylmethyl)pyrido[3,4-d]pyrimidin-4-amine

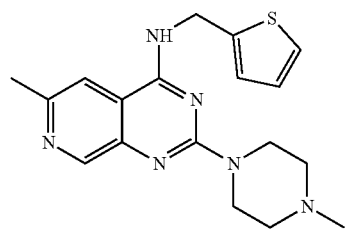

RX: 6-chloro-2-(4-methylpiperazin-1-yl)-N-(thiophen-2-ylmethyl)pyrido[3,4-d]pyrimidin-4-amine (Example 3), 187 mg; R$^3$MX: methylmagnesium bromide (3M in Et$_2$O), 0.27 mL, 0.8 mmol, 1.6 equiv.; Automated flash chromatography (EtOAc:MeOH, product elution with 93:7% v/v) provided the title compound as a yellow solid; weight: 0.104 g; Yield: 56%; Purity: 96.7% (UPLC-A), yellow solid; mp: 214.0-217.0° C.; $^1$H-NMR (CDCl$_3$), δ (ppm): 8.80 (s, 1H), 7.22 (dd, 1H), 7.14 (s, 1H), 7.04 (d, 1H), 6.95 (dd, 1H), 6.36 (t, NH), 4.94 (d, 2H), 3.97 (t, 4H), 2.51 (s, 3H), 2.50 (t, 4H), 2.35 (s, 3H); LR-MS (ESI+): m/z=355.1 Da [M+H]$^+$, calcd. for $C_{18}H_{22}N_6S$: 354.1.

Example 47: N-(furan-2-ylmethyl)-6-methyl-2-(4-methylpiperazin-1-yl)pyrido[3,4-d]pyrimidin-4-amine

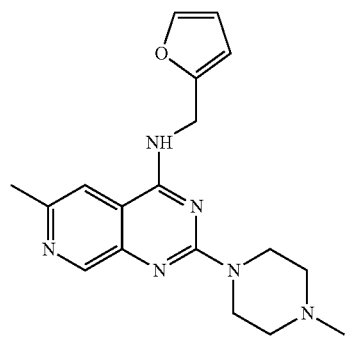

RX: 6-chloro-N-(furan-2-ylmethyl)-2-(4-methylpiperazin-1-yl)pyrido[3,4-d]pyrimidin-4-amine (Example 4), 179 mg; R$^3$MX: methylmagnesium bromide (3M in Et$_2$O), 0.27 mL, 0.8 mmol, 1.6 equiv.; Automated flash chromatography (EtOAc:MeOH, product elution with 95:5% v/v) provided the title compound as a yellow solid; weight: 0.080 g; Yield: 45%; Purity: 92.5% (UPLC-A); $^1$H-NMR (CDCl$_3$), δ (ppm): 8.80 (s, 1H), 7.39 (dd, 1H), 7.011 (s, 1H), 6.36 (dd, 1H), 6.31 (dd, 1H), 5.97 (t, NH), 4.77 (d, 2H), 3.95 (t, 4H), 3.42 (s, 3H), 2.50 (t, 4H), 2.35 (s, 3H): LR-MS (ESI+): m/z=339.1 Da [M+H]$^+$, calcd. for C$_{16}$H$_{22}$N$_6$O: 338.1.

Example 48: 6-methyl-2-(4-methylpiperazin-1-yl)-N-(2-(thiophen-2-yl)ethyl)pyrido[3,4-d]pyrimidin-4-amine

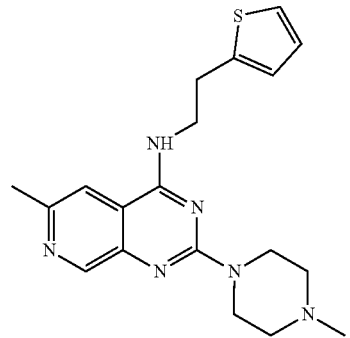

RX: 6-chloro-2-(4-methylpiperazin-1-yl)-N-(2-(thiophen-2-yl)ethyl)pyrido[3,4-d]pyrimidin-4-amine (Example 6), 194 mg; R$^3$MX: methylmagnesium bromide (3M in Et$_2$O), 0.27 mL, 0.8 mmol, 1.6 equiv.; Automated flash chromatography (EtOAc:MeOH, product elution with 97:3% v/v) provided the title compound as a yellow solid; weight: 0.161 g; Yield: 82%; Purity: 97.2% (UPLC-A), yellow solid; mp: 171.1-176.6° C.; $^1$H-NMR (CDCl$_3$), δ (ppm): 8.80 (s, 1H), 7.19 (dd, 1H), 7.03 (s, 1H), 6.98 (dd, 1H), 6.86 (d, 1H), 5.92 (dd, NH), 3.95 (t, 4H), 3.86 (dd, 2H), 3.23 (t, 2H), 2.55 (s, 3H), 2.50 (t, 4H), 2.35 (s, 3H); LR-MS (ESI+): m/z=369.1 Da [M+H]$^+$, calcd. for C$_{19}$H$_{24}$N$_6$S: 368.1.

Example 49: 2-(4-methylpiperazin-1-yl)-6-propyl-N-(thiophen-2-ylmethyl)pyrido[3,4-d]pyrimidin-4-amine

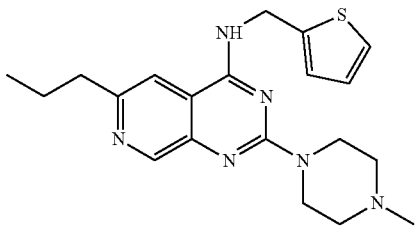 [SMILES: CCCc1cc2c(NCc3cccs3)nc(N3CCN(C)CC3)nc2cn1]

RX: 6-chloro-2-(4-methylpiperazin-1-yl)-N-(thiophen-2-ylmethyl)pyrido[3,4-d]pyrimidin-4-amine (Example 3), 187 mg; R$^3$MX: n-Propylzinc bromide (0.5M in THF), 1.6 mL, 0.8 mmol, 1.6 equiv.; Automated flash chromatography (EtOAc:MeOH, product elution with 95:5% v/v) provided the title compound as a yellow solid; weight: 0.185 g; Yield: 97%; Purity: 95.1% (UPLC-A); mp: 54.4-62.3° C.; $^1$H-NMR (CDCl$_3$), δ (ppm): 8.83 (s, 1H), 7.24 (dd, 1H), 7.09 (s, 1H), 7.05 (d, 1H), 6.97 (dd, 1H), 6.17 (t, NH), 4.95 (d, 2H), 3.99 (t, 4H), 2.75 (t, 2H), 2.54 (t, 4H), 2.37 (s, 3H), 1.79-1.66 (m, 2H), 0.92 (t, 3H); LR-MS (ESI+): m/z=383.2 Da [M+H]$^+$, calcd. for C$_{20}$H$_{26}$N$_6$S: 382.2.

Example 50: 2-(4-methylpiperazin-1-yl)-6-propyl-N-(2-(thiophen-2-yl)ethyl)pyrido[3,4-d]pyrimidin-4-amine

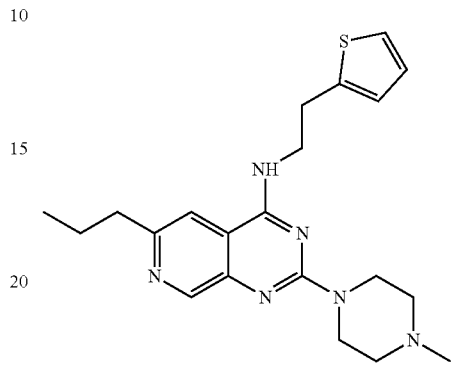

RX: 6-chloro-2-(4-methylpiperazin-1-yl)-N-(2-(thiophen-2-yl)ethyl)pyrido[3,4-d]pyrimidin-4-amine (Example 6), 194 mg; R$^3$MX: n-Propylmagnesium chloride (2M in Et$_2$O), 0.4 mL, 0.8 mmol, 1.6 equiv.; Automated flash chromatography (EtOAc:MeOH, product elution with 90:10% v/v) provided the title compound as a yellow oil; weight: 0.023 g; Yield: 12%; Purity: 95.4% (UPLC-A); $^1$H-NMR (CDCl$_3$), δ (ppm): 8.83 (s, 1H), 7.20 (dd, 1H), 6.98 (s, 1H), 6.98 (d, 1H), 6.87 (d, 1H), 5.78 (t, NH), 3.96 (t, 4H), 3.87 (dd, 2H), 3.24 (t, 2H), 2.77 (t, 2H), 2.51 (t, 4H), 2.36 (s, 3H), 1.79-1.71 (m, 2H), 0.95 (t, 3H); LR-MS (ESI+): m/z=397.2 Da [M+H]$^+$, calcd. for C$_{21}$H$_{28}$N$_6$S: 396.2.

Example 51: N-(furan-2-ylmethyl)-6-isopropyl-2-(4-methylpiperazin-1-yl)pyrido[3,4-d]pyrimidin-4-amine

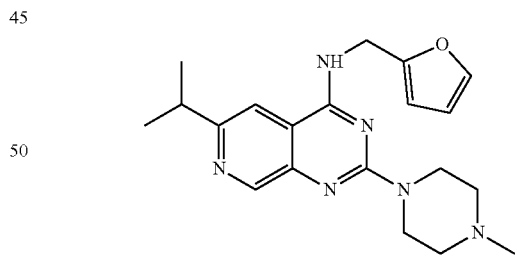

RX: 6-chloro-N-(furan-2-ylmethyl)-2-(4-methylpiperazin-1-yl)pyrido[3,4-d]pyrimidin-4-amine (Example 4), 179 mg; R$^3$MX: i-Propylzinc chloride (1M in MeTHF), 0.8 mL, 0.8 mmol, 1.6 equiv.; Automated flash chromatography (EtOAc:MeOH, product elution with 97:3% v/v) provided the title compound as a yellow solid; weight 0.030 g; Yield: 13%; Purity: 95.4% (UPLC-A); $^1$H-NMR (CDCl$_3$), δ (ppm): 8.85 (s, 1H), 7.41 (dd, 1H), 7.06 (s, 1H), 6.37 (dd, 1H), 6.33 (dd, 1H), 5.83 (t, NH), 4.79 (d, 2H), 3.96 (t, 4H), 3.09 (sept, 1H), 2.51 (t, 4H), 2.36 (s, 3H), 1.32 (d, 6H); LR-MS (ESI+): m/z=367.2 Da [M+H]$^+$, calcd. for C$_{20}$H$_{26}$N$_6$O: 366.2.

Example 52: 6-isopropyl-2-(4-methylpiperazin-1-yl)-N-(thiophen-2-ylmethyl)pyrido[3,4-d]pyrimidin-4-amine

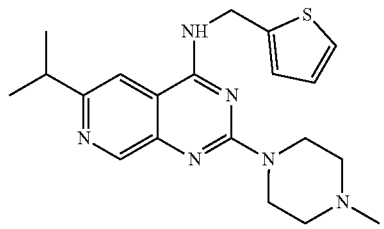 [SMILES: CC(C)c1cc2c(NCc3cccs3)nc(N3CCN(C)CC3)nc2cn1]

RX: 6-chloro-2-(4-methylpiperazin-1-yl)-N-(thiophen-2-ylmethyl)pyrido[3,4-d]pyrimidin-4-amine (Example 3), 187 mg; R³MX: i-Propylzinc bromide (0.5M in THF), 1.6 mL, 0.8 mmol, 1.6 equiv.; Automated flash chromatography (EtOAc:MeOH, product elution with EtOAc 100% v/v) provided the title compound as a yellow solid; weight: 0.177 g; Yield: 93%; Purity: 96.4% (UPLC-A); ¹H-NMR (CDCl₃), δ (ppm): 8.84 (s, 1H), 7.22 (dd, 1H), 7.15 (s, 1H), 7.04 (d, 1H), 6.95 (dd, 1H), 6.47 (t, NH), 4.95 (d, 2H), 3.98 (t, 4H), 3.05 (sept, 1H), 2.50 (t, 4H), 2.34 (s, 3H), 1.27 (d, 6H); LR-MS (ESI+): m/z=383.1 Da [M+H]⁺, calcd. for $C_{20}H_{26}N_RS$: 382.2.

Example 53: 6-isopropyl-2-(4-methylpiperazin-1-yl)-N-(2-(thiophen-2-yl)ethyl)pyrido[3,4-d]pyrimidin-4-amine

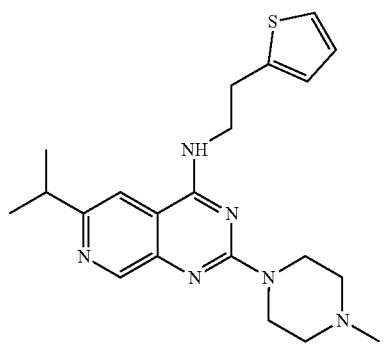 [SMILES: CC(C)c1cc2c(NCCc3cccs3)nc(N3CCN(C)CC3)nc2cn1]

RX: 6-chloro-2-(4-methylpiperazin-1-yl)-(2-(thiophen-2-yl)ethyl)pyrido[3,4-d]pyrimidin-4-amine (Example 6), 194 mg; R³MX: i-Propylzinc bromide (0.5M in THF), 1.6 mL, 0.8 mmol, 1.6 equiv.; Automated flash chromatography (EtOAc:MeOH, product elution with EtOAc 100% v/v) provided the title compound as a yellow oil; weight: 0.164 g; Yield: 79%; Purity: 95.0% (UPLC-A); ¹H-NMR (CDCl₃), δ (ppm): 8.83 (s, 1H), 7.18 (dd, 1H), 7.12 (s, 1H), 6.97 (dd, 1H), 6.86 (d, 1H), 6.36 (t, NH), 3.97 (t, 4H), 3.85 (dd, 2H), 3.06 (sept, 1H), 2.53 (t, 4H), 2.35 (s, 3H), 1.28 (d, 6H); LR-MS (ESI+): m/z=397.1 Da [M+H]⁺, calcd. for $C_{21}H_{26}N_6S$: 396.2.

Example 54: 2-((6-isopropyl-2-(4-methylpiperazin-1-yl)pyrido[3,4-d]pyrimidin-4-yl)amino)-N-phenylethane-1-sulfonamide

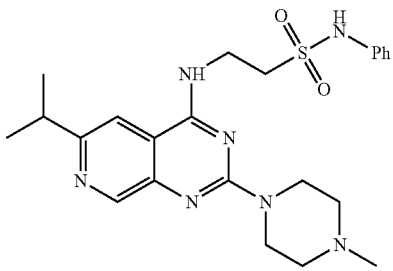 [SMILES: CC(C)c1cc2c(NCCS(=O)(=O)Nc3ccccc3)nc(N3CCN(C)CC3)nc2cn1]

RX: 2-((6-chloro-2-(4-methylpiperazin-1-yl)pyrido[3,4-d]pyrimidin-4-yl)amino)-N-phenylethane-1-sulfonamide (Example 16), 231 mg; R³MX: i-Propylzinc bromide (0.5M in THF), 1.6 mL, 0.8 mmol, 1.6 equiv.; Automated flash chromatography (EtOAc:MeOH, product elution with 95:5% v/v) provided the title compound as a yellow oil; weight: 0.131 g; Yield: 68%; Purity: 95.7% (UPLC-A); ¹H-NMR (CDCl₃), δ (ppm): 8.79 (s, 1H), 7.14 (s, 1H), 7.21-7.07 (m, 5H), 6.74 (t, NH), 4.03 (dd, 2H), 3.84 (t, 4H), 3.54 (t, 2H), 3.05 (sept, 1H), 2.49 (t, 4H), 2.35 (s, 3H), 1.27 (d, 6H); LR-MS (ESI+): m/z=470.2 Da [M+H]⁺, calcd. for $C_{23}H_{31}N_7O_2S$: 469.2.

Example 55: 2-((6-isopropyl-2-(4-methylpiperazin-1-yl)pyrido[3,4-d]pyrimidin-4-yl)amino)-N-methyl-N-phenylethane-1-sulfonamide

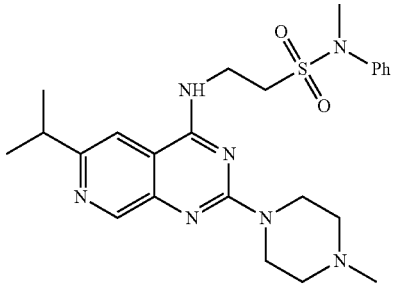 [SMILES: CC(C)c1cc2c(NCCS(=O)(=O)N(C)c3ccccc3)nc(N3CCN(C)CC3)nc2cn1]

RX: 2-((6-chloro-2-(4-methylpiperazin-1-yl)pyrido[3,4-d]pyrimidin-4-yl)amino)-N-methyl-N-phenylethane-1-sulfonamide (Example 17), 238 mg; R³MX: i-Propylzinc bromide (0.5M in THF), 1.6 mL, 0.8 mmol, 1.6 equiv.: Automated flash chromatography (EtOAc:MeOH, product elution with 95:5% v/v) provided the title compound as a yellow oil; weight: 0.0616 g; Yield: 57%; Purity: 95.8% (UPLC-A); ¹H-NMR (CDCl₃), δ (ppm): 8.84 (s, 1H), 7.37-7.35 (m, 5H), 7.01 (s, 1H), 6.27 (t, NH), 4.09 (dd, 2H), 3.90 (t, 4H), 3.39 (t, 2H), 3.36 (s, 3H), 3.10 (sept, 1H), 2.50 (t, 4H), 2.37 (s, 3H), 1.32 (d, 6H); LR-MS (ESI+): m/z=484.3 Da [M+H]⁺, calcd. for $C_{24}H_{33}N_4O_2S$: 483.2.

Example 56: 6-(tert-butyl)-N-(furan-2-ylmethyl)-2-(4-methylpiperazin-1-yl)pyrido[3,4-d]pyrimidin-4-amine

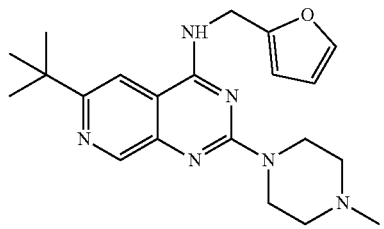 [SMILES: CN1CCN(c2nc(NCc3ccco3)c3cc(C(C)(C)C)ncc3n2)CC1]

RX: 6-chloro-N-(furan-2-ylmethyl)-2-(4-methylpiperazin-1-yl)pyrido[3,4-d]pyrimidin-4-amine (Example 4), 179 mg; $R^3MX$: tert-Butylzinc bromide (0.5M in THF), 1.6 mL, 0.8 mmol, 1.6 equiv.; Automated flash chromatography (EtOAc:MeOH, product elution with EtOAc 100% v/v) provided the title compound as a yellow oil; weight: 0.036 g; Yield: 16%; Purity: 85.5% (UPLC-A); $^1$H-NMR (CDCl$_3$). δ (ppm): 8.14 (d, 1H), 7.39 (dd, 1H), 7.12 (d, 1H), 6.35 (dd, 1H), 6.30 (dd, 1H), 5.79 (t, NH), 4.76 (d, 2H), 3.96 (t, 4H), 2.50 (t, 4H), 2.36 (s, 3H), 1.61 (s 9H); LR-MS (ESI+): m/z=381.2 Da [M+H]$^+$, calcd. for C$_{21}$H$_{28}$N$_6$O: 380.2.

Example 57: 6-(tert-butyl)-2-(4-methylpiperazin-1-yl)-N-(thiophen-2-ylmethyl)pyrido[3,4-d]pyrimidin-4-amine

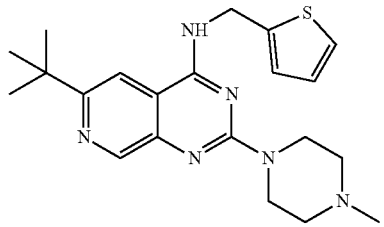 [SMILES: CN1CCN(c2nc(NCc3cccs3)c3cc(C(C)(C)C)ncc3n2)CC1]

RX: 6-chloro-2-(4-methylpiperazin-1-yl)-N-(thiophen-2-ylmethyl)pyrido[3,4-d]pyrimidin-4-amine (Example 3), 187 mg; $R^3MX$: tert-Butylzinc bromide (0.5M in THF), 1.6 mL, 0.8 mmol, 1.6 equiv.; Automated flash chromatography (EtOAc:MeOH, product elution with EtOAc 100% v/v) provided the title compound as a brown oil; weight: 0.006 g; Yield: 2%; Purity: 74% (UPLC-A); $^1$H-NMR (CDCl$_3$). δ (ppm): 8.14 (d, 1H), 7.24 (dd, 1H), 7.09 (d, 1H), 7.07 (d, 1H), 6.98 (dd, 1H), 5.82 (t, NH), 4.95 (d, 2H), 4.00 (t, 4H), 2.54 (t, 4H), 2.37 (s, 3H), 1.61 (s 9H); LR-MS (ESI+): m/z=397.3 Da [M+H]$^+$, calcd. for C$_{21}$H$_{28}$N$_6$S: 396.2.

Example 58: N-(furan-2-ylmethyl)-6-isobutyl-2-(4-methylpiperazin-1-yl)pyrido[3,4-d]pyrimidin-4-amine

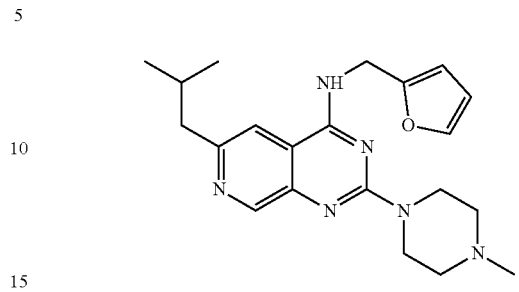

RX: 6-chloro-N-(furan-2-ylmethyl)-2-(4-methylpiperazin-1-yl)pyrido[3,4-d]pyrimidin-4-amine (Example 4), 179 mg; $R^3MX$: i-Butylzinc bromide (0.5M In THF), 1.6 mL, 0.8 mmol, 1.6 equiv.; Automated flash chromatography (EtOAc:MeOH, product elution with 94:6% v/v) provided the title compound as a brown oil; weight: 0.089 g; Yield: 35%; Purity: 90.7% (UPLC-A); $^1$H-NMR (CDCl$_3$), δ (ppm): 8.77 (s, 1H), 7.33 (dd, 1H), 6.98 (s, 1H), 6.29 (dd, 1H), 6.25 (dd, 1H), 5.88 (t, NH), 4.70 (d, 2H), 3.89 (t, 4H), 2.58 (d, 2H), 2.45 (t, 4H), 2.29 (s, 3H), 2.04 (m, 1H), 0.83 (d, 6H); LR-MS (ESI+): m/z=381.2 Da [M+H]$^+$, calcd. for C$_{21}$H$_{28}$N$_6$O: 380.2.

Example 59: 6-isobutyl-2-(4-methylpiperazin-1-yl)-N-(thiophen-2-ylmethyl)pyrido[3,4-d]pyrimidin-4-amine

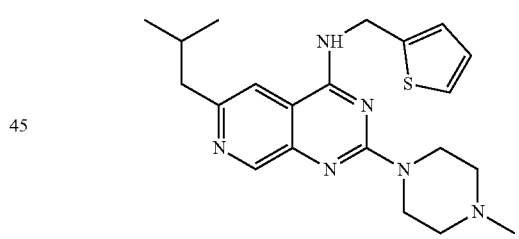

RX: 6-chloro-2-(4-methylpiperazin-1-yl)-N-(thiophen-2-ylmethyl)pyrido[3,4-d]pyrimidin-4-amine (Example 3), 187 mg; $R^3MX$: i-Butylzinc bromide (0.5M in THF), 1.6 mL, 0.8 mmol, 1.6 equiv.; Automated flash chromatography (EtOAc: MeOH, product elution with 95:05% v/v) provided the title compound as a yellow oil; weight: 0.0198 g; Yield: 9%; Purity: 88.1% (UPLC-A); $^1$H-NMR (CDCl$_3$), δ (ppm): 8.85 (s, 1H), 7.26 (dd, 1H), 7.09 (s, 1H), 7.01-6.98 (m, 2H), 5.84 (t, NH), 4.97 (d, 2H), 3.98 (t, 4H), 2.65 (d, 2H), 2.50 (t, 4H), 2.35 (s, 3H), 2.17-2.06 (m, 1H), 0.91 (d, 6H); LR-MS (ESI+): m/z=397.3 Da [M+H]$^4$, calcd. for C$_{21}$H$_{28}$N$_6$S: 396.2.

Example 60: 6-methyl-2-(piperazin-1-yl)-N-(thiophen-2-ylmethyl)pyrido[3,4-d]pyrimidin-4-amine

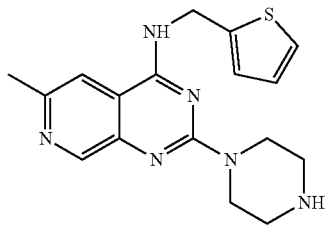 [SMILES: Cc1cc2c(NCc3cccs3)nc(N3CCNCC3)nc2cn1]

The compound was prepared by reaction of 6-chloro-2-(piperazin-1-yl)-N-(thiophen-2-ylmethyl)pyrido[3,4-d]pyrimidin-4-amine (Example 24) (0.414 g, 1 mmol, 1 equiv.) with di-tert-butyl dicarbonate (241 mg, 1.1 mmol, 1.1 equiv.) in tert-butanol (0.7 mL, 0.7M) at 50° C. for 16 h. After this time, the mixture was diluted in 50 mL of dichloromethane and the organic phase was washed with hot water (6×20 mL). The organic phase was dried over anhyd. $Na_2SO_4$ and volatiles were removed under reduced pressure to yield tert-butyl 4-(6-chloro-4-((thiophen-2-ylmethyl)amino)pyrido[3,4-d]pyrimidin-2-yl)piperazine-1-carboxylate as a yellow solid; weight: 0.404 g; Yield: 78%; Purity: 89% (UPLC-A). The so-obtained product was used without further purification as RX reagent in the General Synthetic Procedure D; RX: tert-butyl 4-(6-chloro-4-((thiophen-2-ylmethyl)amino)pyrido[3,4-d]pyrimidin-2-yl)piperazine-1-carboxylate, 231 mg; $R^3MX$: methylmagnesium bromide (3M in $Et_2O$), 0.27 mL, 0.8 mmol, 1.6 equiv.; work-up of the reaction provided tert-butyl 4-(6-methyl-4-((thiophen-2-ylmethyl)amino)pyrido[3,4-d]pyrimidin-2-yl)piperazine-1-carboxylate with high purity 87% (UPLC-A). The so-obtained product was submitted without further purification to reaction under the Boc-Deprotection Procedure above described for Examples 1-38 furnishing the title compound as a yellow solid; weight: 0.148 g; Yield: 82.0%; Purity: 88.2% (UPLC-A); $^1$H-NMR (MeOD), δ (ppm): 8.62 (s, 1H), 7.62 (s, 1H), 7.26 (dd, 1H), 7.09 (d, 1H), 6.96 (dd, 1H), 4.93 (d, 2H), 4.0 (t, 4H), 3.01 (t, 4H), 2.57 (t, 3H); LR-MS (ESI+): m/z=341.1 Da $[M+H]^+$, calcd. for $C_{17}H_{20}N_6S$: 340.2.

Example 61: 2-(piperazin-1-yl)-6-propyl-N-(thiophen-2-ylmethyl)pyrido[3,4-d]pyrimidin-4-amine

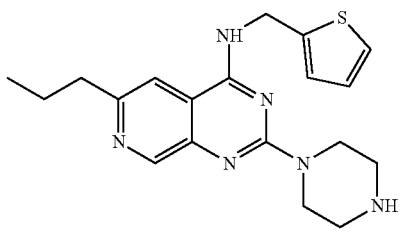 [SMILES: CCCc1cc2c(NCc3cccs3)nc(N3CCNCC3)nc2cn1]

The compound was prepared by reaction of 6-chloro-2-(piperazin-1-yl)-N-(thiophen-2-ylmethyl)pyrido[3,4-d]pyrimidin-4-amine (Example 24) (0.414 g, 1 mmol, 1 equiv.) di-tert-butyl dicarbonate (241 mg, 1.1 mmol, 1.1 equiv.) in tert-butanol (0.7 mL, 0.7M) at 50° C. for 16 h. After this time, the mixture was diluted in 50 mL of dichloromethane and the organic phase was washed with hot water (6×20 mL). The organic phase was dried over anhyd. $Na_2SO_4$ and volatiles were removed under reduced pressure yielding tert-butyl 4-(6-chloro-4-((thiophen-2-ylmethyl)amino) pyrido[3,4-d]pyrimidin-2-yl)piperazine-1-carboxylate as a yellow solid; weight: 0.329 g; Yield: 65%; Purity: 91% (UPLC-A). The so-obtained product was used without further purification as RX reagent in the General Synthetic Procedure D; RX: tert-butyl 4-(6-chloro-4-((thiophen-2-ylmethyl)amino)pyrido[3,4-d]pyrimidin-2-yl)piperazine-1-carboxylate, 232 mg; $R^3MX$: n-Propylzinc bromide (0.5M In THF), 1.6 mL, 0.8 mmol, 1.6 equiv.; Automated flash chromatography (product elution EtOAc with 100% v/v) tert-butyl 4-(6-propyl-4-((thiophen-2-ylmethyl)amino) pyrido[3,4-d]pyrimidin-2-yl)piperazine-1-carboxylate was obtained as a yellow solid; weight: 0.087 g; Yield: 36%; Purity: 96.3% (UPLC-A); $^1$H-NMR ($CDCl_3$), δ (ppm): 8.84 (s, 1H), 7.24 (dd, 1H), 7.09 (s, 1H), 7.07 (d, 1H), 6.97 (t, 1H), 6.13 (t, NH), 4.96 (d, 2H), 3.93 (t, 4H), 3.52 (t, 4H), 2.76 (t, 2H), 1.80-1.68 (m, 2H), 1.50 (s, 9H), 0.93 (t, 3H); LR-MS (ESI+): m/z=469.3 Da $[M+H]^+$, calcd. for $C_{24}H_{32}N_6O_2S$: 468.2.

Tert-butyl 4-(6-propyl-4-((thiophen-2-ylmethyl)amino) pyrido[3,4-d]pyrimidin-2-yl)piperazine-1-carboxylate (87 mg, 0.18 mmol) was submitted to reaction under the Boc-Deprotection Procedure above described for Examples 1-38 giving the title compound as a yellow solid; weight: 0.068 g; Yield: 95.0%; Purity: 91.5% (UPLC-A); mp: 70.1-81.6° C.; $^1$H-NMR (MeOD), δ (ppm): 8.64 (d, 1H), 7.61 (d, 1H), 7.25 (ddd, 1H), 7.08 (dd, 1H), 6.94 (dd, 1H), 4.92 (d, 2H), 3.92 (t, 4H), 2.89 (t, 4H), 2.78 (t, 2H), 1.83-1.71 (m, 2H), 0.98 (t, 3H); $^1$H-NMR ($CDCl_3$), δ (ppm): 8.83 (s, 1H), 7.25 (t, 1H), 7.08 (s, 1H), 7.07 (d, 1H), 6.97 (t, 1H), 6.10 (t, NH), 4.95 (d, 2H), 3.98 (t, 4H), 3.01 (t, 4H), 2.76 (t, 2H), 2.50 (t, NH), 1.80-1.68 (m, 2H), 0.93 (t, 3H); LR-MS (ESI+): m/z=369.1 Da $[M+H]^+$, calcd. for $C_{19}H_{24}N_5S$: 368.2.

Step 13: Synthesis of Examples 62-67

General Dehalogenation Procedure:

The General Dehalogenation Procedure described in the present invention was an adapted procedure published by Jang et al., Tet. Lett. 2006, 47, 8917-8920.

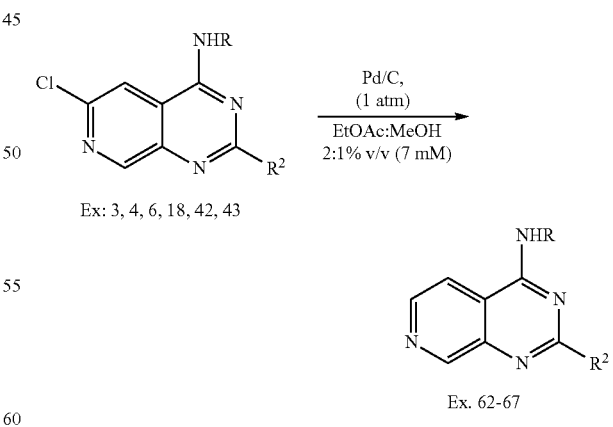

In a 250 ml oven dried round bottom flask, the appropriate compound (Example 3, 4, 6, 18, 42 or 43) (0.5 mmol, 1 equiv.) was dissolved in a mixture of solvents [EtOAc (46 mL) and MeOH (23 mL, HPLC quality)] under Ar atmosphere. Pd/C 10% w/w (26 mg, 0.025 mmol, 0.05 equiv.) was added and three cycles of $H_2$/vacuum were done in order to purge residual gases from the solvents. The reaction mixture was stirred at 22° C. under $H_2$ atmosphere. The progress of the reaction was monitored by TLC (EtOAc:MeOH 90:10% v/v). When full conversion was achieved (1-3 days) the reaction was filtered through a pad of Celite® in a filter plate and solvents were removed under reduced pressure providing a yellow oil, which was purified by automated flash chromatography (EtOAc:MeOH) providing the Examples (62-67).

The following compounds were obtained following the General Dehalogenation Procedure described above for Examples 62-67:

Example 62: 2-(4-methylpiperazin-1-yl)-N-(thiophen-2-ylmethyl)pyrido[3,4-d]pyrimidin-4-amine

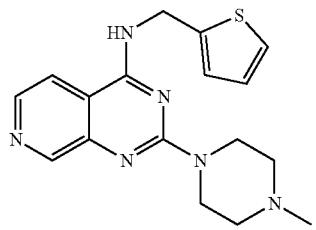 [SMILES: CN1CCN(c2nc(NCc3cccs3)c3ccncc3n2)CC1]

Example 3 (187 mg, 0.5 mmol, 1 equiv.). Automated flash chromatography (EtOAc:MeOH, product elution with 90:10% v/v) provided the title compound as a yellow solid; weight: 113 mg; Yield: 60%; Purity: 90.2% (UPLC-A); $^1$H-NMR (CDCl$_3$), δ (ppm): 8.86 (s, 1H), 8.18 (d, 1H), 7.26 (d, 1H), 7.24 (dd, 1H), 7.06 (d, 1H), 6.97 (dd, 1H), 6.18 (t, NH), 4.94 (d, 2H), 4.0 (t, 4H), 2.54 (t, 3H), 2.37 (s, 3H); LR-MS (ESI+): m/z=341.2 Da [M+H]$^+$, calcd. for $C_{17}H_{20}N_6S$: 340.2.

Example 63: N-(furan-2-ylmethyl)-2-(4-methylpiperazin-1-yl)pyrido[3,4-d]pyrimidin-4-amine

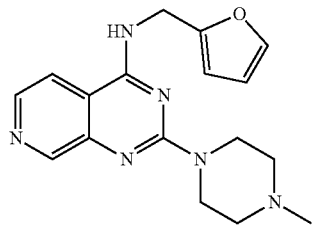 [SMILES: CN1CCN(c2nc(NCc3ccco3)c3ccncc3n2)CC1]

Example 4 (179 mg, 0.5 mmol, 1 equiv.). Automated flash chromatography (EtOAc:MeOH, product elution with 90:10% v/v) provided the title compound as a yellow solid; weight: 129 mg; Yield: 67%; Purity: 83.9% (UPLC-A); $^1$H-NMR (CDCl$_3$), δ (ppm): 8.86 (s, 1H), 7.20 (d, 1H), 7.39 (dd, 1H), 7.29 (t, 1H), 6.34 (dt, 2H), 6.03 (t, NH), 4.78 (d, 2H), 3.99 (t, 4H), 2.53 (t, 4H), 2.38 (a, 3H); LR-MS (ESI+): m/z=325.1 Da [M+H]$^+$, calcd. for $C_{17}H_{20}N_6O$: 324.1.

Example 64: 2-(4-methylpiperazin-1-yl)-N-(2-(thiophen-2-yl)ethyl)pyrido[3,4-d]pyrimidin-4-amine

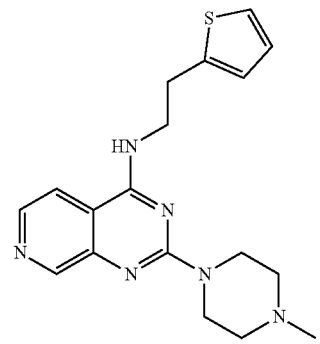 [SMILES: CN1CCN(c2nc(NCCc3cccs3)c3ccncc3n2)CC1]

Example 6 (194 mg, 0.5 mmol, 1 equiv.). Automated flash chromatography (EtOAc:MeOH, product elution with 90:10% v/v) provided the title compound as a yellow solid; weight: 111.2 mg; Yield: 62%: Purity: 98.8% (UPLC-A): $^1$H-NMR (CDCl$_3$), δ (ppm): 8.86 (s, 1H), 8.19 (d, 1H), 7.20 (dd, 1H), 7.14 (d, 1H), 6.98 (dd, 1H), 6.87 (dd, 1H), 5.75 (t, NH), 3.98 (t, 4H), 3.88 (q, 2H), 3.24 (t, 2H), 2.52 (t, 4H), 2.37 (s, 3H); LR-MS (ESI+): m/z=355.1 Da [M+H]$^+$, calcd. for $C_{18}H_{22}N_6S$: 354.2.

Example 65: 2-(4-methylpiperazin-1-yl)-N-(2-(morpholinosulfonyl)ethyl)pyrido[3,4-d]pyrimidin-4-amine

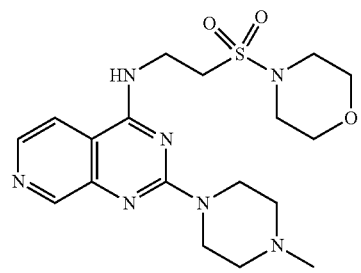 [SMILES: CN1CCN(c2nc(NCCS(=O)(=O)N3CCOCC3)c3ccncc3n2)CC1]

Example 18 (228 mg, 0.5 mmol, 1 equiv.). Automated flash chromatography (EtOAc:MeOH, product elution with 80:20% v/v) provided the title compound as a yellow solid; weight: 160 mg; Yield: 72%; Purity: 94.6% (UPLC-A); $^1$H-NMR (CDCl$_3$), δ (ppm): 8.71 (s, 1H), 8.17 (d, 1H), 7.73 (dd, 1H), 4.04 (dd, 2H), 3.98 (t, 4H), 3.73 (dd, 4H), 3.45 (dd, 2H), 3.27 (dd, 4H), 2.55 (t, 4H), 2.37 (s, 3H); LR-MS (ESI+): m/z=422.1 Da [M+H]$^+$, calcd. for $C_{18}H_2N_7OAS$: 421.2.

Example 66: 2-(1-methylpiperidin-4-yl)-N-(thiophen-2-ylmethyl)pyrido[3,4-d]pyrimidin-4-amine

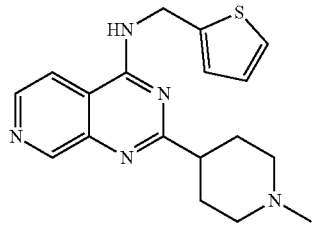 [SMILES: CN1CCC(c2nc(NCc3cccs3)c3ccncc3n2)CC1]

Example 42 (187 mg, 0.5 mmol, 1 equiv.). Automated flash chromatography on recersed-phase (Water/MeOH, product elution with 70:30% v/v) provided the title compound as a yellow solid; weight: 124 mg; Yield: 68%; Purity: 93.2% (UPLC-A); $^1$H-NMR (CDCl$_3$), δ (ppm): 9.21 (s, 1H), 8.55 (d, 1H), 7.46 (d, 1H), 7.25 (dd, 1H), 7.11 (dd, 1H), 6.98 (dd, 1H), 6.22 (t, NH), 5.05 (d, 2H), 3.26-3.14 (m, 2H), 3.02-2.88 (m, 1H), 2.51 (s, 3H), 2.40-2.14 (m, 6H); LR-MS (ESI+): m/z=340.2 Da [M+H]$^+$, calcd. for $C_{18}H_{20}N_5S$: 339.5.

Example 67: 2-(1-methylpiperidin-4-yl)-N-(2-(morpholinosulfonyl)ethyl)pyrido[3,4-d]pyrimidin-4-amine

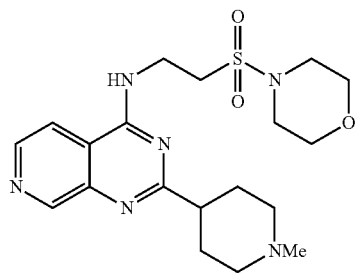 [SMILES: CN1CCC(c2nc(NCCS(=O)(=O)N3CCOCC3)c3ccncc3n2)CC1]

Example 43 (227 mg, 0.5 mmol, 1 equiv.). Automated flash chromatography on reversed-phase (Water/MeOH, product elution with 70:30% v/v) provided the title compound as a yellow solid; weight: 0.181 g; Yield: 25%; Purity: 58% (UPLC-A); $^1$H-NMR (CDCl$_3$), δ (ppm): 9.10 (s, 1H), 8.58 (d, 1H), 7.99 (d, 1H), 4.65 (t, 2H), 4.13 (t, 4H), 3.77 (t, 2H), 3.33 (dd, 4H), 3.06-2.98 (m, 2H), 2.95-2.81 (m, 1H), 2.41 (s, 3H), 2.38-2.14 (m, 6H); LR-MS (ESI+): m/z=421.1 Da [M+H]$^+$, calcd. for $C_{19}H_{25}N_6O_3S$: 420.1.

Biological Assays

H$_4$ Binding Assay

Materials

JNJ7777120, imetit, thioperamide, histamine and chemical reagents such as Tris-HCl and EDTA were supplied by Sigma-Aldrich, VUF10947 was synthetized at FAES FARMA facilities (Lamiako-Leioa, Spain), JNJ10191584 was purchased from Tocris Bioscience, multiscreen microplates (MSFBN6B50) were acquired from Merck Millipore, scintillation liquid (Microscint 20), human H$_4$ membranes (ES-393-M400UA) and $^3$H-histamina (NET 732) were provided by PerkinElmer.

Methods

Affinity for histamine H4-receptor was determined by H$_4$ Binding assay:

Membranes from CHO-K1 cells transfected with human H$_4$ receptor and microplates of 96-well format were used.

For competition studies cell membranes were homogenated in Tris-HCl 50 mM, EDTA 5 mM, pH 7.4 and added to the microplate at the concentration of approximately 15 μg/well. Membrane suspensions were incubated with test compounds for 15 min at 25° C. and binding reaction was initiated by the addition of the specific H$_4$ radioligand [PH] histamine at a final concentration of 5-8 nM ($K_D$=11.1 nM; $B_{max}$=4,13 pmol/mg protein). Non specific binding was defined using 10 μM unlabeled histamine and the total incubation volume was 275 μl per well.

Incubations were performed under gentle agitation at 25° C. for 60 min and concluding with a rapid vacuum filtration using pre-soaked filters (0.5% polyethylenimine). After ten rapid washes with cold wash buffer (50 mM Tris-HCl buffer) the filter plates were dried at room temperature for 30 min.

Finally, scintillation liquid (Microscint 20) was added to the whole microplate in order to measure the radioactivity reattained on the filters using a specific scintillation counter (Top Count—NXT). Curve analysis and values of IC$_{50}$ were determined using Grap Pad Prism program (GraphPad Software, San Diego, USA).

Test compounds were initially evaluated at one concentration (1 μM) and thereafter if significant displacement was observed (>40%) a concentration-response curve was conducted. Each test concentration was measured in triplicate.

As reference compounds JNJ7777120. JNJ10191584, imetit, thioperamide, and VUF-10497 were used.

H$_1$ Binding Assay

Materials

Cetirizine and pyrilamine were supplied by Sigma-Aldrich. Bilastine was synthetized at FAES FARMA facilities (Lamiako-Leioa, Spain), chemical reagents such as Na$_2$HPO$_4$, KH$_2$PO$_4$ or polyvinylpyrrolidone as well as multiscreen microplates (MSFBN6B50) were purchased from Merck Millipore, scintillation liquid (Microscint 20), human H$_1$ membranes (ES-390-M400UA) and $^3$H-pirilamina (NET 594) were provided by PerkinElmer.

Methods

Affinity for histamine H1-receptor was determined by H$_1$ Binding assay:

Membranes form CHO-K1 cells transfected with human H$_1$ receptor and microplates of 96-well format were used.

For competition studies cell membranes were homogenated in 50 mM phosphate buffer (Na$_2$HPO$_4$ and KH$_2$PO$_4$ mixed to pH 7.4 at 25° C.) and added to the microplate at the concentration of approximately 5 μg/well. Membrane suspensions were incubated with test compounds for 15 min at 25° C. and binding reaction was initiated by the addition of the specific H$_1$ radioligand [PH]pyrilamine at a final concentration of 0.75 nM ($K_D$=1.9 nM: $B_{max}$=16.1 pmol/mg protein). Non specific binding was defined using 10 μM unlabeled pyrilamine and the total incubation volume was 275 μl per well.

Incubations were performed until gentle agitation at 25° C. for 60 min and concluding with a rapid vacuum filtration using pre-soaked filters (5% polyvinylpyrrolidone). After ten rapid washes with cold wash buffer (50 mM phosphate buffer) the filter plates were dried at room temperature for 30 min.

Finally, scintillation liquid (Microscint 20) was added to the whole microplate in order to measure the radioactivity retained on the filters using an specific scintillation counter (Top Count—NXT). Curve analysis and values of $IC_{50}$ were determined using Grap Pad Prism program (GraphPad Software, San Diego, USA).

Test compounds were initially evaluated at one concentration (1 μM) and thereafter if significant displacement was observed (>40%) a concentration-response curve was conducted. Each test concentration was measured in triplicate.

As reference compounds pyrilamine, cetirizine and Bilastine were used.

TABLE 1

Affinity for histamine $H_4$ and $H_1$-receptor for compounds of the invention.

| EXAMPLE | STRUCTURE | ACTIVITY CLASS $hH_4R$ | ACTIVITY CLASS $hH_1R$ |
| --- | --- | --- | --- |
| 3 | | A | B |
| 4 | | A | B |
| 5 | | B | B |
| 6 | | B | — |
| 7 | | B | — |

TABLE 1-continued

Affinity for histamine H₄ and H₁-receptor for compounds of the invention.

| EXAMPLE | STRUCTURE | ACTIVITY CLASS hH₄R | ACTIVITY CLASS hH₁R |
|---|---|---|---|
| 8 | | B | — |
| 14 | | A | — |
| 15 | | A | — |
| 16 | | A | — |
| 17 | | A | B |

TABLE 1-continued

Affinity for histamine H$_4$ and H$_1$-receptor for compounds of the invention.

| EXAMPLE | STRUCTURE | ACTIVITY CLASS hH$_4$R | ACTIVITY CLASS hH$_1$R |
|---------|-----------|------------------------|------------------------|
| 18 | | A | — |
| 22 | | B | — |
| 24 | | A | B |
| 25 | | B | B |
| 26 | | A | — |

TABLE 1-continued

Affinity for histamine H₄ and H₁-receptor for compounds of the invention.

| EXAMPLE | STRUCTURE | ACTIVITY CLASS hH₄R | ACTIVITY CLASS hH₁R |
|---------|-----------|---------------------|---------------------|
| 27 | | A | — |
| 28 | | A | — |
| 37 | | A | — |
| 38 | | A | — |

TABLE 1-continued

Affinity for histamine $H_4$ and $H_1$-receptor for compounds of the invention.

| EXAMPLE | STRUCTURE | ACTIVITY CLASS hH$_4$R | ACTIVITY CLASS hH$_1$R |
|---------|-----------|------------------------|------------------------|
| 41 | | A | — |
| 46 | | B | — |
| 49 | | B | B |
| 50 | | B | — |
| 51 | | B | — |

TABLE 1-continued

Affinity for histamine H₄ and H₁-receptor for compounds of the invention.

| EXAMPLE | STRUCTURE | ACTIVITY CLASS hH₄R | ACTIVITY CLASS hH₁R |
|---------|-----------|---------------------|---------------------|
| 52 | | A | — |
| 53 | | B | — |
| 54 | | A | B |
| 60 | | B | B |
| 68 | | B | B |

TABLE 1-continued
Affinity for histamine H₄ and H₁-receptor for compounds of the invention.
| EXAMPLE | STRUCTURE | ACTIVITY CLASS hH₄R | ACTIVITY CLASS hH₁R |
|---|---|---|---|
| 69 | 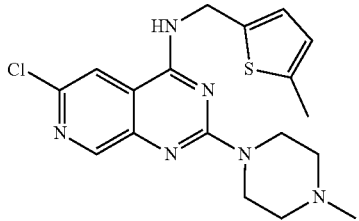 [SMILES: Cc1ccc(CNc2nc(N3CCN(C)CC3)nc3cnc(Cl)cc23)s1] | B | B |
| 70 | 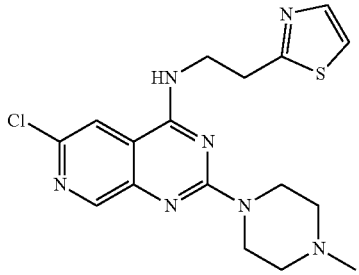 [SMILES: CN1CCN(c2nc(NCCc3nccs3)c3cc(Cl)ncc3n2)CC1] | B | — |
| 71 | 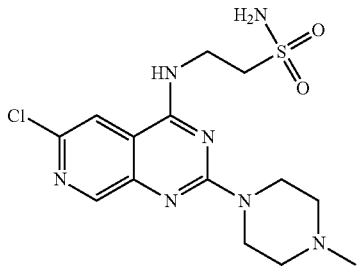 [SMILES: CN1CCN(c2nc(NCCS(N)(=O)=O)c3cc(Cl)ncc3n2)CC1] | A | — |
| 72 | 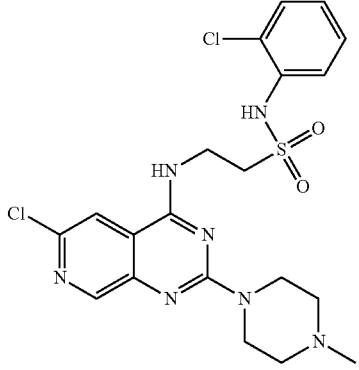 [SMILES: CN1CCN(c2nc(NCCS(=O)(=O)Nc3ccccc3Cl)c3cc(Cl)ncc3n2)CC1] | A | B |
| 73 | 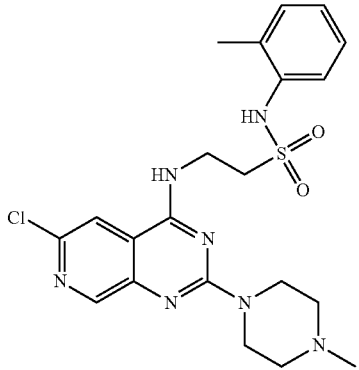 [SMILES: Cc1ccccc1NS(=O)(=O)CCNc1nc(N2CCN(C)CC2)nc2cnc(Cl)cc12] | A | — |

TABLE 1-continued

Affinity for histamine H₄ and H₁-receptor for compounds of the invention.

| EXAMPLE | STRUCTURE | ACTIVITY CLASS hH₄R | ACTIVITY CLASS hH₁R |
|---------|-----------|---------------------|---------------------|
| 74 | | A | B |
| 75 | | B | — |
| 76 | | A | — |

TABLE 1-continued

Affinity for histamine H₄ and H₁-receptor for compounds of the invention.

| EXAMPLE | STRUCTURE | ACTIVITY CLASS hH₄R | ACTIVITY CLASS hH₁R |
|---------|-----------|---------------------|---------------------|
| 77 | (3-trifluoromethoxyphenyl)-NH-SO₂-CH₂-CH₂-NH- linked to 6-chloro-2-(4-methylpiperazin-1-yl)pyrido[3,4-d]pyrimidin-4-yl | B | — |
| 78 | (3-trifluoromethylphenyl)-NH-SO₂-CH₂-CH₂-NH- linked to 6-chloro-2-(4-methylpiperazin-1-yl)pyrido[3,4-d]pyrimidin-4-yl | A | — |
| 79 | (3-methylphenyl)-NH-SO₂-CH₂-CH₂-NH- linked to 6-chloro-2-(4-methylpiperazin-1-yl)pyrido[3,4-d]pyrimidin-4-yl | A | — |

TABLE 1-continued

Affinity for histamine $H_4$ and $H_1$-receptor for compounds of the invention.

| EXAMPLE | STRUCTURE | ACTIVITY CLASS $hH_4R$ | ACTIVITY CLASS $hH_1R$ |
|---|---|---|---|
| 80 | (3-methoxyphenyl sulfonamide, ethylamino linker, 6-chloro-2-(4-methylpiperazin-1-yl)pyrido[3,4-d]pyrimidin-4-yl) | A | — |
| 81 | (3-methylthiophenyl sulfonamide, ethylamino linker, 6-chloro-2-(4-methylpiperazin-1-yl)pyrido[3,4-d]pyrimidin-4-yl) | A | — |
| 82 | (4-chlorophenyl sulfonamide, ethylamino linker, 6-chloro-2-(4-methylpiperazin-1-yl)pyrido[3,4-d]pyrimidin-4-yl) | A | — |

TABLE 1-continued
Affinity for histamine $H_4$ and $H_1$-receptor for compounds of the invention.
| EXAMPLE | STRUCTURE | ACTIVITY CLASS $hH_4R$ | ACTIVITY CLASS $hH_1R$ |
|---|---|---|---|
| 83 | 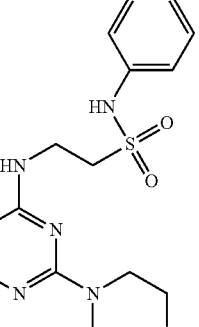 | B | — |
| 84 | 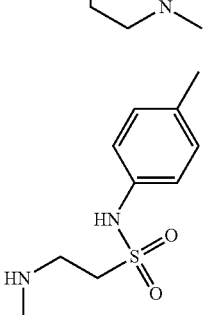 | A | — |
| 86 | 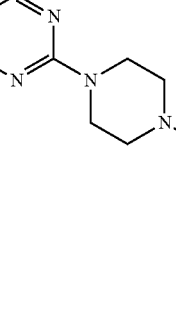 | A | — |

TABLE 1-continued

Affinity for histamine H₄ and H₁-receptor for compounds of the invention.

| EXAMPLE | STRUCTURE | ACTIVITY CLASS hH₄R | ACTIVITY CLASS hH₁R |
|---|---|---|---|
| 87 | | B | — |
| 88 | | A | — |
| 90 | | B | — |
| 93 | | A | B |

TABLE 1-continued

Affinity for histamine $H_4$ and $H_1$-receptor for compounds of the invention.

| EXAMPLE | STRUCTURE | ACTIVITY CLASS $hH_4R$ | ACTIVITY CLASS $hH_1R$ |
|---|---|---|---|
| 94 | | A | B |
| 95 | | A | B |
| 98 | | B | — |

ACTIVITY CLASS RANGE:
A: Ki < 100 nM
B: Ki < 1000 nM

Finally, the affinity for histamine H4 receptor of compound in Example 3 was compared with the corresponding quinazoline 30 and the pyrido[4,3-d]pyramidine isomer 3P by binding studies to $H_4$ receptor using the same protocol as described above. The Ki, % inhibition and $IC_{50}$ values are shown in Table 2.

TABLE 2

Affinity for histamine H4-receptor for comparative compounds

| Compound | Ki (nM) | % inh. | $IC_{50}$ (nM) |
|---|---|---|---|
| Ex. 3 | 0.75 | 94 | 1.74 |
| 3Q | 7.6 | — | — |

TABLE 2-continued

Affinity for histamine H4-receptor for comparative compounds

| Compound | Ki (nM) | % inh. | IC$_{50}$ (nM) |
|---|---|---|---|
| 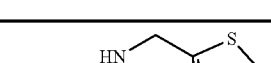 3P | 339.8 | 68 | 889 |

As shown above, the compounds of formula (I) of the invention provide an improved affinity for human histamine H$_4$-receptor over compounds the corresponding quinazoline and isomeric compounds.

The invention claimed is:

1. A compound of formula (I')

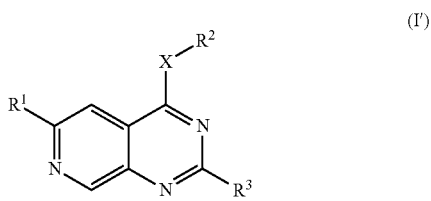

or a salt or solvate thereof,
wherein
R$^1$ is halogen, or unsubstituted C$_{1-6}$ alkyl;
X is —NH—;
R$^2$ is:
unsubstituted C$_{1-6}$ alkyl or C$_{1-6}$ alkyl substituted by:
C$_{1-6}$ alkyl;
unsubstituted C$_{3-7}$ cycloalkyl or C$_{3-7}$ cycloalkyl substituted by halogen, C$_{1-6}$ alkyl, C$_{6-10}$ aryl, or (C$_{6-10}$)aryl(C$_{1-6}$)alkyl;
unsubstituted C$_{6-10}$ aryl or C$_{6-10}$ aryl substituted by halogen, C$_{1-6}$ alkyl, C$_{6-10}$ aryl, or (C$_{6-10}$)aryl(C$_{1-6}$)alkyl;
unsubstituted 5- to 10-membered heteroaryl or 5- to 10-membered heteroaryl substituted by halogen, C$_{1-6}$ alkyl, C$_{6-10}$-aryl, or (C$_{6-10}$)aryl(C$_{1-6}$)alkyl;
CONR$^{11}$R$^{12}$, wherein R$^{11}$ and R$^{12}$ are independently H, C$_{1-6}$ alkyl, C$_{6-10}$ aryl, or (C$_{6-10}$)aryl(C$_{1-6}$)alkyl;
SOR$^{13}$, wherein R$^{13}$ is substituted or unsubstituted C$_{1-6}$ alkyl, substituted or unsubstituted C$_{6-10}$ aryl, substituted or unsubstituted (C$_{6-10}$)aryl(C$_{1-6}$)alkyl, or substituted or unsubstituted 5- to 10-membered heterocyclyl, wherein said substituted C$_{1-6}$ alkyl, substituted C$_{6-10}$ aryl, substituted (C$_{6-10}$)aryl(C$_{1-6}$)alkyl, and substituted 5- to 10-membered heterocyclyl are substituted by halogen, C$_{1-6}$ alkyl, C$_{6-10}$ aryl, or (C$_{6-10}$)aryl(C$_{1-6}$)alkyl;
SO$_2$R$^{14}$, wherein R$^{14}$ is substituted or unsubstituted C$_{1-6}$ alkyl, substituted or unsubstituted C$_{6-10}$ aryl, substituted or unsubstituted (C$_{6-10}$)aryl(C$_{1-6}$)alkyl, or substituted or unsubstituted 5- to 10-membered heterocyclyl, wherein said substituted C$_{1-6}$ alkyl, substituted C$_{6-10}$ aryl, substituted (C$_{6-10}$)aryl(C$_{1-6}$)alkyl, and substituted 5- to 10-membered heterocyclyl are substituted by halogen, C$_{1-6}$ alkyl, C$_{6-10}$ aryl, or (C$_{6-10}$)aryl(C$_{1-6}$)alkyl;
SO$_2$NR$^{15}$R$^{16}$, wherein R$^{15}$ and R$^{16}$ are independently H, substituted or unsubstituted C$_{1-6}$ alkyl, substituted or unsubstituted C$_{6-10}$ aryl, substituted or unsubstituted (C$_{6-10}$)aryl(C$_{1-6}$)alkyl, or substituted or unsubstituted 5- to 10-membered heteroaryl, wherein said substituted C$_{1-6}$ alkyl, substituted C$_{6-10}$ aryl, substituted (C$_{6-10}$)aryl(C$_{1-6}$) alkyl, and substituted 5- to 10-membered heteroaryl are substituted by C$_{1-6}$ alkyl, C$_{1-6}$ haloalkyl, C$_{6-10}$ aryl, (C$_{6-10}$)aryl(C$_{1-6}$)alkyl, 5- to 10-membered heteroaryl, halogen, —N(R$_a$)(R$_b$), —OR$_c$ or —SR$_d$, wherein R$_a$, R$_b$, R$_c$ and R$_d$ are independently hydrogen, C$_{1-6}$ alkyl or C$_{1-6}$ haloalkyl; or
SO(=NH)NHR$^{17}$, wherein R$^{17}$ is H, substituted or unsubstituted C$_{1-6}$ alkyl, substituted or unsubstituted C$_{6-10}$ aryl, substituted or unsubstituted (C$_{6-10}$)aryl(C$_{1-6}$)alkyl, or substituted or unsubstituted 5- to 10-membered heteroaryl, wherein said substituted C$_{1-6}$ alkyl, substituted C$_{6-10}$ aryl, substituted (C$_{6-10}$)aryl(C$_{1-6}$)alkyl, and substituted 5- to 10-membered heteroaryl are substituted by C$_{1-6}$ alkyl, C$_{1-6}$ haloalkyl, C$_{6-10}$ aryl, (C$_{6-10}$)aryl(C$_{1-6}$) alkyl, 5- to 10-membered heteroaryl, halogen, —N(R$_a$)(R$_b$), —OR$_c$ or —SR$_d$, wherein R$_a$, R$_b$, R$_c$ and R$_d$ are independently hydrogen, C$_{1-6}$ alkyl or C$_{1-6}$ haloalkyl;
unsubstituted C$_{3-7}$ cycloalkyl or C$_{3-7}$ cycloalkyl substituted by halogen, C$_{1-6}$ alkyl, C$_{6-10}$ aryl, or (C$_{6-10}$)aryl(C$_{1-6}$)alkyl;
unsubstituted C$_{6-10}$ aryl or C$_{6-10}$ aryl substituted by halogen, C$_{1-6}$ alkyl, C$_{6-10}$ aryl, or (C$_{6-10}$)aryl (C$_{1-6}$)alkyl; or
unsubstituted (C$_{6-10}$)aryl(C$_{1-6}$)alkyl or (C$_{6-10}$)aryl (C$_{1-6}$)alkyl substituted by halogen, C$_{1-6}$ alkyl, C$_{6-10}$ aryl, or (C$_{6-10}$)aryl(C$_{1-6}$)alkyl;
R$^3$ is:
substituted or unsubstituted N-containing 5- to 10-membered heterocyclyl selected from the group consisting of piperazinyl, piperidinyl, pyrrolidinyl, tetrahydropyridinyl, diazepanyl and octahydro-pyrrolopyrazinyl, wherein the substituent is C$_{1-6}$ alkyl, C$_{6-10}$ aryl, (C$_{6-10}$)aryl(C$_{1-6}$)alkyl or —N(R$_a$)(R$_b$), wherein R$_a$ and R$_b$ are independently hydrogen or C$_{1-6}$ alkyl.

2. The compound according to claim 1, wherein R$^2$ is:
unsubstituted C$_{1-3}$ alkyl or C$_{1-3}$ alkyl substituted by:
unsubstituted C$_{3-7}$ cycloalkyl or C$_{3-7}$ cycloalkyl substituted by halogen or C$_{1-6}$ alkyl,
unsubstituted C$_{6-10}$ aryl or C$_{6-10}$ aryl substituted by halogen or C$_{1-6}$ alkyl,
unsubstituted 5- to 10-membered heteroaryl or 5- to 10-membered heteroaryl substituted by halogen, C$_{1-6}$ alkyl, C$_{6-10}$ aryl, or (C$_{6-10}$)aryl(C$_{1-6}$)alkyl;
CONR$^{11}$R$^{12}$, wherein R$^{11}$ and R$^{12}$ are independently H, C$_{1-6}$ alkyl, C$_{6-10}$ aryl or (C$_{6-10}$)aryl(C$_{1-6}$)alkyl;
SOR$^{13}$, wherein R$^{13}$ is unsubstituted C$_{1-6}$ alkyl, unsubstituted C$_6$ aryl, unsubstituted (C$_{6-10}$)aryl(C$_{1-6}$)alkyl, unsubstituted 5-to 10-membered heterocyclyl, substituted C$_{1-6}$ alkyl, substituted C$_{6-10}$ aryl, substituted (C$_{6-10}$)aryl(C$_{1-6}$)alkyl, or substituted 5- to 10-membered heterocyclyl, wherein the substituent is C$_{1-6}$ alkyl, C$_{6-10}$ aryl, (C$_{6-10}$)aryl(C$_{1-6}$)alkyl or halogen;

SO$_2$R$^{14}$, wherein R$^{14}$ is unsubstituted C$_{1-6}$ alkyl, unsubstituted C$_{6-10}$ aryl, unsubstituted (C$_{6-10}$)aryl(C$_{1-6}$)alkyl, unsubstituted 5-to 10-membered heterocyclyl, substituted C$_{1-6}$ alkyl, substituted C$_{6-10}$ aryl, substituted (C$_{6-10}$)aryl(C$_{1-6}$)alkyl, or substituted 5- to 10-membered heterocyclyl, wherein the substituent is C$_{1-6}$ alkyl, C$_{6-10}$ aryl, (C$_{6-10}$)aryl(C$_{1-6}$)alkyl, or halogen;

SO$_2$NR$^{15}$R$^{16}$, wherein R$^{15}$ and R$^{16}$ are independently H, unsubstituted C$_{1-6}$ alkyl, unsubstituted C$_{6-10}$ aryl, unsubstituted (C$_{6-10}$)aryl(C$_{1-6}$)alkyl, unsubstituted 5- to 10-membered heteroaryl, substituted C$_{1-6}$ alkyl, substituted C$_{6-10}$ aryl, substituted (C$_{6-10}$)aryl(C$_{1-6}$)alkyl, or substituted 5- to 10-membered heteroaryl, wherein the substituent is C$_{1-6}$ alkyl, C$_{1-6}$ haloalkyl, C$_{6-10}$ aryl, (C$_{6-10}$)aryl(C$_{1-6}$)alkyl, 5- to 10-membered heteroaryl, halogen, —N(R$_a$)(R$_b$), —OR$_c$, or —SR$_a$, wherein R$_a$, R$_b$, R$_c$ and R$_d$ are independently hydrogen, C$_{1-6}$ alkyl, or C$_{1-6}$ haloalkyl; or SO(=NH)NHR$^{17}$, wherein R$^{17}$ is H, unsubstituted C$_{1-6}$ alkyl, unsubstituted C$_{6-10}$ aryl, unsubstituted (C$_{6-10}$)aryl(C$_{1-6}$)alkyl, unsubstituted 5- to 10-membered heteroaryl, substituted C$_{1-6}$ alkyl, substituted C$_{6-10}$ aryl, substituted (C$_{6-10}$)aryl(C$_{1-6}$)alkyl, or substituted 5- to 10-membered heteroaryl, wherein the substituent is C$_{1-6}$ alkyl, C$_{1-6}$ haloalkyl, C$_{6-10}$ aryl, (C$_{6-10}$)aryl(C$_{1-6}$)alkyl, 5- to 10-membered heteroaryl, halogen, —N(R$_a$)(R$_b$), —OR$_c$, or —SR$_a$, wherein R$_a$, R$_b$, R$_c$ and R$_d$ are independently hydrogen, C$_{1-6}$ alkyl, or C$_{1-6}$ haloalkyl;

unsubstituted C$_{3-7}$ cycloalkyl or C$_{3-7}$ cycloalkyl substituted by halogen, or C$_{1-6}$ alkyl;

unsubstituted C$_{6-10}$ aryl or C$_{6-10}$ aryl substituted by halogen or C$_{1-6}$ alkyl; or unsubstituted (C$_{6-10}$)aryl(C$_{1-3}$)alkyl or (C$_{6-10}$)aryl(C$_{1-3}$)alkyl substituted by halogen, or C$_{1-6}$ alkyl.

3. The compound according to claim 1, wherein X—R$^2$ is a group of formula

—NH—(CH$_2$)n-SO$_2$NR$^{15}$R$^{16}$ wherein:

n is 1, 2 or 3;

R$^{15}$ is H, unsubstituted C$_{1-6}$ alkyl or C$_{1-6}$ alkyl substituted by halogen, —N(R$_a$)(R$_b$), —OR$_c$, or —SR$_a$, wherein R$_a$, R$_b$, R$_c$, and R$_d$ are independently hydrogen or C$_{1-6}$ alkyl R$^{16}$ is H, unsubstituted C$_{1-6}$ alkyl, unsubstituted C$_{6-10}$ aryl, unsubstituted (C$_{6-10}$)aryl(C$_{1-6}$)alkyl, unsubstituted 5- to 10-membered heteroaryl, substituted C$_{1-6}$ alkyl, substituted C$_{6-10}$ aryl, substituted (C$_{6-10}$)aryl(C$_{1-6}$)alkyl or substituted 5- to 10-membered heteroaryl, wherein the substituent is C$_{1-6}$ alkyl, C$_{1-6}$ haloalkyl, C$_6$-aryl, 5- to 10-membered heteroaryl, halogen, —N(R$_a$)(R$_b$), —OR$^c$, or —SR$_a$, wherein R$_a$, R$_b$, R$_c$ and R$_d$ are independently selected from hydrogen, C$_{1-6}$ alkyl and C$_{1-6}$ haloalkyl.

4. The compound according to claim 1, wherein X—R$^2$ is a group of formula

—NH—(CH$_2$)n-Z wherein:

n is 1, 2 or 3;

Z is unsubstituted 5- or 6-membered heteroaryl or 5- or 6-membered heteroaryl substituted by halogen, C$_{1-6}$ alkyl, or (C$_{6-10}$)aryl(C$_{1-6}$)alkyl.

5. A compound having the structure:

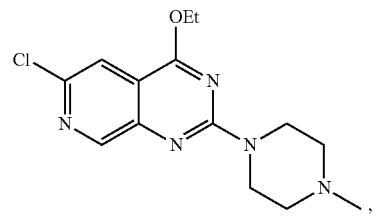,

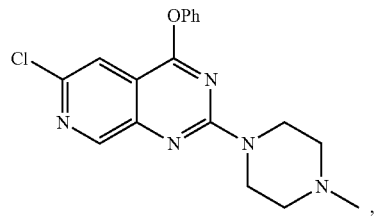,

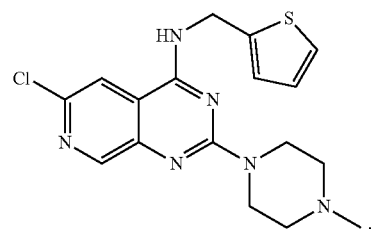,

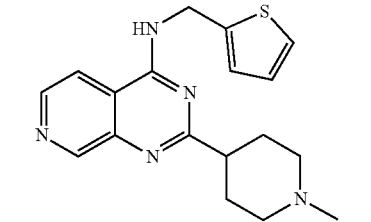,

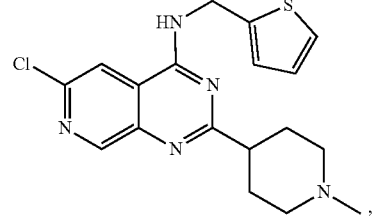,

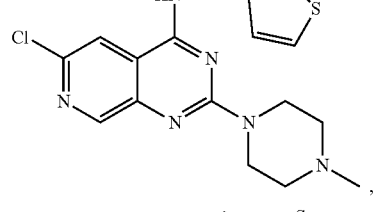,

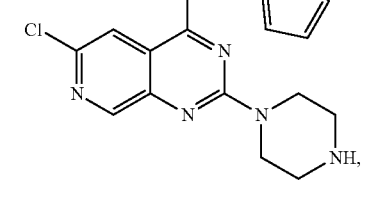,

-continued
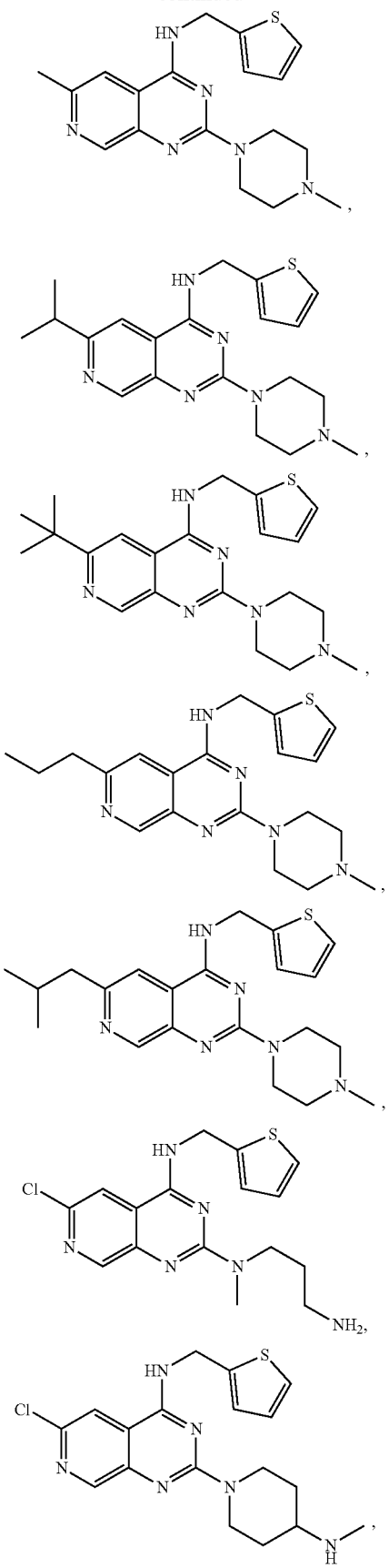
-continued
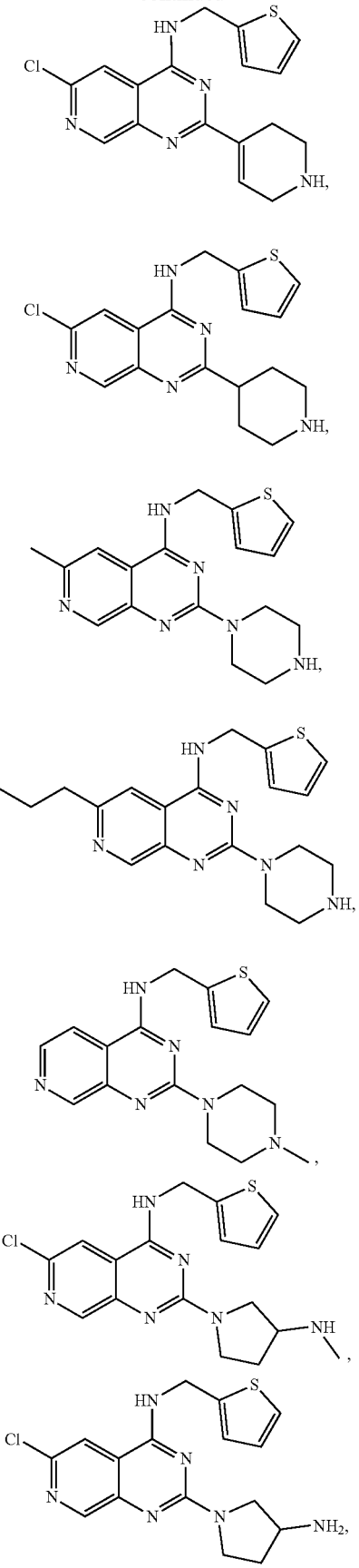

-continued
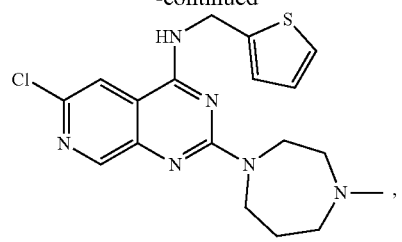
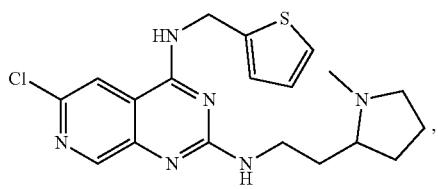
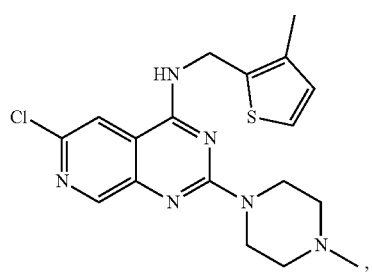
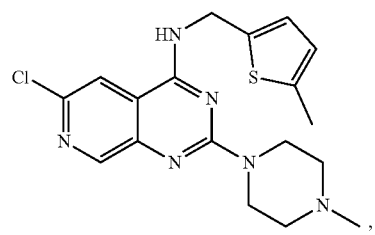
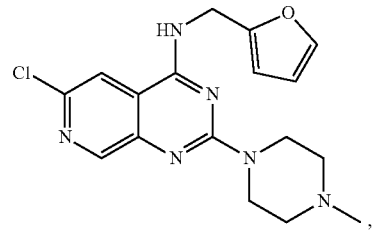
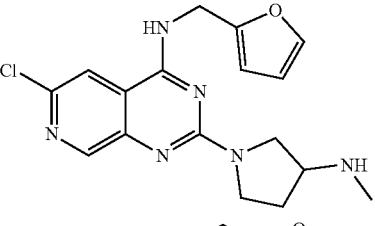
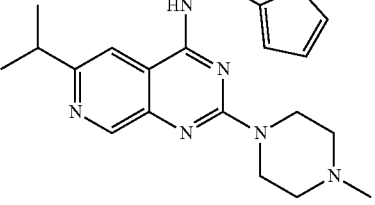
-continued
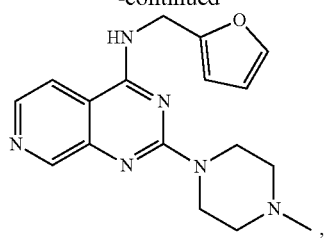
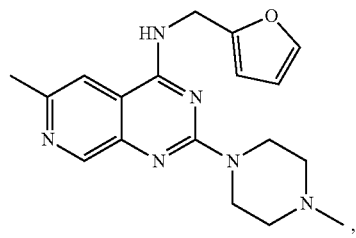
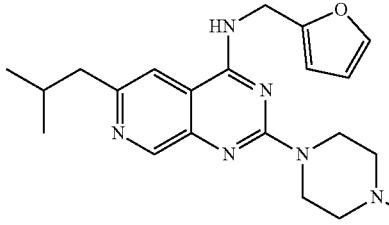
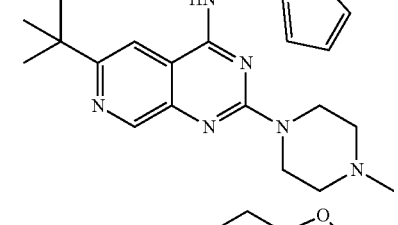
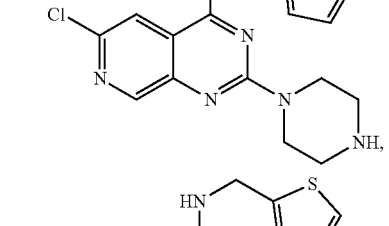
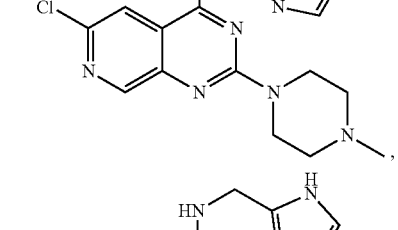
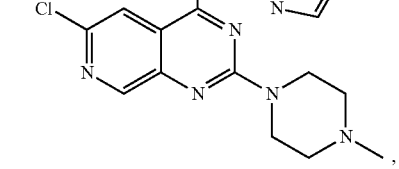

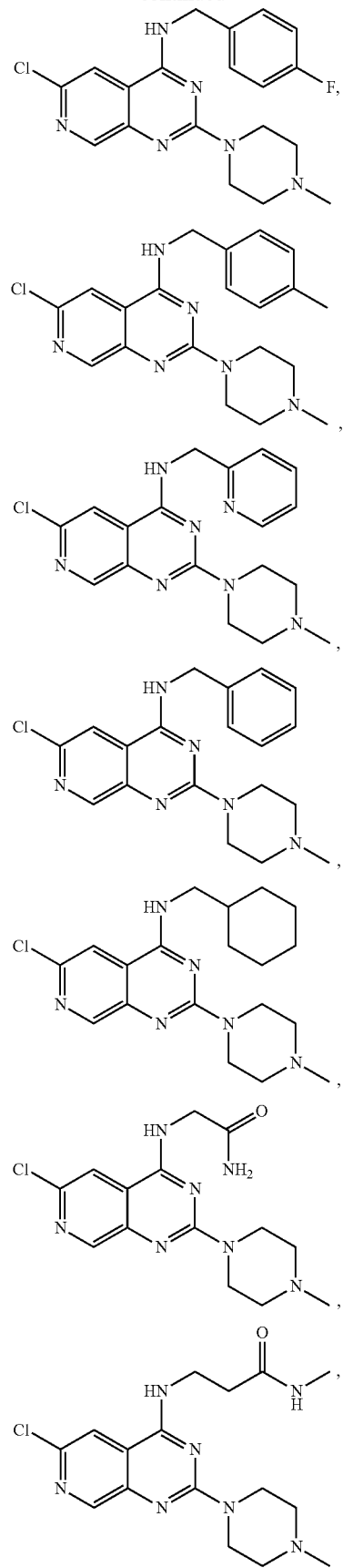
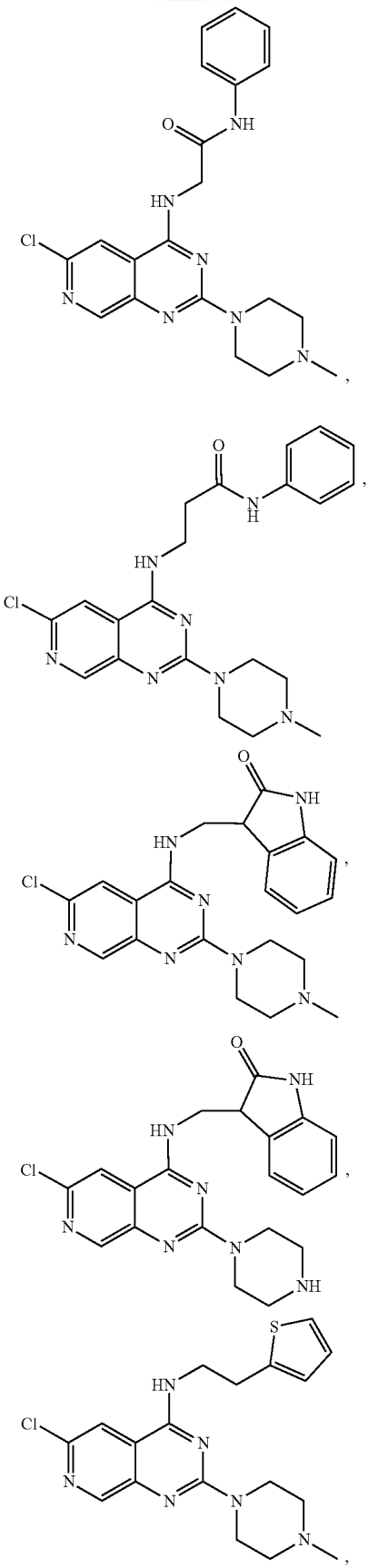

149
-continued
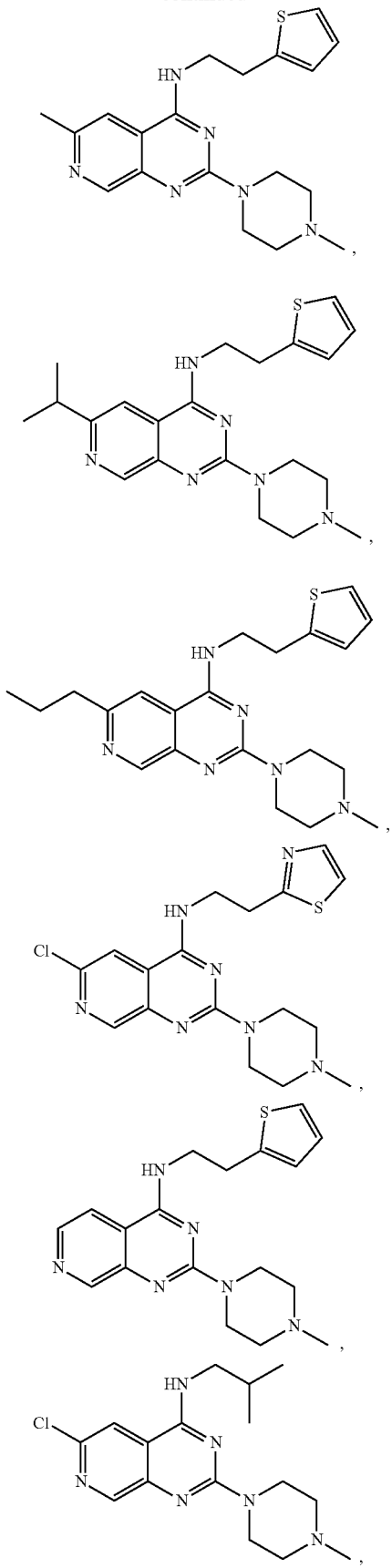
150
-continued
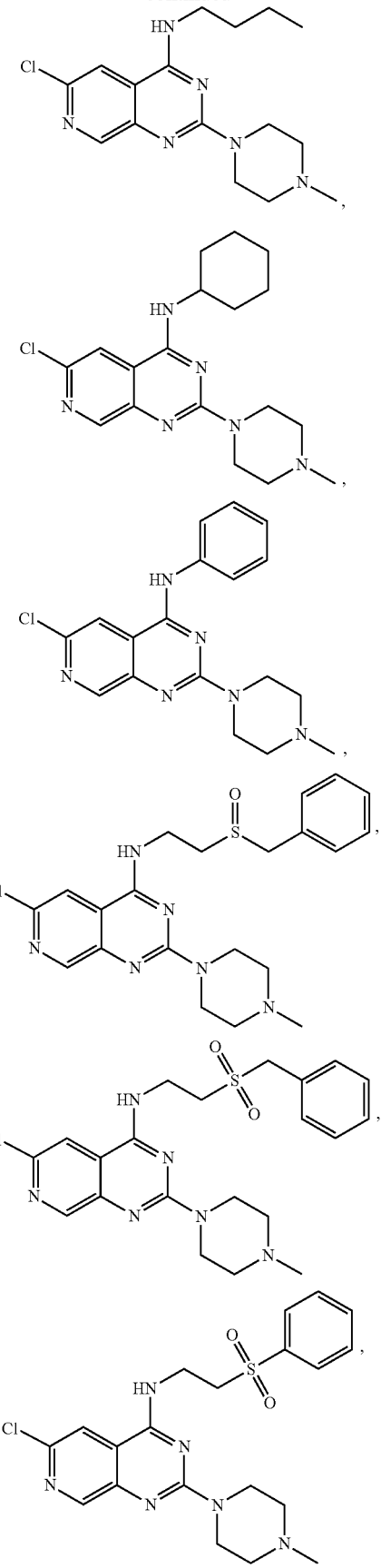

151
-continued
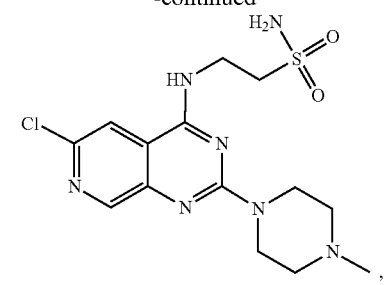
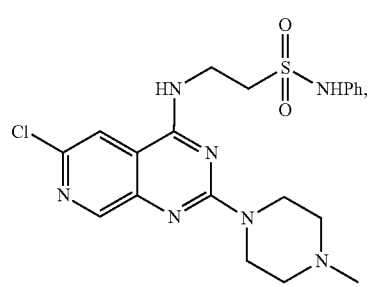
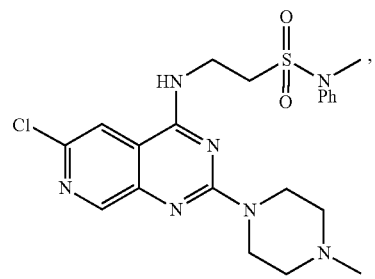
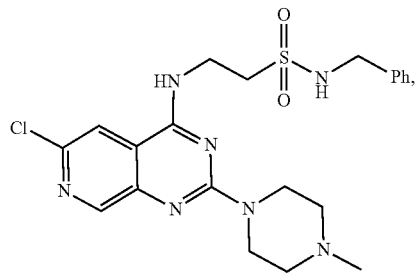
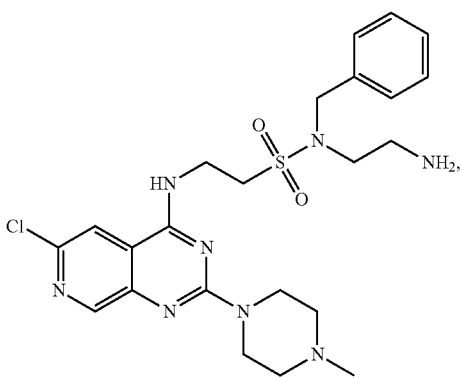
152
-continued
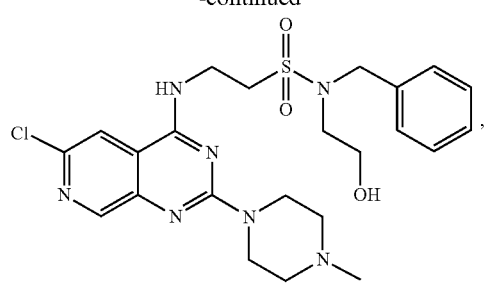,
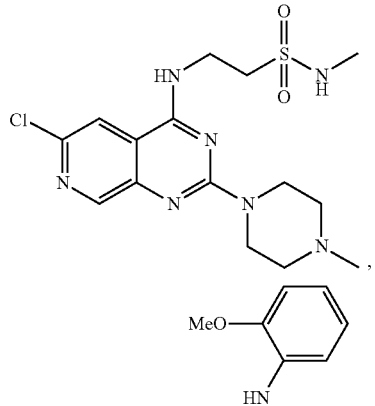,
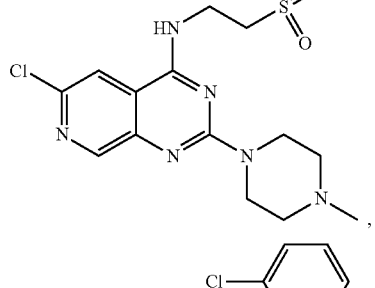,
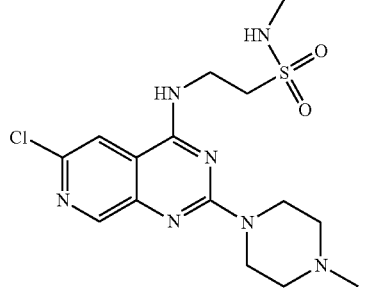,
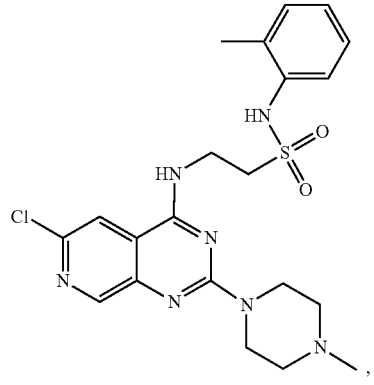, 153
-continued
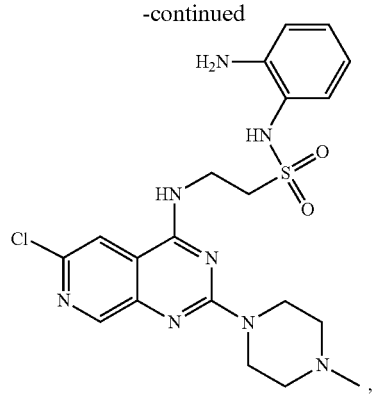
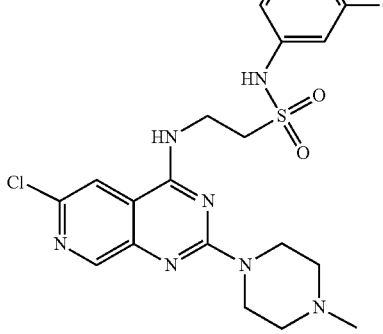
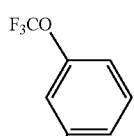
154
-continued
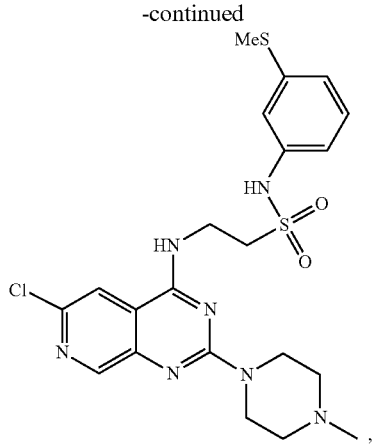
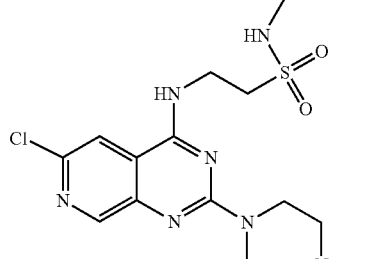
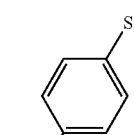
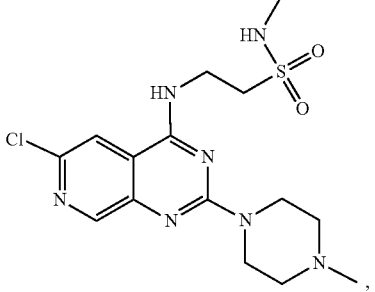

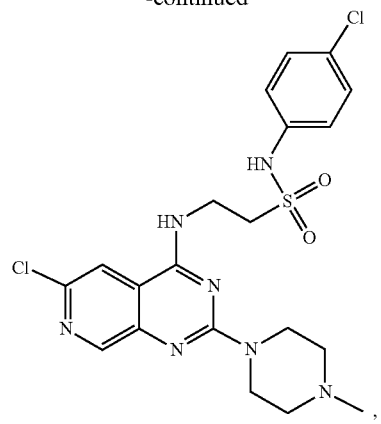
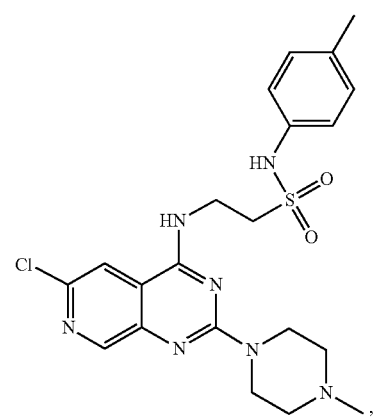
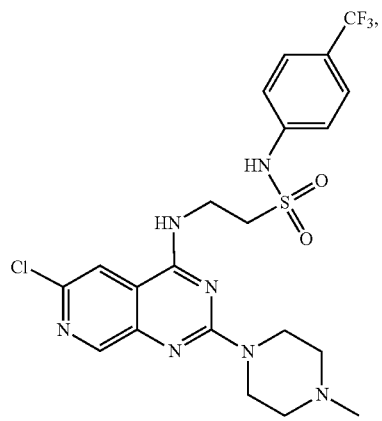
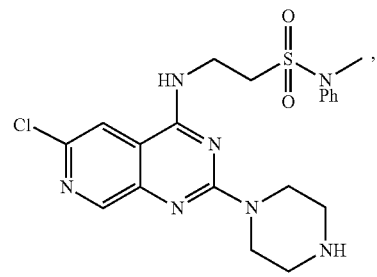
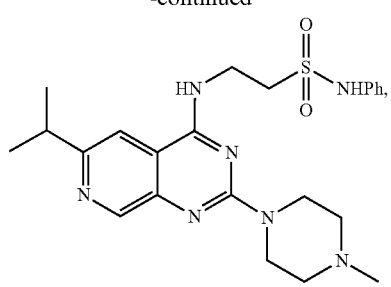
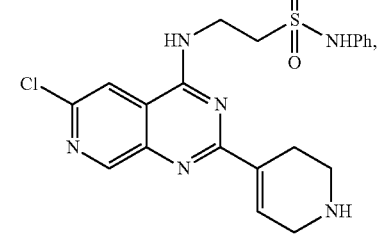
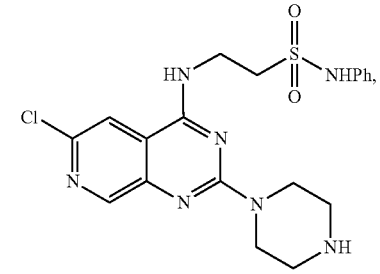
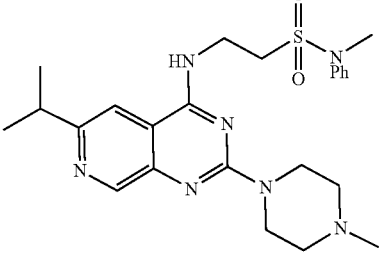
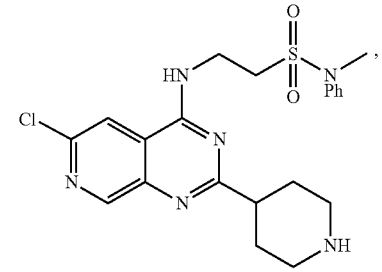
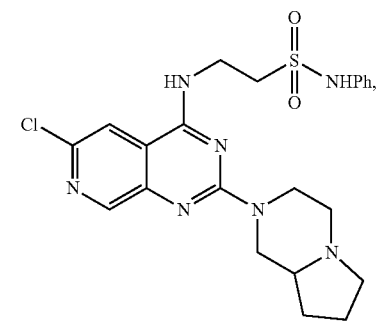

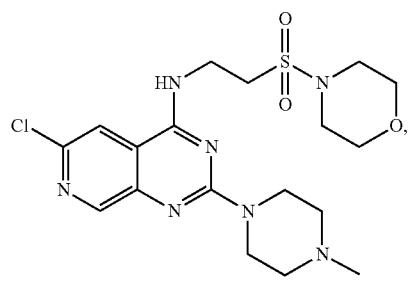
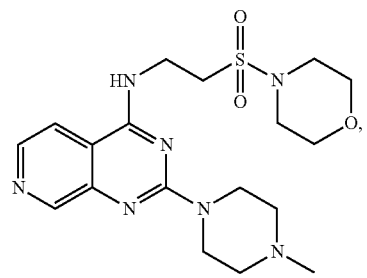
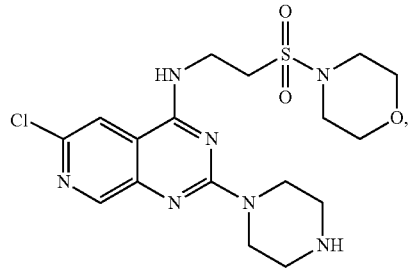
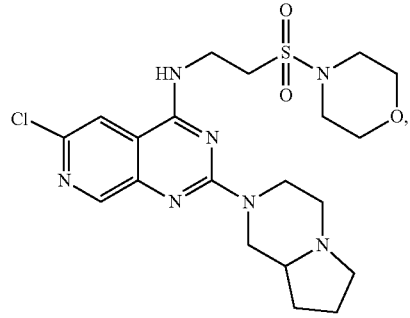
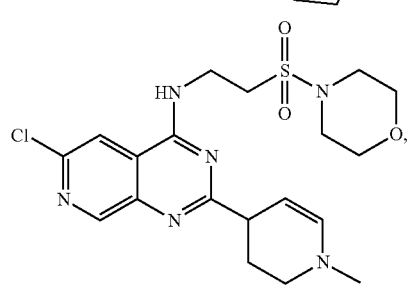
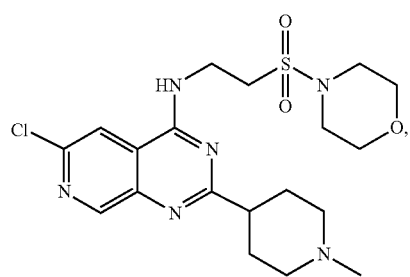
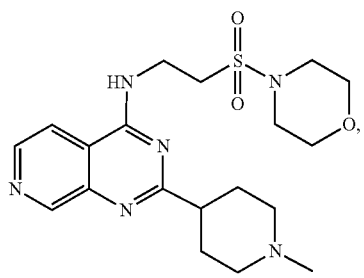
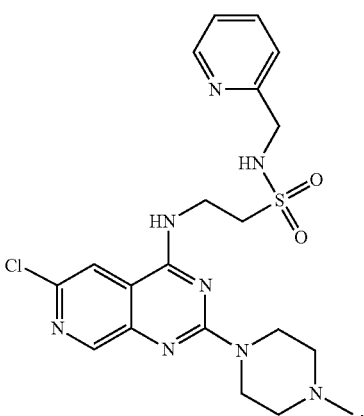
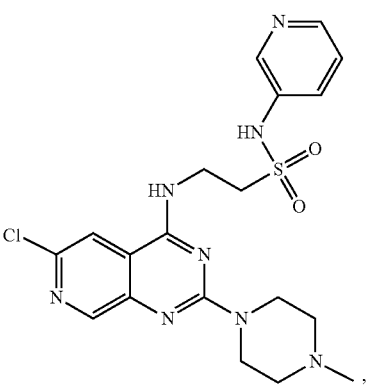
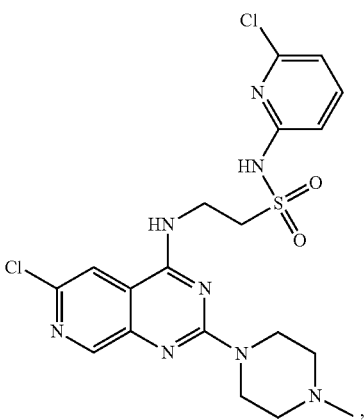

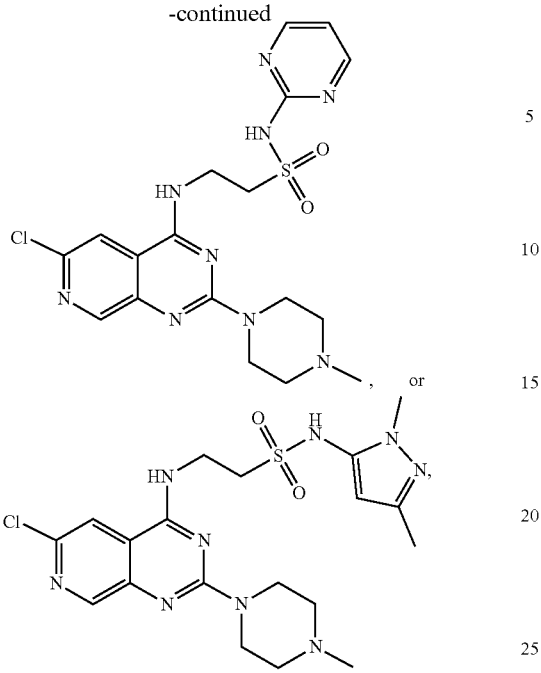
or a salt or solvate thereof.
6. A pharmaceutical composition comprising a compound of formula (I'), or a pharmaceutically acceptable salt or solvate thereof, as defined in claim 1 and a pharmaceutically acceptable excipient.
* * * * *